US012287799B2

(12) United States Patent
Gutiérrez et al.

(10) Patent No.: US 12,287,799 B2
(45) Date of Patent: *Apr. 29, 2025

(54) DYNAMIC PRESENTATION OF SEARCHABLE CONTEXTUAL ACTIONS AND DATA

(71) Applicant: COMAKE, INC., Los Angeles, CA (US)

(72) Inventors: Andres Gutiérrez, Los Angeles, CA (US); Adler Faulkner, Los Angeles, CA (US)

(73) Assignee: COMAKE, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,077

(22) Filed: Aug. 28, 2023

(65) Prior Publication Data

US 2023/0401222 A1 Dec. 14, 2023

Related U.S. Application Data

(63) Continuation of application No. 17/568,526, filed on Jan. 4, 2022, now Pat. No. 11,741,115, which is a (Continued)

(51) Int. Cl.
*G06F 16/24* (2019.01)
*G06F 9/451* (2018.01)
(Continued)

(52) U.S. Cl.
CPC .......... *G06F 16/2465* (2019.01); *G06F 9/451* (2018.02); *G06F 16/252* (2019.01); *G06F 16/9566* (2019.01); *H04L 67/02* (2013.01)

(58) Field of Classification Search
CPC . G06F 16/2465; G06F 16/9566; G06F 16/252
See application file for complete search history.

(56) References Cited

U.S. PATENT DOCUMENTS 6,144,962 A 11/2000 Weinberg et al.
6,370,537 B1 4/2002 Gilbert et al.
(Continued)

FOREIGN PATENT DOCUMENTS

WO WO-99/64945 A2 12/1999

OTHER PUBLICATIONS

Extended European Search Report on EPO App. 20902778.8, dated Oct. 31, 2023 (15 pages).
(Continued)

*Primary Examiner* — Baoquoc N To
(74) *Attorney, Agent, or Firm* — Foley & Lardner LLP

(57) ABSTRACT

Disclosed methods and systems allow a central server to monitor electronic units of work accessible to a group of computers and generate a nodal data structure representing the units of work. The server then uses various protocols, such as hashing algorithms and/or executing artificial intelligence and machine learning models to identify similar and/or related units of work. The server then merges/links the nodes corresponding to the similar/related units of work. The server also monitors all user activities. When a user or a software system/service accesses electronic content on his, her, or its electronic device, the server identifies a node corresponding to the accessed electronic content and associated unit(s) of work and presents searchable data and actions related to the identified node and any related/linked nodes.

20 Claims, 78 Drawing Sheets

Related U.S. Application Data continuation of application No. 17/510,349, filed on Oct. 25, 2021, now Pat. No. 11,442,950, which is a continuation of application No. 17/127,872, filed on Dec. 18, 2020, now Pat. No. 11,157,505, which is a continuation-in-part of application No. 16/889,409, filed on Jun. 1, 2020, now Pat. No. 10,970,349, which is a continuation-in-part of application No. 16/164,465, filed on Oct. 18, 2018, now Pat. No. 10,762,060.

(60) Provisional application No. 62/951,748, filed on Dec. 20, 2019, provisional application No. 62/854,682, filed on May 30, 2019, provisional application No. 62/573,914, filed on Oct. 18, 2017.

(51) Int. Cl.

| | |
|---|---|
| ***G06F 16/2458*** | (2019.01) |
| ***G06F 16/25*** | (2019.01) |
| ***G06F 16/955*** | (2019.01) |
| ***H04L 67/02*** | (2022.01) |

(56) References Cited

U.S. PATENT DOCUMENTS

| | | | |
|---|---|---|---|
| 8,880,787 | B1 | 11/2014 | Kimmel et al. |
| 9,143,468 | B1 | 9/2015 | Cohen et al. |
| 9,229,942 | B1 | 1/2016 | MacNeill |
| 9,497,288 | B2 | 11/2016 | Bhat et al. |
| 9,559,996 | B1 | 1/2017 | Clark et al. |
| 9,678,981 | B1 | 6/2017 | Taylor et al. |
| 9,824,095 | B1 | 11/2017 | Taylor et al. |
| 9,852,149 | B1 | 12/2017 | Taylor et al. |
| 10,387,934 | B1 | 8/2019 | Hoover |
| 2002/0194209 | A1 | 12/2002 | Bolosky et al. |
| 2003/0154212 | A1 | 8/2003 | Schirmer et al. |
| 2003/0198180 | A1 | 10/2003 | Cambron |
| 2003/0210278 | A1 | 11/2003 | Kyoya et al. |
| 2004/0046804 | A1 | 3/2004 | Chang |
| 2004/0215962 | A1 | 10/2004 | Douceur et al. |
| 2005/0091595 | A1 | 4/2005 | Shappell et al. |
| 2005/0182773 | A1* | 8/2005 | Feinsmith ............. G06Q 30/02 |
| 2005/0198238 | A1 | 9/2005 | Sim et al. |
| 2006/0195490 | A1 | 8/2006 | Toebes et al. |
| 2006/0282475 | A1 | 12/2006 | Suermondt et al. |
| 2008/0263113 | A1 | 10/2008 | Krishnaiyer et al. |
| 2008/0270450 | A1 | 10/2008 | Veitch et al. |
| 2008/0307393 | A1 | 12/2008 | Cartledge et al. |
| 2008/0319987 | A1 | 12/2008 | Takuma et al. |
| 2009/0157740 | A1 | 6/2009 | Barley et al. |
| 2010/0082644 | A1 | 4/2010 | Ly et al. |
| 2010/0114842 | A1 | 5/2010 | Forman et al. |
| 2010/0115001 | A1 | 5/2010 | Soules et al. |
| 2010/0169865 | A1 | 7/2010 | Clemm |
| 2010/0287512 | A1 | 11/2010 | Gan et al. |
| 2011/0010387 | A1 | 1/2011 | Chalouhi et al. |
| 2011/0213750 | A1 | 9/2011 | Kumar et al. |
| 2011/0239231 | A1 | 9/2011 | Brown et al. |
| 2011/0288962 | A1 | 11/2011 | Rankin et al. |
| 2012/0047149 | A1 | 2/2012 | Zhou et al. |
| 2012/0110515 | A1 | 5/2012 | Abramoff et al. |
| 2012/0131005 | A1 | 5/2012 | Shen et al. |
| 2012/0162230 | A1 | 6/2012 | Nevin, III |
| 2012/0324027 | A1 | 12/2012 | Vaynblat et al. |
| 2013/0006986 | A1 | 1/2013 | Phan et al. |
| 2013/0204955 | A1 | 8/2013 | Robinson et al. |
| 2013/0246315 | A1 | 9/2013 | Joshi et al. |
| 2013/0268830 | A1 | 10/2013 | Khosrowshahi et al. |
| 2014/0047372 | A1 | 2/2014 | Gnezdov et al. |
| 2014/0075004 | A1 | 3/2014 | Van Dusen et al. |
| 2014/0188840 | A1 | 7/2014 | Agarwal et al. |
| 2014/0324999 | A1 | 10/2014 | Dan et al. |
| 2015/0104114 | A1 | 4/2015 | Bai et al. |
| 2015/0106078 | A1 | 4/2015 | Chang |
| 2015/0186538 | A1 | 7/2015 | Yan et al. |
| 2016/0132521 | A1 | 5/2016 | Reininger et al. |
| 2016/0156631 | A1 | 6/2016 | Viswanathan et al. |
| 2016/0274976 | A1 | 9/2016 | Manjunath et al. |
| 2016/0306791 | A1* | 10/2016 | Allen ................. G06F 16/3329 |
| 2017/0017903 | A1 | 1/2017 | Gray et al. |
| 2017/0139576 | A1 | 5/2017 | Jeong et al. |
| 2017/0351726 | A1 | 12/2017 | Dean et al. |
| 2017/0357717 | A1 | 12/2017 | Hughes et al. |
| 2018/0129686 | A1 | 5/2018 | Vaishnav |
| 2018/0159928 | A1 | 6/2018 | Jin |
| 2018/0196812 | A1 | 7/2018 | Gupta et al. |
| 2018/0288736 | A1 | 10/2018 | Raman et al. |
| 2018/0373714 | A1 | 12/2018 | Elvheim et al. |
| 2019/0138587 | A1 | 5/2019 | Silk et al. |
| 2020/0076768 | A1 | 3/2020 | Eshghi |
| 2020/0334313 | A1 | 10/2020 | Kussmaul et al. |

OTHER PUBLICATIONS

Zhang Zhiyuan et al: "The Five Ws for 1-15 Information Visualization with Application to Healthcare Informatics", IEEE Transactions on Visualization and Computer Graphics, IEEE, USA, vol. 19, No. 11, Nov. 1, 2013 (Nov. 1, 2013), pp. 1895-1910, XP011526649, ISSN: 1077-2626, DOI: 10.1109/TVCG.2013.89 [retrieved on Sep. 11, 2013] * the whole document *.

"A desktop experience like never before", Meta, retrieved from https://www.gometa.com/, on Mar. 18, 2021, 6 pages.

"eLab Demo Day 2017: Startup Comake", Student Agencies and Entrepreneurship at Cornell, Apr. 30, 2018; https://www.youtube.com/watch?v=Dk3YSHmnJNo, 11 pages.

"Google Knowledge Graph", Wikipedia, retrieved from https://en.wikipedia.org/wiki/Google_Knowledge_Graph, on Mar. 18, 2021, 2 pages.

"An open source, standards-based software platform for multiple device categories", Tizen, retrieved from https://www.tizen.org/, on Mar. 18, 2021, 2 pages.

"Comake—Product Hunt", Comake, Aug. 26, 2017, retrieved from https://www.producthunt.com/upcoming/comake-6, on Jan. 16, 2019, 1 page.

"Comake—The modern file browser", Comake, BetaList, Aug. 26, 2017, retrieved from https://betalist.com/startups/comake, on Jan. 16, 2019, 7 pages.

"Comake: Rethinking Your File Browser", Comake, Cornell Business Review, Apr. 16, 2017, retrieved from http://www.cornellbusinessreview.com/cbr/2017/4/16/comake, on Jan. 16, 2019, 8 pages.

"News is 24/7—You Aren't.", Acciyo, Dec. 1, 2020, retrieved from http://web.archive.org/web/20201201141829/https://www.acciyo.com/, on Jun. 10, 2021, 6 pages.

"Student startup teams from colleges across the country compete for top honors and bragging rights in Student Startup Madness tournament", Student Startup Madness, Syracuse, N.Y., Jan. 4, 2017, retrieved from https://studentstartupmadness.com/field-of-64-college-startups-announced/, on Jan. 16, 2019, 6 pages.

"Student startup teams from colleges and universities across the country compete for top honors and bragging rights in Student Startup Madness tournament", Student Startup Madness, Syracuse, N.Y., Jan. 17, 2017, retrieved from https://studentstartupmadness.com/32-college-startups-in-national-tournament-semifinal-round/, on Jan. 16, 2019, 4 pages.

"The Operating system for SaaS," Comake, retrieved from https://docsend.com/view/jfptrq5uzczyx6ve, on Mar. 25, 2020, 25 pages.

"Welcome to X-Ray"—Cast—"Experience more with X-Ray on Prime Video. Get instant access to cast, characters, music, trivia, photos, videos and other bonus materials while you watch.", Amazon, retrieved from https://www.amazon.com/adlp/xray?tab=Cast, on Mar. 18, 2021, 5 pages.

"Welcome to X-Ray"—Scenes—"Experience more with X-Ray on Prime Video. Get instant access to cast, characters, music, trivia, photos, videos and other bonus materials while you watch.", Amazon, retrieved from https://www.amazon.com/adlp/xray, on Mar. 18, 2021, 5 pages.

(56) References Cited

OTHER PUBLICATIONS

Chan, Kristi, "Introducing the New 2016-2017 eLab Teams", Entrepreneurship @ Dyson, Oct. 27, 2016, retrieved from http://eship.dyson.cornell.edu/blog/2016/10/27/introducing-the-new-2016-2017-elab-teams/, on Jan. 16, 2019, 6 pages.
Chojecki, Przemek, "Crazy GPT-3 Use Cases", OpenAI, Jul. 27 (no year provided), retrieved from https://medium.com/towards-artificial-intelligence/crazy-gpt-3-use-cases-232c22142044, on Dec. 22, 2020, 8 pages.
Dhvanil@Dhvanilp, Twitter Thread, Jul. 23 (no year provided), retrieved from https://twitter.com/dhvanilp/status/1286452207513038848?s=20, on Dec. 22, 2020, 4 pages.
Dorm Room Fund, "Revolutionizing Workflow—Why We Funded Comake", Medium, Sep. 25, 2017, retrieved from https://medium.com/@dormroomfund/revolutionizing-workflow-why-we-funded-comake-c4b223c08f3b, on Jan. 16, 2019, 5 pages.
Dottotech, "Rapportive for Gmail—Essential Add On", Apr. 15, 2013, retrieved from https://www.youtube.com/watch?v=UP5RaquVV6U, on Mar. 18, 2021, 3 pages.
Filipowicz, "Look Up replaces Define in iOS 10: Here's how to use it", iMore, Oct. 7, 2016, retrieved from https://www.imore.com/look-replaces-define-ios-10-heres-how-use-it, on Mar. 18, 2021, 19 pages.
Fredricson, B., "Fast Python Collaborative Filtering for Implicit Feedback Datasheets", GitHub, retrieved from https://github.com/benfred/implicit/, on Jun. 1, 2020, 3 pages.
Google Cloud Search, "Create a content connector", Apr. 17, 2020, 23 pages.
GPT3 Examples, "What is GPT-3?", retrieved from https://gpt3examples.com/, on Dec. 22, 2020, 12 pages.
Gutierrez, Andres, "Apple TV Demo", Dec. 17, 2020; https://www.youtube.com/watch?v=gYTF0LQyKPs&feature=youtu.be, 3 pages.
Gutierrez, Andres, "Comake Overview", Apr. 17, 2020, retrieved from https://youtu.be/hZrOR25idmM, on Jun. 9, 2021, 6 pages.
Hovis, Kathy, "eHub opens doors to first set of student entrepreneurs", Cornell Chronicle, Jun. 27, 2016, retrieved from http://news.cornell.edu/stories/2016/06/ehub-opens-doors-first-set-student-entrepeneurs, on Jan. 16, 2019, 3 pages.
Hu et al., "Collaborative Filtering for Implicit Feedback Datasets," 2008 Eighth IEEE International Conference on Data Mining, Dec. 2008, downloaded on Jun. 1, 2020, pp. 263-272.
International Preliminary Report on Patentability on PCT Appl. Ser. No. PCT/US2020/066194 dated Jun. 30, 2022 (7 pages).
International Search Report and Written Opinion for PCT Appl. Ser. No. PCT/US2020/066194 dated Mar. 17, 2021 (7 pages).
Johnson, Dave, 'What is the X-Ray feature on Amazon Prime Video?': How to find and view bonus material about TV shows and movies, Jul. 10, 2020, retrieved from https://www.businessinsider.com/what-is-x-ray-on-prime-video, on Mar. 18, 2021, 10 pages.
Kauber, Fred, "Make Your Files Count", Entrepreneurship @ Dyson, Oct. 13, 2016, retrieved from http://eship.dyson.cornell.edu/blog/2016/10/13/make-your-files-count/, on Jan. 16, 2019, 12 pages.
Kauber, Fred, "Work-Work Balance: How Student Entrepreneurs Do Both", Entrepreneurship @ Dyson, Jan. 17, 2017, retrieved from http://eship.dyson.cornell.edu/blog/2017/01/17/work-work-balance-how-student-entrepeneurs-do-both/, on Jan. 16, 2019, 7 pages.
Lodhi, Nauman, "Top 5 Cloud Duplicate Finder Solutions", DZone, Cloud Zone, Nov. 7, 2019, 4 pages.
Ondrejcek, et al., "A Methodology for File Relationship Discovery," National Institute of Standards and Technology, Dec. 2009, 9 pages.
Paul Katsen@Pavtalk, Twitter Thread, Jul. 20 (no year provided), retrieved from https://twitter.com/pavtalk/status/1285410751092416513?s=20, on Dec. 22, 2020, 3 pages.
Windows Know How, "Windows 10: Get the most out of Cortana", YouTube, Aug. 15, 2017, https://www.youtube.com/watch?t=90&v=kNRj5aWZxDo&feature=youtu.be, 2 pages.
Xu, Shawn, "How to Think About Tech as You Start Business School", Medium, Oct. 11, 2017, retrieved from https://medium.com/@shawnxu/how-to-think-about-tech-as-you-start-business-school-806d546ef0d5, on Jan. 16, 2019, 8 pages.

* cited by examiner

FIG. 15D
My Company
Awesome Project
132
7 000
6 375
625
91,1%
Overdue Tasks
Upcoming Tasks

1506

1840

FIG. 19
1900
1902
1904
1906
Andres Gutierrez
Awesome Project
Overdue Tasks
Upcoming Tasks
Important Content
Content tagged with in this project

FIG. 20
Andres Gutierrez
Awesome Project
Today
Yesterday

3500B

3500A

4100

DYNAMIC PRESENTATION OF SEARCHABLE CONTEXTUAL ACTIONS AND DATA

CROSS-REFERENCE TO RELATED APPLICATIONS

This application is a continuation of U.S. application Ser. No. 17/568,526, filed Jan. 4, 2022, which is a continuation of U.S. patent application Ser. No. 17/510,349, filed Oct. 25, 2021, which is a continuation application of U.S. patent application Ser. No. 17/127,872, filed Dec. 18, 2020, which claims priority to U.S. Provisional Patent Application No. 62/951,748, filed Dec. 20, 2019. U.S. patent application Ser. No. 17/127,872 is also a continuation-in-part application of U.S. patent application Ser. No. 16/889,409, filed Jun. 1, 2020, which claims priority to U.S. Provisional Application No. 62/854,682, filed May 30, 2019. U.S. patent application Ser. No. 16/889,409 is also a continuation-in-part application of U.S. patent application Ser. No. 16/164,465, filed Oct. 18, 2018, which claims priority to U.S. Provisional Application No. 62/573,914, filed Oct. 18, 2017. Each of the aforementioned applications are incorporated herein by reference in their entirety.

TECHNICAL FIELD

This application relates generally to data management and mapping.

BACKGROUND

Productivity tools utilize software to track, manage, and/or store files, contacts, messages, comments, tasks, and more within different computing environments. Most conventional productivity tools systems are capable of keeping records of various versions, edits, collaborations, and/or related data (files, tasks, contacts, messages, comments, etc.) created or accessed by different users. Utilizing conventional productivity software systems, users can access and interact with various Components of Work, such as files, messages, tasks, etc. within different computing environments. Users can also monitor a revision/edit history of various Components of Work. However, conventional productivity systems suffer from at least two technical problems.

First, conventional productivity systems require users to store all files/data on a central electronic data repository (e.g., database, cloud storage, and the like). Storing large volumes of data on a central data repository requires high amount of data storage, which is costly, inefficient, and/or even impractical when working with clients or collaborators that prefer using repositories from competing providers. For instance, managing interrelated Components of Work in a central repository requires significant processing power due to number, size, content, and relationships between the Components of Work. Online collaborative applications are increasingly emerging where multiple users can simultaneously access, store, share, edit, comment on, and create tasks for online files. Many of these applications come with their own file types, their own file storage, their own messaging or commenting features, their own project management, contact lists, and even their own file browser. Ultimately, many people today find themselves in a digital reality defined by data/content that is highly fragmented. As a result, conventional productivity software systems either require high processing power, which is costly, or do not monitor the files in a timely manner, which is highly undesirable and inefficient.

Second, conventional productivity software systems may require users to designate related Components of Work. For instance, conventional workflow management systems require users to either tag related files/messages/tasks, designate a related project to a file/message/task, or name files/tasks/contacts in accordance with predetermined naming requirements. Therefore, conventional productivity software systems shift the burden of identifying relationships between components/units of work (e.g., files, messages, tasks, contacts) onto users, which is highly undesirable and creates a negative user experience.

SUMMARY

For the aforementioned reasons, there is a need for a workflow management system and method that can automatically and efficiently identify related Components of Work, collect relevant actions and data surrounding the related Components of Work across various systems, services, and provides, and display the results in real-time or near real-time. There is a need for a workflow management system that does not require users to manually identify related files, communication, projects, or other context. Furthermore, there is a need for a workflow management system that does not require users to store all their data in a single central electronic data repository.

Even though certain embodiments herein are described in the context of files, it is expressly understood that the methods and systems described herein apply to any components of work. For instance, while methods, systems, and embodiments disclosed herein describe analytics server (or any other server or computing device) identifying whether two files are related, the same servers or other computing devices can use the disclosed methods, systems, and embodiments to identify related components of work. Non-limiting examples of a Component of Work may include messages, tasks, contacts, deals, clients, employees, contacts, notifications, online articles, videos, songs, websites, applications, addresses, time, tags, and the like.

In an embodiment, a method comprises periodically scanning, by a server, a plurality of electronic data repositories accessible to a plurality of computing devices to identify a set of data accessible to at least one computing device within the plurality of computing devices, each subset of representing at least one action performed on at least one computing device; executing, by the server, an analytical protocol to generate a unique identifier of each subset of data; generating, by the server, a nodal data structure comprising a set of nodes where each node comprises a unique identifier for each respective subset of data; for each pair of unique identifiers that satisfy a relevance threshold, linking, by the server, respective nodes corresponding to at least two subsets of data; in response to identifying that at least one computing device is accessing electronic content retrieving, by the server, an identification of the electronic content accessed by the computing device; identifying, by the server using the retrieved identification of the electronic content, a node corresponding to the electronic content; and presenting, by the server, a window including context data associated with at least one of the identified node and any other node linked to the identified node, the context data identifying at least one of a file, a user, or a message associated with the identified node or any other node linked to the identified node.

In another embodiment, a plurality of electronic data repositories storing a set of data; a plurality of computing devices having access to the set of data stored onto the plurality of electronic data repositories; a server in communication with each computing device and each electronic data repository, the server configured to periodically scan the plurality of electronic data repositories to identify the set of data accessible to at least one computing device within the plurality of computing devices, each subset of representing at least one action performed on at least one computing device; execute an analytical protocol to generate a unique identifier of each subset of data; generate a nodal data structure comprising a set of nodes where each node comprises a unique identifier for each respective subset of data; for each pair of unique identifiers that satisfy a relevance threshold link respective nodes corresponding to at least two subsets of data; in response to identifying that at least one computing device is accessing electronic content: retrieve an identification of the electronic content accessed by the computing device; identify using the retrieved identification of the electronic content, a node corresponding to the electronic content; and present a window including context data associated with at least one of the identified node and any other node linked to the identified node, the context data identifying at least one of a file, a user, or a message associated with the identified node or any other node linked to the identified node.

In an embodiment, a method comprises periodically scanning, by a server, a plurality of electronic data repositories accessible to a plurality of computing devices to identify a plurality of files stored onto the plurality of electronic data repositories where each file is accessible to at least one computing device within the plurality of computing devices; executing, by the server, a protocol to generate at least one unique identifier of each file within the plurality of files; retrieving, by the server for each file, context data comprising at least one of a time stamp, access history, and edit history associated with each identified electronic file; generating, by the server, an artificial intelligence model comprising a set of nodes where each node comprises metadata indicating a unique identifier and context data for each respective electronic file; executing the artificial intelligence model to identify a likelihood of reliance value for each pair of electronic files within the identified plurality of electronic filed, wherein each likelihood of relevance value correspondents to a likelihood that two electronic files are related to each other; for each pair of electronic files having a likelihood of relevance value that satisfy a threshold: merging, by the server, respective nodes corresponding to the pair of electronic files; in response to receiving, from an electronic client device, a request to access a file, identifying, by the server, a node corresponding to the requested file; and displaying, by the server, an indication of the file and any other files with a related node to the identified node of the requested file.

In an embodiment, a method comprises periodically scanning, by a server, a plurality of electronic data repositories accessible to a plurality of computing devices to identify a plurality of files stored onto the plurality of electronic data repositories where each file is accessible to at least one computing device within the plurality of computing devices; executing, by the server, a protocol to generate at least one unique identifier of each file within the plurality of files; retrieving, by the server for each file, context data comprising at least one of a time stamp and access history; executing, by the server, a computer model to identify related files based on each file's context data and unique identifier to generate a plurality of groups where each group comprises at least one electronic file; monitoring, by the server, electronic communication between a set of users to identify a set of electronic communication events between at least two users, where each electronic communication is associated with at least one group of files; identifying, by the server, context data associated with each identified electronic communication event, the context data comprising at least a time stamp of each electronic communication event and an electronic file and its corresponding group; generating, by the server, a score for each user within the set of users, the score corresponding to the identified context data of the identified electronic communication events; and generating, by the server, a graphical user interface having a set of graphical component each representing at least one user within the set of users, wherein the set of graphical components are arranged in accordance with the score of each user represented by each respective graphical component.

In another embodiment, context data is associated with at least one electronic communication event comprises a text of that electronic communication event. In another embodiment, the score for each user further corresponds to the text of at least one electronic communication event. In another embodiment, the server filters or sorts the set of graphical elements within the graphical user interface based on an attribute. In another embodiment, the server displays a list of attributes on the graphical user interface. In another embodiment, the attribute corresponds to a department, office, role, team, project, or skill associated with at least one user. In another embodiment, when a user interacts with at least one graphical component representing at least one user, the server displays a profile of that user. In another embodiment, the server displays at least one group of files associated with the user. In another embodiment, the server displays at least one application associated with the user. In another embodiment, the server displays at least one other user associated with the selected user.

In another embodiment, a method comprises periodically scanning, by a server, a plurality of electronic data repositories accessible to a plurality of computing devices to identify a plurality of files stored onto the plurality of electronic data repositories where each file is accessible to at least one computing device within the plurality of computing devices; executing, by the server, a protocol to generate at least one unique identifier of each file within the plurality of files; retrieving, by the server for each file, context data comprising at least one of a time stamp and access history; executing, by the server, a computer model to identify related files based on each file's context data or unique identifier; generating, by the server, a nodal data structure comprising a set of nodes where each node within at least a subset of the set of nodes corresponds to a file within the set of files, each node within the set of nodes linked to at least one other node; in response to receiving a time period input from a user, identifying, by the server, a cluster of linked nodes associated with the user during the time period inputted; and dynamically displaying, by the server, a graphical element corresponding to the identified cluster of linked nodes.

In another embodiment, a system comprises a server in communication with at least one electronic data repository and a plurality of electronic devices each configured to access at least one file stored onto the at least one electronic data repository, the server comprising a processor and a non-transitory computer-readable medium containing instructions that when executed by the processor causes the processor to perform operations comprising periodically scan the plurality of electronic data repositories accessible to the plurality of computing devices to identify a plurality of files stored onto the plurality of electronic data repositories where each file is accessible to at least one computing device within the plurality of computing devices; execute a protocol to generate at least one unique identifier of each file within the plurality of files; retrieve for each file, context data comprising at least one of a time stamp and access history; execute a computer model to identify related files based on each file's context data or unique identifier; generate a nodal data structure comprising a set of nodes where each node within at least a subset of the set of nodes corresponds to a file within the set of files, each node within the set of nodes linked to at least one other node; in response to receiving a time period input from a user, identify a cluster of linked nodes associated with the user during the time period inputted; and dynamically display a graphical element corresponding to the identified cluster of linked nodes.

In another embodiment, a method comprises periodically scanning, by a server, a plurality of electronic data repositories accessible to a plurality of computing devices to identify a plurality of files stored onto the plurality of electronic data repositories where each file is accessible to at least one computing device within the plurality of computing devices; executing, by the server, a protocol to generate at least one unique identifier of each file within the plurality of files; retrieving, by the server for each file, context data comprising at least one of a time stamp and access history; executing, by the server, a computer model to identify related files based on each file's context data or unique identifier; generating, by the server, a nodal data structure comprising a set of nodes where each node within at least a subset of the set of nodes corresponds to a file within the set of files, each node within the set of nodes linked to at least one other node; receiving, by the server, a prioritization attribute associate from a user device; receiving, by the server, a set of notifications associated with the user device; identifying, by the server within the nodal data structure, a node associated with each notification; generating, by the server, a score for each notification, the score corresponding to the prioritization attribute and the identified node associated with each respective node; and outputting, by the server, the set of notifications in an order corresponding to each notification's respective score.

In another embodiment, a server in communication with at least one electronic data repository and a plurality of electronic devices each configured to access at least one file stored onto the at least one electronic data repository, the server comprising a processor and a non-transitory computer-readable medium containing instructions that when executed by the processor causes the processor to perform operations comprising periodically scan the plurality of electronic data repositories accessible to the plurality of computing devices to identify a plurality of files stored onto the plurality of electronic data repositories where each file is accessible to at least one computing device within the plurality of computing devices; execute a protocol to generate at least one unique identifier of each file within the plurality of files; retrieve for each file, context data comprising at least one of a time stamp and access history; execute a computer model to identify related files based on each file's context data or unique identifier; generate a nodal data structure comprising a set of nodes where each node within at least a subset of the set of nodes corresponds to a file within the set of files, each node within the set of nodes linked to at least one other node; receiving, by the server, a prioritization attribute associate from a user device; receiving, by the server, a set of notifications associated with the user device; identifying, by the server within the nodal data structure, a node associated with each notification; generating, by the server, a score for each notification, the score corresponding to the prioritization attribute and the identified node associated with each respective node; and outputting, by the server, the set of notifications in an order corresponding to each notification's respective score.

In another embodiment, a method comprises periodically scanning, by a server, a plurality of electronic data repositories accessible to a plurality of computing devices to identify a plurality of files stored onto the plurality of electronic data repositories where each file is accessible to at least one computing device within the plurality of computing devices; executing, by the server, a protocol to generate at least one unique identifier of each file within the plurality of files; retrieving, by the server for each file, context data comprising at least one of a time stamp and access history; executing, by the server, a computer model to identify related files based on each file's context data or unique identifier; generating, by the server, a nodal data structure comprising a set of nodes where each node within at least a subset of the set of nodes corresponds to a file within the set of files, each node within the set of nodes linked to at least one other node; receiving, by the server, an attribute from a user; identifying, by the server within the nodal data structure, a cluster of related nodes associated with the received attribute; and when the user initiates a browser application, dynamically generating, by the server, a first link displayed by the browser application and configured to direct the browser application to one or more electronic files associated with identified cluster of related nodes.

In another embodiment, a system comprises a server in communication with at least one electronic data repository and a plurality of electronic devices each configured to access at least one file stored onto the at least one electronic data repository, the server comprising a processor and a non-transitory computer-readable medium containing instructions that when executed by the processor causes the processor to perform operations comprising: periodically scan a plurality of electronic data repositories accessible to a plurality of computing devices to identify a plurality of files stored onto the plurality of electronic data repositories where each file is accessible to at least one computing device within the plurality of computing devices; execute a protocol to generate at least one unique identifier of each file within the plurality of files; retrieve, for each file, context data comprising at least one of a time stamp and access history; execute a computer model to identify related files based on each file's context data or unique identifier; generate a nodal data structure comprising a set of nodes where each node within at least a subset of the set of nodes corresponds to a file within the set of files, each node within the set of nodes linked to at least one other node; receive an attribute from a user; identify, within the nodal data structure, a cluster of related nodes associated with the received attribute; and when the user initiates a browser application, dynamically generate a first link displayed by the browser application and configured to direct the browser application to one or more electronic files associated with identified cluster of related nodes.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
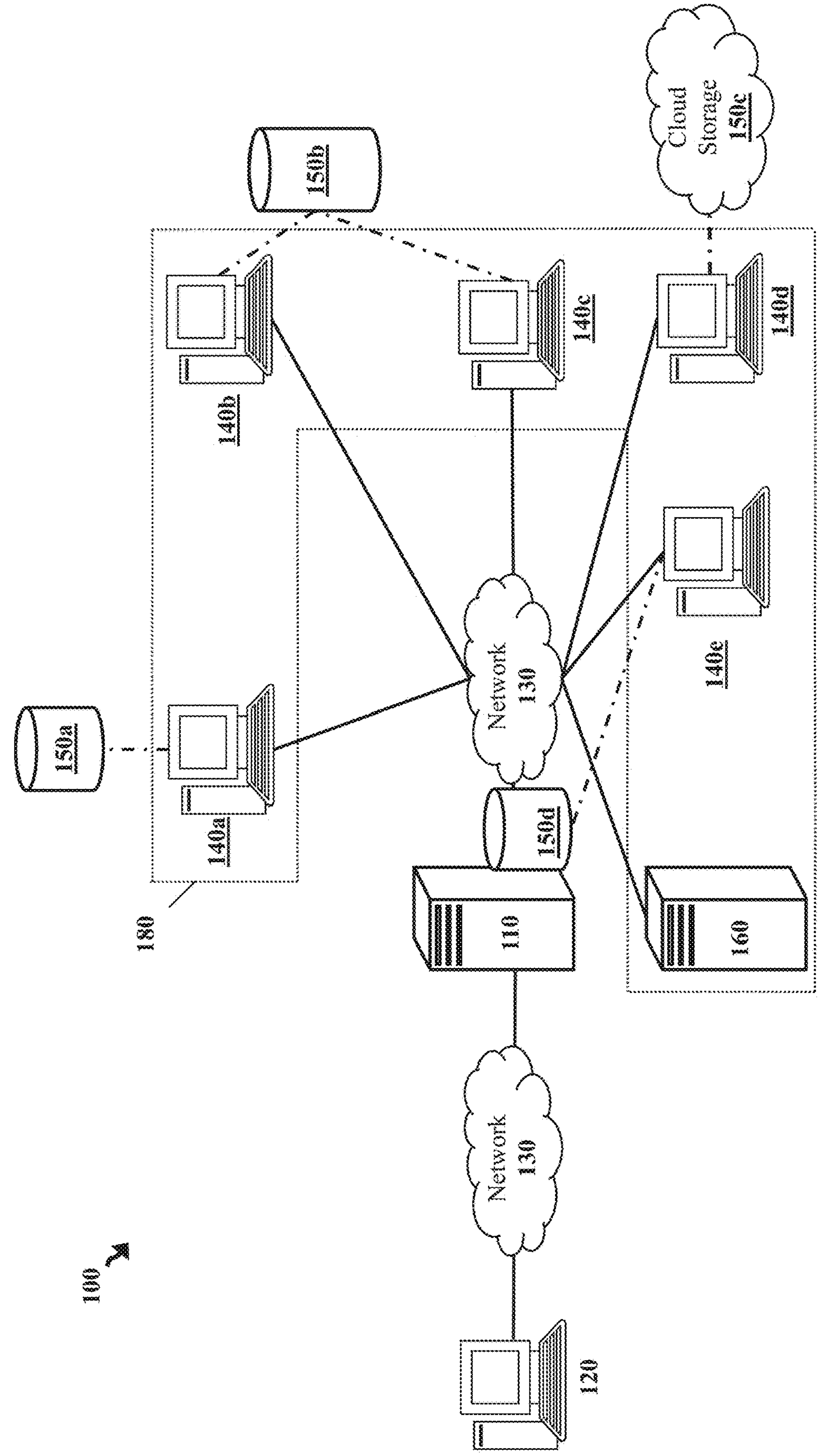
FIG. 1 illustrates components of an electronic workflow management system, in accordance with an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 illustrates components of an electronic workflow management system 100. The electronic workflow management system 100 may also be referred to herein at the electronic workflow management system. The electronic workflow management system 100 may include an analytics server 110, an administrator computing device 120, user computing devices 140*a-e* (collectively user computing devices 140), electronic data repositories 150*a-d* (collectively electronic data repositories 150), and third-party server 160. The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets, or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The electronic workflow management system 100 is not confined to the components described herein and may include additional or alternate components, not shown for brevity, which are to be considered within the scope of the electronic workflow management system 100.

The analytics server 110 may generate and display a graphical user interface (GUI) on each user computing devices 140 within a network 180. The analytics server 110 may also display the GUI on the administrator-computing device 120. An example of the GUI generated and hosted by the analytics server 110 may be a web-based application or a website, as depicted in FIGS. 5, 6A-C, 7A-B, 15, and 19-29.

The analytics server 110 may host a website accessible to end-users, where the content presented via the various webpages may be controlled based upon each particular user's role. The analytics server 110 may be any computing device comprising a processor and non-transitory machine-readable storage capable of executing the various tasks and processes described herein. Non-limiting examples of such computing devices may include workstation computers, laptop computers, server computers, cell phones, and the like. While the electronic workflow management system 100 includes a single analytics server 110, in some configurations, the analytics server 110 may include any number of computing devices operating in a distributed computing environment to achieve the functionalities described herein.

The analytics server 110 may execute software applications configured to display the GUI (e.g., host a website), which may generate and serve various webpages to each user computing device 140 and/or the administrator computing device 120. Different users operating the user computing devices 140 may use the website to generate, access, and store data (e.g., files) stored on one or more of the electronic data repositories 150, as described in detail in FIGS. 2, 5, 6, and 7. In some implementations, the analytics server 110 may be configured to require user authentication based upon a set of user authorization credentials (e.g., username, password, biometrics, cryptographic certificate, and the like). In such implementations, the analytics server 110 may access a system database 150*d* configured to store user credentials, which the analytics server 110 may be configured to reference in order to determine whether a set of entered credentials (purportedly authenticating the user) match an appropriate set of credentials that identify and authenticate the user.

As described herein a file refers to contained data available to at least one operating system and/or at least one software program. A file may contain data, such as text, video, computer program, audio, and the like. Furthermore, a file can also refer to a path associated with data. For example, a file, as used herein, can refer to a traditional file or folder on a local machine, a shortcut to a file/folder on a different machine, and/or a reference to a file/folder in an email message. Another non-limiting example of a file may include a reference to the location of a file/folder by website URL or file/folder path, a file/folder that only exists online or is not traditionally saved to a local machine's normal file. The path may not be accessible through the main system's file browser (e.g., Google Docs®, Evernote Notes®, and the like) that are not typically accessible through a computer's Windows Explorer or MacOS Finder unless explicitly downloaded to a folder in a different format that might lose either functionality or context such as related content and comments). In some configurations, the analytics server 110 may provide an application native to the user computing devices 140 or other electronic devices used by users where users may access the native application using the user computing devices 140 or any other computing devices (e.g., personal electronic devices) to generate, access, store, or otherwise interact with data stored onto the electronic data repositories 150. The native application may be any application that is directly in communication with the analytics server 110. For example, the native application may be a mobile application, cloud-based application, universal GUI, and/or virtual/cloud-based "desktop" where users (upon being authenticated) can access, interact with, and manipulate data stored onto the electronic data repositories 150.

In some configurations, the analytics server 110 may generate and host webpages based upon a particular user's role within the electronic workflow management system 100 (e.g., administrator, employee, or the employer). In such implementations, the user's role may be defined by data fields and input fields in user records stored in the system database 150*d*. The analytics server 110 may authenticate each user and may identify the user's role by executing an access directory protocol (e.g., LDAP). The analytics server 110 may generate webpage content, access or generate data stored in the electronic data repositories 150, according to the user's role defined by the user record in the system database 150*d*. For instance, a user may be defined as a lower level employee who may not be authorized to view all related content to a particular sensitive file. Therefore, the analytics server 110 may customize the GUI according to the user's authentication level. Furthermore, the analytics server 110 may customize the GUI according to a user's role (e.g., function type). For instance, the analytics server 110 may customize the GUI based on whether a user is a designer or an account manager.

In operation, when instructed by the administrator-computing device 120 and/or any user-computing device 140, the analytics server 110 may execute various scanning and crawling protocols to identify and map data stored onto each electronic data repository 150. As described herein, the analytics server 110 may also execute various predetermined protocols to generate unique identifiers for the above-described files/data, identify related files, create a nodal data structure, periodically scan the electronic data repositories, update the nodal data structure, and display related files and context information on the above-described GUI. In some implementations, the analytics server 110 may incorporate the GUI into a third-party application, such as a third-party email application or a file sharing/management application while preserving the "look and feel" of the third-party application.

In some configurations, the analytics server 110 may compare unique identifiers included in the metadata of each file. For instance, a file may have metadata that includes unique identifiers associated with elements related to the file (e.g., email, tasks, storage location, and the like). In some embodiments, the analytics server 110 may use these unique identifiers to determine whether the file is related to any other files.

User computing devices 140 may be any computing device comprising a processor and a non-transitory machine-readable storage medium capable of performing the various tasks and processes described herein. Non-limiting examples of a user-computing device 140 may be a workstation computer, laptop computer, tablet computer, and server computer. As depicted in FIG. 1, the user computing devices 140 may each be operated by a user within the network 180. In a non-limiting example, the network 180 represents an internal network and/or collection of computing devices connected within an entity. For instance, network 180 may represent all computing devices operated by all employees of a company. User computing devices 140 may be internally interconnected via an internal and/or private network of the network 180 (not shown). For instance, a company's intranet or any other private network may connect all the company's computing devices. In FIG. 1, user-computing devices 140 are interconnected within the network 180 (e.g., belong to the same company).

Even though the depicted user computing devices 140 are within the same network (e.g., network 180), it is expressly understood that the services provided by the analytics server 110 may not be limited to computers within the same network. For instance, the analytics server 110 may scan files accessible to one or more user computing devices that are not interconnected and are not within the same network. In some other embodiments, the analytics server 110 may only monitor a customized and/or predetermined portion of the computing devices 140. For instance, the administrator-computing device 120 may customize a list of user computing device 140 and their corresponding electronic repository 150 to be monitored by the analytics server 110.

Each user computing device 140 may access one or more electronic data repositories 150 to access (e.g., view, delete, save, revise, share, send, communicate around, and the like) data stored onto the one or more electronic data repositories 150. For instance, user-computing device 140*a* may access data within a local database 150*a*. User computing device 140*b* and 140*c* may access a shared database 150*b*. User computing device 140*d* may access a cloud storage 150*c*. Furthermore, user-computing device 140*e* may access a database operationally managed by the analytics server 110, such as the system database 150*d*. The network 180 may also include the third-party server 160 where one or more user computing devices 140 utilize the third-party server 160 to access, store, and/or manage data. An example of the third-party server 160 may be an email server, a third party (or homegrown) electronic file management server, a public web site for hosting and sharing specific file types (e.g., YouTube® for videos, Behance® for graphic files, and LinkedIn Slideshare® for presentations), or any other server used to access and/or store data files.

In some configurations, data accessible to the user computing devices 140 may be stored in a distributed manner onto more than one electronic repositories. For instance, one or more files may be stored onto a blockchain accessible to the user computing devices 140 where the blockchain comprises multiple distributed nodes storing data onto disparate electronic repositories. The analytics sever 110 may retrieve a public or private blockchain key associated with each user and/or each user computing device 140 to access the blockchain and monitor data stored onto the blockchain.

Even though different user computing devices 140 are depicted as having, access to different electronic data repositories 150, it is expressly understood that in different embodiments and configurations, one or more user computing devices 140 may have access to a combination of different electronic repositories 150. For instance, user-computing device 140*a* may utilize the third-party server 160 and the local database 150*a* to store data. In another example, user-computing device 140*c* may utilize database 150*b*, cloud storage 150*c* and the third-party server 160 to access files/data. For the purpose of brevity, different combinations of different user computing devices 140 having access to different electronic data repositories 150 are not shown.

Figure 2:
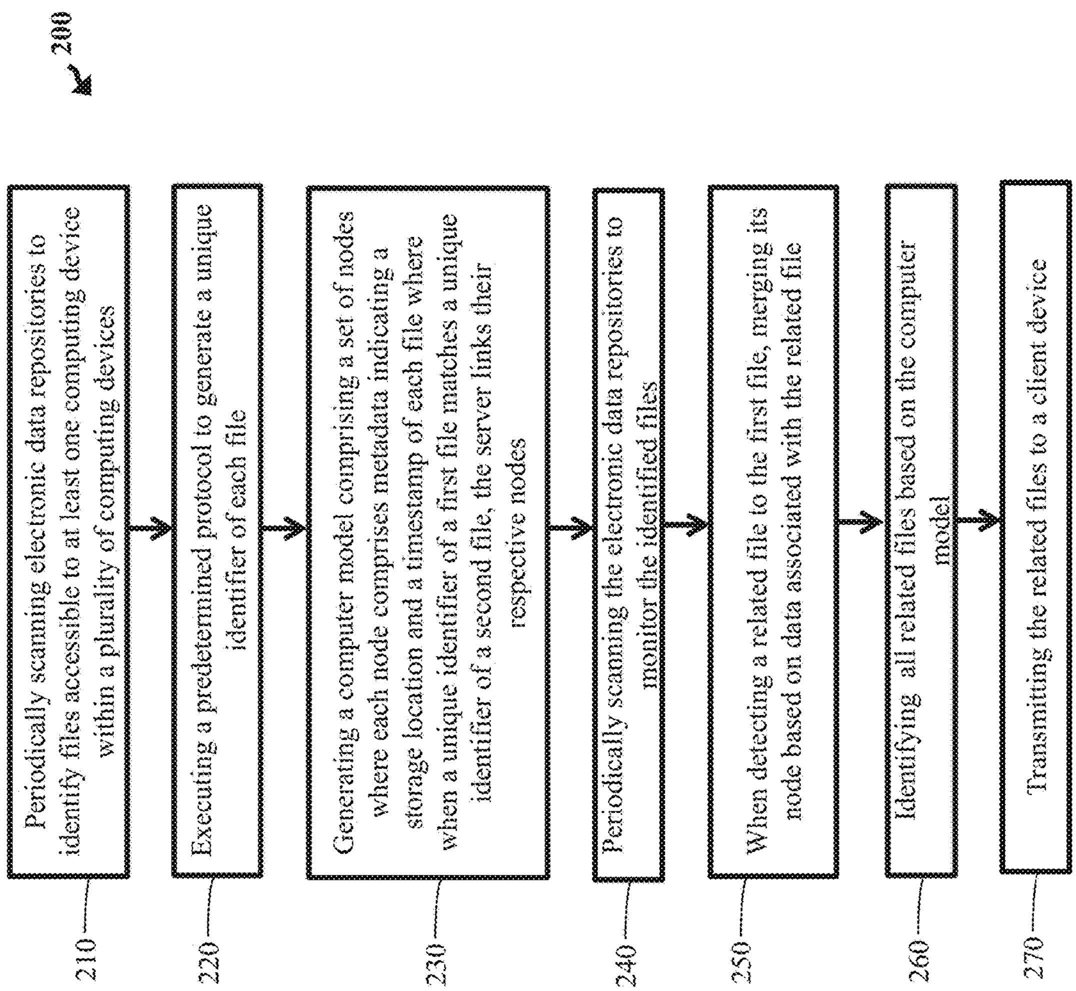
FIG. 2 is a flow diagram of a process executed in an electronic workflow management system, in accordance with an embodiment.

FIG. 2 illustrates a flow diagram of a process executed in an electronic workflow management system, in accordance with an embodiment. The method 200 includes steps 210-270. However, other embodiments may include additional or alternative execution steps, or may omit one or more steps altogether. In addition, the method 200 is described as being executed by a server, similar to the analytics server described in FIG. 1. However, in some embodiments, steps may be executed by any number of computing devices operating in the distributed computing system described in FIG. 1. One or more user computing devices or an administrator-computing device may, locally perform for instance, part or all the steps described in FIG. 2. Furthermore, even though some aspects of the method 200 is described in the context of a web-based application, in other configurations, the analytics server may display related data in a mobile application or an application native to the user's desktop.

At step 210, the analytics server may periodically scan a plurality of electronic data repositories accessible to a plurality of computing devices to identify a plurality of files stored onto the plurality of electronic data repositories where each file is accessible to at least one computing device within the plurality of computing devices. As discussed above, the analytics server may periodically scan one or more electronic data repositories to identify electronic files stored onto such electronic repositories.

The analytics server may require all users to create accounts and grant permission to the analytics server to periodically monitor files accessible to each user and/or computing device operated by each user. In some configurations, the analytics server may provide a web-based application displaying various prompts allowing each user to grant the analytics server permission to periodically monitor all files accessible and/or revised by each user. The web-based application may provide at least five monitoring functionalities: 1) files saved on any electronic data repository accessible by each user; 2) each user's email communication; 3) each user's chat/messaging activity; 4) each user's task management or project management; and 5) each user's calendar events.

During the account registration process, the web-based application may display one or more prompts allowing each user to connect his or her email accounts, messaging tools, task management tools, project management tools, calendars, organizational or knowledge management tools (e.g., Evernote®, Atlassian Confluence®, etc.), other collaborative tools (e.g., Basecamp®, Smartsheet®, etc.) and/or electronic repository systems (e.g., local database, cloud storage systems, and the like) to the analytics server. The prompt may also include one or more text input fields where each user can input identification and authentication credentials for his email accounts, messaging tools, electronic repository systems, and/or third party applications, such as project management tool, time tracking applications, billing, issue tracking, web accounts (e.g., YouTube®), online applications (e.g., Figma®, Onshape®, Google Docs®, and the like). For example, a user may enter his email address and password in the input fields displayed by the analytics server. Upon receipt, the analytics server may use the authentication credentials to remotely login the above-described portals and monitor all files accessible and/or revised by each user and/or all files saved on the electronic data repositories.

Upon receiving permission and/or authorization from users, the analytics server may scan the one or more electronic data repositories accessible to each user. The analytics server may execute a scanning or crawling protocol where the analytics server crawls different databases to identify all files accessible to each user.

As discussed above, an electronic repository may represent any electronic repository storing files that are accessible to one or more computers within an entity or a network. Non-limiting examples of an electronic repository may include a database, cloud storage system, third-party shared drives, third-party application as described above, internal file transfer protocol (FTP), and internal or external database operated by the analytics server, email storage, HR systems, accounting systems, customer relationship management (CRM) systems, and the like.

The analytics server may, upon receiving permission from one or more computing devices periodically scan the above-described electronic repositories and identify one or more files stored onto these electronic repositories. For instance, an administrator of an entity may grant permission to the analytics server to scan all repositories accessible to all computers within the entity.

Upon identification of each file, the analytics server may search data associated with the identified files and may re-create an activity timeline for each user. The activity timeline may present historical data associated with each file and each user. For instance, when the analytics server identifies a file (e.g., Sample.doc), the analytics server may further identify a history of Sample.doc by analyzing said file's history (e.g., revision, communication, and access history of the file). As a result, the analytics server may create a timeline that indicates every interaction (e.g., file generation, revisions, modification, and the like) with Sample.doc.

In some configurations, the analytics server may retrieve the file history and other related data (e.g., context data) using an application programming (API) interface in communication with the electronic data repositories. For instance, the analytics server may be prohibited from accessing a third-party shared drive. In those embodiments, the analytics server may use an API configured to communicate with the third party shared drive to identify and monitor files. The analytics server may further use a similar protocol to determine whether a file has been revised/modified. For instance, the analytics server may cause an API to connect/sync with a third-party document sharing application. The analytics server may also cause the API to transmit a notification for each instance that a file, stored on the third-party document sharing application, is accessed and/or revised by a user.

In some configurations, third-party service providers of shared document drives may not allow the API to transfer detailed data regarding file revisions. For instance, third-party service providers may only transmit a notification that a file has been accessed and/or revised by a user. However, the API notification may not contain the revision (e.g., change of text, formatting, and the like) to the file. In those embodiments, the analytics server may remotely access the shared drive, using credentials obtained from the user during the account registration process, obtain a copy of the file, and compare the file to a previous version.

The analytics server may also include the API notification in the metadata profile of each identified file. For instance, the analytics server may receive an API notification that a first user has shared File X with a second user on a third-party document sharing application. The API notification may not include any specific data regarding the content of File X because the analytics server may be prohibited from retrieving a copy of File X. The analytics server may include the document sharing activity in the metadata of File X (within the nodal data structure described herein), which may include a timestamp of the document share and data associated with the first user and the second user. As a result, the analytics server may reconstruct an activity timeline for File X that includes information on how File X was shared (e.g., medium and timestamp) and different users who interacted with File X.

In another example, user 1 may share File X with user 2 using a third-party file management application. Using an API connect to the third-party file management application, the analytics server may receive a notification that File X was shared between two users at a certain time. The API notification may not include user identifiers and may not identify the sender or the receiver of File X. The third-party file management application may also notify user 1 and/or user 2 regarding the file sharing. For instance, the third-party file management application may send an email to user 2 informing user 2 that user 1 has shared File X with user 2. The email may also include an identifier associated with File X (e.g., URL of File X). Because the analytics server has access to emails of user 1 and user 2, the analytics server can identify that user 1 has shared File X with user 2. The analytics server may then include the file path, timestamp of the email, and timestamp of the file share, in the File X's metadata file. In some configurations, the analytics server may create a node for the email and/or the file path (e.g., URL) included in the email.

At step 220, the analytics server may execute a predetermined protocol to generate a unique identifier of each file within the plurality of files. Upon identifying each file, the analytics server may execute a predetermined hashing algorithm and generate a unique identifier for each file identified in step 210. A hashing algorithm or protocol may be a function that converts a data string into a numeric string output of fixed lengths. The output string is generally much smaller than the original data. Hash algorithms are designed to be collision-resistant. In other words, there is a very low probability that the same string would be created for files with dissimilar content. Simply put, the analytics server may create a unique identifier for each file identified in step 210. As described herein, the analytics server may use the unique identifier (e.g., generated hash string) to compare files with each other and/or with their previous versions.

Using the hashing algorithm, the analytics server may eliminate the need to retrieve files and to execute file-comparison protocols, which requires extensive computing power and increases the chance of unintended file corruption. For instance, the analytics server may store the unique identifier for each file in a database. Upon detecting a revision of a file, the analytics server may execute the same hashing protocol using the purportedly revised file and compare the newly generated unique identifier with the previously stored unique identifier. In this way, the analytics server identifies whether the file has been revised using less processing power than conventional systems.

In some configurations, the analytics server may use message-digest protocol 5 (MD5) hashing protocol to generate the unique identifier for each identified file. Using the MD5 hashing protocol, the analytics server may generate a unique identifier for each file that contains a 128-bit hash value representing the content of each identified file. Because the unique identifier comprises an output string, which is smaller than the original file, executing data-comparing protocols on the unique identifier (rather than performing the same protocols on the original file) requires much less processing power.

Each element related to a file may include a unique identifier. For instance, where a file is stored (storage drive or a storage folder) may have its unique identifier. When a file is sent via an email message, the email may have its own unique identifier. In some configurations, the analytics server may use these identifiers to compare files and determine whether they are related. For example, a PDF stored on a shared data repository (e.g., Google Drive) may have 3 unique identifiers: (1) a unique URL, (2) a unique ID generated by the shared data repository, and (3) a unique content-based hash ID generated by the analytics server. The analytics server may use all the unique identifiers to compare files.

In a non-limiting example, file 1 may be associated with a unique identifier of a related task, a unique identifier of a related email, and a unique identifier of a storage drive. File 2 may be associated with a unique identifier of a related email and a unique identifier of a related task. In some configurations, the analytics server may compare the unique identifiers of files 1 and 2 (e.g., unique identifier of the email related to file 1 compared to unique identifier related to file 2). When a number of similar unique identifiers satisfy a threshold, the analytics server may determine that the files are related.

As a result, when two web-based files (e.g., two files saved on a third-party file sharing application) share the same drive identifier (e.g., are saved within the same storage drive or folder), the files may be associated with similar unique identifiers associated with the folder or the storage drive. Consequently, the analytics server may determine that they are related.

In some configurations, the analytics server may generate the unique identifier for each file based on a combination of one or more of the above-described methods. For example, the analytics server may generate the unique identifier for each file using the hashing protocol, and an identifier of where the file is saved. As described herein, a "unique" identifier is unique to each file. Furthermore, other elements described herein can have unique identifiers. For instance, a storage drive on which a file is stored may have a unique identifier. In another example, an email sent to a user may have its own unique identifier. For instance, the analytics server generates unique identifiers such that a unique identifier cannot be generated for two unrelated files.

When the analytics server determines that the file is a file path, shortcut, link/URL, bookmark, or an identifier of an online file (e.g., Google Docs®, OnShape®, and the like), the analytics server ay generate the unique identifier based on the file's URL. For instance, a unique identifier may be embedded within the URL of a file.

At step 230, the analytics server may generate a computer model comprising a set of nodes where each node comprises metadata indicating context data of each file within the plurality of files, wherein when a first unique identifier of a first file matches a second unique identifier of a second file, the server links a first node corresponding to the first file to a second node corresponding to the second file. The analytics server may create a computer model comprising a nodal data structure (or data graph) where each node represents an identified file. The analytics server may store the nodal data structure in the system database (or any other electronic data repository, such as a cloud bases storage, local/internal data storage, distributed storage, blockchain, and the like) described in FIG. 1.

The nodal data structure may be a complete map of all the files identified in step 210. Each node may also contain metadata further comprising historical (e.g., context) data associated with the file, such as the generated unique identifier of the file, title, mime type, file permissions, comments, and the like. The metadata may also indicate a revision history associated with each file. For instance, the metadata may include timestamp of every revision for each file, a unique identifier (e.g., user ID, IP address, MAC address and the like) of the user and/or the computing device who accessed and/or revised the file, and the like. Other context data may include, but not limited to, email identifiers (e.g., unique email identifiers, sender identifier, receiver identifier, and the like), tasks associated with the files, user identifiers, mime type, collaboration information, viewing permission, title of each file, and the like.

The metadata may also include context information associated with each file. For instance, the metadata may include email/chat communication that are related to each file. In another example, if the analytics server determines that a file has been transmitted via an email or other electronic communication protocols (e.g., referenced or attached in an email message, referenced in a chat session, and the like), the analytics server may include a transcript of the electronic communication (e.g., body of the email) in the node, as metadata. The analytics server may index each node based on its associated metadata and make each node searchable based on its metadata.

The analytics server may compare the unique identifiers for of all the files identified in step 210. When the unique identifiers of two or more files match, the analytics server may link the nodes representing the two or more files in the above-described nodal data structure. A link (or edge) may connect similar or associated nodes within a nodal data structure such that the analytics server may retrieve context metadata more efficiently. Edges can be directed, meaning they point from one node to the next, or undirected, in which case they are bidirectional. The analytics server may use different directed or undirected edges to link different nodes. Edges between nodes can be given special classifications, including but not limited to "copy," "version," "parent," "child," "derivative," "shared email," "shared task," "shared tag," and "shared folder." The analytics server may also combine relevant metadata from related files and display to the client (e.g., files A and B are copies of each other, and file B is attached in an email message. When user previews file A, the email message for file B can be displayed). As described herein, the analytics server may use the links to identify a latest version of a related family of files.

Figure 3:
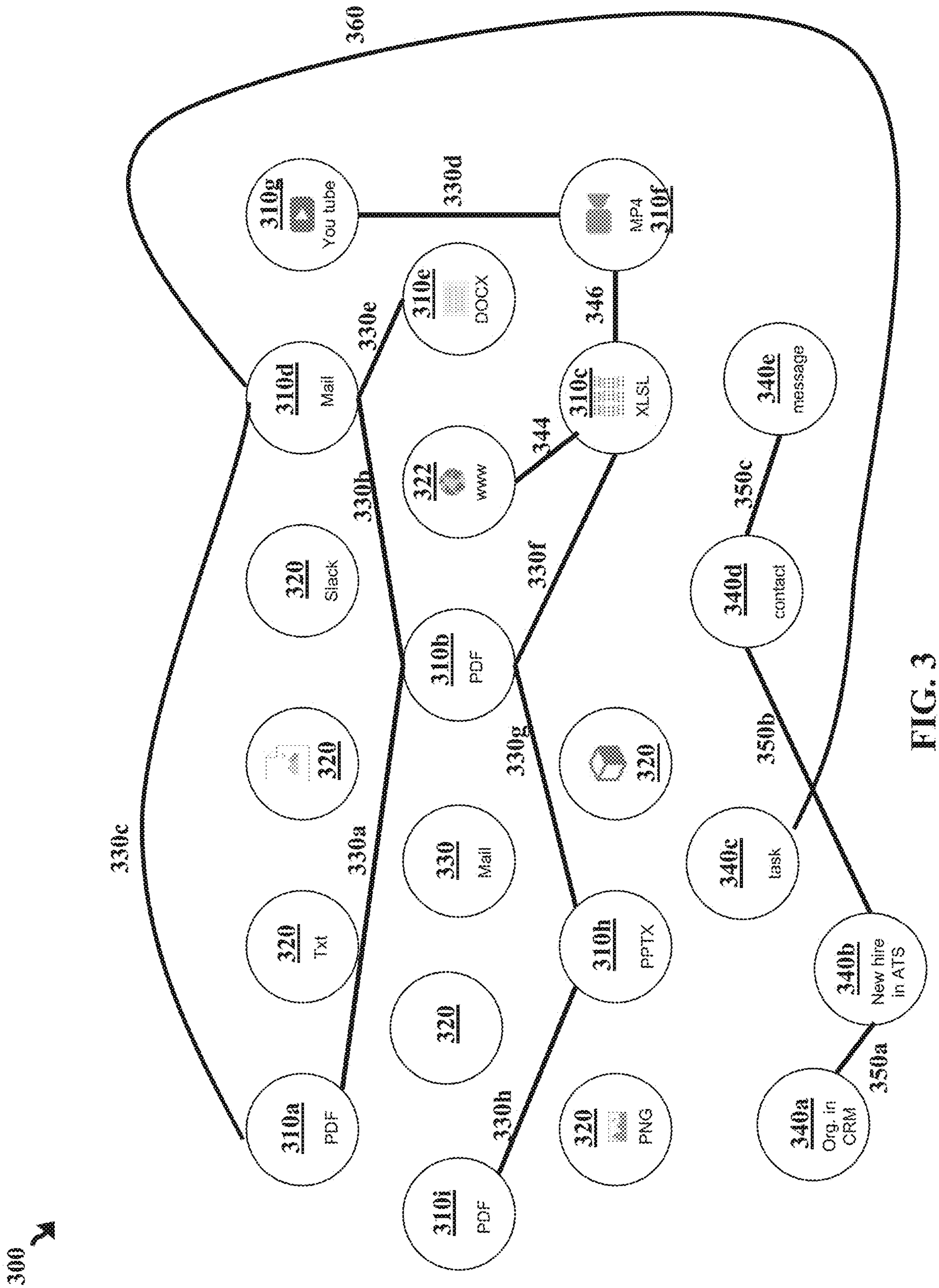
FIG. 3 is a nodal data structure representing multiple identified files within a computing environment, in accordance with an embodiment.

Referring now to FIG. 3, nodal data structure 300 represent a nodal structure created based a set of identified files and related nodes connected via different edges. As depicted in FIG. 3, the analytics server identifies 17 files and creates a node for each file (nodes 310*a-i* and nodes 320). For instance, node 310*b* represent a pdf file stored locally on a computer of an entity (e.g., computer within a network of computers); node 310*h* may be a PowerPoint Open XML, file stored on a cloud storage accessible to another computer within the same network. As described above, each node may include an indication of a location where the file is stored. For instance, node 310*e* may represent a DOCX file stored in a local database. Therefore, node 310*e* may include metadata comprising a path of the DOCX file to the local database. Additionally, as described above, multiple nodes may be linked together. For instance, links 330*a-h* connect nodes 310*a-i* that represent related files. Furthermore, because the analytics server identifies that nodes 320 are not related, the analytics server does not link nodes 320, as depicted in FIG. 3. As described above, a "file" may also refer to a path associated with data. For instance, a file may refer to the underlying data regardless of where the data is stored and/or hosted or the application needed to view the data. For instance, a file may include a link (directing a user to view the underlying file). The file may only exist as on online file and may only be accessible through an internet browser or mobile application, and in some cases, it may not be able to be downloaded to a local machine without some type of conversion (e.g., Google Docs® or Google Slides® only exist online, but can be downloaded as DOCX or PPTX).

A path may specify a unique location of a file within a file system or an electronic data repository. In some configurations, a path may point to a file system location by following the directory tree hierarchy expressed in a string of characters in which each component of the string, separated by a delimiting character, represents a directory. In some configurations, the analytics server may use a uniform resource locator (URL) to identify each file's stored location. For instance, when a file is stored onto a cloud storage or when a file is stored onto a third-party shared drive, the analytics server may include a URL of the file in the nodal data structure.

In some configurations, and as described above, the nodal structure may not include the identified files and may only comprise nodes representing file locations (and other metadata) and edges representing how different files are related. For instance, instead of storing multiple files (and possibly multiple version of the same file and/or related files) the analytics server may only store the nodal data structure in a local or external database. In this way, the analytics server may conserve significant storage space because storing a representation of a file requires significantly less storage capacity than storing the file itself. Furthermore, as described herein, identifying relationships (and executing various protocols to identify context, relationship or other related data for each file) is much less computationally intensive when performed on the above-described nodal data structure than executing the same protocols on the files themselves. In this way, the analytics server may conserve significant computing and processing power needed to provide file management services. As a result, the analytics may deliver results in a faster and more efficient manner than provided by conventional and existing file management methods.

As depicted, the nodal data structure 300 may include all data associated with users' workflow. For instance, the wild the nodes described above represent different files, nodes 340*a-e* may represent workflow components generated because of users' work. For instance, the node 340*a* corresponds to organization chart generated based on customer relationship management (CRM) software solution (internal or third party solution). The node 340*b* may correspond to new employees hired where the data is generated based on an applicant tracking system software solution (internal or third party solution).

The node 340*c* may correspond to one or more tasks associated with one or more employees. For instance, an organization may use an internal or third party software solution to help employees execute various tasks efficiently. The analytics server may identify the tasks I may generate a node for each task. Accordingly, the analytics server may identify that one or more tasks may be related to one or more files and/or work components within the nodal data structure 300.

The node 340*d* may correspond to a contact within a contact list of an employee/user. The analytics server may scan various software solutions (internal and/or external) and may identify contacts associated with each user/employee. The analytics server may then generate a node for each contact accordingly. As described herein, the analytics server may then identify that a contact is related to another node that may represent a file and/or a workflow component within an organization. The node 340*e* respond to one or more messages generated and transmitted among users, such as emails or any other messages (chat applications).

As depicted, the analytics server may not differentiate between files stored on data repositories accessible to one or more users and workflow components generated/accessible to the users. The analytics server may execute various analytical protocols described herein to identify related nodes and may use edges to link or merge the related nodes. For instance, the analytics server may use edges 350*a-c* to connect related work component nodes. The analytics server may also use age 360 two connect node 340*c* (workflow component) to the node 310*d*, and indirectly connect node 340*d* to nodes 310*a*, 310*b*, 310*e*, 310*c*, 310*h*, and 310*i*.

Figure 4:
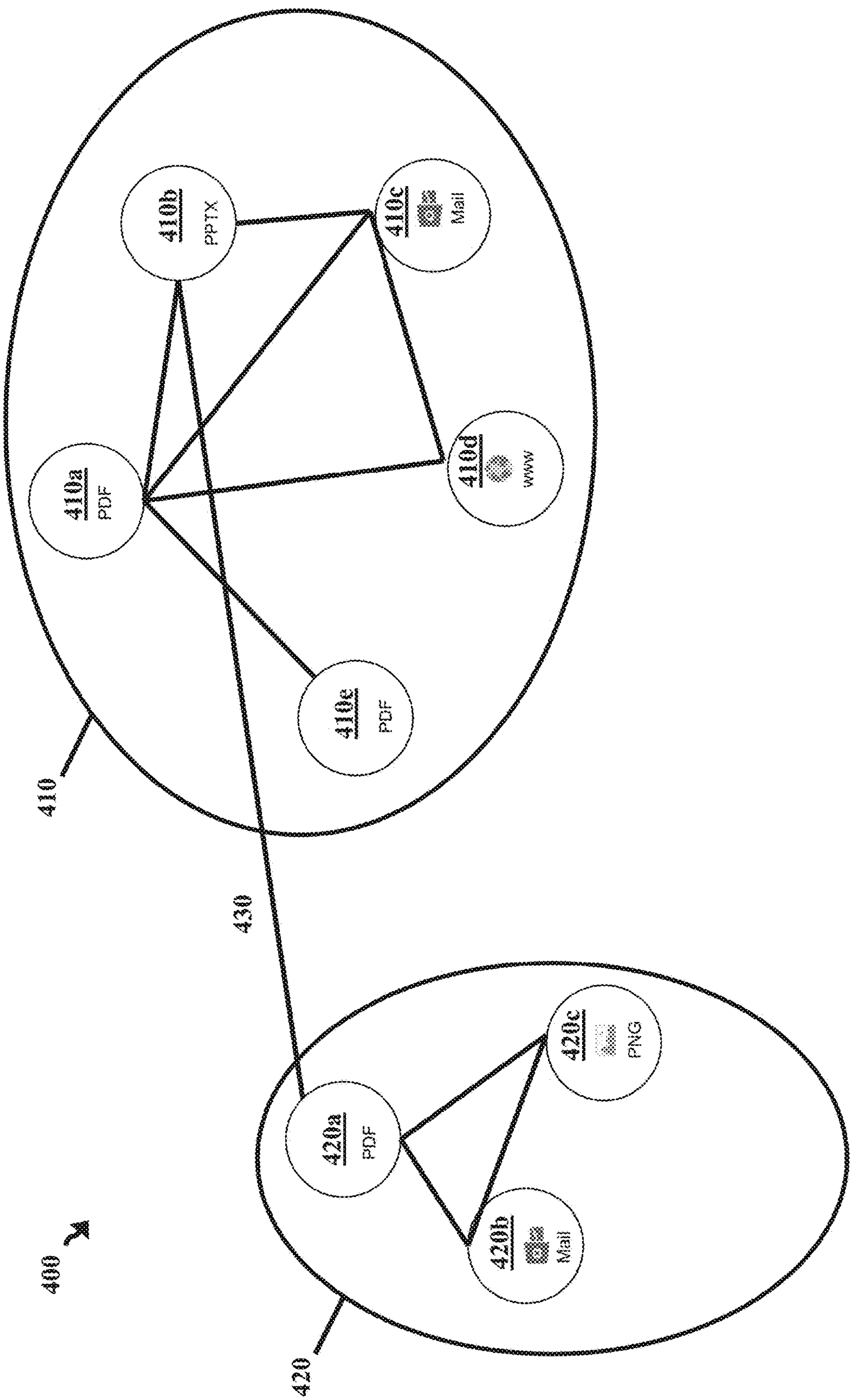
FIG. 4 is a nodal data structure representing multiple identified files within a computing environment, in accordance with an embodiment.

Referring now to FIG. 4, another illustration of a nodal data structure is illustrated. Nodal data structure 400 represents a clustered nodal data structure where the analytics server clusters related files into data clusters 410 and 420. As described above, each node within the nodal data structure 400 represents an identified file. Each node within the nodal data structure 400 may include metadata associated with each respective file (e.g., indicating the location, type, historical data, and context data associated with the file). Upon identifying relationships between files, the analytics server may generate a cluster that represents all related nodes/files. For instance, the analytics server may determine that a unique identifier of a first pdf file on a first computer (represented by node 410*a*) matches the unique identifier of a second pdf file stored on a cloud storage accessible by a second computer (represented by node 410*e*). In response to identifying this relationship, the analytics server may link nodes 410*a* and 410*e*. Subsequently, the analytics server identifies that a PowerPoint file (represented by 410*b*) and a web link (represented by node 410*d*) were transmitted via an email message (represented by node 410*c*) that also includes the pdf file represented by node 410*a*. In response, the analytics server may link node 410*a* to each of nodes 410*b*, 410*c*, and 410*d*. The analytics server may further link node 410*b* and node 410*d* to node 410*c* because files represented by nodes 410*b* and 410*d* may be related. As seen in FIG. 4, the analytics server creates data cluster 410 that includes all the above-mentioned nodes.

The analytics server may execute similar protocols as described above to identify interrelated files and generate multiple clusters. For example, the analytics server may cluster nodes 420*a-c* into cluster 420. Furthermore, one or more nodes within different clusters may also be linked, as represented by edge 430. As described above, data cluster 410 and 420 each represent a related family of files. Different clusters may be stored into different shards to optimize storage and efficiency when identifying nodes (e.g., step 260).

In some configurations, the analytics server may consolidate all metadata associated with each identified file to identify all related users and content. In a non-limiting example, the analytics server may identify that user 1 sent File A in an email (along with File B) to user 2; user 2 downloaded File A and stored File A in a folder with File C. As a result, the analytics server may connects nodes representing files A, B, and C. When a user accesses any of the files A, B, or C, the analytics server notifies the user regarding the relationship between these files. As described herein, the analytics server may only customize the notifications in accordance with each user's access permissions. For instance, if a user is not authorized to access (or view) File B, the analytics server may only display notifications regarding Files A and C to the user.

Referring back to FIG. 2, at step 240, the analytics server may periodically scan the plurality of electronic data repositories, to monitor the first file and the second file. The analytics server may periodically scan the electronic repository as discussed above. In some configurations, the frequency of data scanning may be predetermined or may be adjusted by an administrator in accordance with an entity's needs. For instance, an administrator may require the analytics server to scan the electronic data repositories every week, day, or multiple times per day depending on their unique needs and data sensitivity.

In some configurations, the analytics server may only scan the electronic data repositories in response to receiving a notification or a trigger from another server, such as an email message, a third party API or a data management server operationally in communication with a data repository. The analytics server may use application-programming interfaces and/or web hooks to achieve the above-described results. For instance, as described above, the analytics server may utilize various APIs to monitor the identified files. Therefore, the analytics server may receive a notification, from an API, that a file has been revised. In some embodiments, the API may transmit details of the revisions (e.g., user name, timestamp, and the like). In some other embodiments, the API may not be configured or authorized to transmit such detailed data. In those embodiments, in response to receiving the notification from the API indicating that a file has been revised, the analytics server may further scan the electronic repository (or other repositories, such as email, third-party applications, and other repositories) on which the file is stored. As a result, the analytics server may retrieve revision details associated with the revised file.

At step 250, the analytics server may, for each instance of the server detecting a related file to the first file, merge the first node where the merged first node corresponds to a context data of related files (e.g., storage location and a timestamp of the related file to the first file and context data of the first file). In response to identifying a revision or a modification to a file, the analytics server may revise the nodal data structure accordingly. For instance, as described above, the analytics server may identify that a file has been revised or modified by a user within the network. The analytics server may then update the metadata associated with the node and the respective edge representing the revised file with revision/modification data. For instance, the analytics server may update the node metadata with a user identifier, timestamp, content of the revision, and other historical data. When the analytics server identifies a revision of the file, the revised file is no longer a "copy" of the original file. Therefore, the analytics server updates the metadata of the revised file from "copy" of the original file to a "version" of the original file.

In some configurations, the analytics server identifies related files based on their context data stored onto one or more nodes representing each respective file. For instance, in some embodiments, the analytics server may update or revise the nodal data structure by generating new nodes and/or edges. For instance, when the analytics server discovers that a user has attached a file in an email communication, the analytics server may generate a node that represents the email communication. The analytics server may then update the node's metadata with information associated with the email communication (e.g., timestamp, email body, email address, sender user identification, receiver's user identification, and other context data described herein).

In some configurations, if the email communication includes other files or web links, the analytics server may create individual nodes for other related files. For instance, and referring to FIG. 3, node **310*d* represents email communication between two users where one user attached a pdf file represented by node 310*b*. Furthermore, in the email represented by node 310*d*, the user also attached a document represented by node 310*e*. As depicted in nodal data structure 300, the analytics server may also link the above-described nodes using edges 330*b* and 330*e***. As a result, the analytics server may continuously and iteratively update the nodal data structure. Therefore, the nodal data structure is a dynamic computer model, which adapts to user interactions.

In some configurations, the analytics server may combine metadata from multiple related nodes into a single metadata file. Instead of each node having a separate metadata file, the analytic server may create a single metadata file associated with a file where the metadata file contains all metadata associated with all (or a given subset of) related nodes. For instance, if File A is related to Files B-F, the analytics server may create a single metadata file and combine metadata associated with Files A-F. Upon identifying additional related files (or other related data, such as tasks, messages, and the like), the analytics server may update the metadata file accordingly.

In some configurations, the analytics server may augment the metadata file using public data. For instance, in addition to scanning the electronic repositories described herein, the analytics server may also scan publicly accessible repositories (e.g., public websites or other publicly accessible data). When the analytics server identifies a public file related to an identified file, the analytics server may augment the identified file's metadata file. For instance, the analytics server may identify a video file stored locally onto a user's computer. The analytics data may then determine that the identified video is similar to a video publicly shared on a website (e.g., YouTube®). Consequently, the analytics server may augment the identified video's metadata file using data associated with the publicly share video (e.g., URL of the video).

As described above, the analytics server may use two methods to merge two nodes where the two nodes represent two related files (e.g., copies of the same file, and/or files that have been determined to be related). First, the analytics server may create a new node for the newly discovered related file and may link the nodes together. Second, the analytics server may combine the metadata of the newly discovered file with the original file (e.g., create a single metadata file and combine all metadata corresponding to context information of the related file to the original file).

The analytics server may also use one or both of the above-described methods when merging two nodes.

In a non-limiting example, the analytics server may identify two copies of the same file where the first file is stored on a local database and the analytics server identifies the second file as an attachment in an email sent from a first user (or when the file path is transmitted through the email) to a second user. The analytics server may then combine the metadata associated with the email (e.g., email message, sender identifier, receiver identifier, content data, mailbox identifier, and the like) with the metadata associated with the first file (e.g., name of the local system, size, data modified, folder, and the like). For instance, the analytics server may generate a single metadata file that contains metadata associated with the first file and the second file. The analytics server may then use the combined metadata file to identify related files, build, and suggest relationships between the first/second file and other files identified. In another example, the analytics server may generate a node that represents a file. When the file is attached in a task, the analytics server may generate a new node for the task. Therefore, the analytics server may operate in two ways: 1) creating a new node for a related file; and/or combining the context into a single metadata file for a file. In some configurations, the analytics server may use a combination of the above-described methods.

At step 260, the analytics server, in response to receiving from an electronic client device, a request to access the first file or the second file, may identify all or some of the related files to the first file or the second file in accordance with a latest timestamp of the first node or the second node. The analytics server may receive a request to access a file. For instance, a user may click or otherwise interact with a file and transmit a request to access the file (e.g., view, edit the content, revise the name, send, or otherwise interact with the file). In some embodiments, the user may access a shared third-party application and transmit a request to access the file. In response to determining that the user has requested to access a file, the analytics server may identify a node within the nodal data structure that represents the requested file.

Upon retrieving the identified node, the analytics server may retrieve all related nodes and metadata associated with the identified nodes and/or the related nodes within the nodal data structure. The analytics server may analyze the metadata retrieved and identify all related files (including a latest version of the requested file). For instance, the analytics server may retrieve all timestamps for all nodes related to a node representing the requested file. The analytics server may then compare all timestamps to identify a latest version of the requested file. The analytics server may also identify relationships between files by determining relationships between different nodes representing those files. These relationships (identified related nodes) may be displayed on the GUI viewed by the user. For instance, when a user accesses a file, the analytics server may identify the original file, different copies, versions, derivative, shared tasks, shared comments, shared emails, shared tags, and shared folders that are associated with the file. The analytics server may also display these related items on the GUI, as depicted in FIG. 5, FIGS. 6A-C, and FIGS. 7A-B.

At step 270, the analytics server may retrieve all files related to the requested file-in accordance with the storage location of the latest version of the requested file identified based on the updated first node- and may transmit the retrieved latest version to the electronic client device. As described above, the analytics server may identify a node that represents a latest version of the requested file. Subsequently, the analytics server may use the path stored within the metadata of the identified node to retrieve a latest version of the requested file and transmit the retrieved latest version to the electronic client device. The analytics server may populate a graphical user interface that displays various information associated with the requested file. As described herein, the analytics server may directly display graphical user interface on the user's computer or may incorporate the graphical user interface into a third-party application, such as a third-party email application. In some embodiments, the analytics server may display all versions of the requested file. For instance, in addition to displaying the latest version, the analytics server may display an option for the user to access an older version or a related version (e.g., a version of the requested file that was shared in an email). Using the above-described options, the user may access and interact with an older version of the request file.

Using the methods and systems described herein, the analytics server also allows users to interact with files stored onto disparate electronic data repositories using the same web-based application (e.g., browser). For instance, the analytics server may identify a node representing the requested file stored onto a first electronic data repository, a first related node representing an email stored onto a second electronic data repository that included the requested file as an attachment, and a related file stored onto a third electronic data repository. The user may access all the above-mentioned files (requested file, related file, and related email) from the same browser even though the above-mentioned files are stored onto different electronic repositories.

To retrieve all related data (e.g., all related files including the latest version of a file), the analytics server may utilize the Apache Lucene project's open source enterprise search platform, Solr®, for full-text indexing and searching. As described above, the analytics server may index every node within the nodal data structure, which allows the nodes to be searchable by their associated metadata. Furthermore, executing the above-described indexing and searching protocol on the nodal data structure, as opposed to all files stored in a central data repository, allows the analytics server to identify nodes and retrieve related metadata in real-time or near real-time.

Figure 5:
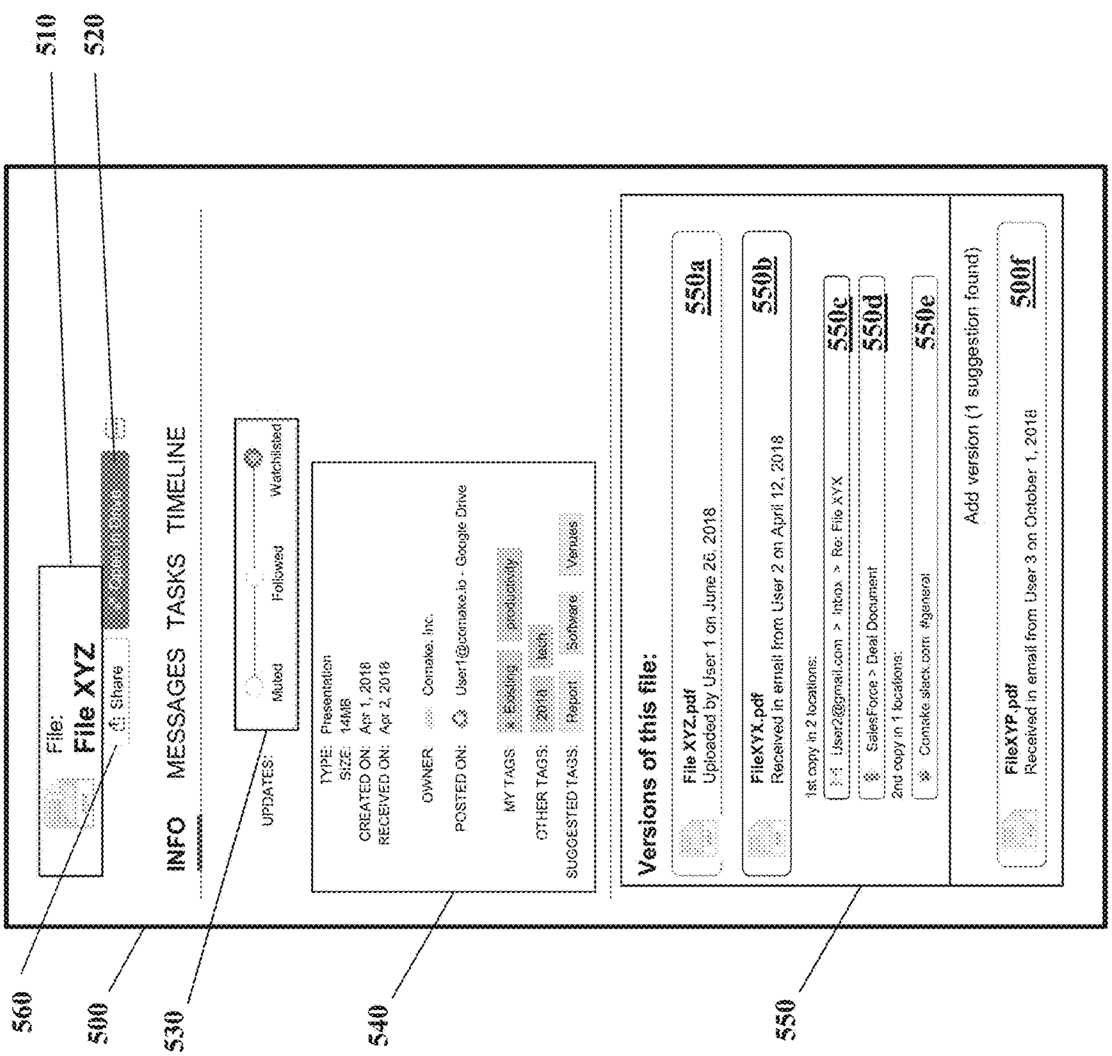
FIG. 5 is a graphical user interface displaying file context information, in accordance with an embodiment.

Referring now to FIG. 5, an example of a graphical user interface displaying file context information is illustrated. In some configurations, the analytics server may display GUI 500 directly on a user's computer. For instance, when a user interacts with a file (e.g., clicks on a file and request the file to be opened), the analytics server may display the GUI 500 on the user's computer. In the depicted embodiment, a user requests File XYZ to be opened. As a result, the analytics server displays the GUI 500. In some other embodiments, the analytics server displays an indicator associated with File XYZ and displays the GUI 500 in response to the user interacting with the indicator.

The GUI 500 may display filename and file types of the requested file in the graphical component 510. For instance, graphical component 510 indicates File XYZ (file name) and further indicates that File XYZ is a PDF file (file type). The GUI 500 may also comprise an interactive graphical component 520. When the user interacts with the interactive graphical component 520 (e.g., by clicking), the analytics server may display content of File XYZ. Another interactive graphical component 560 may allow the user to share File XYZ with other users. For instance, when the user interacts with the interactive graphical component 560, the analytics server may generate an interactive link configured to direct the recipient to the File XYZ (e.g., a URL or other paths indicating a storage location of the File XYZ).

Figure 7A:
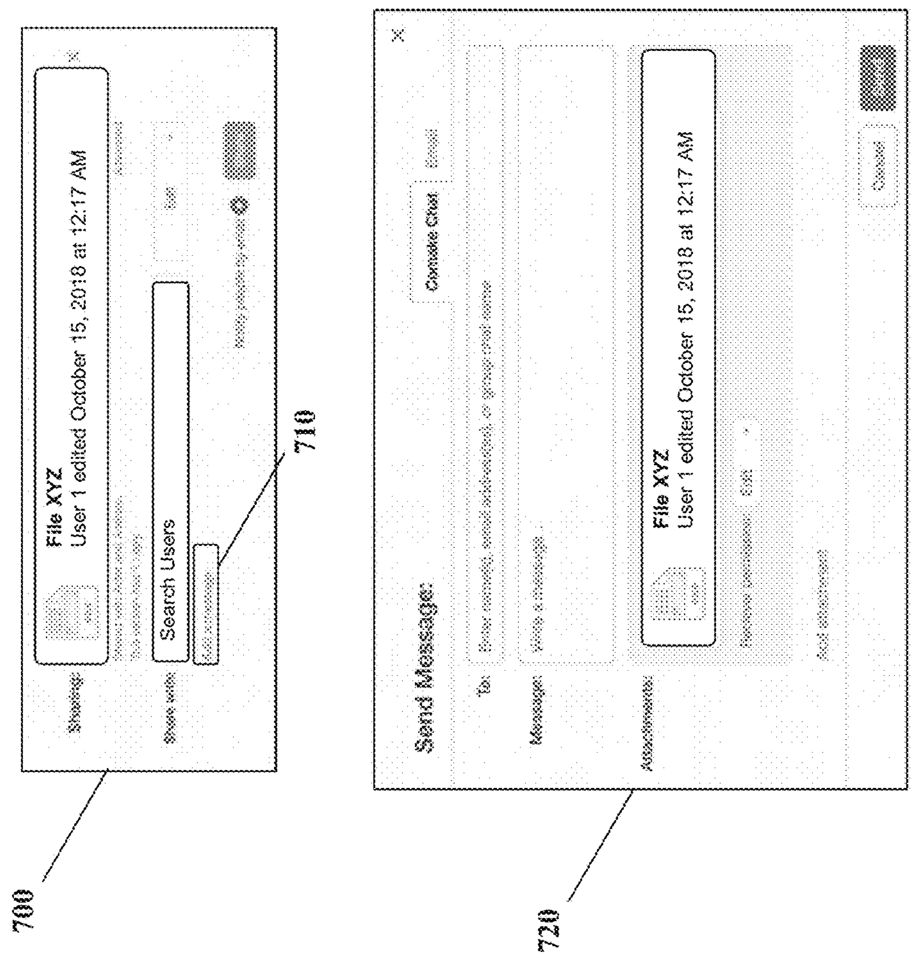
FIGS. 7A and 7B illustrate a messaging application, in accordance with an embodiment.
Figure 7B:
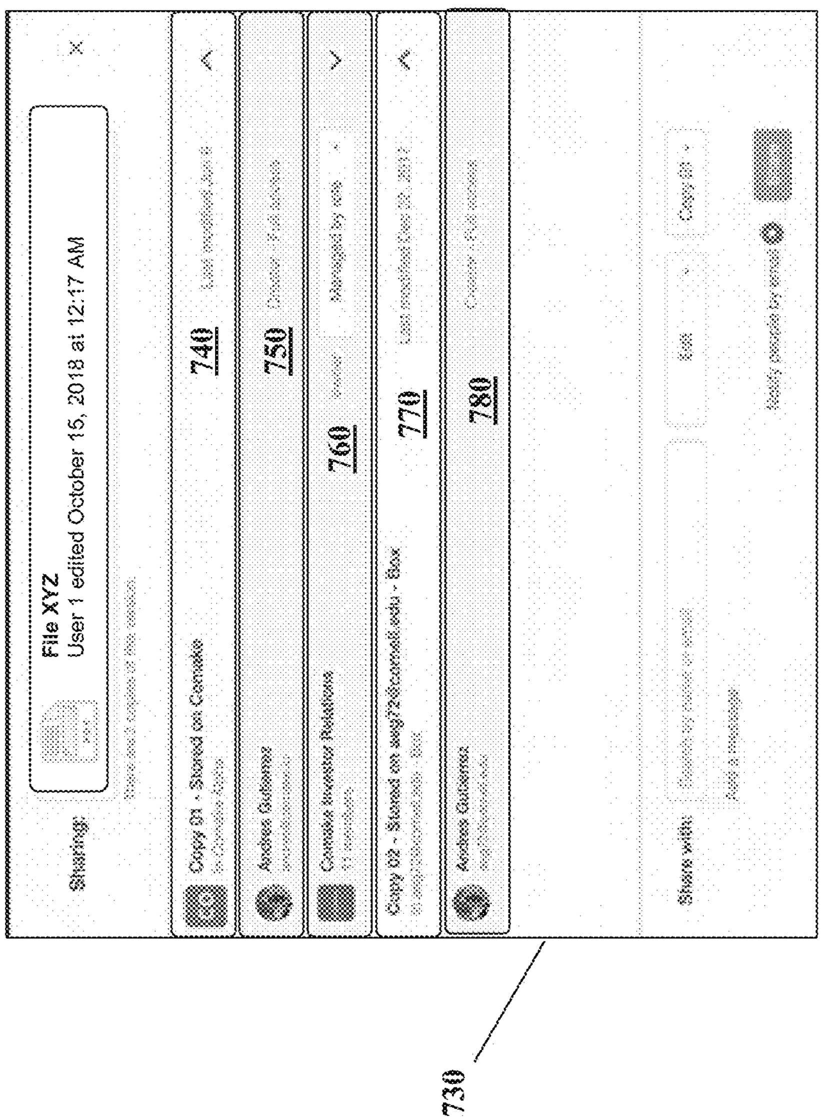

In some configurations, the analytics server uses a messaging application to transmit the requested file to other users. When a user interacts with the graphical component 560, the analytics server may direct the user to the messaging application (or otherwise referred to as the sharing panel). Referring now to FIG. 7A and FIG. 7B, an internal messaging application is illustrated, in accordance with an embodiment. The internal messaging application may include a graphical component 700, where the user can search for other users/employees/contacts, identify one or more recipients, and share the file with the identified recipients. When the user interacts with the graphical component 710 ("add message), the analytics server may display a graphical component 720 where the user can add customized messages and other attachments.

In some embodiments, an organization may use an internal (or third party) software solution to aggregate and consolidate all tasks, messages, and contacts across all connected tools (e.g., software applications used by users/employees). The analytics server may use that software solutions to transmit he requested file to the users. Additionally or alternatively, the analytics server may integrate its services into other software application. For instance, the methods and systems described herein can be implemented into other applications, such that users no longer need to use multiple applications.

The internal messaging application may also provide the user with the option to transmit the file via any third-party email or messaging system previously connected to the analytics server. As a result, the user may draft an email using the internal messaging application provided by the analytics server (e.g., while interacting with the file) and the analytics server may transmit the email by communicating with the third-party email application. The above-described method creates a significant positive user experience because the user is no longer required to interact with multiple interfaces and applications.

As described above, the analytics server/messaging application may also provide users with the option to transmit other workflow components. For instance, users may be able to share tasks, contacts, messages, and the like. For any unit of work, a user can easily share and embed the unit of work within a message. For example, conventionally, users may share emails with other users by forwarding the emails. However, using methods, systems, and software solutions described herein, a sender can share an email with a recipient else not included in the email message, without forwarding the email.

In some configurations, the analytics server may also display interrelated relationships associated with the requested file. For instance, when the user interacts with the "advanced" hyperlink displayed in the graphical component 700, the analytics server may display the graphical component 730 where the analytics server displays files and activities related to the requested file. For instance, graphical component 740 displays information regarding the first copy of File XYZ (e.g., data regarding storage area and the date of the last modification), graphical user component 750 displays data regarding the "creator" of the first copy of File XYZ, graphical component 760 displays data regarding a group of users who are permitted to access File XYZ, graphical component 770 displays data associated with a second copy of File XYZ (including graphical component 780 displaying the creator).

Using the graphical component 730, the user can also manage all of the permissions for all of the different versions and files related to File XYZ simultaneously. For instance, the user can revise a list of users who can access File XYZ by interacting with the drop down menu displayed in the graphical component 760.

As described above, the analytics server may customize each GUI and graphical component described herein in accordance with the user's role. For instance, while the analytics server may identify that the File XYZ has 10 related copies/versions, the user may only view the copies/versions and relevant metadata to the two copies/versions for which the user is authorized to view.

The GUI 500 may also comprise interactive component 530 comprising a status indicators illustrating a status of File XYZ. For instance, the interactive status indicators may indicate whether File XYZ is muted or "watchlisted." A file can be muted, followed, or watchlisted. If a user has never interacted with a file, the user may never get any updates or notifications regarding that file. If a user has interacted with a file (e.g., modify a file, send a file, received a file, create a file, change permissions of a file), the user may get key updates regarding that activity around that file. In some embodiments, the updates/notifications may be transmitted to each user via a feed, such as an RSS feed delivered to each user, or via daily email overviews of all relevant updates. Users can also choose to manually follow or watchlist a file. When a user watchlists a file, the user may receive notifications, regarding all activity related to that file, including all of its copies and versions.

Through advanced settings, the user may determine to "hide" or "ignore" a file, meaning that the analytics server may not compare the file to other files stored within other electronic data repositories. Additionally or alternatively, the analytics server may not monitor a hidden or ignored file. However, when a file is watchlisted, the analytics server periodically monitors the file, as described above. The GUI 500 provides the user with the option to change the status of File XYZ by interacting with the interactive indicators.

The GUI 500 may also comprise a graphical component 540, which displays context information associated with File XYZ. Data displayed in the graphical component 540 may be retrieved from metadata stored within the nodal data structure and may include type, size, timestamp of creation, owner, an indicator of storage location, and different tags associated with file XYZ. Graphical component 540 may provide the user with the option to delete, add, and/or revise different tags. In some implementations, users can add custom metadata fields. In some configurations, the analytics server may further identify suggested tags for file XYZ based on related files and their respective tags. The analytics server may also suggest tags based on file content, file relationship, a user identifier, tags gleaned through user activity, and more.

The GUI 500 may further comprise a graphical component 550, which displays all the versions and copies (including the latest version) of the requested file permitted to be viewed by the user. For instance, the graphical component 550*a* displays that user 1 uploaded File XYZ one on Jun. 26, 2018. The graphical component 550*b* displays that the analytics server has identified a related file (e.g., a file with a matching unique identifier, as described above). As depicted in graphical component 550*b*, the related file name is File XYX, which is also a PDF file. The graphical component 550*b* displays that File XYX was identified in an email communication between user 1 and user 2 on Apr. 12, 2018. Furthermore, graphical components 550*c-e* indicate where File XYZ and File XYX are stored respectively. Even though the embodiment described here uses a related file that is the same file type as the requested file, in some configurations, a related file may not be the same file type. For instance, a PDF file stored in a first electronic repository may be stored in a second electronic repository as a document file.

As depicted in 550*d*, sometimes a file (or other workflow data) can be stored in a third-party data repository where the analytics server identifies the file by integrating with the third party. For instance, the file indicated in the graphical component 550*d* may be associated with third-party CRM and/or ATS software. The analytics server may provide additional metadata by integrating with these third-party software solutions, which can help contextualize files/workflow. For instance, if a file corresponds to a resume, the file may be referenced in an ATS software solution, which may be internal/native to an organization or may be a third party ATS solution. If a user interacts with the resume and his/her email, the analytics server may display context data associated with the resume, such as whether the resume is associated with a new hire in an ATS software (e.g., whether the resume is being considered for a first round or a second round of interviews), whether the analytics server has identified any additional nodes or files associated with the resume, and the like. In some embodiments, the analytics server may direct the user to the ATS software solution where the user can obtain more information and review related files/data.

In some configurations, each graphical component shown may be interactive. For instance, the user may click on any of the above-described graphical components and the analytics server may direct the user to the file represented by each respective graphical component. For example, if the user clicks on the graphical component 550*c*, the analytics server may retrieve a location of the email communication between user 2 and user 1 and may change component 540 to display details regarding the graphical component 550*c*. The analytics server may also open the message tab of GUI 500 and display the email communication on the GUI 500, as shown in FIG. 6B.

The graphical component 550 may also display a suggested related file (e.g., a version). As described above, the analytics server may periodically monitor all files accessible by all computers within a network (e.g., all computers within an entity or all registered users) to identify related files/content. When the analytics server identifies the related file/content, the analytics server may display the identified related file/content in the GUI 500. For instance, graphical component 500*f* indicates that the analytics server has identified File XYP, which is also a PDF file and is identified as related to the file XYZ by the analytics server. The graphical component 500*f* also indicates that file XYP was received in an email correspondence from user 3 user on Oct. 1, 2018. This is possible because the analytics server determines that file XYP may, for example, share an email thread with file XYZ and due to other similar metadata, it establishes that they are likely versions of each other. Alternatively, user 3 could have been working on file XYZ before (e.g., satisfying a predetermined time threshold) saving file XYP and therefore, by closeness of activity along with other considerations, the analytics server suggests file XYZ and XYP as versions of each other.

Figure 6A:
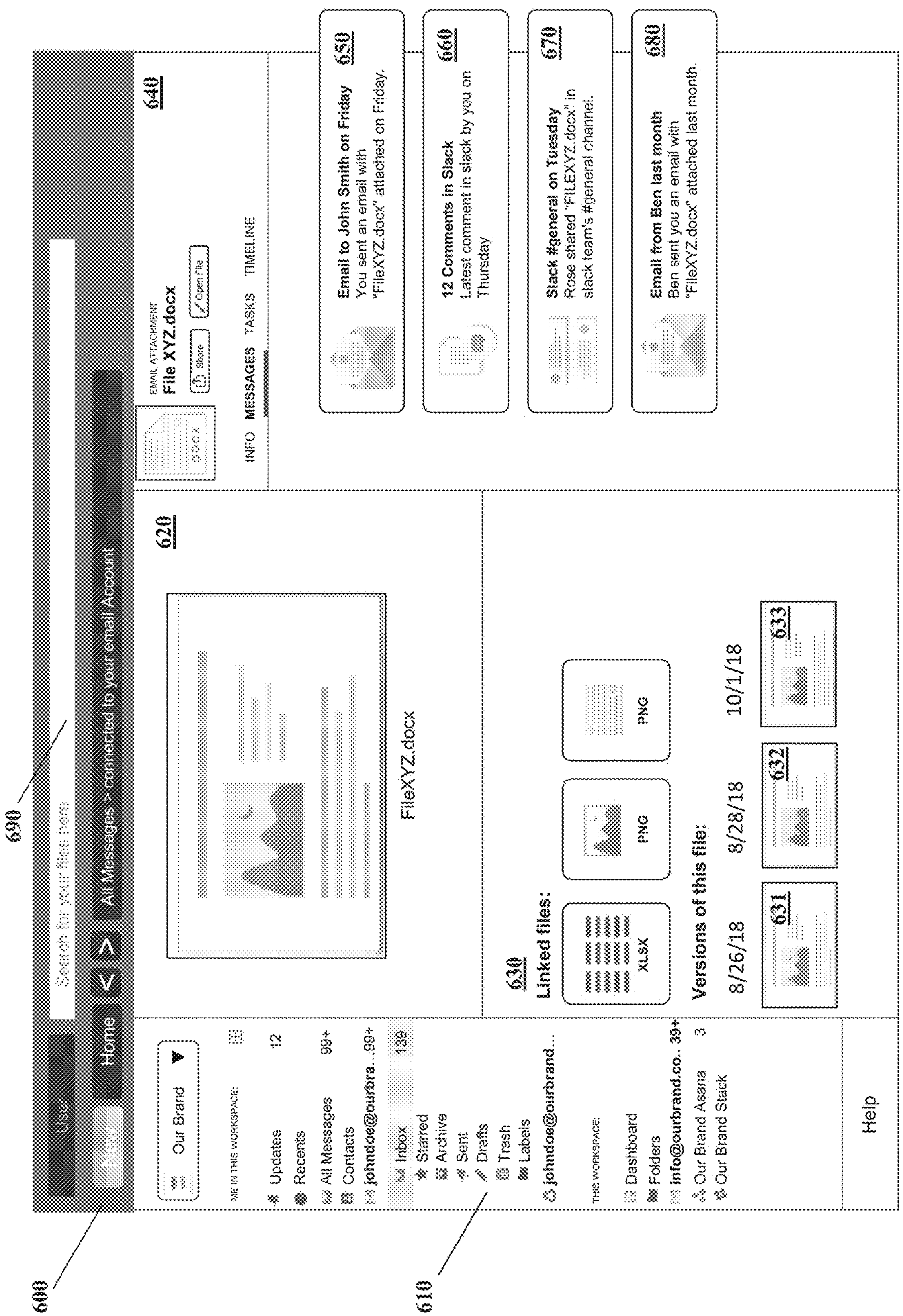
FIG. 6A is a graphical user interface displaying a file and its context information, in accordance with an embodiment.
Figure 6B:
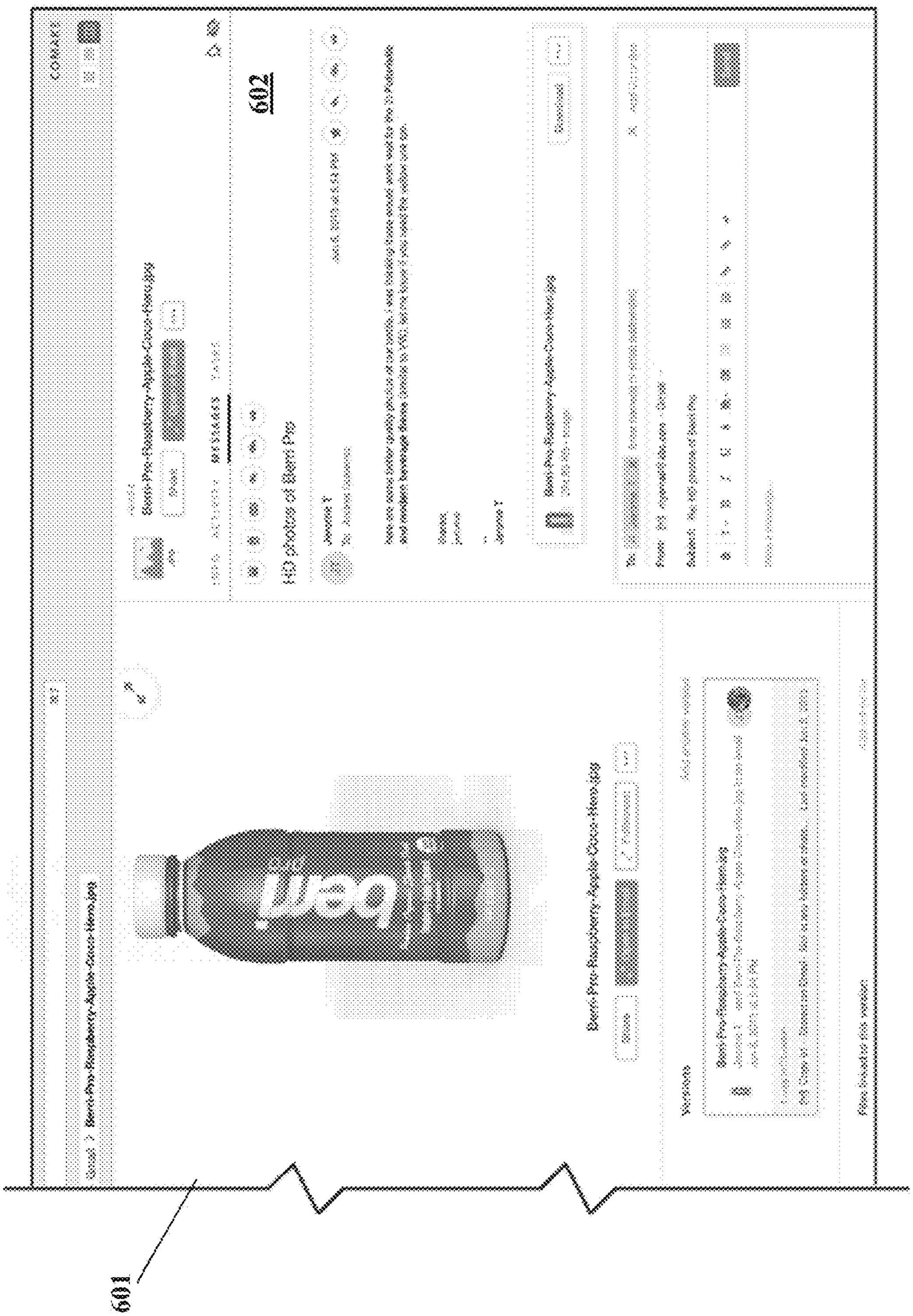
FIG. 6B is a graphical user interface displaying a file and its context information, including a related email message, in accordance with an embodiment.
Figure 6C:
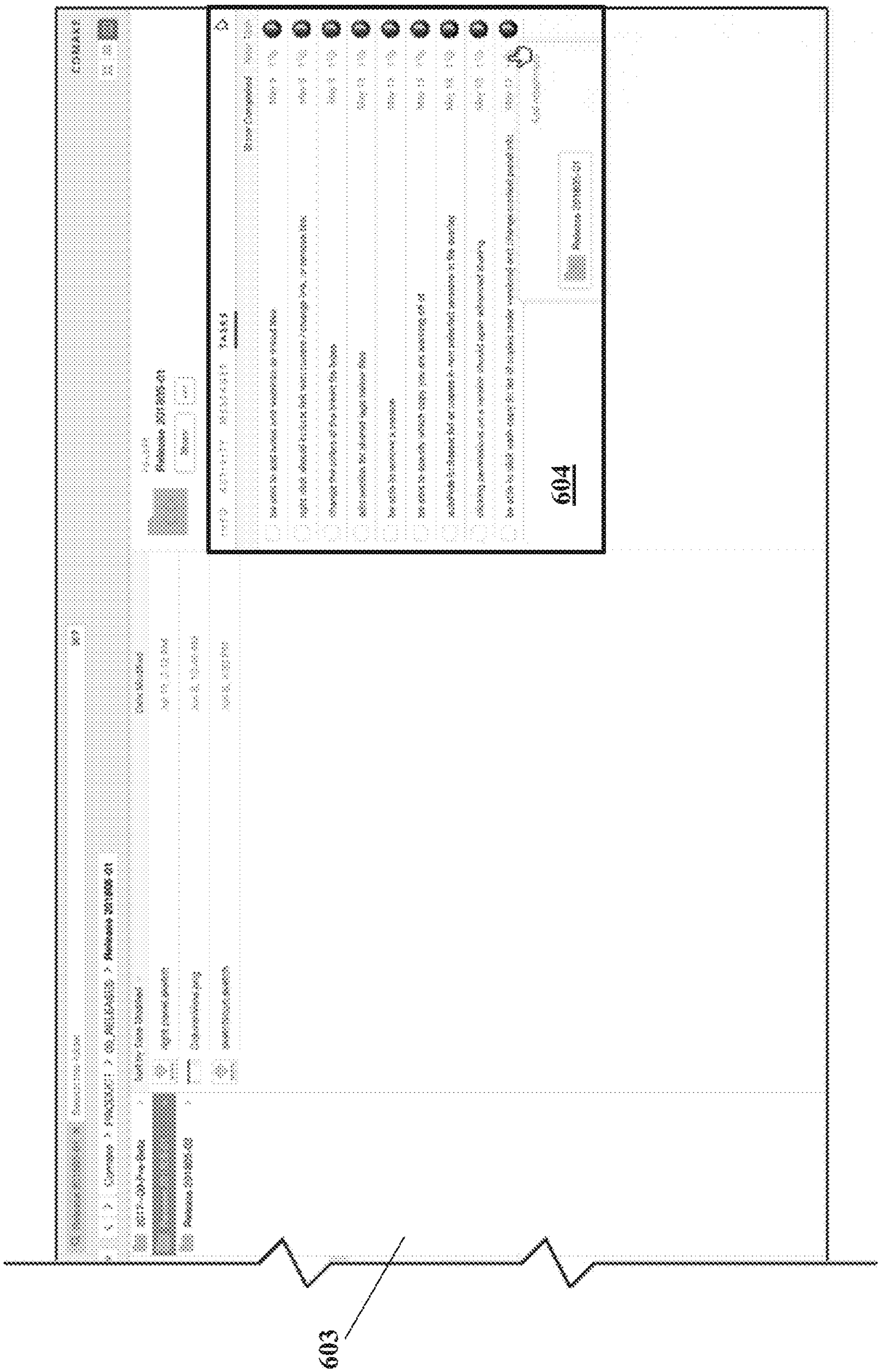
FIG. 6C is a graphical user interface displaying a folder and its context information, including related tasks, in accordance with an embodiment.

Referring now to FIG. 6A, another example of a graphical user interface displaying file context information is illustrated. As described above, the analytics server may incorporate a graphical user interface displaying file previews and context information into a third-party application, such as a third-party email application, a third-party file sharing application, or a third-party project management tool. Additionally or alternatively, the analytics server may generate a web-based application (e.g., a website) and/or native desktop and mobile application where registered users can login to access and/or manage different files. The web-based application may incorporate other third-party applications, such as email applications.

GUI 600 represents a graphical user interface generated and operatively controlled by the analytics server. In the depicted embodiment, the analytics server incorporates data from third-party email, messaging, and other collaborative applications into the GUI 600. For instance, GUI 600 corresponds to a user who has previously registered and connected his or her third-party email, Slack® account, and Asana® account. As a result, the analytics server updates the graphical component 610 in real time by continuously querying the third-party email, messaging, project management, and cloud storage applications and populating the graphical component 610. As described above, the analytics server may utilize various web hooks and/or APIs instead of continuously scanning data repositories.

The GUI 600 depicts an example where a registered user has requested to access File XYZ by searching for the File XYZ using the search bar 690. As described above, the analytics server may perform the search using a search platform (e.g., Solr®), which maintains an index of all files, messages, tasks, and more across all of the data repositories including all third-party data sources. In some embodiments, the analytics server may augment the search results through an understanding of the interconnected nature of the nodes (e.g., how interconnected are the nodes). For example, the analytics server may execute a predetermined ranking algorithm and display the search results accordingly. Upon identifying File XYZ (by identifying a node that represents File XYZ within a nodal data structure), the analytics server populates the graphical component 620 that displays a "quick view" of the file XYZ.

The GUI 600 may also comprise a graphical component 640 that includes interactive hyperlinks/components where a user can open File XYZ or change the file's user permission and share a link directing recipients to access File XYZ. In this illustrative user interface, the graphical component 640 includes hyperlinks for info, messages, tasks, and timeline. Activating the info hyperlink can display information such as timestamp, author, version number, or the like. Activating the messages hyperlink, as shown in FIG. 6A, can display messages containing File XYZ. Activating the tasks hyperlink can display tasks that contain or are related to File XYZ. Activating the timeline hyperlink can display a listing of chronological events and related projects associated with File XYZ.

Activating the deals hyperlink can display a list of all the deals a file is related to in CRM or other sales software (e.g., third party software), as well as other related data (e.g., what stage it is in, the people involved in those deals). Similarly, other hyperlinks could be added, such as project that correspond to the different data sources that might be connected to the analytics server. The GUI 600, including graphical component 640, thereby allows a user to consolidate and manage all updates, notifications, contacts, messages, tasks, and content on a single user interface in a more user-friendly manner.

The GUI 600 further includes a graphical component 630, which indicates suggested related files. In some configurations, the analytics server may display the suggested and/or related files, as shown in graphical component 630. The suggested (e.g., using soft factors) and/or related (e.g., using hard factors) files may be grouped and/or sorted based on different customizable categories. For instance, other files that are attached in the same email thread as File XYZ and other files that are a part of the same deal as File XYZ in a CRM could be grouped together. Furthermore, related files may be sorted based on file type. The graphical component 630 may also include "quick view" access to different versions of File XYZ. For instance, graphical component 630 comprises version 631 from Oct. 26, 2018, version 632 from Oct. 28, 2018, and version 633 from Oct. 1, 2018.

The GUI 600 further includes a message history of File XYZ, as illustrated by the graphical component 650-680. As described above, each graphical component within the GUI 600 may comprise an interactive component configured to direct the user to a file, a message, a task, or a person related to File XYZ. The timeline tab includes a history of all user activity events related to File XYZ and all of its versions, including but not limited to email messages, edits, downloads, and views.

For instance, the graphical component 660 indicates that File XYZ is associated with 12 comments on a third-party project management application. When the user clicks or otherwise interacts with the graphical component 660, the analytics server displays each comment on the GUI 600. The user can easily respond to comments from any third party system (e.g., a task management application) in which the file was uploaded to, or used in a chat conversation. In another example, when the user interacts with the graphical component 650, the analytics server displays the email communication between the user and John Smith. For instance, when a user interacts with the graphical component 650, the analytics server may display a new graphical user interface 601. The analytics server may use a unique email identifier to retrieve the email via IMAP and/or API calls and to display the related email message or thread in full, as shown in graphical component 602. Using the features displayed in graphical component 602, the user may be able to respond in line, and click and drag other versions and/or related files into the message to attach them. In another example, when the user interacts with "task" option in the graphical component 640, the analytics server may display the GUI 604 where the graphical component 604 displays different tasks related to the requested file (e.g., tasks that have a file or folder as an attachment).

In a non-limiting example, the analytics server scans data accessible to all computers within a company where the data is stored onto multiple electronic repositories. Upon identifying all files stored onto different electronic repositories, the analytics server executes a hashing protocol for each identified file to generate a unique identifier for each file. For references to files or websites (e.g., links shared in email messages, website bookmarks, file shortcuts, etc.), the analytics server identifies different unique identifiers such as file path, a URL, or a third-party party system's unique ID. The analytics server further creates a nodal data structure where each node represents an identified file and contains metadata indicating data associated with each file. The analytics server further compares the unique identifiers for all the identified files. When two files have matching unique identifiers, the analytics server updates the nodal data structure by linking the nodes representing the two files as copies of one another.

The analytics server may further scan other data sources with varied metadata, such as messaging systems, task management tools, and the like. The analytics server may also update the nodal structure to relate (e.g., link/merge) multiple files that share emails, messages, tasks, and activity events for example. Similarly, the analytics server can generate unique identifiers for other types of data/units of work, including but not limited to messages, tasks, contacts, calendar events, and notifications in order to link/de-duplicate units of work that are the same across different systems. For example, a URL that points to a task within a project management tool can be found within an email message and that same task could be otherwise indexed by the analytics server directly from the project management tool (e.g., via the project management tool's API), such that the analytics server links the unique URL for that task with the indexed task in the database.

The analytics server periodically scans (or receives updates via API or web hooks) the electronic repositories and iteratively updates/revises the nodal data structure based on comparing unique identifiers of all the units of work and linking appropriate nodes. When a user operating a computer within the company requests to access a unit of work, the analytics server retrieves the nodal data structure and identifies a node representing the requested unit of work. The analytics server also identifies related nodes and context data stored on the node's metadata (representing the requested unit of work). The analytics server then displays detailed information associated with the requested unit of work. For instance, the analytics server displays all the versions (including a latest version) of a requested file, related files, related tasks, related people, email communication related to the requested file, and the like.

Figure 30:
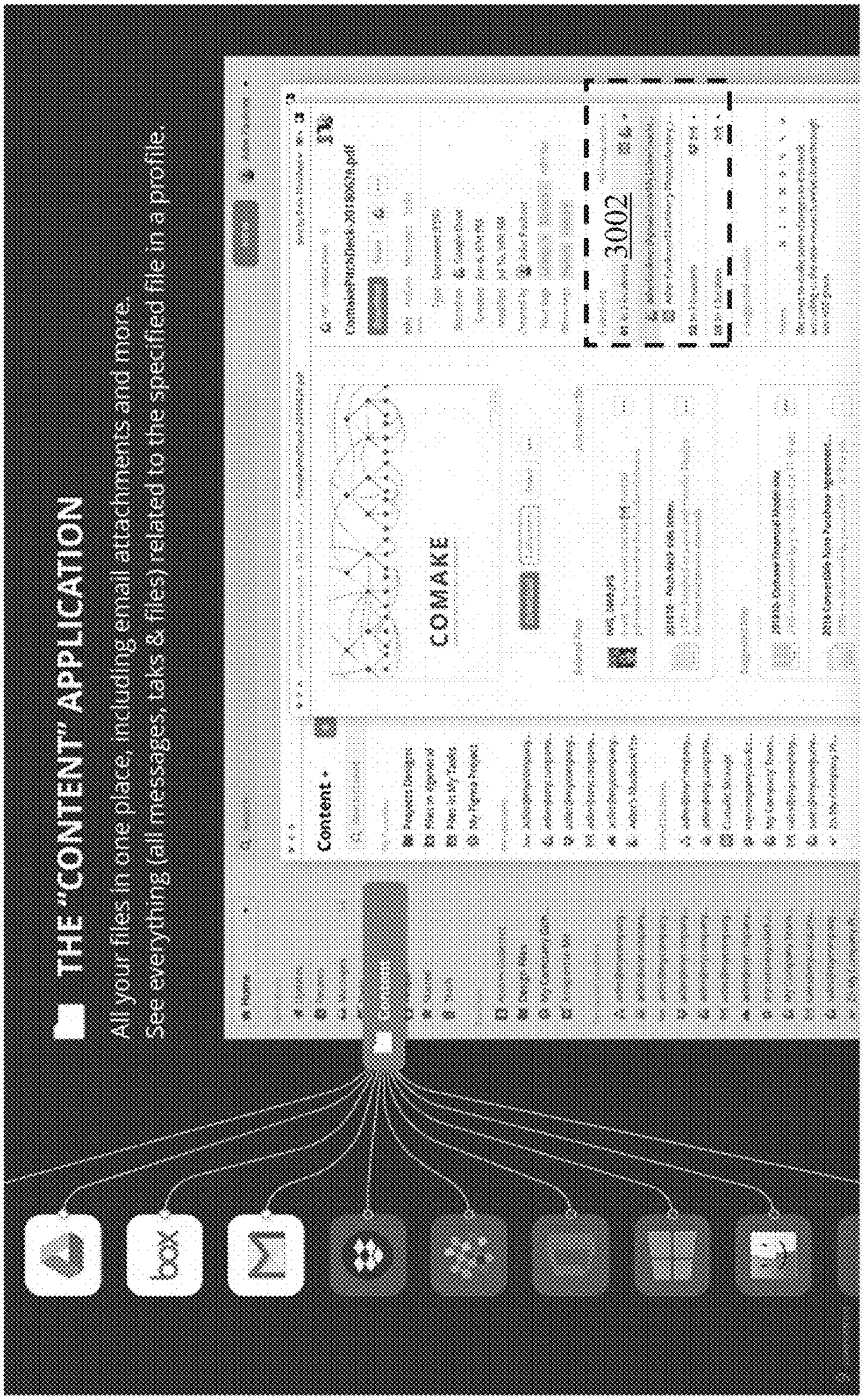
FIG. 30 illustrates graphical user interfaces displayed by an electronic workflow management system, in accordance with an embodiment.

In some embodiments, the electronic platform provided by the analytics server may allow users to access any workflow component using the native applications. For instance, as depicted in FIG. 30, the analytics server may display the graphical element 3002 where the user can interact with a workflow component's name (e.g., file name) and the analytics server may direct the user to the third-party application that hosts that particular workflow component. Using the depicted method, users do not need to activate the third party application to accesses files or other workflow components.

In addition to identifying related files and workflow components using explicit relationships (hard factors) described in FIG. 2, the analytics server may also use a variety of methods to identify related files and workflow components using implicit relationships (soft factors). FIGS. 8-12 describe a variety of methods utilized by the analytics server to identify related content (e.g., files and workflow components) using data associated with each file. The analytics server may monitor context data associated with files and workflow components. For instance, the analytics server may monitor how various files were shared among users and/or edited/accessed by each user. The monitored context data is sometimes referred to herein as the soft factors or implicit data. How users interact with files and workflow components may indicate whether they are related to each other or to a particular project.

As will be described herein, the analytics server may use artificial intelligence (AI) and machine learning (ML) modeling techniques to identify related content. For instance, the analytics server may calculate a likelihood of relatedness for different files based on implicit data (e.g., user interactions). If the analytics server identifies, within a reasonable degree of certainty, that a node corresponding to a file or workflow component is related another node, the analytics server may link the related nodes.

Figure 8:
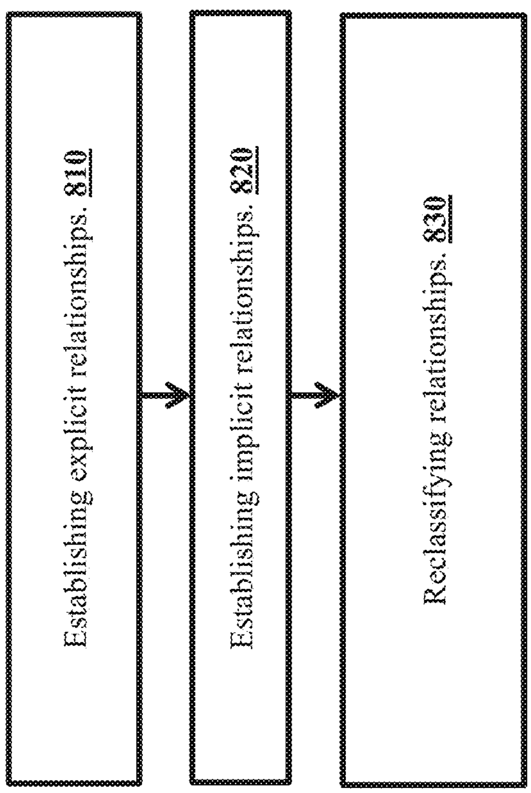
FIG. 8 is a flow diagram of a process executed in an electronic workflow management system, in accordance with an embodiment.
Figure 9:
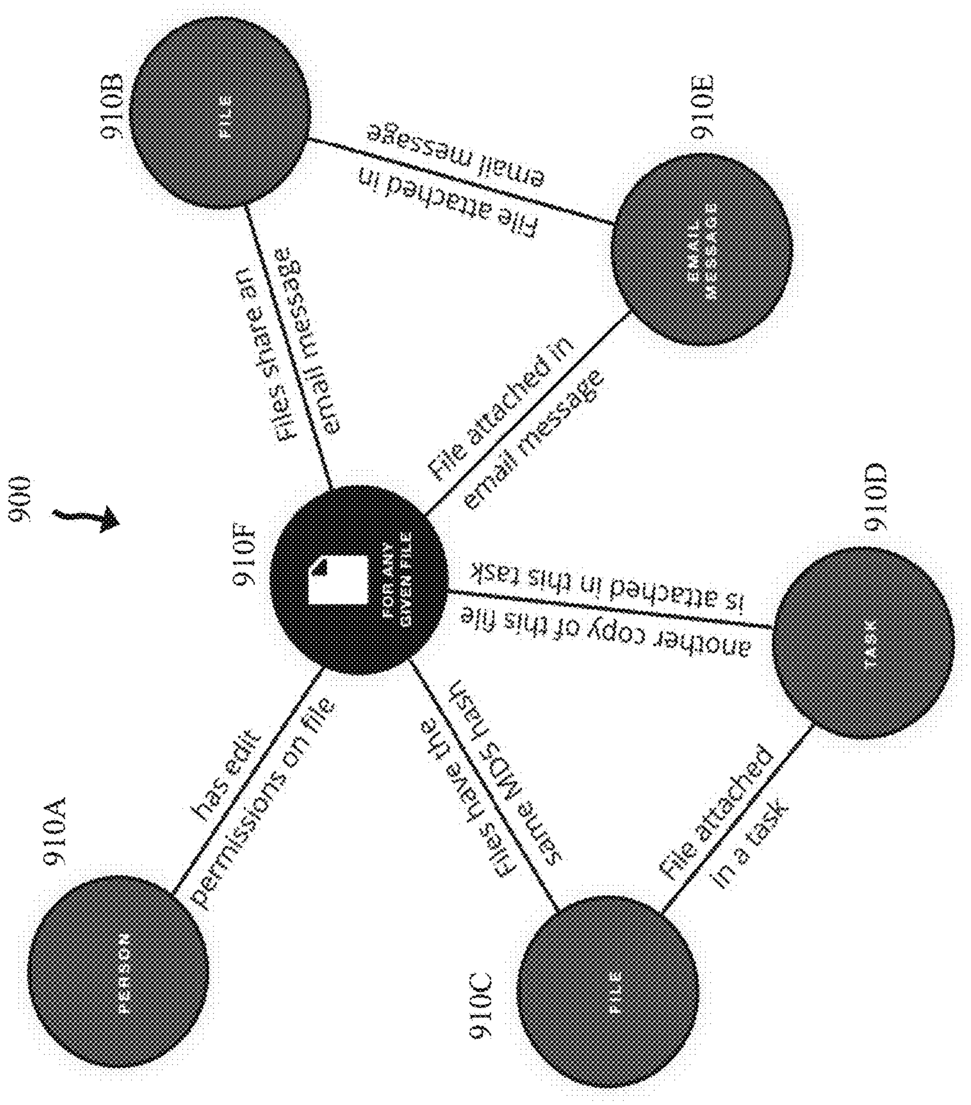
FIG. 9 is a visual representation of a nodal data structure, in accordance with an embodiment.

As illustrated in FIG. 8, the analytics server may use a three-step process to identify related content and to establish relationships between related nodes within the nodal data structure. At step 810 (as illustrated in FIG. 9), the analytics server establishes explicit (e.g., known data or hard factor) relationships between nodes. At step 820, (illustrated in FIG. 10) the analytics server establishes relationships between nodes based on implicit data (e.g., soft factors) by calculating a relative distance/measure between nodes. At step 830, (illustrated in FIG. 11, the analytics server reclassifies types of relationships between nodes that are close to one another according to user needs/use cases. The reclassification can put more abstract labels that might better align with user needs/use cases.

Upon identifying related nodes, the analytics server may append the identified relationships as metadata to each node. For instance, the analytics server may identify related information (e.g., electronic messages, files, other users, tasks, calendar events, and notes) for each node. The analytics server may then generate metadata for each node that corresponds to the identified relationships. In some configurations, the analytics server may also de-duplicate nodes by comparing unique identifiers, such as email addresses for contacts to generate a more efficient graph (nodal data structure).

Although examples and embodiments described herein relate to files and workflow components, the methods and systems described herein can be configured, such that the analytics server identifies related nodes that correspond to a person, user, contact, message, task, etc.

At step 810, the analytics server may use a variety of methods to establish a connection between nodes based on explicit and known context data associated with different nodes. For instance, the analytics server may use method 200 described in FIG. 2 to retrieve relevant data associated with each node (corresponding to different files and/or workflow components) and may establish proper connection within the nodal data structure accordingly.

At step 810 (e.g., explicit relationships or hard factors), the analytics server connects different nodes corresponding to related files through explicit relationships. The most basic relationship considers the MD5 hash fingerprints of each file to identify all copies of one file across different systems (e.g., data repository and/or software applications). If the hashes of the two files match, the analytics server assumes that they correspond to the same file. Other types of relationships are built between files that are attached in the same email or email thread, files that are attached in the same task, files that are referenced in another's comments, and so forth. Activity and relationships from different copies of the same file are consolidated to enable more relationships to be created.

Referring now to FIG. 9 a visual representation of connected nodes is illustrated. FIG. 9 illustrates a set of nodes where the analytics server identifies as related based on known factors, such as being attached in a monitored electronic communication or having a matching unique identifier. As depicted, the analytics server may establish known links between nodes in the graph 900. Each node may represent a file, user, or a workflow component. For instance, the node 910A represents a user, nodes 910B/C/F represent different files, node 910D represents a task, and node 910E represents an email message.

Using methods and systems described herein, such as method 200, the analytics server retrieves context data associated with each node. The analytics server uses MD5 hashing methods to identify that node 910F is related to node 910C. The analytics server then connects nodes 910D to 910F because a copy of the file corresponding to the node 910F has been attached to the task corresponding to the node 910D. The analytics server also connects nodes 910E and 910B to the node 910F because an email attached the same file as 910F. Finally, the analytics server connects the node 910A to the node 910F because a person corresponding to the node 910A edited the file corresponding to the node 910F.

Referring back to FIG. 8, at step 820, the analytics server may connect various nodes using implicit relationships among files, users, and workflow components. This process is also referred to herein as implicit relationships or soft factors. In this step, the analytics server gathers and stores all user activity across systems and services. The methods and systems described herein leverage this monitored and collected user activity data to deduce implicit feedback, which is then used to expose unknown relationships between files. As a result, the analytics server does not have to rely on known relationships (hard factors) or user input to link different nodes. Implicit feedback can also augment explicit feedback/relationships. Moreover, the analytics server is also able to find relationships between nodes that are unknown to users.

As will be described herein, the analytics server may use various scoring algorithms to identify a likelihood that a pair of nodes are related. If the likelihood of relatedness satisfies a threshold (e.g., two nodes are highly likely related, such as 80% possibility that the nodes are related), the analytics server may revise the nodal data structure by linking and/or merging the corresponding nodes. If the likelihood of relatedness does not satisfy the threshold (e.g., there is a 50% possibility that the nodes are related), the analytics server may suggest the nodes as related or may not link the nodes.

As described above, the analytics server periodically monitors files and user activity within a network. The analytics server periodically collects user data (e.g., edit histories, communication histories, files revisions, time of revision, electronic communications, location/device metadata, current open window (e.g., analytics server windows/smart windows) and generates a nodal network that represents relationships between files, messages, tasks, people, web sites, and other types of information.

The analytics server may then consolidate timelines of activity around each user. Consolidating timelines may be technically challenging. For instance, a third party data repository application (e.g., Google Drive) may not currently give third party applications (e.g., analytics server) information related to what a given event represents. Instead, the third party data repository application indicates to third party applications that there was a change to some file, without any information about what that change was or who performed the action. Therefore, in order to discern the details around who performed what action, the analytics server needs to execute comparisons protocols and data correlations.

In a non-limiting example, the analytics server has previously indexed File A, and in that record, File A is shown as a private file without any shared permissions. Therefore, if the analytics server identifies that a "change" was made to File A as described above, it is able to compare the previous version of File A with the new version of File A and determine that the permissions were changed and that the original owner shared the File A with a new "person X." Furthermore, the analytics server may compare other fields in the index, such as a hash of the file's contents to determine if the file was revised.

In some configurations, the analytics server may not be able to discern the actor or the action simply by comparing the old index record with the new information from the third party data repository application. For example, if the "file A" was previously shared with multiple people, it may not be possible to know which of those people truly shared the file with person X. The analytics server may coordinate partial information from different systems, for example, by analyzing email messages to identify if there was an email notification indicating "person Y shared file A with you (person X)" or by tracking activity on local systems and identifying that a given user edited a file. The analytics server may augment the database/index of consolidated activity by tracking and/or scraping information from user's web views/screens/computers/applications as they work normally within those systems.

In order to identify whether two nodes are related, the analytics server may first generate an initial label that includes data indicating that two files may be related (also referred to herein as implicit dataset or implicit feedback dataset). The analytics server may then use a file correlation algorithm and/or scoring algorithm to generate a score that represents a distance between two nodes. In order to achieve this, the analytics server may execute various scoring algorithms and or AI/ML models.

As described herein, the analytics server may execute various analytical protocols to identify whether two nodes are related. The analytics server may only link two nodes when the analytics server has determined a likelihood of the two nodes being related that satisfies a threshold. For instance, the analytics server may execute various analytical protocols described herein to identify whether two nodes are related. If the likelihood of two nodes being related satisfies a predetermined threshold (e.g., the analytics server can confidently determine that the two nodes relate to each other), the analytics server may link the corresponding notes.

The predetermined threshold may correspond to a confidence score generated by the analytics server that identifies a likelihood of the two nodes being related. The system administrator or an end user can revise the predetermined threshold. When the predetermined threshold is increased, the analytics server may only link nodes when the confidence score is higher. For instance, a predetermined threshold of 80% may require the analytics server to only link nodes if the analytics server identifies (with an 80% confidence) that the two nodes are related.

For possible related nodes that do not satisfy the predetermined threshold, the analytics server may link the nodes, such that the nodes are "suggested" as related. As will be described herein, the analytics server may suggest related files/workflow components to the end user. If two files are merged, the analytics server has determined that the two files are related. However, if the analytics server determines that two files are likely to be related, instead of merging/linking their corresponding nodes, the analytics server may link the nodes. When displaying results, the analytics server may then suggest the nodes as related, whereby the end user is informed that the two files may be (but not guaranteed to be) related.

Figure 25A:
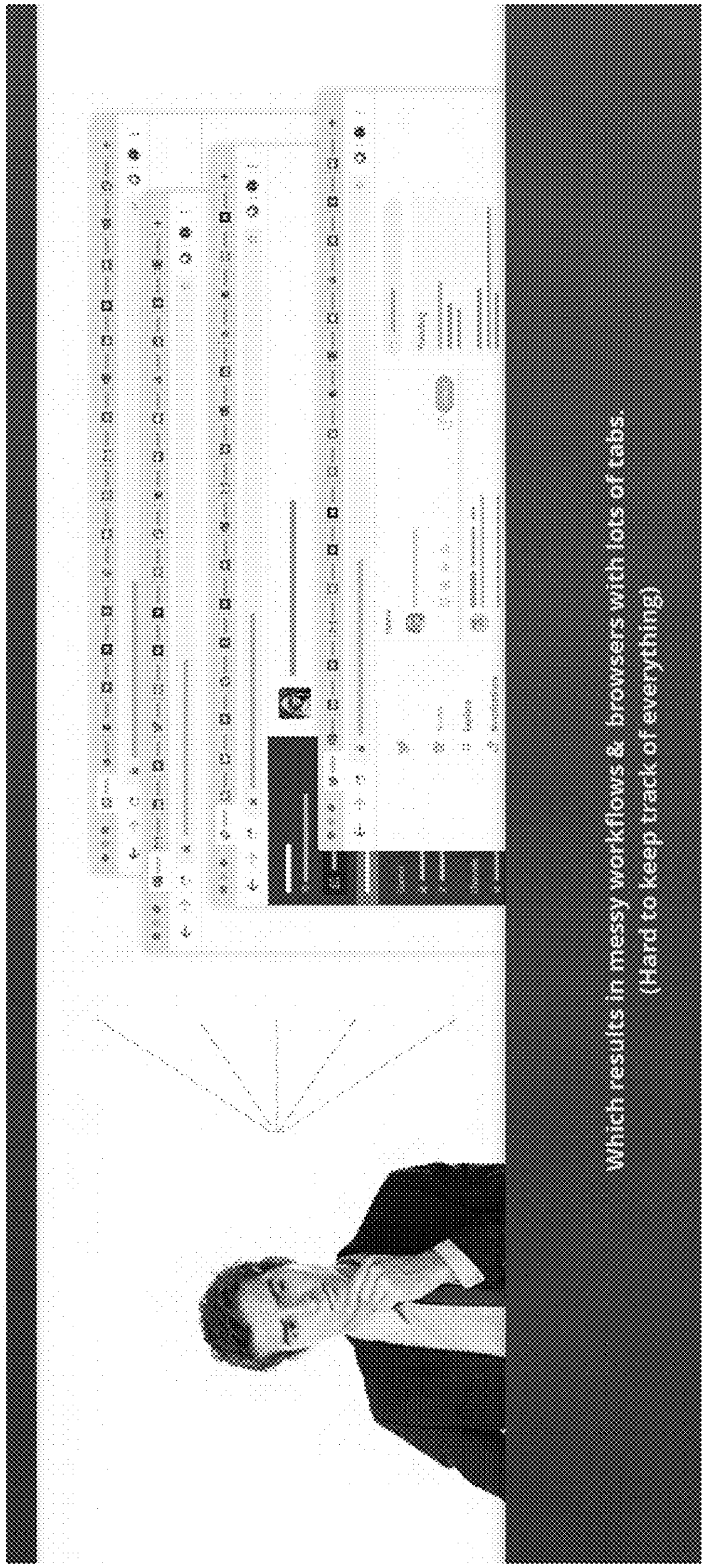
Figure 25B:
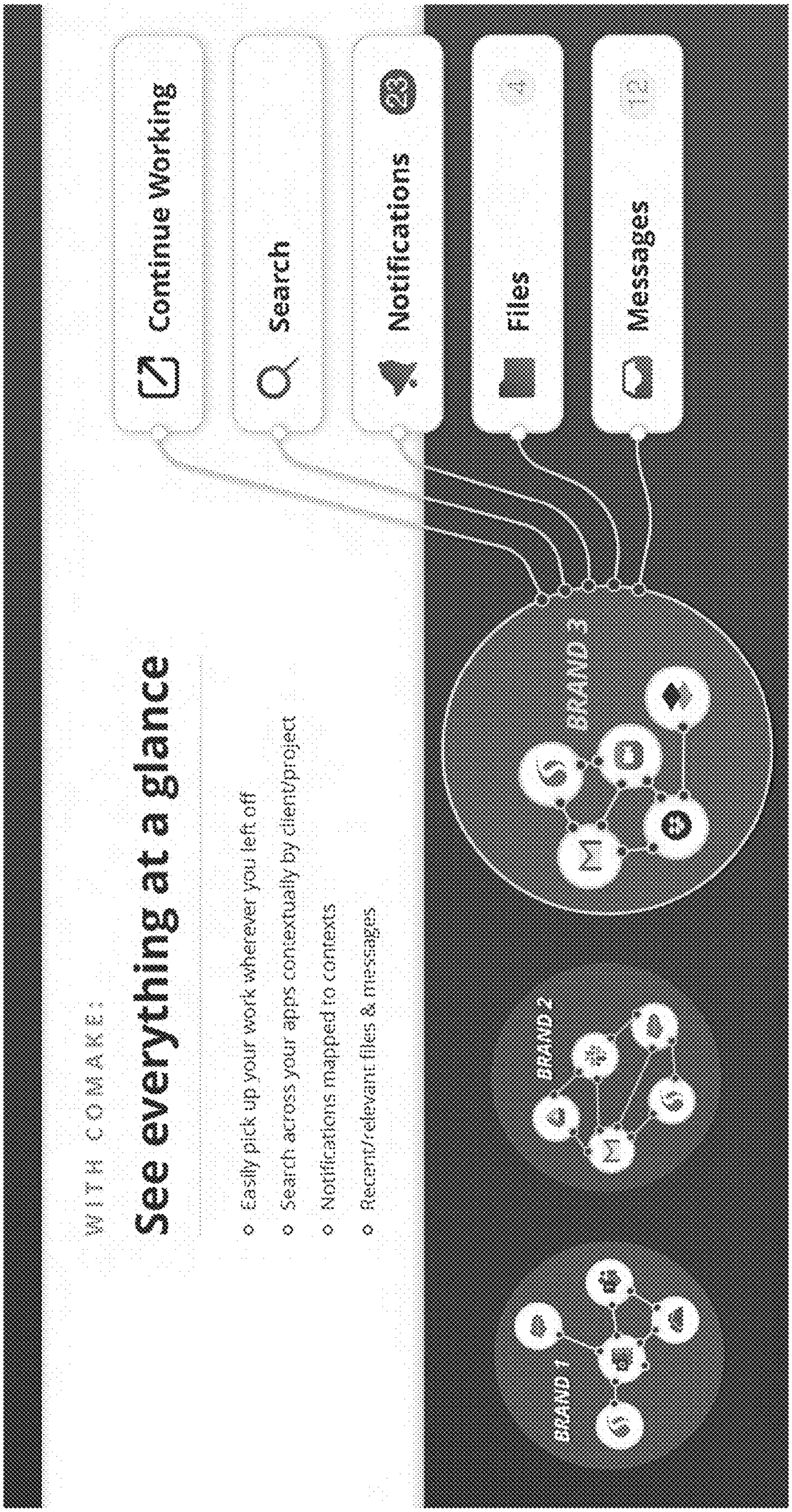
Figure 26:
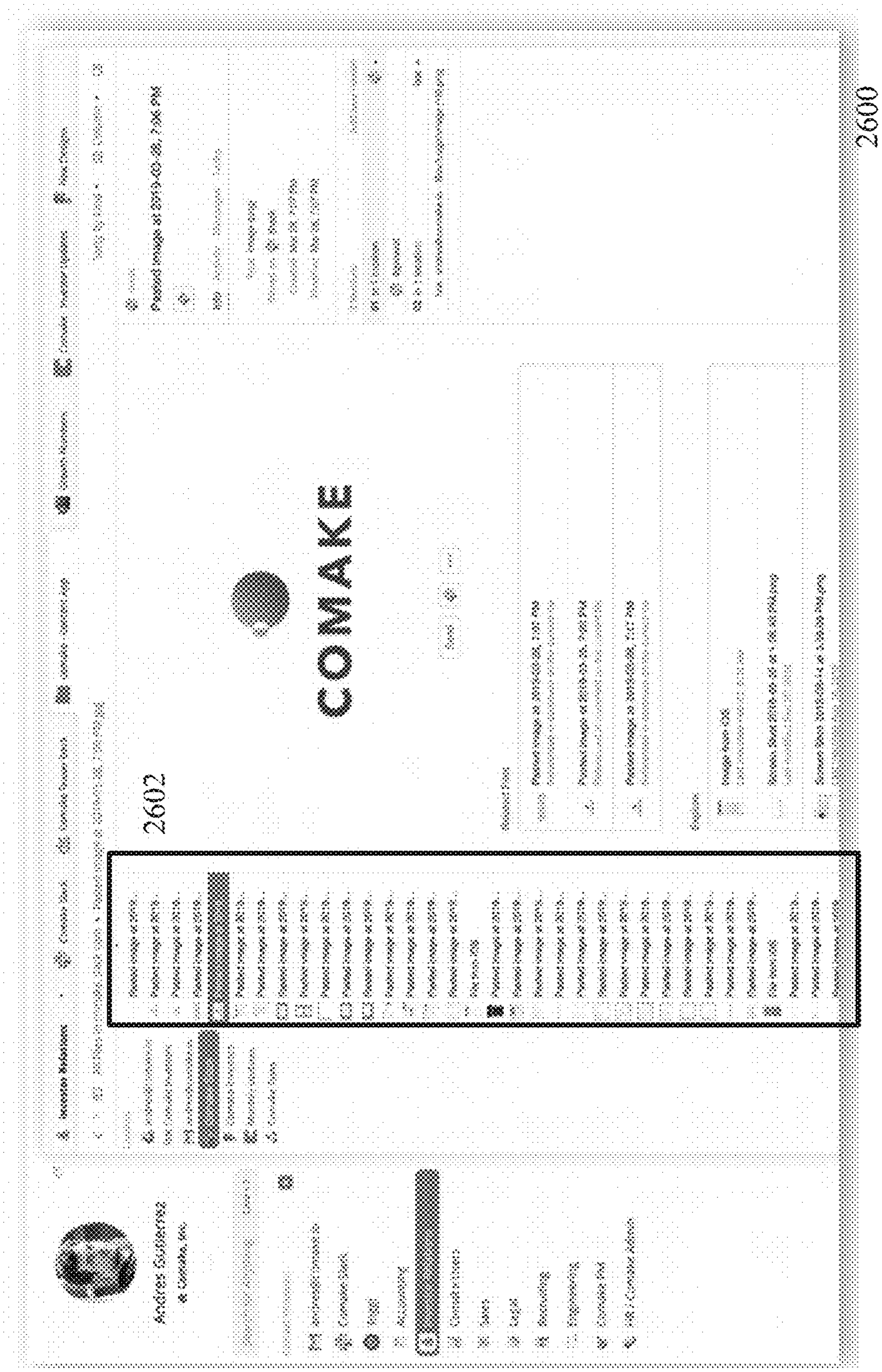
FIGS. 26-27 illustrate graphical user interfaces displayed by an electronic workflow management system, in accordance with an embodiment.
Figure 27:
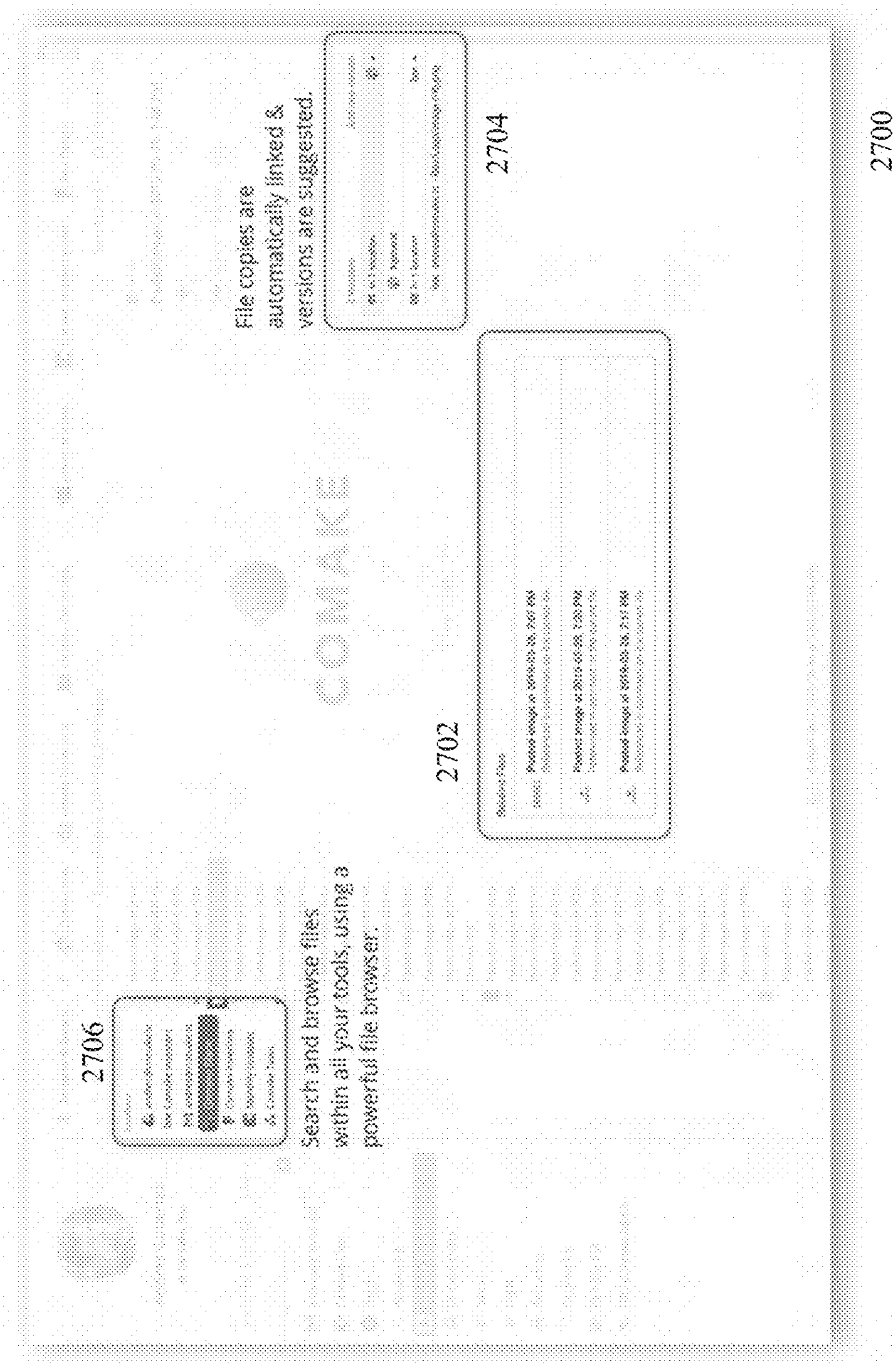

For instance, as illustrated in FIGS. 26-27, the analytics server may display a software platform with a user's existing software applications and accounts (e.g., email accounts or a homegrown file management software). The displayed interface may show related files grouped by context or project (FIGS. 25-26). The platform provided by the analytics server also allows users to consolidate all relevant files such that users can easily work across accounts. For instance, even if different files are stored within different platforms, a user may access them (if they are designated as related) using the same platform (FIG. 27).

The information that the analytics server indexes, correlates, and contextualizes can also be queried and accessed via API by any number of third party software products and tools. In this way, the data augmentation can be used to enrich workflows within, for example, a user's favorite email client or task manager.

Initial Labeling

The analytics server may generate a set of predetermined features/indicators that indicate whether to nodes may be related. This initial labeling may create a weaker/noisier signal that the analytics server may improve using ML and reinforced learning. The type of nodes (files, messages, users, tasks, notes, etc.) may have some impact on how the analytics server generates the initial labeling. The analytics server may generate an implicit feedback dataset. The analytics server may execute various analytical protocols (e.g., scoring and AI/ML models) using the implicit feedback dataset to identify whether two nodes are related.

The implicit feedback dataset is based on gathering observations that indicate possible relationships between nodes. When a user performs an action using a software tool connected to the analytics server, an event is added to the analytics server graph and passed to the file correlation algorithm, or corresponding algorithm if dealing with non-file/other types of nodes. In a non-limiting example, the analytics server may group events together by a heuristic the analytics server call "session groups," which can be easily understood as a session. All the files and components of work that are worked on by a given individual within the same session are grouped together into a "session group." An assumption is that files that appear in the same "session group" more often have a higher chance of being related. File pairs with a high chance of being related may receive a higher "relationship score" than files that do not. The output is a data frame with a preliminary relationship score for every file-file pair.

Session grouping allows the analytics server to identify different files and units of work as possibly related. As discussed herein, the analytics server may monitor different interactions by a user and group them together within the same session. For instance, a user may initiate a chat session with a second user, generate a document file, attach the file in an email, send the email to a third user, and interact with a billing software. As a result, the analytics server may group the generated document, the chat session, information associated with the first, second, and third users, content of the email, and file associated with the user's interaction with the billing software together in a session group.

The analytics server may also provide explicit suggestions for files in addition to the implicitly generated suggestions. These may include the linked nodes of a particular nodes' other linked nodes that might have been shared with a user immediately before and/or afterwards by the same person. In another example, files that might have been shared immediately before and afterwards in a chat session may also be designated as related. Lastly, the analytics server takes this pool of implicit and explicit suggestions and linked files, and compares the metadata such as names, file snippet, file contents, and/or mime types to determine whether to suggest files as versions.

In an example, the analytics server generates an initial labeling (e.g., implicit feedback dataset) indicating that two nodes are related based on idle time. An idle time may refer to a scenario where two nodes have successive activity events by the same person within a predetermined amount of time (e.g., less than 45 minutes). Time logging data entered or confirmed by a user can be used to influence a relative score between two nodes.

In an example, the analytics server generates an initial labeling indicating that two nodes are related based on open or used applications on a user device. Users can open locations, files, nodes, contacts, applications, etc. within analytics server's software tools or windows (or sometimes third party application monitored the analytics server). Having these elements listed above open in the same analytics server window (or external window, third party browser window) can influence a relative score between them.

In another example, the analytics server generates an initial labeling indicating that two nodes may be related based user associations. Users can associate locations, files, nodes, contacts, applications, a given account for an application, etc. with graphical user interfaces provided by the analytics server (e.g., smart windows described in FIGS. 18A-M). If both elements have a hard relationship (e.g., pinned to the window, added as a source for the window, etc.) with an analytics server window, then they are more likely to have a higher relative score (e.g., closer distance) between them.

If elements A and B are recommended to the same smart window C (e.g., based on soft factors) then the analytics server generates a relative score between A and B indicating that they may be related. Other soft/implicit factors may include being viewed in the same window/application.

The analytics server may also retrieve additional data associated with each node. Non-limiting examples of data retrieved may include existing relationships between nodes (e.g., other connected nodes). The analytics server may also retrieve location information, IP address, device, ID, and other data associated with different electronic devices that accessed the files/data.

The analytics server may also consolidate activity for a given user and may create relative scores between components of work because of closeness of a user's activity around them (e.g., file edit history). The types of activity events performed by users may also influence the relative score between nodes. For instance, if a user edits File A, reads File B, edits File A, reads File B, the analytics server may create a higher relative score indicating a higher likelihood of relatedness than if the user reads file A, reads file B, and reads file C.

The analytics server may also use various scoring algorithms (that can be revised and tuned by a system administrator) to generate a score indicating whether two nodes are similar. For instance, the analytics server may use the score to identify users who may know information related to a file (e.g., workflow component). When a user accesses a file, the analytics server may recommend a user who is associated with the file ("other users who may know about this"). The analytics server may rank users based on their respective scores and may recommend a top portion of the ranked users (e.g., top 5 users). To generate the score, the analytics server may attribute 1.5 points per collaboration on messages that user has sent; 1 point per collaboration on messages that user was in "To" field/sent slack message; and 0.5 points per collaboration on messages that user was in "CC" field/was recipient in a slack direct message. To identify and score related content, the analytics server may assign 0.75 points per collaboration on copies/versions that user has activity on; and 0.5 points per collaboration on copies/versions that user has no activity on.

The analytics server may automatically link nodes that correspond to files and workflow components in accordance with the following rules:

Shared email message: if file A and file B share an email message;

Shared email thread: if file A and file C share are in two emails within the same thread;

Shared chat message: if file A and link B share a chat message;

Shared message thread: if file A and file C are in two messages within the same thread; and Shared task: if files A and B are attached or referenced in the same task.

File Relationship Algorithm

The analytics server may execute a file relationship algorithm to identify/recommend relationships among nodes. The analytics server may leverage the history of relationships stored within your connected locations to build newly suggested relationships. As used herein, a connected location may refer to an application that is integrated into the methods and systems implemented using the analytics server. For instance, a third party messaging application, desktop folders, cloud server, an organizations internal and/or external CRM software tools, may all be considered as connected locations.

Furthermore, consolidating user activity allows the analytics server to loosely suggest implicit relationships between files that are worked on at similar times. The analytics server then uses these explicit and implicit relationships between files as a starting point over which a collaborative filtering model is executed to provide recommendations (e.g., identify related nodes).

The observational data gathered from implicit feedback may not be used directly to provide sophisticated recommendations, and is therefore used primarily as preliminary data. This is because implicit feedback may have certain characteristics that must be accounted for to get meaningful suggestions. For instance, implicit datasets may not provide negative feedback without additional processing (e.g., if there is no registered interaction between files, then the "missing data," or the lack of a relationship between file pairs is not addressed without further processing). In another example, implicit feedback may be noisy. In another example, the relationship score between two files may only indicate the system's "confidence" over the existence or non-existence of a relationship, and may not provide the actual strength of the relationship.

Figure 10:
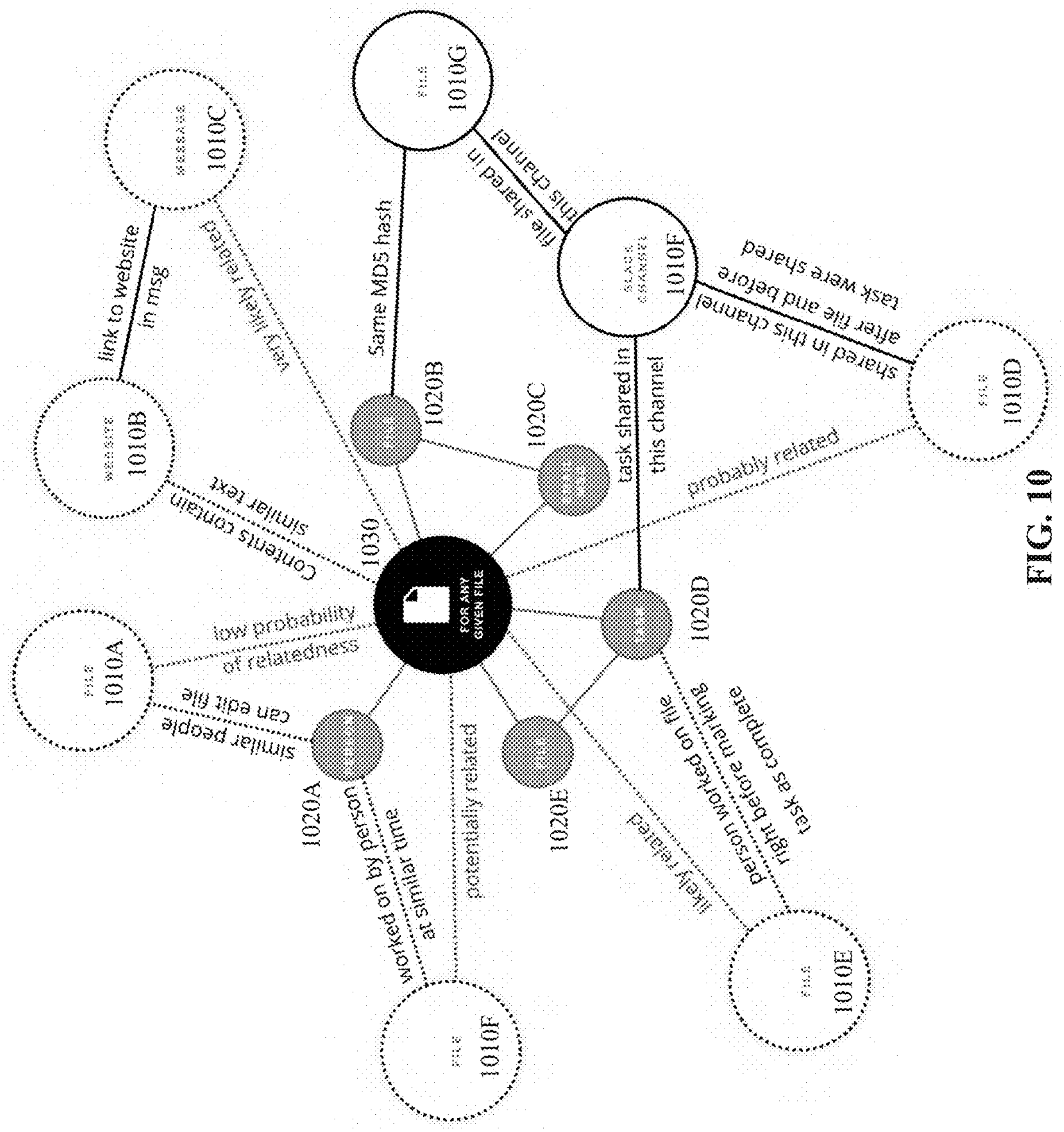
FIG. 10 is a visual representation of a nodal data structure, in accordance with an embodiment.
Figure 11:
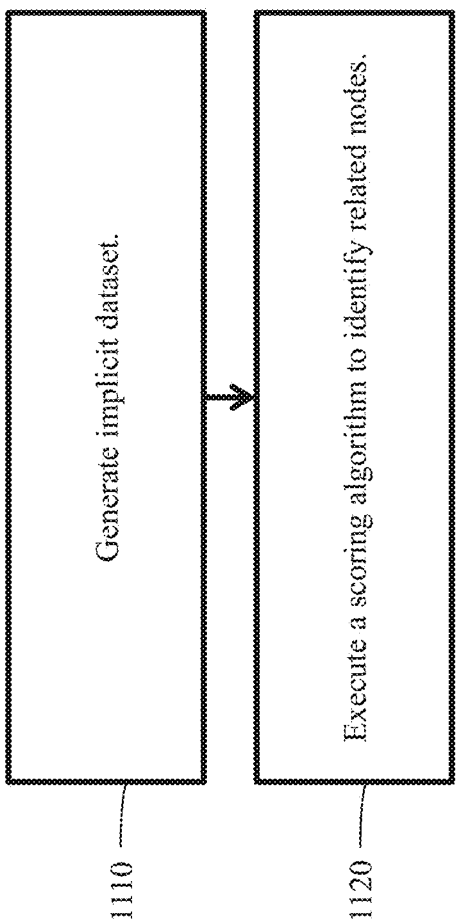
FIG. 11 is a flow diagram of a process executed in an electronic workflow management system, in accordance with an embodiment.

A visual representation of possibly related nodes is illustrated in FIG. 10. In the nodal data structure 1000, the analytics server identifies some nodes as related using explicit factors. These relationships are illustrated using solid lines. For instance, nodes 1020A-E are related to the node 1030. The nodes 1020A-E may represent similar nodes as the nodes 910A-E illustrated in FIG. 9. The analytics server may identify other related nodes using explicit relationships. For instance, the node 1010G is relate to node 1020B because of a similar MD5 hash value. The node 1010F is also related to the nodes 1010G, 1010E, and 1020D. Similarly, the nodes 1010C and 1010B are related.

The analytics server also identifies that some nodes are possibly related due to implicit relationships. These relationships are illustrated using dashed lines. For instance, the analytics server identifies that the node 1010A-E may be related to the node 1030. The analytics server may also designate a likelihood of the nodes being related based on the type of implicit data. For instance, the node 1010A has a low likelihood of being related to the node 1030 because similar people can edit the file that corresponds to the node 1010A. In contrast, the file that corresponds to the node 1010D is likely related to the node 1030 because the file has a solid line (e.g., hard factor) relationship with the node 1010F, which has a solid line relationship with the node 1020D, which has another solid line relationship with the node 1030.

Scoring/Imputing

After initial labeling, the analytics server may calculate a compiled relative score between nodes (e.g., between files and other files, between users and other users, and items to identify whether they are related). As described above, the analytics server may generate an implicit feedback dataset that includes all retrieved context/session data (step 1110 in FIG. 11). The analytics server may then execute a scoring algorithm to identify whether the nodes are related (step 1110 in FIG. 11). The analytics server may also execute one or more computer models configured to identify whether the nodes are related. The models may employ artificial intelligence and machine learning algorithms to determine a likelihood of relatedness for each pair of nodes using the implicit data previously retrieved.

The AI/ML models may be trained using training datasets (e.g., ground truth datasets) that represent known related nodes. Once trained, the models can be executed to identify whether two nodes are related. The analytics server may also periodically monitor the model's outcome to retrain the models based on identifying false positive and revising various algorithms utilized by the models.

The analytics server may generate a score matrix based on the implicit dataset. For instance, the analytics server may generate an element-element co-occurrence matrix by aggregating over all sessions and calculating: X_ij:=(Count of distinct sessions where both element i and element j had events).

In this sparse symmetric matrix, X is factored into UV' using an appropriate numerical method, such as Alternating Least Squares provided by implicit package, although other algorithms may also be used. The number of columns for U may correspond to a tuning parameter chosen by k-fold cross validation. The analytics server may then apply a Regularization algorithm (e.g., alpha is also chosen by k-fold cross validation). The number of iterations is a nuisance parameter. In some configurations, the analytics server will warm start the factorization updates.

The analytics server may employ the following method to achieve the above-described results:

Step 1: Related files are determined by scoring an element;

Step 2: File Detail view makes request to recommender micro service;

Step 3: Identify element i for a given file;

Step 4: Calculate predicted scores of X_i* by multiplying U_i×U;

Step 5: Filter out all element pairs, which are explicitly linked elsewhere in the graph;

Step 6: Take top 20 remaining elements;

Step 7: Filter out all elements scoring below threshold \tau (where \tau determined via cross-validation);

Step 8: Return elements that remain as JSON;

Step 9: Mapped back to files by Web server.

In that embodiment, the analytics server may generate groupings of files that were worked on by the same individual during similar times. These groupings are called "session groups" (e.g., context data associated with the event) and are created by querying the database and/or the nodal data structure for activity events recorded in timelines for each file. Different types of events over files can have different relative weights corresponding to how important they might be within a given "session groups." For example, receiving a file during a given work session will have less impact to an "session groups", than viewing a file during that same session, which in turn has less impact than editing a file during a given session. The matrix is then factored into X=UV', where U and V are n by k matrices and k and λ, factors are selected via cross validation methodologies. When the analytics server generates a score for file i, scores are calculated (e.g., UiV), sorted descending, and filtered based on a threshold.

As previously described, the implicit dataset may be noisy, which may lead to incorrect results. To address this issue, the analytics server may various curve-smoothing methods. For instance, the analytics server may use the collaborative filtering technique described in the paper "Collaborative Filtering for Implicit Feedback" (Hu et al., 2008). This technique relies on using Alternating Least Squares to minimize a loss function. Alternating Least Squares method exploits the algebraic properties of the loss function to minimize it in linear time. Smoothing in this way generates recommendations that are more accurate given the nature of implicit feedback datasets. In some other embodiments, the analytics server may utilize a stochastic gradient descent method.

To improve the scoring process, the analytics server may also include explicit relationships among nodes into the model before smoothing the data points. In some configurations, the analytics server may execute the model to generate two sets of recommendations, based on two different scores (one from explicit suggestions, and the other from smoothed implicit data points). The analytics server may combine these scores and generate only one set of recommendations that take both implicit and explicit data into account.

In some configurations, additional factors can be taken into consideration in scoring the relationships between nodes. For example, the analytics server may add weights to different types of events that are used in creating implicit relationships between nodes. This assumes that certain activities are stronger indicators of relationships than others are. The analytics server could also use types of events between nodes to suggest types of relationships. For instance, the analytics server can adapt an approach that also analyzes other metadata, such as email content surrounding the files, common collaborators between files, common folders that contain both files, and the like. The analytics server may compare text-related files using low-dimensional vector representations of them. Similarly, the analytics server may calculate semantic similarity between components of work (i.e. documents, files, messages, tasks, etc.) to find text-based similarities, which may indicate that two components or work are similar and/or related.

Labels and Scores Change Over Time

Referring back to FIG. 8, at step 830, the analytics server may periodically reclassify and relabel nodes to achieve better results. The analytics server improves the quality of initial labeling and the AI/ML powered scoring by considering user behavior. For example, the analytics server may provide an option for users to accept and/or reject recommendations and have their actions influence the earlier labels and models described herein. For instance, as a user is interacting with a file/workflow component, the analytics server may generate a list of possibly related files/workflow components. The analytics server may then prompt the user to identify whether the suggested files/workflow components are indeed related to the user's project/files. Users may be able easily verify whether a suggestion is a good suggestion by either accepting it or dismissing the suggestion. These user responses will update the score between the two nodes. A naive implementation that could be used as a starting point would divide the current score between the two files in half. Furthermore, validations and/or rejections of suggestions should be used as a training set to improve recommendation generated by the analytics server.

In some configurations, if a user dismisses a recommendation, the analytics server does not revert the score identifying the relationship between the two corresponding nodes to zero. Instead, the analytics server may adjust the score, such that other considerations are taken into effect. For instance, user 1 and user 2 have local access to file A and file B. They are not shared files, so both users each have 1 private copy of each file. If user 1 accepts a relationship between file A and file B, and user B rejects the relationship between file A and file B, the analytics server could use both inputs in calculating a new score. The factors that could potentially influence a relationship between files A and B do not have to result in a binary output of options. Furthermore, having an understanding of all of the factors and metadata surrounding a conscious acceptance/rejection, a passively browsing click to view the file, the context in which a file was viewed, by whom, in what location, on what device, etc. . . . can help personalize recommendations contextually by user or by project. There does not need to be a single score between nodes (e.g., there can be a single score between nodes per user).

An example of suggested related files is depicted in FIGS. 26-27. GUIS 2600 and 2700 are similar. However, for clarity, GUI 2700 focuses on specific GUI elements related to methods and systems described herein.

In the depicted embodiment, the user uses the graphical element 2706 search and browse files within various data repositories and/or software tools. The analytics server may display the requested files in the graphical element 2602. The analytics server may then display the graphical element 2702, which suggests possibly related files and/or workflow components. The analytics server may also display the graphical element 2704, which displays the requested files and/or other versions of the requested files that may be stored within one or more data repositories and/or software tools.

The analytics server may also identify subsequent and/or previous versions of the same file/workflow component. For instance, the analytics server may identify closest nodes to any given node and process the information again with new/alternate algorithms that can establish particular types of relationships between the nodes. For example, analytics server may compare the text in the contents of this subset of nodes (e.g., nodes that are more similar or closer in distance) more easily than comparing text in all of the existing nodes. This method also requires less computing power because fewer nodes are analyzed. If text is similar enough (e.g., likelihood of similarity satisfies a threshold), the analytics server suggest two nodes as versions of each other. Specific types of actions and relationships can also start to inform classifications. For instance, two files with similar names that share an email thread may likely be versions of each other.

In order to increase efficiency and execute more detailed analysis, the analytics server may identify a subset of the nodes and execute various additional analytical protocols. The additional protocols may include protocols that extract and identify similarities between content corresponding to the subset of the nodes. For instance, where in some embodiments, the analytics server compares metadata corresponding to a file or node, in some other embodiments, if there is only a subset of nodes, the analytics server could do deeper (more detailed) processing and comparison of the contents of the nodes. The analytics server may execute additional models/algorithms that may be too costly or inefficient to run on all possible combinations/permutations of all nodes within the nodal data structure.

In some configurations, the analytics server may allow users to define their own types of relationships, association, and other pertinent information. In this way, the analytics server may provide users with the freedom to label relationships with any label they choose. As the amount of user-defined, implicit, and other explicit relationships increases, the analytics server (using recommendation algorithms) will be able to provide better suggestions that could include specific relationships types. Non-limiting examples of these relationships may include, files that are derivatives of other files (e.g., working files or parent-child relationships between files), files that are outputs or exported from other files (e.g., a pdf file and the associated word document that generated the pdf), files that are previews of other files (e.g., an image of a 3D model and the associate CAD file), emails that are related to the same deal, etc.

Figure 12:
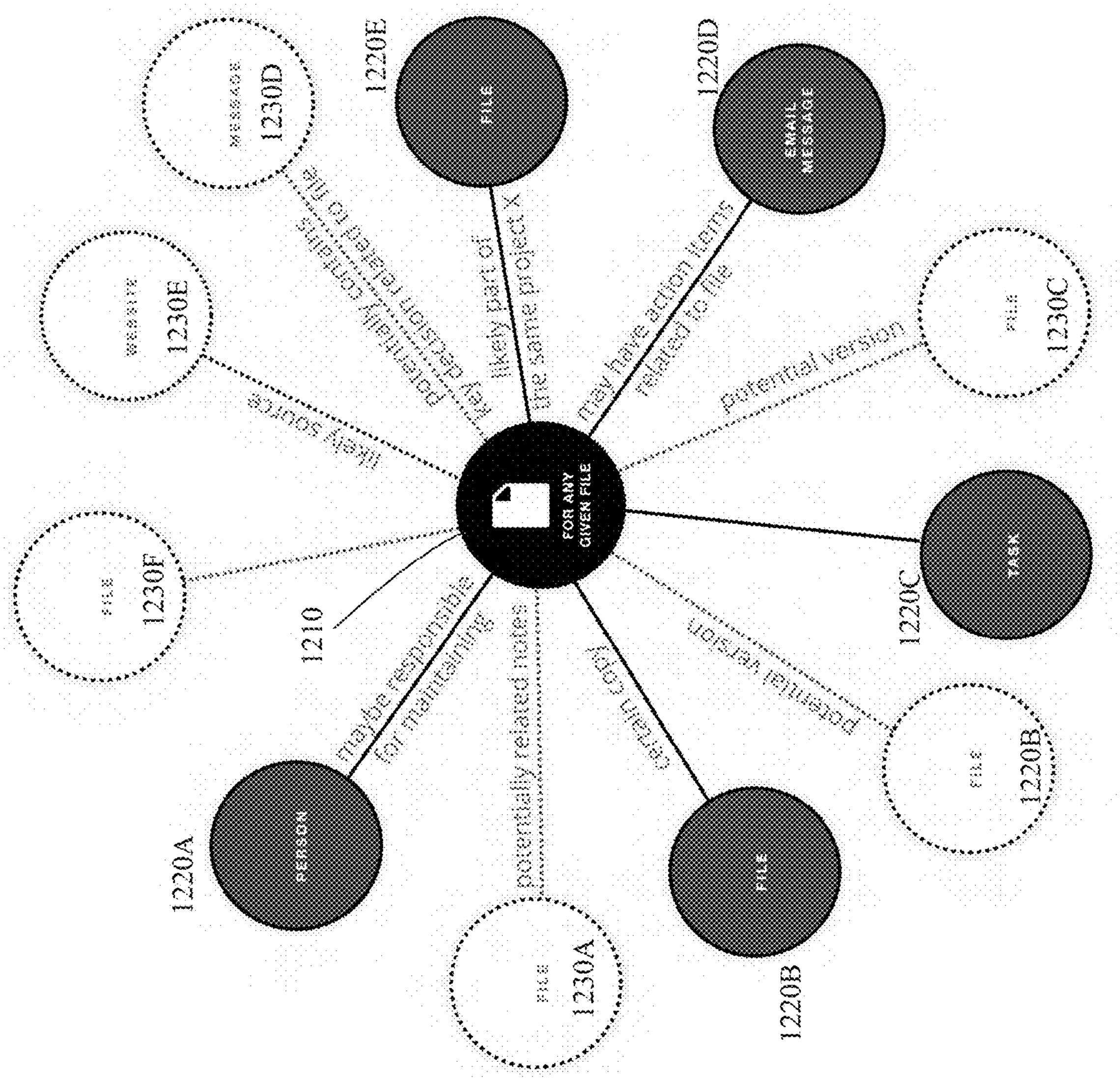
FIG. 12 is a visual representation of a nodal data structure, in accordance with an embodiment.

Referring now to FIG. 12, a nodal data structure linking nodes based on the methods/systems described herein is illustrated, in accordance with an embodiment. The node 1210 is linked with various other nodes using hard/soft factors and the methods/systems described herein. The analytics server links the nodes 1220A-E to the node 1210 based on explicit data, illustrated as solid lines. The analytics server then links the nodes 1230A-F to the node 1210 as related nodes identified using implicit data, illustrated in dashed nodes.

The methods and system described herein can be used for an information mapping business that helps users improve their access to relevant and understanding of fragmented work data. The methods and systems described herein can be used in conjunction with a variety of software tools. The value of these methods and systems, regardless of how the technology is packaged, lies in helping users automatically and/or manually interrelate units of work, while also contextualizing them within the larger objectives/contexts, such as, teams, projects, clients, classes, etc.

The analytics server allows users to increase their ability to work contextually without being required to provide the analytics server access to any of their underlying data. However, users must share some context data with the analytics server in order allow the analytics server to map data and identify related nodes. As a result, the methods and systems described herein can be implemented on any data repository without requiring a change within the existing infrastructure. For instance, the analytics server may be utilized within an organization where the analytics server can work in conjunction with existing infrastructure and software tools to contextualize data.

Figure 28:
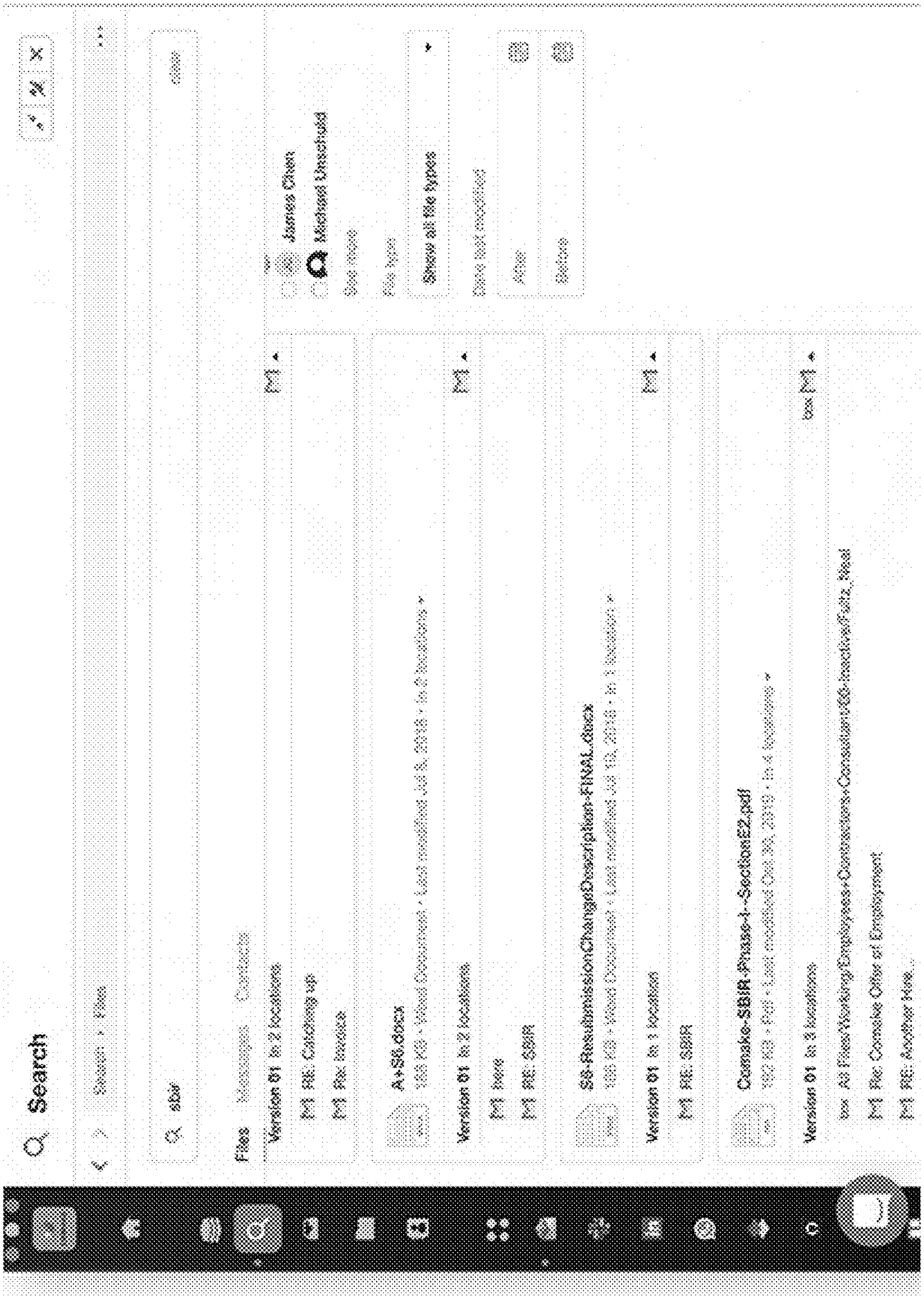
FIG. 28 illustrates a graphical user interface displayed by an electronic workflow management system, in accordance with an embodiment.

Moreover, users can also use analytics server's information mapping services as native interface components, for example through an API (FIG. 28). The interface shown in FIG. 28 may be integrated into any other application, including a third party application, thereby eliminating the need to use multiple applications (e.g., existing applications of an organization and an additional application to view data provided by the analytics server).

Figure 22A:
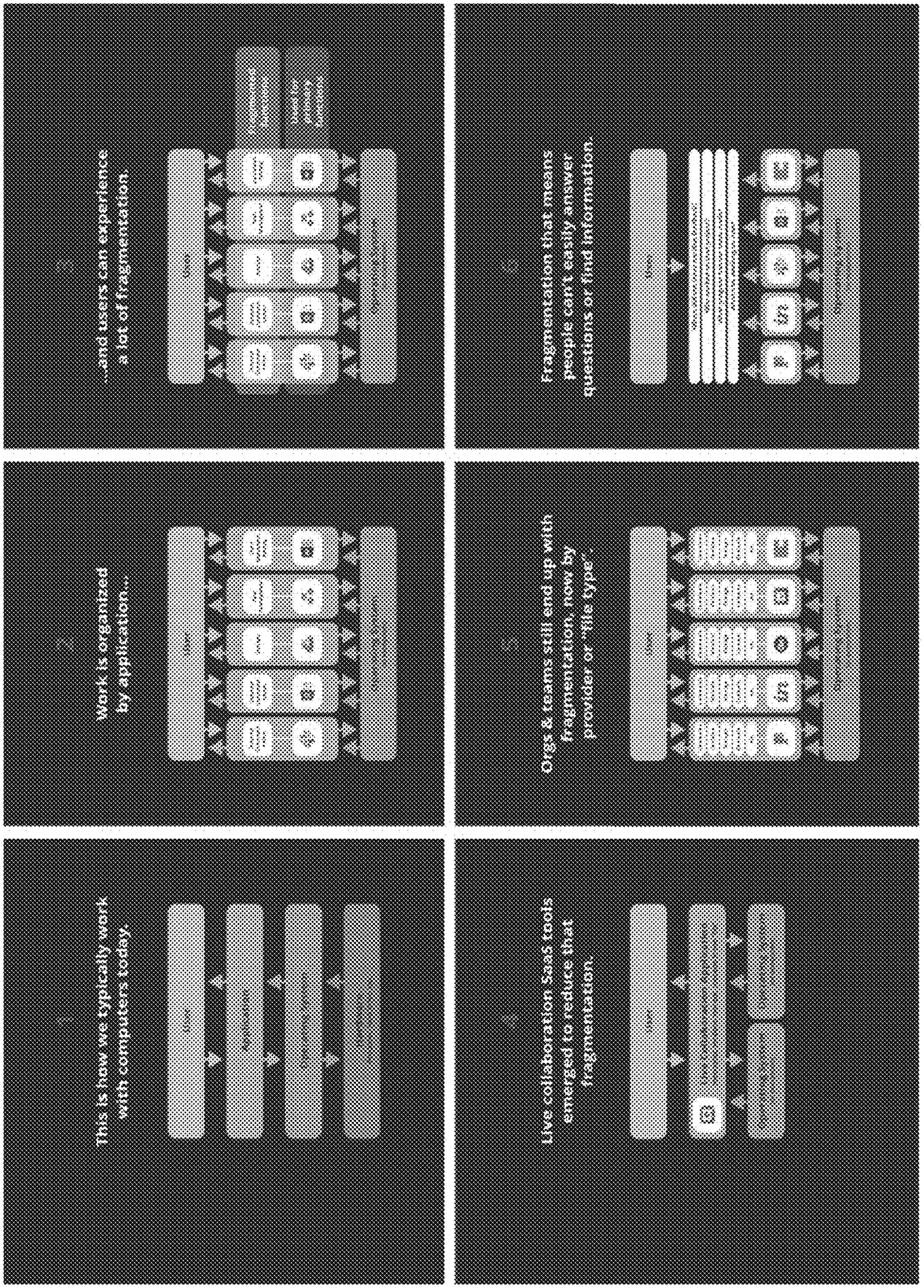
FIGS. 22A to 25B show non-limiting examples of workflow management systems, in accordance with an embodiment.
Figure 22B:
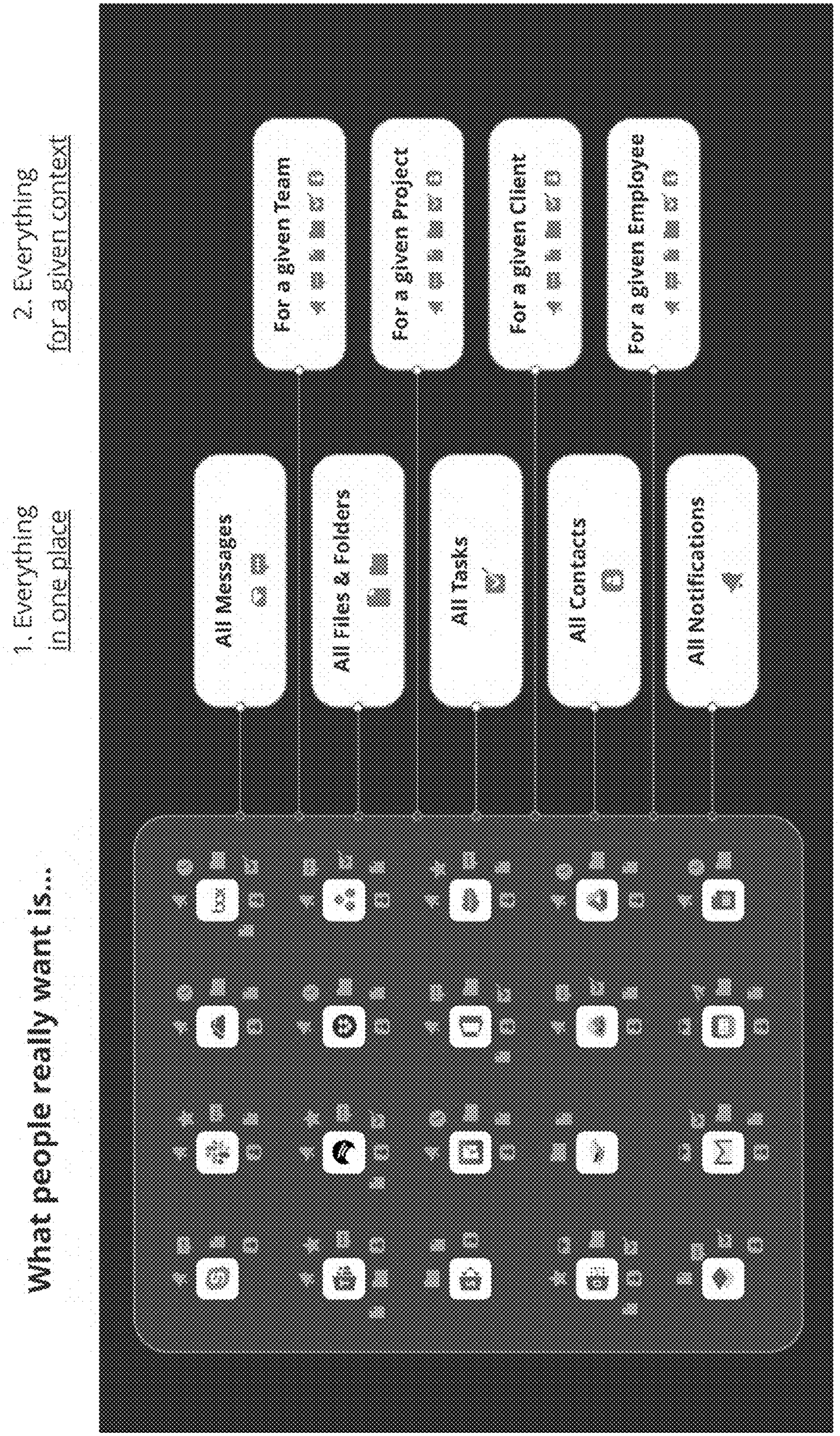

The methods and systems described herein can also solve long-standing data fragmentation problems. FIGS. 22A-B show a conventional method of operation of conventional software solutions. For instance, as depicted in FIG. 22A, users typically have a fragmented approach to accessing units of work (e.g., files, messages, tasks, etc.) and digital workflows are organized by applications rather than by objective. As a result, users experience a disconnect between intent and their interaction with work inside the digital tools they use, ultimately making it difficult and unnatural to access information, particularly for people who have do not have previous experiences with the organization of a given project or objective.

FIG. 22A illustrates the current paradigms for how users interact with applications and their data. The term "ecosystem," as used herein, may refer to a software ecosystem or an operating system prevising services. The ecosystem may be interpreted as the World Wide Web (the browser through which the web is accessed) and may include all the different applications that run on the web. Different application and their ecosystem may share some data/processes/functions within other applications in their ecosystem. For example, sharing a file with someone through data repository (e.g., Google Drive®) and sending an email to someone else through an electronic mail messaging application (e.g., Gmail®) may add both of those individuals to a single contact list in a suite of applications (e.g., G-Suite®) because both applications are part of the same ecosystem. Under most circumstances, contacts across ecosystems remain unlinked. Because most ecosystems are not designed to communicate proprietary data, users using multiple software applications belonging to different ecosystems may not benefit from interchange of data among the used software applications.

Most workplaces and individuals today, live with digital workflows that leverage software from multiple ecosystems, which results in a lot of fragmentation, duplicate efforts, and time spent searching for or understanding information, increased onboarding time of new employees or project team members, and the like. For example, it is not uncommon for a modern knowledge worker to communicate and collaborate simultaneously across several software applications on any given day: internal messaging via a chat tool (like Slack), external messaging via an email tool like outlook, respond to comments and conversations in documents (like Google Docs or Quip), update team members with comments over a given task or support ticket, etc.

The analytics server may identify related information for a given context, in essence using the context as search criteria for all the underlying information within each application. The analytics server may also generate suggestions on nodes and information that may be relevant to a given context so a user may access each piece of information more efficiently. Furthermore, as illustrated in FIG. 22B, the method and systems described herein aggregate all electronic files and their respective context data (other associated information, such as related files, communications between users associated with each electronic file, and the like) in one place; All electronic messages and their respective context data (other associated information such as the sender, related communications, related nodes, and the like); All electronic tasks and their respective context data; All calendar events and their respective context data (related files, communications, etc.); and All contacts and their respective context data (other associated information like role, title, relationship with other people, related files, messages, etc.); and all notifications.

Figure 23:
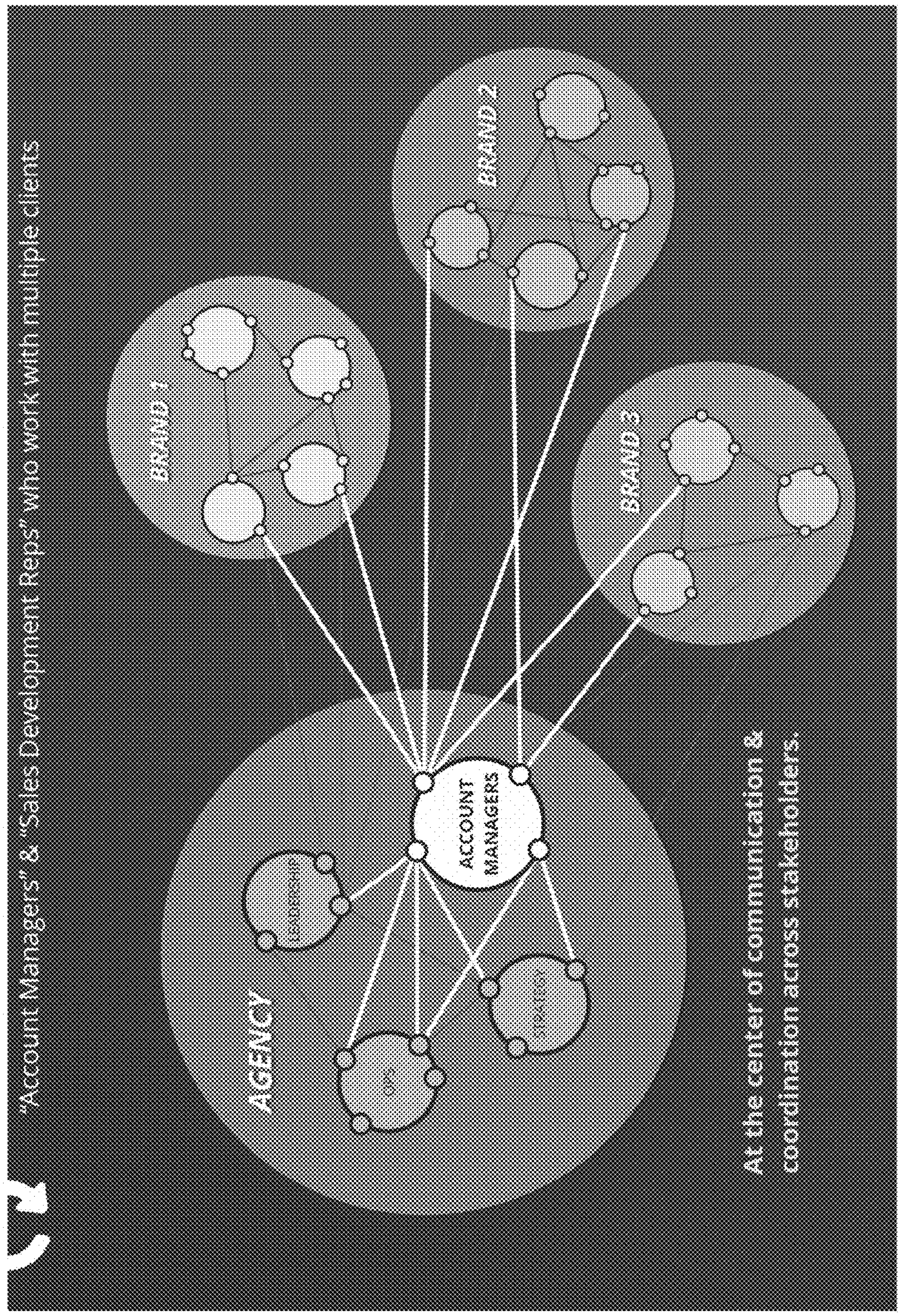

FIGS. 22-25 illustrate how this fragmentation typically manifests itself in a given user's workflow. FIG. 23 shows how an account manager or sales development representative who works with multiple clients has to constantly communicate with both internal and external stakeholders in order to help manage communication and successful project delivery. The account managers and/or sales representatives may be responsible for understanding and representing the client's needs internally within their agency or client service firm. Simultaneously, these same individuals need to understand their agency's capabilities and availability in order to keep the client informed of current project status as well as to help sell additional services to the client. The difficulties start to compound when each person within the agency ends up working on multiple projects for different clients and the information required to understand who is working on what, what the current status of a project is, and why things were done in a particular way is fragmented across channels.

Figure 24:
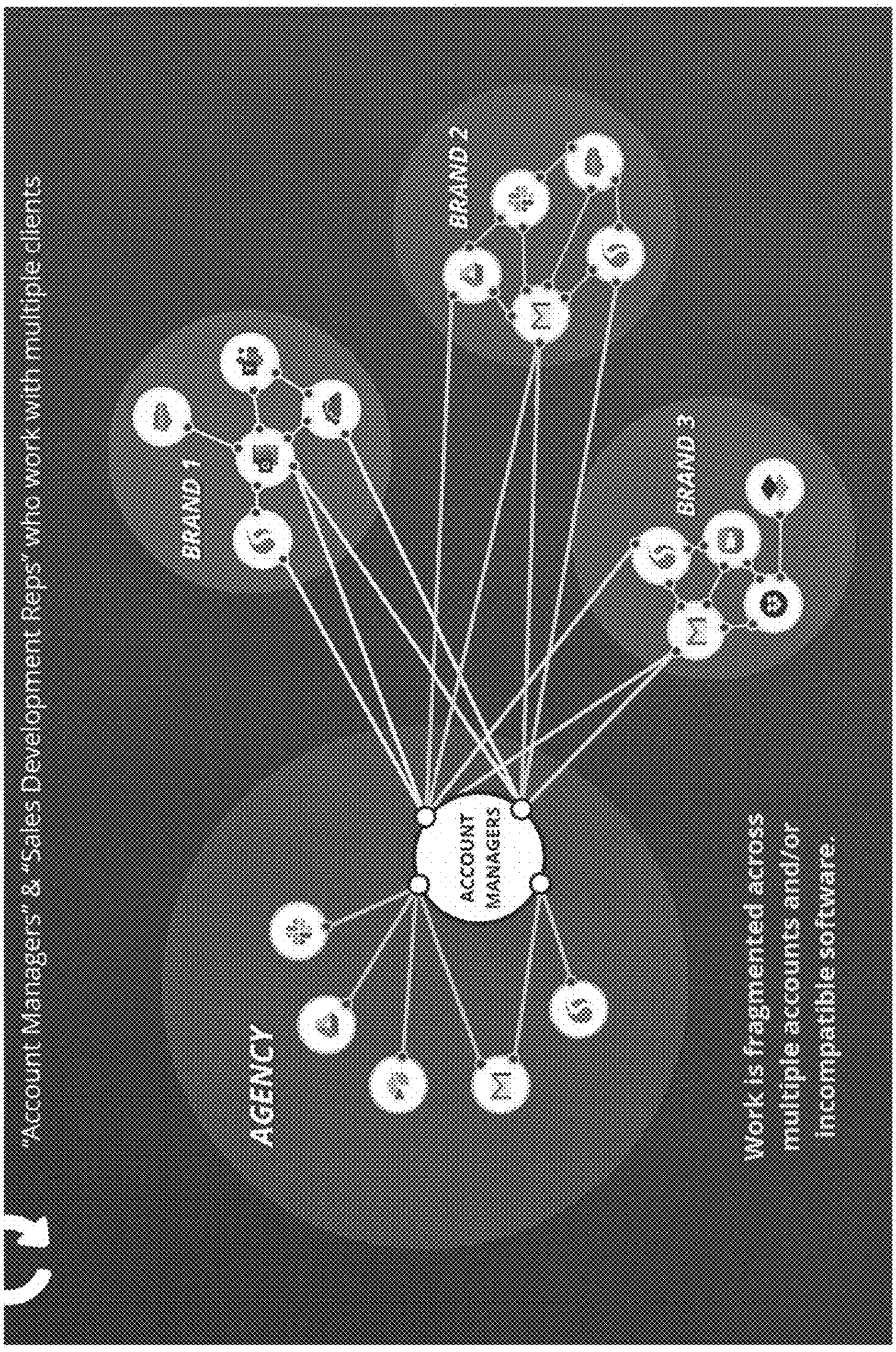

Knowledge workers that work with multiple clients experience this problem more acutely than others might as is shown in FIG. 24. As depicted, each account manager ultimately has to use his/her internal company tools, as well as interface with a variety of tools that their clients use. This results in more extreme fragmentation, makes it easy for information to get lost, and users end up experiencing communication and collaboration problems. It frequently manifests with workers using multiple browsers for different client accounts and an overwhelming number of tabs simultaneously open to try to keep track of their workflows as can be seen in FIG. 25A.

FIG. 25B illustrates an alternate approach that can serve as a solution to the above-described problems. Instead of requiring that user interaction with digital work be siloed by application or ecosystem, these figures describe how data that exists within each application can be restructured and displayed in ways that are more functional to the end user, and that are application agnostic. This alternate approach can be broadly described in two parts.

Figure 29:
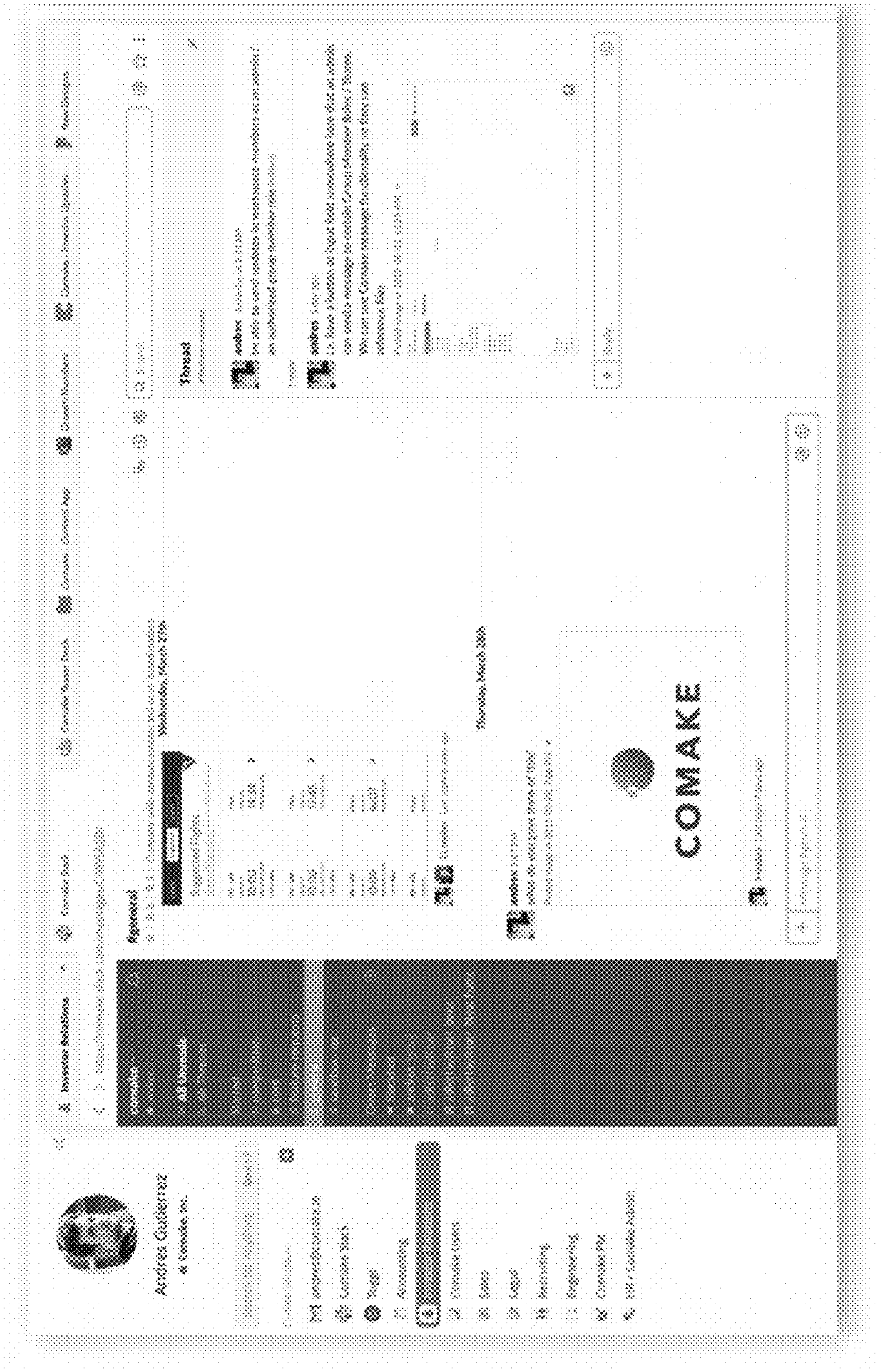
FIG. 29 illustrates a graphical user interface displayed by an electronic workflow management system, in accordance with an embodiment.

The first part is the consolidation of units of work across applications and their organization by the type of unit it is (e.g., files, messages, notes, contacts, and tasks) across all of user's work. In order to help a user to respond to and manage this fragmented communication, the alternate approach offers a solution that consolidates all of those communications in one message client rather than across applications (FIG. 29). Similarly, that user may desire to have all his/her email attachments, local files, cloud storage files, files attached in project management tools, etc. accessible through one file browser; all her contacts consolidated in one contact list; all her notes browsable through one interface; all her calendar events consolidated in one database and interface.

The methods and systems described herein will improve a user's ability to manage his or her workflow across tools, applications, websites, and accounts. Furthermore, consolidating all of this information provides the analytics engine with the opportunity to provide data enrichment and contextualization to the end user around their existing work, as described elsewhere in this patent.

One of the problems with employee directories and organizational charts at large organizations is that they quickly become outdated. This problem is exasperated if no employee(s) is dedicated to keeping the organization charts current and updated. Using the methods/system described herein, the analytics server is able to automatically analyze and consolidate multiple profiles and other employee information from several systems (internal and/or third party). The analytics server can also aggregate and present user profiles and organization charts in an easy-to-understand graphical user interface. Users are able to understand the relationships between people and other people, people and contexts (what projects, clients, and objectives colleagues have been involved), and people and Components of Work.

The analytics server is also able to utilize the systems/methods described herein to automatically identify and rank an employee's colleagues. For instance, the analytics server may use the methods/systems described herein to identify related nodes corresponding to user behavior, interactions, and communication. The analytics server may monitor and analyze files and/or workflow components interacted by each employee (e.g., accessed, edited, and/or deleted) to generate a de facto organization chart. For instance, the analytics server may analyze the number of shared, overlapping meetings, files, messages, tasks, and similar workflow components associated with each employee to generate and/or update the organization chart. The analytics server may also augment the above-described analytical protocols by insights gleaned from the consolidated activity, such as the employee's average response time to messages or other activity events from a given colleague.

With an overall understanding of all employees and their workflow, the analytics-server-implemented method begins to identify clusters of employees and types of relationships between people that a user can easily confirm or correct. For example, product teams that share a lot of content and messages can automatically be grouped into a cluster and suggested as a team. In another example, the analytics server may identify communication and/or file interaction patterns between an employee and his/her manager because they typically have a lot of shared content (e.g., information and/or files), frequent messages, and regular/standing meetings/checkups every week, and the like.

By having a consolidated understanding of employee activity across different systems/platform and having an understanding of the relationships between users, the analytics server is able to identify and flag a particular user who has communication pattern changes. For instance, the analytics server is able to recognize and ask for updated information if/when an employee changes teams or starts reporting to a different person within an organization.

The analytics server may automatically and periodically identify the above-described patterns and may automatically and periodically identify a change in the organization's hierarchy based on employees' behavioral patterns. Therefore, the analytics server may identify and revise the organization chart when an employee's role is changed, even if the employee's official title has not changed.

Figure 13A:
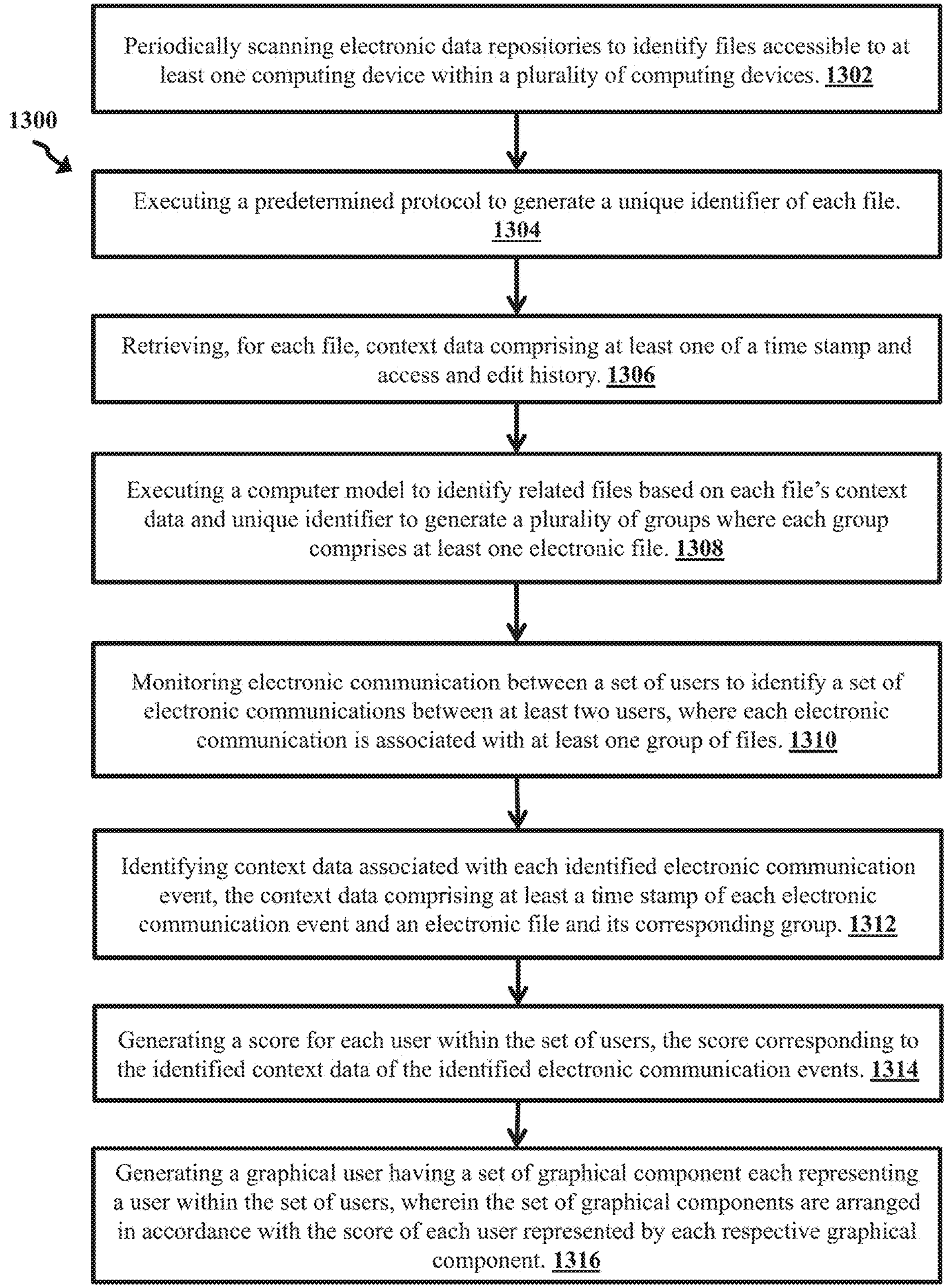
FIG. 13A is a flow diagram of a process executed in an electronic workflow management system, in accordance with an embodiment.

FIG. 13A illustrates a flow diagram of a process executed in an electronic workflow management system, in accordance with an embodiment. The method 1300 includes steps 1302-1314. However, other embodiments may include additional or alternative execution steps, or may omit one or more steps altogether. In some embodiments, the method 1300 may be executed on various other workflow components, such as tasks, messages, notification, and the like.

In addition, the method 1300 is described as being executed by a server, similar to the analytics server described throughout this disclosure. However, the described steps may be executed by any number of computing devices operating in the distributed computing system described in FIG. 1. For instance, part or all the steps described in FIG. 13A, may be locally performed by one or more user computing devices or an administrator-computing device. Furthermore, even though some aspects of the method 1300 is described in the context of a web-based application, in other configurations, the analytics server may display related data in a mobile application or an application native to the user's desktop.

At step 1302, the analytics server may periodically scan a plurality of electronic data repositories accessible to a plurality of computing devices to identify a plurality of files stored onto the plurality of electronic data repositories where each file is accessible to at least one computing device within the plurality of computing devices. As describe above, the analytics server may use various protocols to identify various files stored onto data repositories accessible (or accessed) by one or more computers within a network. Furthermore, as described above the analytics server may use various APIs, web books, and the like to identify the files accessible and/or accessed by the users within the network.

At step 1304, the analytics server may execute a predetermined protocol to generate at least one unique identifier of each file within the plurality of files. At step 1306, the analytics server retrieves for each file, context data comprising at least one of a time stamp and access/edit history. At step 1308, the analytics server executes a computer model to identify related files based on each file's context data and unique identifier to generate a plurality of groups where each group comprises at least one electronic file.

As described above, the analytics server may use one or more analytical protocols to identify related data. For instance, in some embodiments, the analytics server may use the unique identifier generation method (also referred to herein as the hard factors) to identify whether two files are related. Additionally or alternatively, the analytics server may execute various analytical protocols and/or artificial intelligence modeling techniques (also referred to herein as the soft factors) to identify whether one or more files are related. In some configurations, the analytics server may use a combination of the hard and soft factors to identify related files and workflow components.

As described above, analytics may generate and periodically update a nodal data structure where each node represents a unit of workflow, such as a file, message, a user, or any other content related to workflow. The nodal data structure may include interrelated nodes that are identified as related, using methods and systems described herein.

The analytics server may also generate various groups/clusters of nodes where each node within a group/cluster is related to other nodes. For instance, a group of nodes may correspond to nodes associated with a project or a client. The analytics server may group nodes based on various attributes. Therefore, a group of nodes may represent any group of nodes that correspond to workflow components that share at least one attribute.

At step 1310, the analytics server monitors electronic communication between a set of users to identify a set of electronic communications between at least two users, where each electronic communication is associated with at least one group of files. The analytics server may monitor all electronic communication between users where they electronic communication involves at least one node within at least one group. Electronic communications may involve any identifiable communication using organization servers and/or the analytics server.

At step 1312, the analytics server identifies context data associated with each identified electronic communication event, the context data comprising at least a time stamp of each electronic communication event and an electronic file and its corresponding group. The analytics server may monitor timestamps associated with each communication event. For instance, the analytics server may monitor a "response time" associated with each communication event. The response time may correspond to a time period between when an electronic message was received (or seen) and when a response was sent back.

The analytics server may consider other data associated with the users/nodes to identify relationships among users. Things considered by the analytics server may include number of shared files, messages, tasks, calendar events, and the like within two users within a predetermined time. In another example, the analytics server may consider activity events across software tools. For instance, the analytics server may consider the type of activity events (e.g., view or edit). If events are one sided, it could inform type and direction of relationship (e.g., someone is always assigning tasks to someone else)—it could also inform who else reports to the same manager and therefore can create 'sibling' relationships between people. In another example, if one user always edits the other users work product, defense may indicate that the editing user may have a higher score within the employee organization chart. In some embodiments, deviations in patterns/relationships can come from changes not between two people, but changes between a group. Where if a manager stops assigning tasks to one user in the "family," the whole family might need to be re-evaluated.

The analytics server may also consider data retrieved from third party tools in order to generate relationships between users. For instance, the analytics server may initially retrieve relationships from an existing organizational chart from an internal and/or external HR system.

The analytics may also consider information and manual inputs from users. For instance, the analytics server may retrieve labels manually entered by different users (e.g., on their social media or other websites) and/or confirmation/rejection of previous recommendations. If the analytics server identifies a possibly new relationship, the analytics server may prompt the user to enter the user's relationship with one or more other users within an organization. The analytics server may retrieve roles, titles, job description, and other relevant information as indicators of a user's position within an organizational chart.

The analytics server may also consider Contexts/smart windows that may be centered on teams and that have information relating to team dynamics in them. As will be described below, the electronic platform provided by the analytics server may include various contexts specific windows that are customized based upon users and/or projects. The analytics server may use data customized by each user to identify relationships among users. For instance, if a user generates smart windows for other users, the analytics server may assume that the user who has generated the smart windows is a manager of the other users.

The context data may also refer to the language used within the electronic communication. For instance, the analytics server may use various natural language processing protocols to identify sentiment associated with each electronic medication. Sentiment, as used herein, may include tone of the electronic communication event. For instance, the analytics server may execute a sentiment analysis protocol that uses artificial intelligence and/or machine learning to identify sentiment of electronic communications between two users based on the vocabulary used in those electronic communication sessions. Understanding the sentiment of an electronic communication session may allow the analytics server to identify a relationship between the users.

At step 1314, the analytics server may generate a score for each user within the set of users, the score corresponding to the identified context data of the identified electronic communication events. The analytics server may generate a score for each user based on predetermined rules. The score may correspond to an importance level, a hierarchical relationship, or otherwise labeled/classified relationship (e.g., client <> consultant, friends, secret lovers, etc.) between the users. For instance, in some configurations, the score may correspond to a response time between two users. Additionally or alternatively, the score may also correspond to the identified sentiment value.

In a non-limiting example, the analytics server monitors employee A and his electronic correspondence with other employees. The analytics server identifies that employee A predominantly receives electronic communications (e.g., emails) from employee B, C, and D. The analytics server identifies that employee A's response time to employee C is 4 minutes. In contrast, employee A's response time to employee B and D is 18 minutes. Similarly, the analytics server identifies that employee A's communications with employee B and D correspond to a much friendlier sentiment than his communications with employee C. Using the above described information, the analytics server may generate a higher score for employee C than employee B or D. Using the above described information, the analytics server may conclude that employee A may report to employee C. Therefore, employee C may be higher in an organization chart than employee A, B, or D.

Figure 13B:
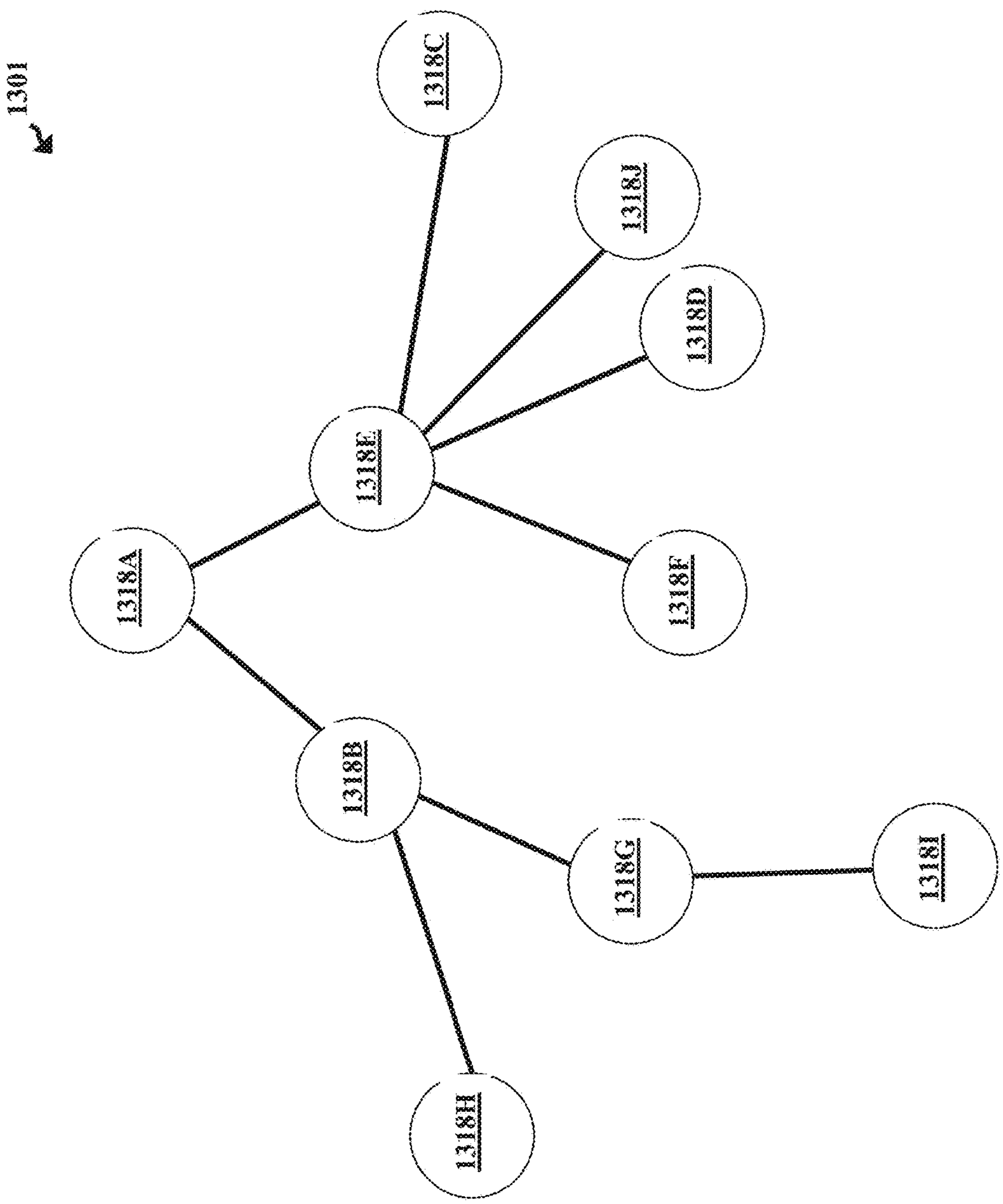
FIG. 13B illustrates a nodal data structural corresponding to an organization's hierarchy, in accordance with an embodiment.

In some embodiments, the analytics server may generate a second nodal data structure comprising a set of nodes where each node corresponds to an employee and their respective score. The analytics server may then arrange the nodal data structure according to each employee's score. In a non-limiting example, as depicted in FIG. 13B, the analytics server may arrange different employees based on their score. The depicted nodal data structure 1301 may correspond to a hierarchy among the depicted employee 1318A-J. For instance, employee 1318A has a higher score than all other employees. Similarly, employees 1318B and 1318E have higher scores than employees 1318C-D and 1318F-J.

Using the methods/systems described herein, the analytics server can also establish patterns in the relationships between two given employees and recognize any potential changes in the interaction patterns, regardless of how unique the relationship between two individuals might be. The analytics server may generate insightful graphs representing an organization, including but not limited to, generating and/or automatically maintaining a de facto organizational chart. For instance, employee A may be a manager of employee B. The employees AB usually meet at 8 am on Monday. The two employees are have a lot of regular communication, overlapping calendar events, files, etc. However, employee B then changes projects and therefore his/her manager might change.

In another example, employee A may be officially designated to be reporting to employee B. However, based on their communications (e.g., how fast employee A responds to employee B and other employees), shared projects, and working on different files that are related, the analytics server may identify that employee A reports to employee C instead. The analytics server may continuously/periodically revise the dynamic organizational chart as more relationships are identified or new employee relationships are created (e.g., employee A is now assigned to a new team overseen by employee D). The analytics server may also provide searching capabilities to efficiently search for employees/resources based on this dynamic chart.

Conventionally, manual revisions of the organization chart is required. However, if an administrator has not updated the organization chart, the analytics server (or anyone else within the organization) will be notified on this change. The analytics server can automatically identify that employee B and employee A's relationship has changed: both got access to different files and content, started working in different folders, no longer have regular meetings, there is fewer communication event, and the like. The analytics server may then prompt each user (or a system administrator) to update the information and even begin to suggest whom the new manager-employee relationship might be. The analytics server will continuously revise the dynamic organizational chart as more relationships are identified or new employee relationships are created (e.g., employee A is now assigned to a new team overseen by employee D).

At step 1380, the analytics server may generate a graphical user interface having a set of graphical component each representing a user within the set of users, wherein the set of graphical components are arranged in accordance relationship between each user represented by each respective graphical component.

The analytics server may generate a graphical user interface that displays a hierarchy of the employees within an organization. The analytics server may use the nodal data structure 1301 to arrange the employees in accordance with its identified hierarchy.

Figure 13C:
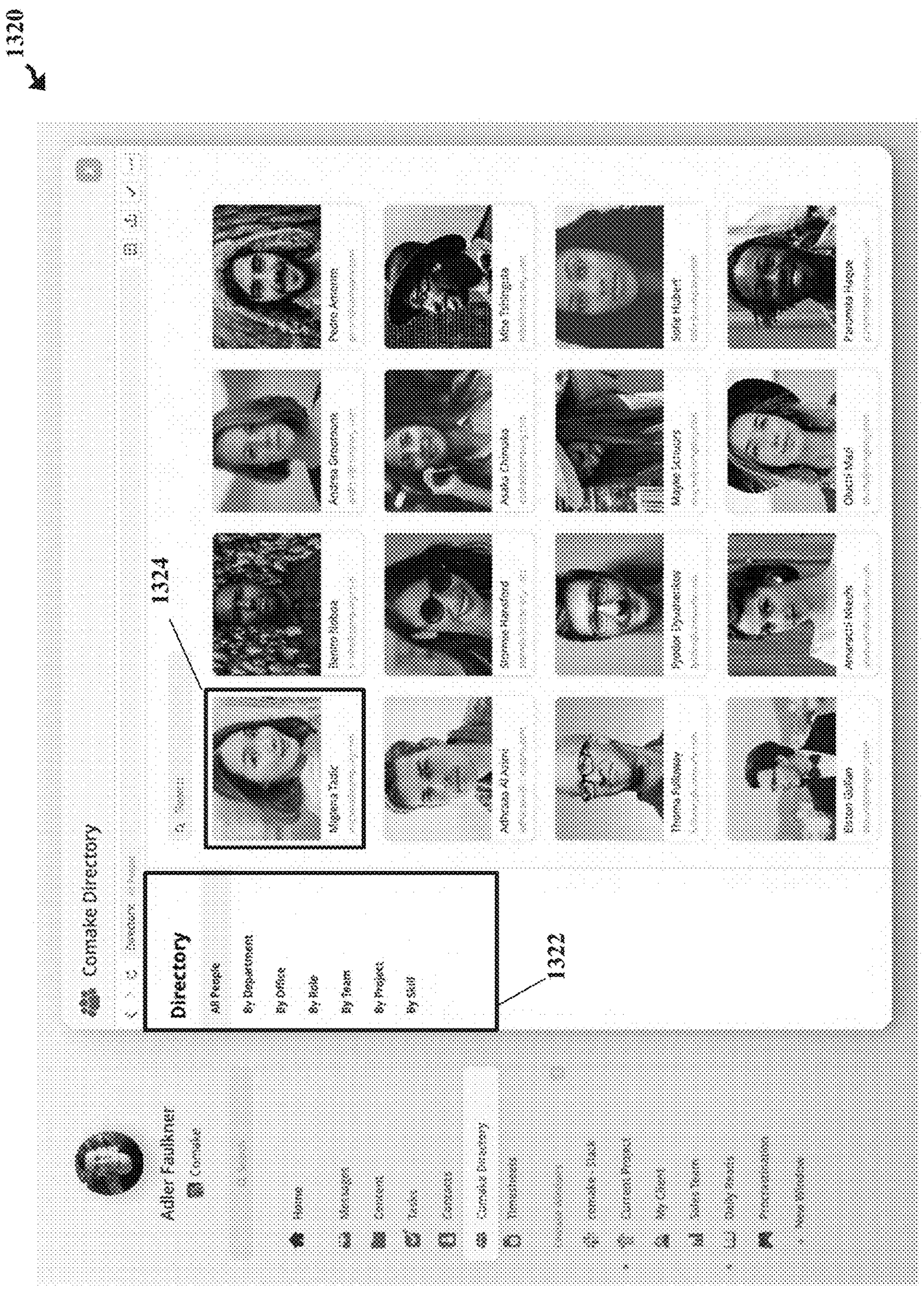
FIGS. 13C-D illustrate graphical user interfaces displaying an organization's hierarchy, in accordance with an embodiment.

Referring now to FIG. 13C, a non-limiting example of a graphical user interface illustrating an organizational hierarchy is shown, in accordance with an embodiment. GUI 1320 includes a list of all employees and their corresponding image and contact information. A user interacting with the GUI 1320 may filter the employees based on various provided filters, depicted in the graphical element 1322. For instance, the user may arrange the employees by department, office, role, team, project, and/or skill. When prompted by the user to rearrange the employees based on an attribute, the analytics server may identify a relationship among users' nodes within the nodal data structure (based on various analytical protocols described herein) and may arrange the visualization of employees accordingly.

Figure 13D:
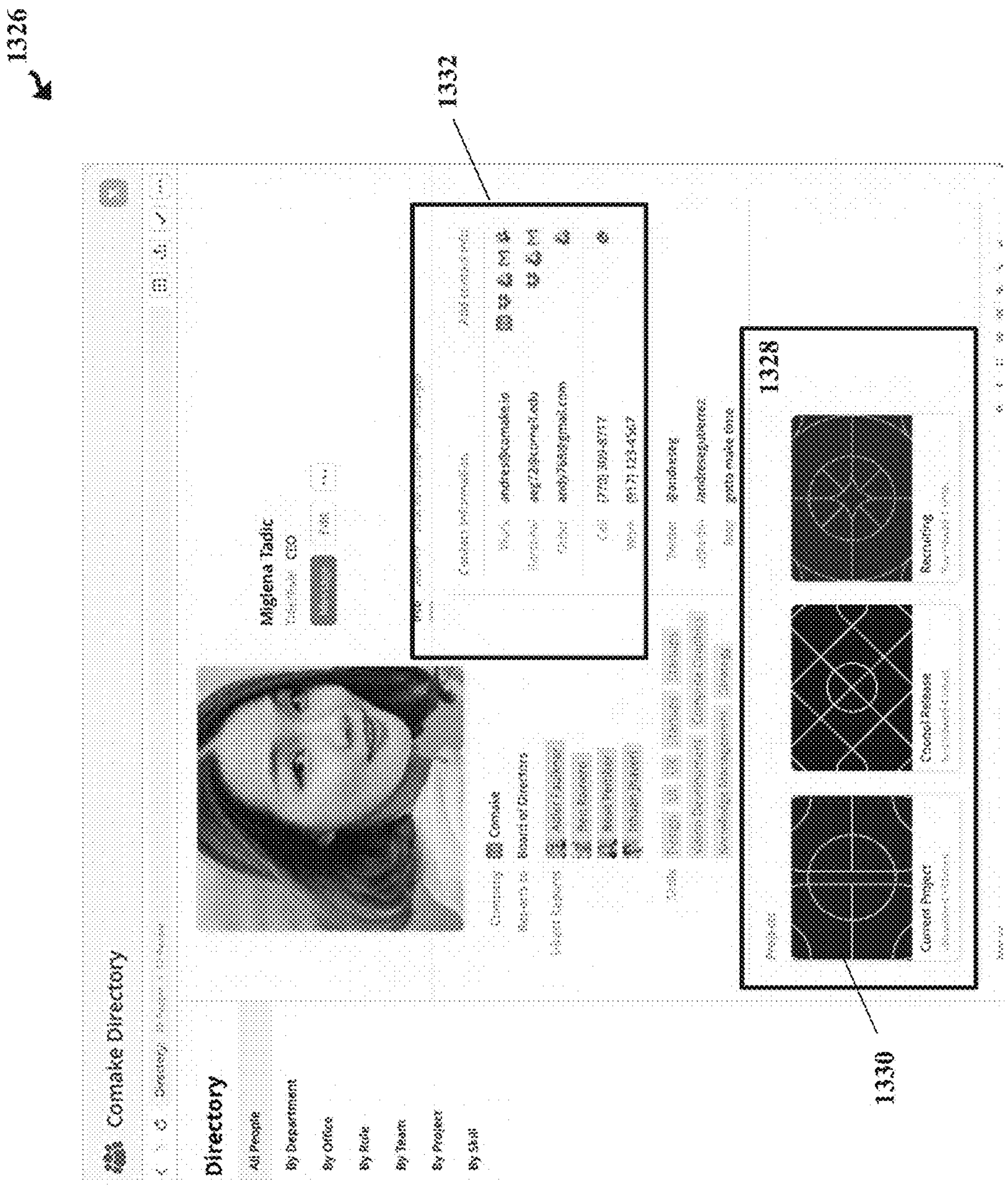

When a user interacting with the GUI 1320 interacts with an employee displayed on the GUI 1320, the analytics server may display detailed data regarding that employee. For instance, when a user interacts with the graphical component 1324, the analytics server directs the user to GUI 1326 (FIG. 13D) where more detailed data associated with the selected employee is displayed. GUI 1326 may include graphical components 1328 where the analytics server may display various results of the analytical protocols described herein. For instance, when a user interacts with the graphical element 1330, the analytics server may identify nodes related Miglena Tadic (using the nodal data structure) and may direct the user to any related project/workflow. The analytics server may display data associated with nodes related to a node that corresponds to Miglena.

The analytics server may automatically generate profiles for each users/colleagues/collaborators by consolidating profile information from any integrated third party tools. For example, the depicted user may have various third party software tools that are depicted in the graphical component 1332. The analytics server may consolidate information from all of these tools around a profile that is automatically generated and updated.

The analytics server may display a logo for a variety of third party services used by each employee, contact, or colleague. Therefore, either the user viewing the GUI 1326, Miglena Tadic, and/or a third party have connected/integrated the illustrated accounts and that the analytics server has identified shared content between an email that the viewer has confirmed/verified as his/her and an email that has been recognized (using the methods and systems described herein) as being related to Miglena Tadic. As depicted, the analytics server may also display other employees to whom Miglena reports.

The analytics server may use the method 1300 to generate and maintain organizational charts for human resources; to document project teams; to provide other human capital analytics/classifiers (early bird, late owl, social connector, and flag communication breakdowns), and the like. Even though, embodiments describing the method 1300 focus on a specific use of this process around people and organizational charts, the underlying principles are very similar regardless of whether the method 1300 is applied to files, employees, or any other workflow component (e.g., tasks). For example, the method 1300 can be applied to other workflow components and/or files to identify a hierarchy between the workflow components and/or files.

Using the method 1300, the analytics server can also classify or recommend classification types between the relationships. For example, the analytics server can analyze known relationships between two files (e.g., shared email message, shared email thread, shared task, similar file contents, and/or files with similar activity by a user) and infer/recommend relationships that may be more useful to users (e.g., versions of each other, one is a derivate of the other, and/or related to a particular deal or project). As stated throughout, the method 1300 may also be applicable to any other workflow component, such as nodes corresponding to people and their contact.

In other related embodiments, the analytics server may identify and rank employee contacts as well. Employees' contacts typically fall out of date and lack contextual information. Employee directories require dedicated people to maintain, and even then, they fall out of date. Organizational charts require dedicated people to maintain, and even then, they fall out of date. Employees usually struggle to quickly receive and respond to the most important contact updates (e.g., information, updates and action items) they receive across the many tools and accounts they work with. The analytics server can rank different contacts.

The analytics server can retrieve a list of email addresses associated with the users. Each email address may have a list of related integrations (on which it has permissions); consolidated list of activity events from the email address' related integrations; consolidated list of files the email address' integrations have permissions on; consolidated list of messages the email address' integrations have permissions on; and consolidated list of tasks the email address' integrations have permissions on.

The analytics server can also retrieve and display a list of users where each user has a list of related integrations (e.g., applications and/or workflow components on which he/she has permissions), consolidated list of activity events from the user's related integrations and from the user, consolidated list of files the user's integrations have permissions on, consolidated list of messages the user's integrations have permissions on, and consolidated list of tasks that have been have been created by or assigned to the user's integrations. The analytics server can retrieve and display a list of contacts associated with each user. Each retrieved contact may have a list of related email addresses, and through those integrations, the analytics server may identify new connections.

The analytics server may also consolidate profile information from the contact's related integrations. This is sometimes referred to as deduping (or de-duplicating) nodes. For instance, the analytics server may de-duplicate files with similar MD5 identifies and merge their respective metadata from different sources. The analytics server may then execute various analytical protocols described herein to establish relationships between users and label those relationships.

The analytics server may also use various profile data to integrate and identify relationships among users. For instance, each user profile may have special fields, such as person to person relationships (e.g., Slack profiles can have the following fields: mentor (user), birthday (date), title (string), etc. and a different company can have different fields), consolidated list of activity events from the contact's related integrations, consolidated list of files the contact's integrations have permissions on (e.g., the files, messages, etc. need to be able to be accessed by the logins/integrations of both the 1st person user and that user's contact), consolidated list of messages the contact's integrations have permissions on, and consolidated list of tasks the contact's integrations have permissions on. Each contact can also have other related components of work, including files, messages, tasks, notes, etc. that can be established in much the same way as relationships and labels between files are established. Similarly, contacts are able to have relationships with other contacts and/or users.

The analytics server may allow users to share accounts for given integrations (e.g., multiple people can access a central email such as info@company.com). In this embodiment, not all activity from shared integrations may pollute the activity timelines for contacts that have access to a shared account/integration. In other words, contact's profile does not show all activity from shared integrations, but it can show activity that is identified as originated from user within shared integrations.

Using the methods and systems described herein, the analytics server can create a relative score between a user and all of his/her contacts (e.g., create a measure of relative distance between a user and contact). Analytics server may provide a list, which allows users to focus information around the people/contacts that matter most to them. The analytics server may establish labels between users (e.g., manager and manage and/or a user and a contact). Using the methods and systems described herein, analytics server may identify when an organizational chart needs to be updated.

The analytics server may send a notification to multiple users to suggest/recommend relationships and labels for the relationships (e.g., manager, mentor, client, etc.) between different employees and/or employees and their contacts. For instance, if the analytics server identifies that users A and B have high scores in relation to user C, the analytics server may recommend contacting user B when user C is contacting user A. In a non-limiting example, when user C is drafting an email to user B, the analytics server displays a prompt on user C's computer that recommends drafting a similar email to user A or including user A in the email as a recipient.

The relationships generated by the analytics server are dynamic and the analytics server may revise them based on monitored user activity and behavior. For instance, a change in a user's activity may indicate that a label (or lack of label) may have changed between a user and contact (or a cluster of contacts). The analytics server may revise these relationship (e.g., relative score) based on monitored user behavior of the user, related users, and/or the contacts.

The analytics server may also augment suggesting relationships by identifying a behavior pattern of the contact, such as the contact's department, related teams, and related projects. The analytics server may also recommend when users/contacts are working (e.g., early bird, late owl, and prefers slack to email) or add labels to contacts to improve collaboration.

Using the methods and systems described herein, the analytics server may use communication and activity patterns to also identify a relationship between two users/employees. The relationships may not be limited to identifying organizational hierarchy. For instance, the analytics server may also identify social relationships among employees. The analytics server may create paradigms of relationships that it can try to match between users, such as manager-employee, close friends, social conflict, etc. This can be used to improve operational performance, staffing, organizational transparency and lateral communication, etc.

The analytics server may also provide searching capabilities to efficiently search for employees/resources based on the dynamic organizational chart. Using the nodal data structure representing the organizational chart, the analytics server may receive a query (e.g., "show me employees who work on project X") and traverse the nodal data structure accordingly to identify related nodes. For instance, even if employee A has not been officially designated as working on project X, the analytics server may identify employee A as a possibly working on project X using the methods and systems described herein.

Conventionally, information shown in project profiles may not typically exist in one place. As a result, information associated with a particular project may not be easily accessible to employees. The analytics server utilizes the nodal data structure (e.g., disclosed system of pointers that is building/presenting known and suggested relationships between components/nodes of information that reside within different (sometimes third party tools) to identify a project associated with an employee's worked hours. End users are able to navigate their activity timelines and see relevant activity events automatically correlated with different suggested projects. Ultimately, as users accept or submit their timesheets, they are increasing the analytics server's confidence that a given activity event and therefore related component of work may be related to a given project. This helps the analytics server populate project profiles with relevant information. As described and depicted in FIGS. 14-15A-D, the analytics server may utilize the methods and systems described herein (e.g., nodal data structure) to automatically recommend certain projects or clients for blocks of time depending on the underlying relationships between files/components of work, and certain projects.

The method 1400 uses the relationship-building methods described herein to augment time entry applications. For instance, the analytics server can use related files and users (e.g., how other users working on a related file have documented their time spent on a project) to recommend a best option for time worked by users. In a non-limiting example, analytics server can recommend how much time a user should bill to a project. The analytics server can also consolidate user timelines and time spent on different projects. By consolidating the data, analytics server can also allow structured and unstructured searching (e.g., e-discovery). For instance, when instructed, the analytics server may retrieve all times billed to a particular project and identify corresponding nodes within the nodal data structure. As a result, the analytics server may retrieve all relevant files to a project (e.g., all files accessed by employees while working on a project).

Using the method 1400, the analytics server can provide time tracking suggestions that attribute (or suggest) a user consolidated timeline of activity events to a particular project.

The analytics server may retrieve data from the existing graph (e.g., nodal data structure) and relationship recommendations to suggest what events are related to which projects. The analytics server may also use other users/employees activities to identify a related project. For instance, if multiple users are related to the same activity or event (e.g., email sent/received, and calendar event) and one user classifies his/her time as related to one project, the analytics server may conclude with a certain level of confidence that other users (working on related material) were also working on that particular project during the same time. Using this method, the analytics server may improve the recommendation for what project that time slot is associated with for the second user. This method may use information from third party time tracking tools to help increase/decrease the relative recommendation score between activity events and their related files, messages, tasks, etc. to projects.

The analytics server may also provide users the option to classify certain times and groups of activity/events as different projects and/or increase/decrease the relative recommendation score between the underlying information to the respective projects. The analytics server's recommendations may improve depending on a number of users who have mapped (e.g., classified) different events. For instance, when a predetermined number of users map the same event as related to a project, the analytics server can identify that the event and the project are related with a high degree of confidence. Therefore, the analytics server's recommendation improves with each mapping of events inputted by each user.

Figure 14:
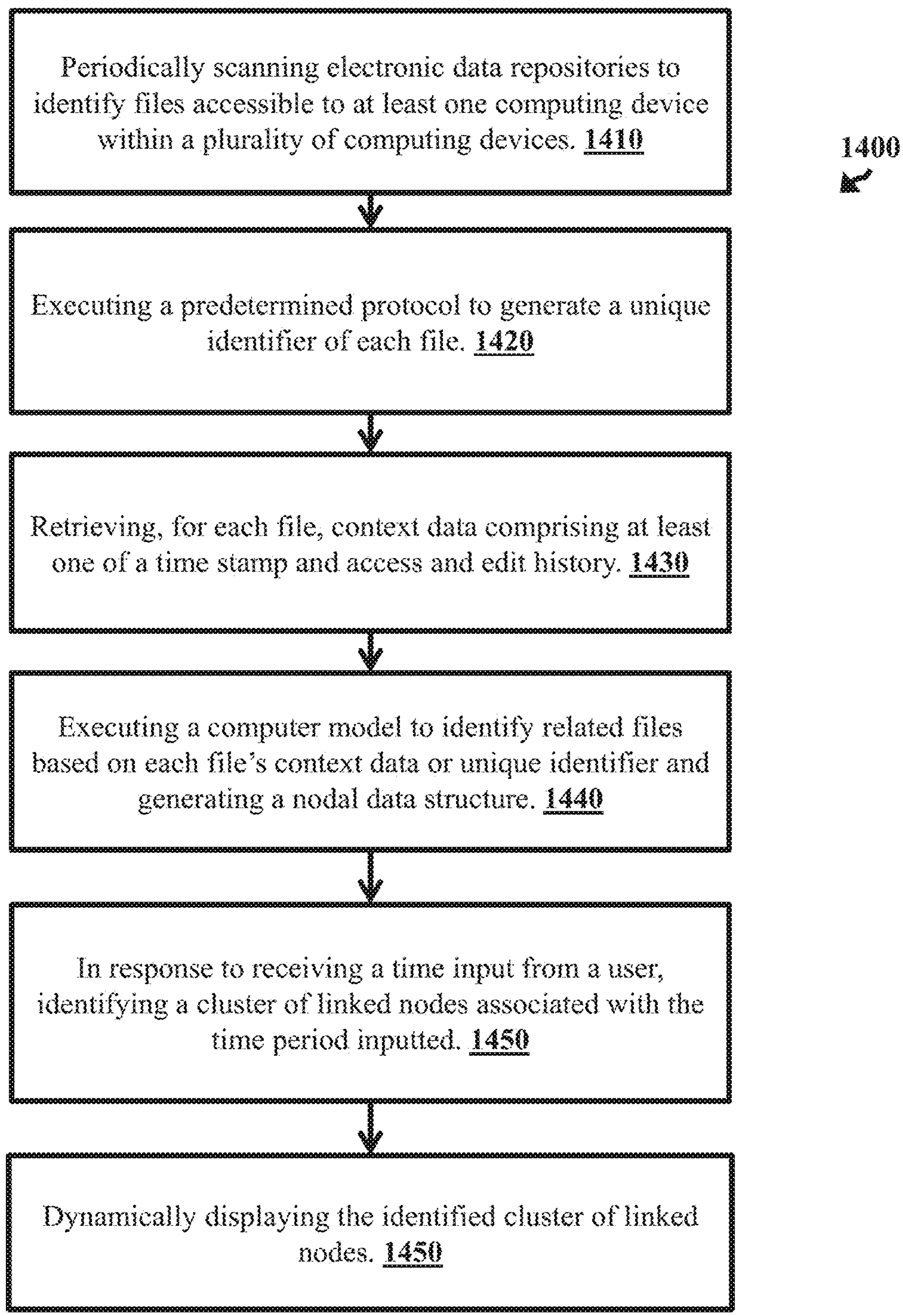
FIG. 14 is a flow diagram of a process executed in an electronic workflow management system, in accordance with an embodiment.

FIG. 14 illustrates operational steps for identifying a time period associated with one or more electronic files. At step 1410, the analytics server may periodically scan a plurality of electronic data repositories accessible to a plurality of computing devices to identify a plurality of files stored onto the plurality of electronic data repositories where each file is accessible to at least one computing device within the plurality of computing devices. At step 1420, the analytics server may execute a predetermined protocol to generate at least one unique identifier of each file within the plurality of files. At step 1430, the analytics server may retrieve, for each file, context data comprising at least one of a time stamp and access/edit history. At step 1440, the analytics server may execute a computer model to identify related files based on each file's context data and unique identifier to generate a plurality of groups where each group comprises at least one electronic file.

At step 1450, the analytics server may, in response to receiving a time input from a user, identify a group associated with the user during the time period inputted. The analytics server may receive a request from a user device to identify a group associated with an inputted time. In a non-limiting example, a user may select a timeframe representing a time period of work hours. For instance, the user may access an electronic time entry form/software tool and may select a time. As described herein, the analytics server may periodically scan (or use other software tools described herein) to identify files/workflow components accessible and/or accessed by each user within a network. The analytics server may then generate a nodal data structure and identify interrelated nodes using the methods/systems used herein.

As described herein, the analytics server may use various analytical protocols to identify and link related nodes. Therefore, the analytics server may generate clusters/groups of nodes within the nodal data structure. The analytics server may cluster nodes based on one or more attributes. For instance, each cluster of nodes may represent a project defined by a system administrator.

After receiving a request from a user along with an identified time period, the analytics server may first identify components of work accessed by the user operating the user device within the selected/inputted time. For instance, if the user indicates that the user is interested in a time window corresponding to 3-5 PM on Wednesday, June 23, the analytics server may first identify all user activity (e.g., files accessed, messages sent, workflow components revised, and any other activity implemented on the user device or otherwise associated with the user even if performed from a different user device) within the inputted time.

The analytics server may then identify nodes within the nodal data structure that correspond to the user's activity within the identified time window. For instance, if a user has access to file A during the selected time, the analytics server may identify file A and may identify a corresponding cluster of linked nodes to which file A belongs. In essence, the analytics server may identify a project that corresponds to the identified nodes, which will likely identify a project associated with the inputted time. For instance, the analytics server may identify (using metadata associated with the related nodes) a project name that all the related nodes have in common. As a result, the analytics server may conclude that the related nodes correspond to a particular project. As a result, the analytics server concludes that the user's activity during the identify time window is related to the identify project.

Figure 15A:
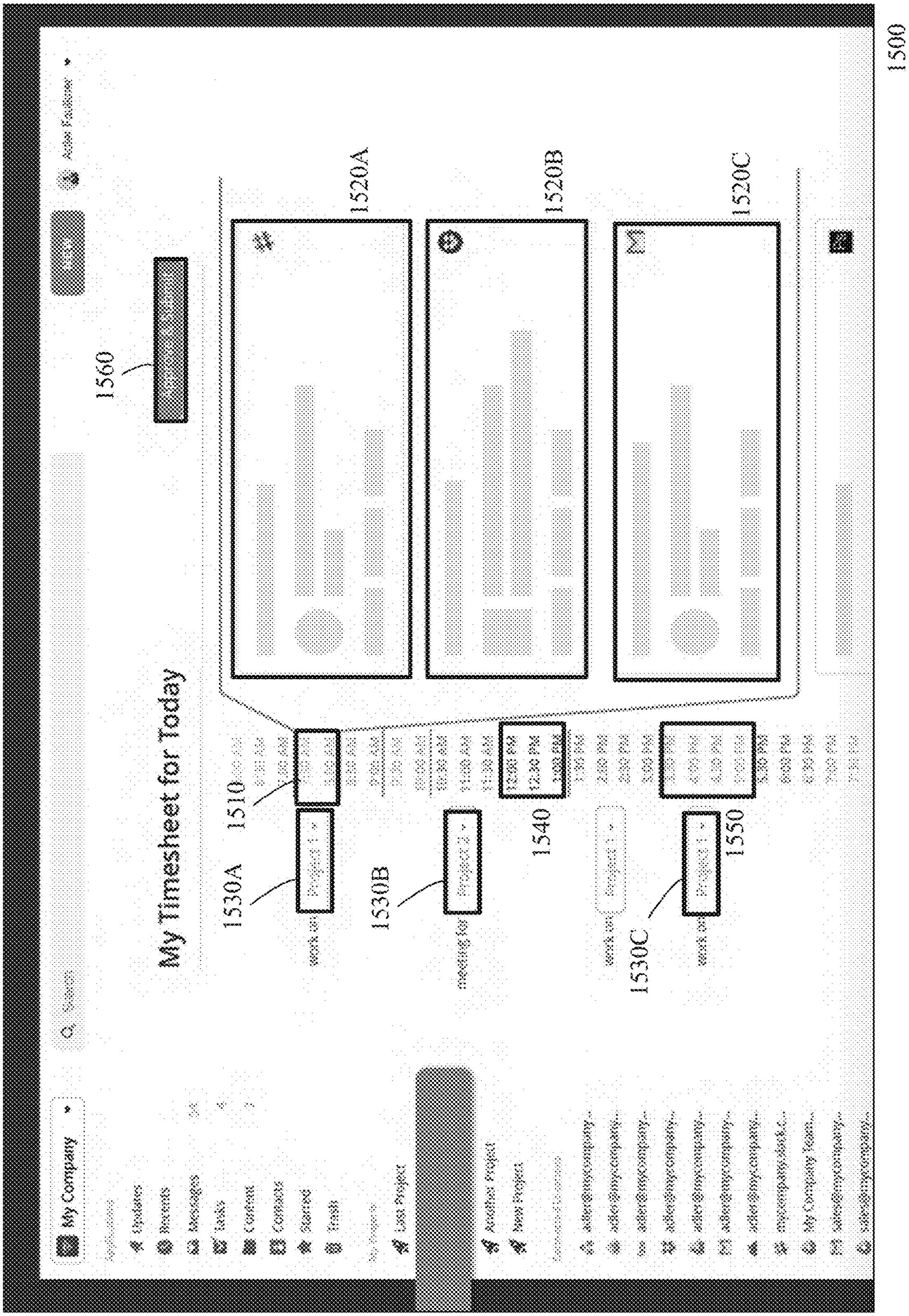
FIGS. 15A-D illustrate graphical user interfaces displaying an enhanced timesheet application, in accordance with an embodiment.
Figure 15B:
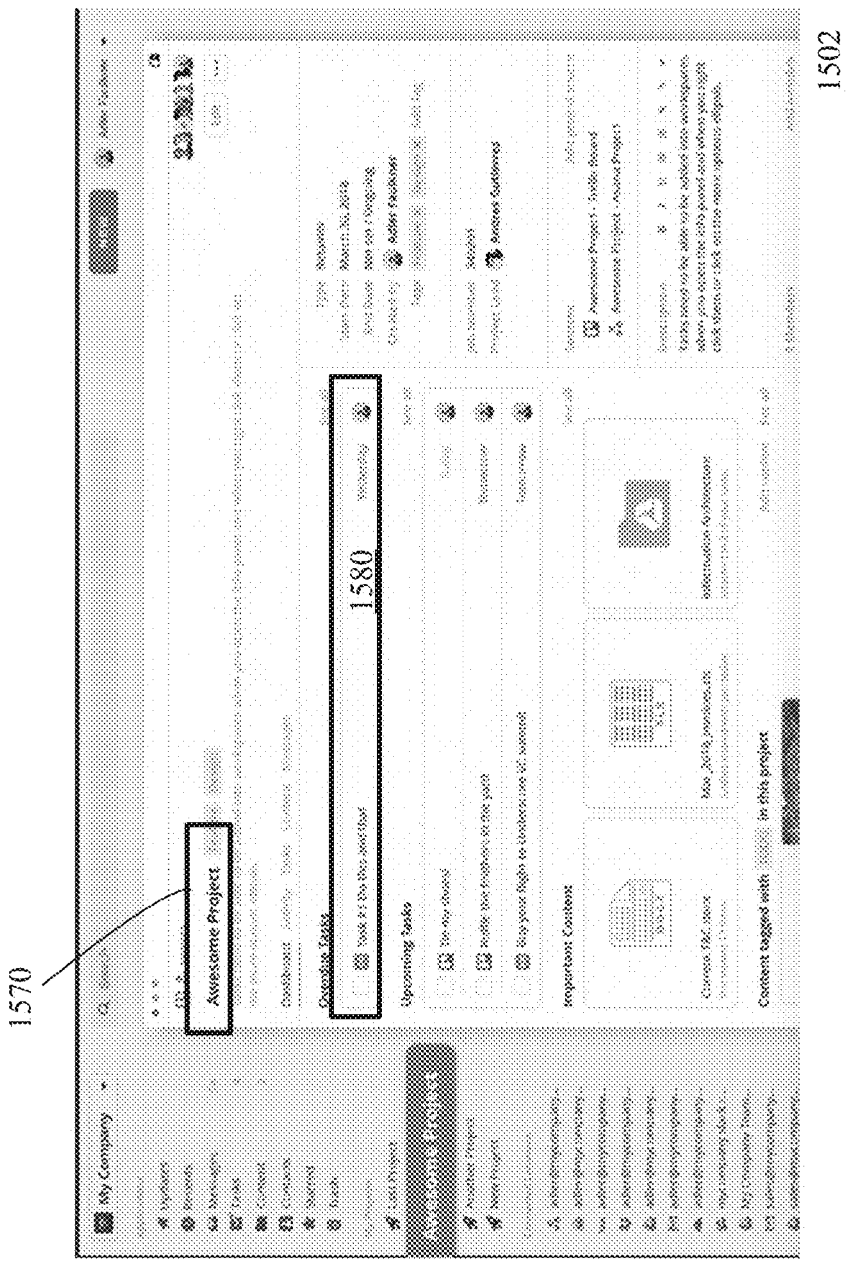

At step 1410, the analytics server may dynamically display the identified linked clusters. The analytics server may display an indicator associated with the identified project (e.g., length clusters of nodes). FIG. 15A is a non-limiting example of the indicators displayed by the analytics server. As depicted in GUI 1500, a user may select various time periods. For instance, the user selects time windows 1510, 1540, and 1550. The analytics server first identifies the user's activities during the identified time windows. The analytics server may also identify a cluster of linked nodes that include the identified nodes accessed by the user within the time windows. For instance, the analytics server displays indications of what files were accessed in the graphical elements 1520A-C (corresponding to time windows 1510, 1540, and 1550 respectively). Using the methods/system described herein, the analytics server identifies corresponding projects worked by the user in the corresponding time window.

The analytics server may also display an indication of a suggested project via graphical elements 1530A/C. For instance, graphical element 1530A indicates that (based on the user's activity in that time), the user was working on project 1. Graphical indicator 1530B suggests that the user worked on project 2 from 10:30 AM to 1:00 PM.

The suggested projects and/or time windows may include visually distinct elements. The visually distinct elements (e.g., different colors) may correspond to a degree of certainty associated with the suggested project. For instance, if the analytics server determines that a time window is associated with a project with a high degree of certainty, the analytics server may display the time window and/or the project name using green colors. Similarly, the analytics server may use red coloring for the time window 1540 because the analytics server identifies project 2 with a low degree of certainty.

To achieve the above-described visual distinction, the analytics server may generate a likelihood that the identified cluster is associated with a particular time window. The likelihood may correspond to a number of nodes accessed by the user within the time window that are also associated with a particular project. For instance, if a user accesses 10 files that are all associated with a project within a time window, the analytics server assigns a higher likelihood that the time window should be attributed to that particular project than another user who accesses one file that is associated with that particular project.

In some embodiments, the analytics server may identify the cluster of nodes associated with a first user's work hours based on projects worked on by other users. For instance, as described above, the analytics server may generate an organizational chart for an organization. If the analytics server identifies that multiple coworkers have attributed their work time (that corresponds to a particular node) to project A, the analytics server may suggest project A for all users who have accessed same, similar, and/or related nodes. In this way, the analytics server may predict a project based on a user's coworkers who are working on the same project or have similar job descriptions and responsibilities.

The analytics server may also provide users with the option of approving and submitting the suggested projects. The user may, upon selecting the correct suggested project, approve and submit the timesheet. If approved, the analytics server may use the user's approval to revise the nodal data structure accordingly. For instance, if the user approves that the content displayed in the graphical element 1520A are indeed related to project 1, the analytics server revises the nodal data structure, such that nodes corresponding to the content displayed in the graphical element 1520A are connected to nodes corresponding to project 1.

In some configurations, the analytics server may use the revised nodal data structure to display related information when displaying data associated with a project. As depicted in GUI 1502, when the analytics server displays information related to the project 1570, the analytics server may display tasks (and a corresponding time) performed by the user.

Figure 15C:
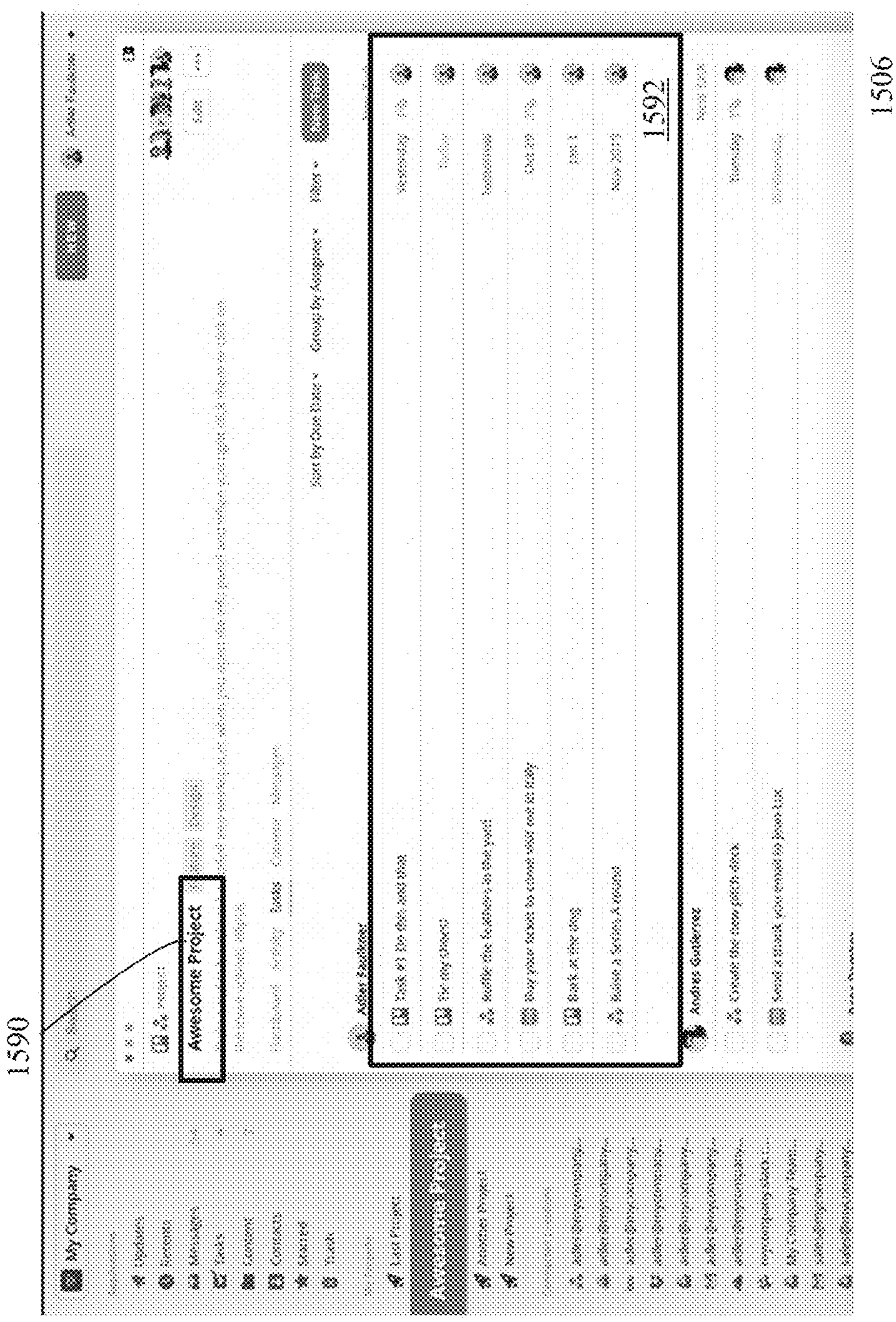

In some configurations, the analytics server may allow a user to designate a project when creating new tasks or other workflow components. The analytics server may use the designated task to identify a project when prompted. As depicted in FIG. 15C (GUI 1504), a user may generate various tasks displayed in the graphical component 1592 and may designate the tasks to the project 1590. When prompted (e.g., when the user accomplishes the tasks and requests the analytics server to identify a corresponding project), the analytics server uses this designation to suggest the project 1590.

Figure 15D:

In some configurations, the analytics server may use the methods/systems described herein to provide metrics associated with each project. As depicted in FIG. 15D (GUI 1506).

The analytics server may also use associated time entered by users/employees to revise the nodal data structure. For instance, when a user submits his/her timesheets (even if the user is using third party, not generated by the analytics server, software or systems to log time, and so long as the analytics server can integrate with/ingest the data), the analytics server may revise the nodal data structure accordingly by building relationships between the nodes corresponding to related activity events, files, emails, and/or tasks and a given project/client. In an example, when a user identifies his/her worked time period as associated with a project, the analytics server may identify a cluster of nodes associated with the user, which the user has interacted with during that particular time period, and associate the nodes within the identified cluster with one or more nodes of the project. That is, the analytics server may revise the nodal data structure and the relative scores and labels between nodes in accordance with the project associations identified by users. The analytics server may also link nodes corresponding to different employees based on their identified projects. For instance, the analytics server may link nodes associated with employees who are working on the same and/or related projects.

The methods/systems described herein can be used to generate user behavior patterns. For instance, the analytics server may continuously/periodically monitor how a user accesses various files, tasks, and other workflow components. Consequently, the analytics server may generate a model that represents the patterns of behavior associated with each user. The analytics server may use the generated behavior model to predict whether a user's account or device has been compromised, as well as flag potentially dangerous intentional actions by the user. The methods/systems described herein can be utilized to generate news alerts, customized for users based on each user's unique working patterns and relationships to other users.

Figure 16A:
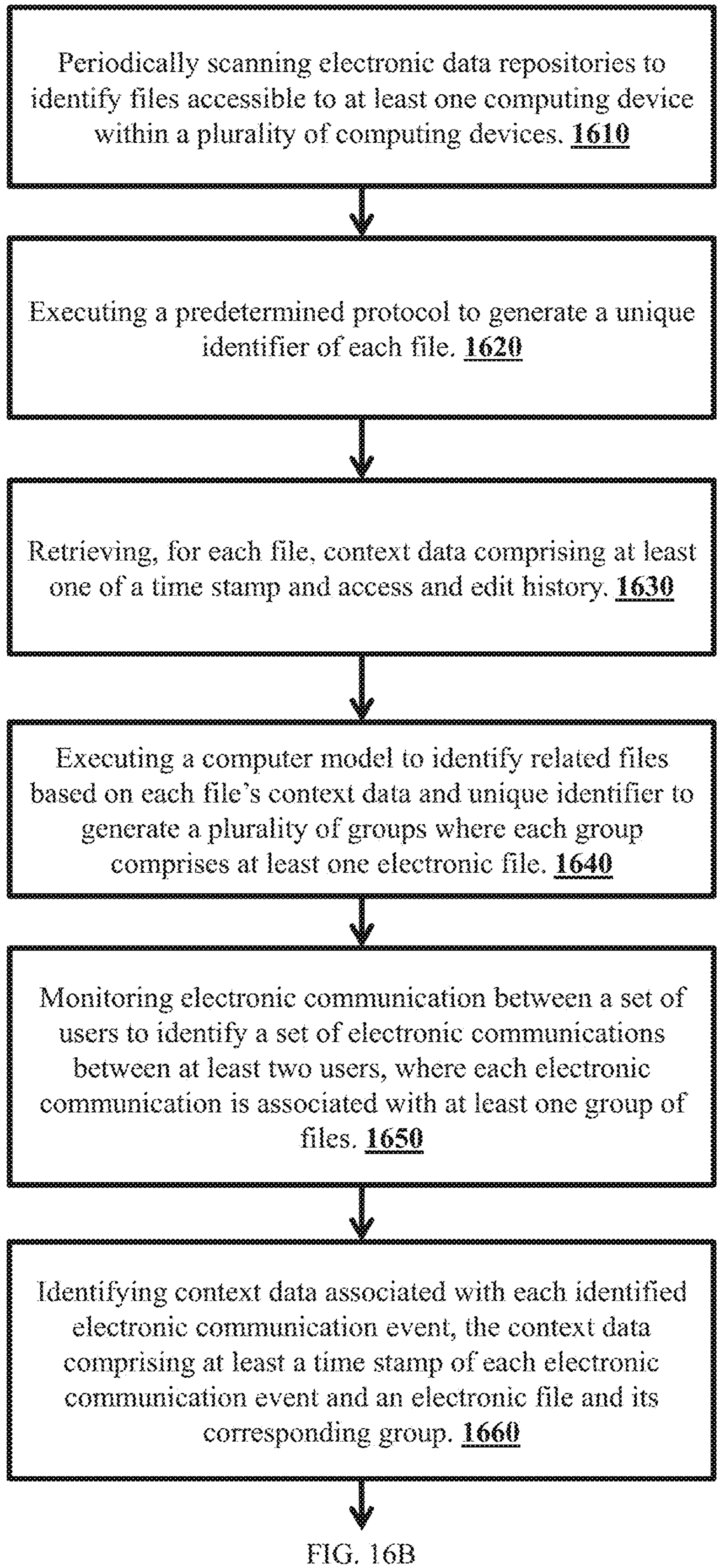
FIGS. 16A and 16B illustrate a flow diagram of a process executed in an electronic workflow management system, in accordance with an embodiment.
Figure 16B:
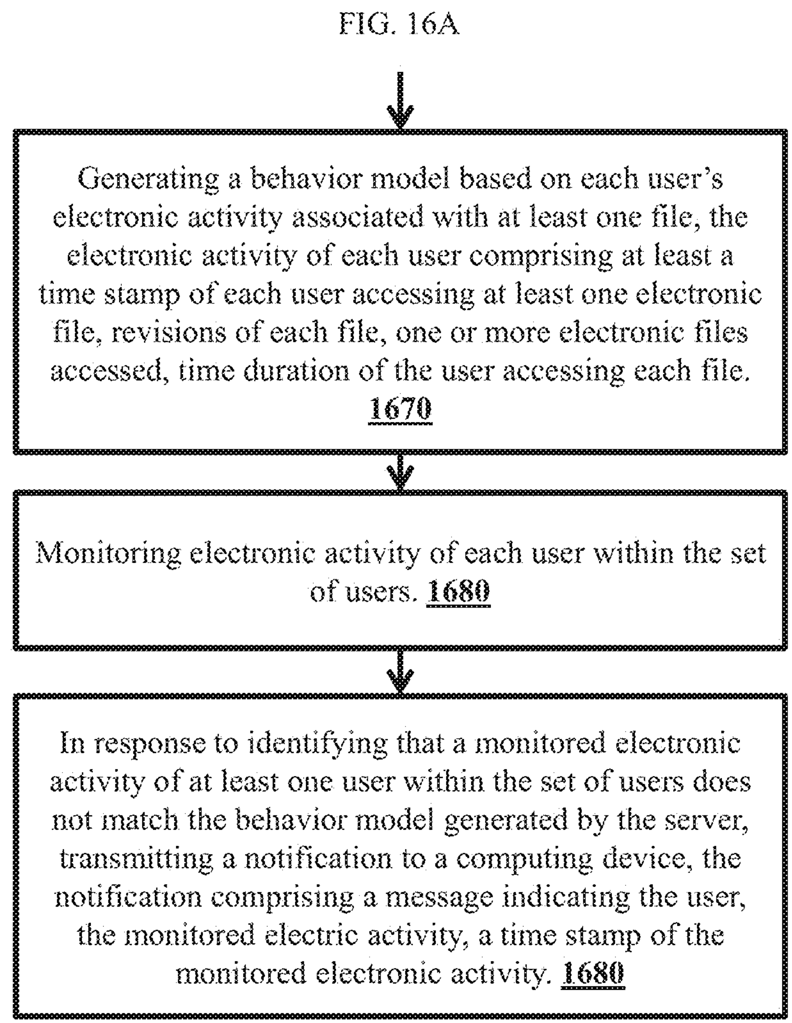

The method depicted in FIGS. 16A-B uses the relationships described herein to analyze a user's activity (working patterns) and to identify suspicious behavior. For instance, when a user's working pattern has drastically changed or when a user is viewing data that does not correspond to his/her organizational chart (e.g., employee A is downloading files associated with a project on which employee A has not worked), the analytics server may determine that the user's computer may have been compromised. In other embodiments, the analytics server can identify employees that are about to quit by identifying user behavior patterns and comparing them to previously compromised users and/or disgruntled employees. Some of the patterns may be easier for the analytics server to identify. For instance, a user who starts blocking time in the middle of the workday, forwards messages or downloads old files that he/she has worked on may exhibit a pattern that is consistent with an employee who is unhappy and/or prepare for his/her departure. Other examples can also include identifying emotional duress, stress, etc. which can be gleaned through sentiment analysis of consolidated components of work FIG. 16A-B illustrate operational steps for identifying cybersecurity threats by identifying relationships between different users and electronic files. The analytics server can understand patterns around people as described in the FIG. 16B, and can also understand information around other understood contexts (e.g., a project) that are application/ecosystem agnostic as described above. For example, the analytics server may be able to identify that access and usage patterns around a team/project/other context are strange, where traditional applications might miss it due to either only seeing a piece of activity related to a team or project, and/or because it lacks an understanding of what these broader business contexts or objectives are. It may also be able to raise an alert around a given node (e.g., file) that is experiencing unconventional/unauthorized activity across systems (e.g., a file with sensitive information being sent via unsecure email message). Furthermore, the analytics server can be used to consolidate historical information from a variety of different systems in order to make it easy for individuals to audit or do e-discovery in the event of a breach other problem. As before, the analytics server can deduplicate data, pull in related context, and show components of work that are related to a higher lever business objective or concept (e.g., team, client, project, and deal).

At step 1610, the analytics server may periodically scan a plurality of electronic data repositories accessible to a plurality of computing devices to identify a plurality of files stored onto the plurality of electronic data repositories where each file is accessible to at least one computing device within the plurality of computing devices. At step 1620, the analytics server may execute a predetermined protocol to generate at least one unique identifier of each file within the plurality of files. At step 1630, the analytics server may retrieve, for each file, context data comprising at least one of a time stamp, access, and edit history.

At step 1640, the analytics server may execute a computer model to identify related files based on each file's context data and unique identifier to generate a plurality of groups where each group comprises at least one electronic file. At step 1650, the analytics server may monitor electronic communication between a set of users to identify a set of electronic communications between at least two users, where each electronic communication is associated with at least one group of files.

At step 1660, the analytics server may identify context data associated with each identified electronic communication event, the context data comprising at least a time stamp of each electronic communication event and an electronic file and its corresponding group. At step 1670, the analytics server may generate a behavior model based on each user's electronic activity associated with at least one file, the electronic activity of each user comprising at least a time stamp of each user accessing at least one electronic file, revisions of each file, one or more electronic files accessed, time duration of the user accessing each file. At step 1680, the analytics server may monitor electronic activity of each user within the set of users.

At step 1690, the analytics server may, in response to identifying that a monitored electronic activity of at least one user within the set of users does not match the behavior model generated by the server, transmitting, by the server, a notification to a computing device, the notification comprising a message indicating the user, the monitored electric activity, a time stamp of the monitored electronic activity.

Using the methods/system described herein, the analytics server may help users better manage and prioritize the flow of information/messages/notifications they receive at any given point in time by intelligently focusing on notifications related to a particular contact or project. The methods and systems described herein may automatically rank the importance of notification related to different contacts and projects. Conventionally, activities (e.g., conversations and notifications) revolving around a project are fragmented, spread out, and repeated. As a result, response times to these notifications may be creating longer bottlenecks and a negative user experience. The analytics server may solve the above-described problem by providing smart notifications (e.g., context aware notification system).

Smart notifications refocus many notifications and messages received by users around contexts that are more relevant to users. In a non-limiting example, a busy user, who is busy in between meetings all day, gets a few minutes to look through the messages he or she has accumulated across a variety of applications (e.g., notifications regarding emails, slack messages, and other notifications). Conventionally, he/she has to go through each application and scan for important notifications. Using the context-based notifications provided by the analytics server, he/she could receive a consolidated list of messages, notifications, and action items organized based on various attributes (e.g., contacts, projects, clients, deals, teams, classes, or relevance).

Figure 17A:
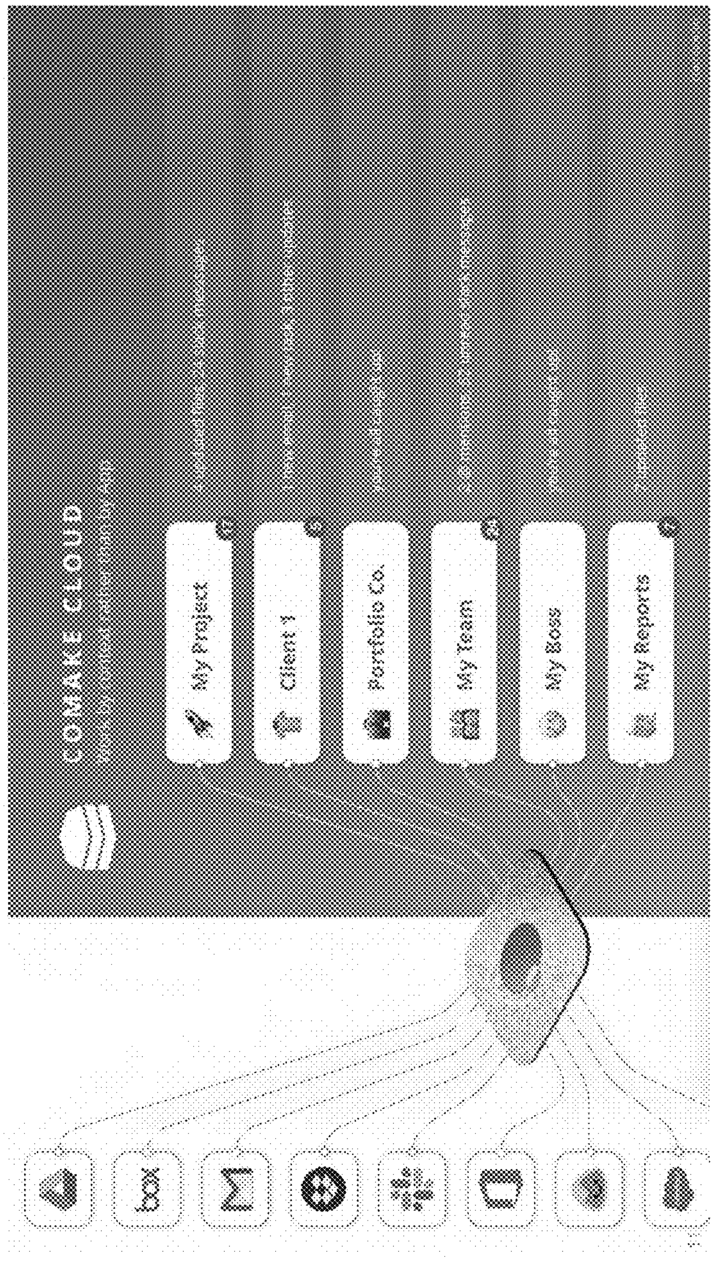
FIG. 17A illustrates a schematic representation of prioritized notification system provided by an electronic workflow management system, in accordance with an embodiment.

As depicted in FIG. 17A, the analytics server can generate notifications that are optimized to fit the user's working mental models and are based on different projects, clients, portfolios, teams, employees (e.g., hierarchy of employees), and/or different reports. The analytics server may group and prioritize a user's numerous notifications based on a prioritization attribute received from the user.

Figure 17B:
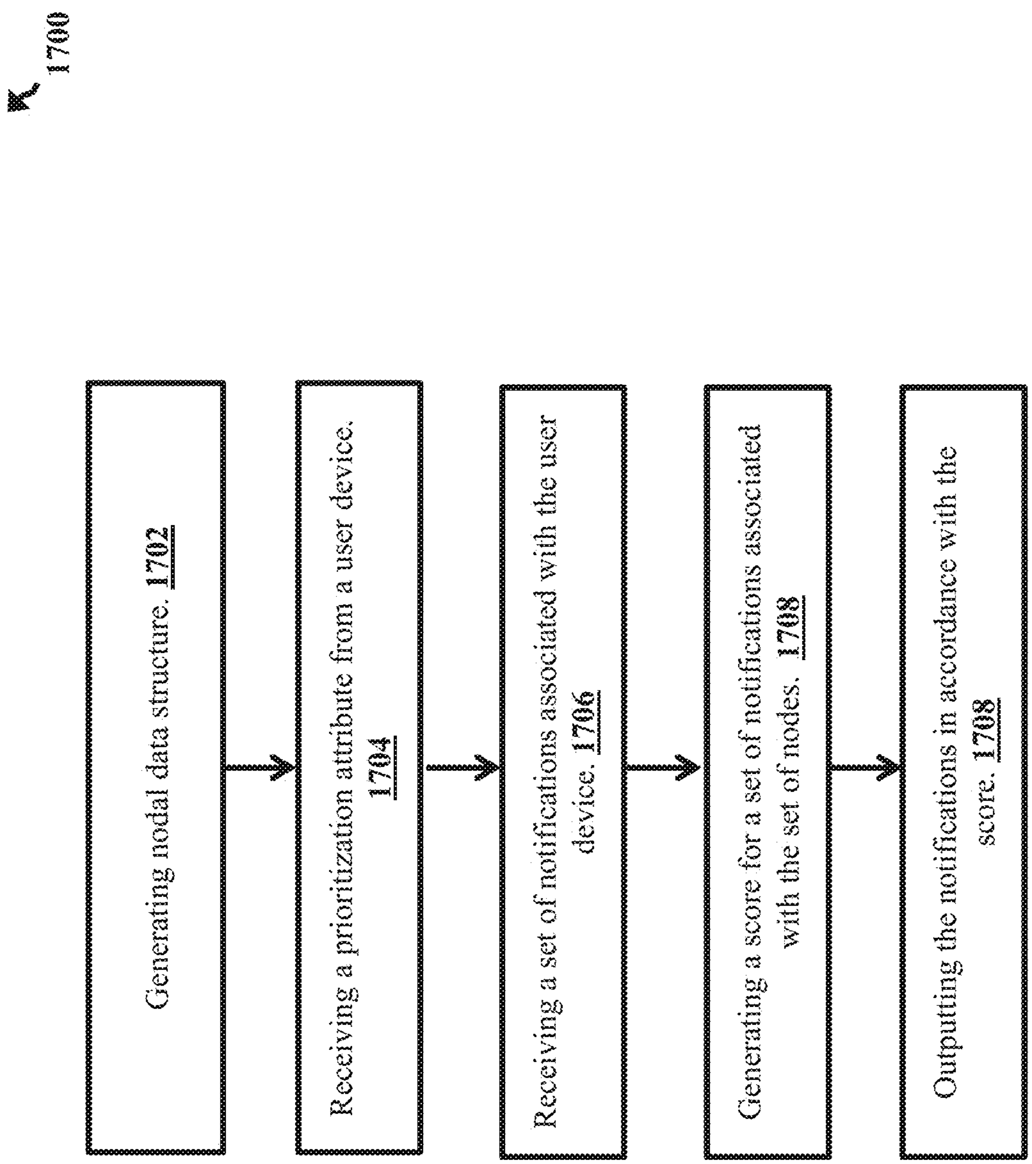
FIG. 17B illustrates a flow diagram of a process executed in an electronic workflow management system, in accordance with an embodiment.

FIG. 17B illustrates operational steps for generating smart notifications, in accordance with an embodiment. In step 1702, the analytics server may generate a nodal data structure corresponding to files accessible and/or accessed by various users and user devices within the network. As described throughout the present disclosure, the analytics server may not limit the methods and systems described herein to files. Therefore, the methods and systems described herein apply to any workflow component, such as tasks, messages, notifications, and any other data generated and/or stored within the nodal data structure.

The generation of the nodal data structure is described in detail throughout disclosure. The analytics server may then rank the notifications based on the contextualization. For instance, the analytics server may display the notifications based on how relevant/important they are to the user. In this way, the user may receive the notification not based on a chronological order (e.g., conventional systems) but based on how relevant and/or important the notification is to the user.

Using the methods and systems described herein, the analytics server may first contextualize notification and then rank the notifications based on their respective context realizations. For instance, the analytics server may first identify how notification relates to a user (e.g., how important is the person who originated the notification, how important is the project to which the notification relates, and/or how important is the file to which the notification relates).

At step 1704, the analytics server may receive one or more prioritization attributes from a user device. The analytics server will use this attribute to prioritize various notifications associated with the user and/or the user device. In some embodiments, the analytics server may display a prompt to receive the prioritization attribute from the user. The prioritization attribute may include a classification of notifications that must be prioritized by the analytics server. Non-limiting examples of prioritization attributes may include projects, clients, portfolio, team, team hierarchy, and the like.

Another prioritization attribute may correspond to prioritizing notifications based on a relative importance of other users within the network. In that embodiment, the analytics server may prioritize notifications based on their corresponding user (e.g., users who originated the notification) and how important those users are relative to the user receiving the notifications.

If no prioritization attribute is received, the analytic server may identify the user's working patterns (e.g., the user's hierarchy within the organization chart and projects associated with the user). The analytics server may use the user's working pattern as the default prioritization attribute. For instance, if a user has not identified a desire to prioritize his/her notifications by for example following or unfollowing certain contacts, projects, teams, etc., the analytic server may prioritize the user's notification based on the projects in which he/she is involved and has recent activity over.

In step 1706, the analytics server may receive a set of notifications associated with the user device. The analytics server may receive various notifications that are associated with the user device. The notifications may correspond to notifications generated by various software tools and application. For instance, various applications and software tools utilized by a user operating the user device may automatically generate the notifications. In another example, a third-party application may transmit a notification to the user informing the user of an update and/or reporting an issue associated with a file and/or a project. In another embodiment, another user may transmit a notification to the user device. For instance, a team member may transmit a message associated with the user device. Notifications may also include received messages, updates to components of work, changes to contexts (e.g., new user added to a project), birthday reminders, alerts, and the like.

In step 1708, the analytics server may generate a score for each notification. The analytics server may first parse the notification and identify its attributes. For instance, the analytics server may first identify what service each notification originates from, who initiated the activity that resulted in a notification, and what component of work (i.e. file, task, and message) the notification relates to. Further described in a non-limiting example, the analytics server may get this information directly from the system/service where the activity happened. In another embodiment, the analytics server could parse the notification and identify the originating source (e.g., name of the originating person/server). The analytics server may then identify the content of each notification. For instance, the analytics server may identify a project, client, and/or a portfolio associated with each notification. Additionally or alternatively, the analytics server may identify a user associated with each notification. For instance, the analytics server may execute a natural language processing algorithm to identify whether the notification is associated with another user within the network. In some embodiments, the analytics server may identify the user who has originated the notification. The analytics server may then generate each score accordingly.

To ingest various activity events and notifications, the analytics server may use different analytical protocols and methods. These protocols and methods may differ based on the origination of the notification. For instance, if the analytics server is ingesting the notification from a browser, the analytics server may use a browser notification flow. If the analytics server is ingesting the notification from software as a service (Saas), the analytics server may use a Saas event flow or a Saas polling flow.

For notifications received from a browser, the analytics server may use an extension code and inject a script to modify browser notification API. The analytic server may use a modified API to capture a copy of each browser notification (e.g., notifications that are sent by an open webpage to your browser). The analytics server may retrieve each copied browser notification. The analytics server may then collect copied browser notifications from multiple browser tabs and windows and from multiple devices associated with the same and/or different users. The analytics server may then process collected browser notifications into events for the purposes of standardization, deduplication, the addition of metadata, and combining with events from other sources. The analytics server may then transmit the processed events/notifications as contextualize and prioritize notifications to different client devices. These notifications may be sent to client sites offer applications that may or may not be generated and/or updated by the analytics server. The client-side software applications may receive the process events and notifications and store them as local/temporary state (e.g., within a local/temporary repository). The client sites offer application may then display the notifications and events based on the metadata accompanying each notification and or event. The metadata described herein may refer to the data produced by the analytics server that identifies contextualization and prioritization of each notification or event.

For SaaS event flow, the analytics server may use per-product APIs and configuration consoles. For instance, the analytics server may subscribe to pushed events from various SaaS products and offerings (such as third party data repositories and software tools). Using pushed technology, the analytics server may receive the pushed events and notifications. The analytics server may use the methods and systems described herein to process and analyze the received pushed events and notifications (e.g., received events are processed for the purposes of standardization, deduplication, the addition of metadata, and combining with events and notifications from other sources). The analytics server then combines events and notifications and displays them on a client device as described above.

For SaaS polling flow, the analytics server may periodically poll various SaaS products and offerings for new and updated data, such as events and/or notifications. The analytics server may then process the polled data based on methods and systems described herein (e.g., event data is processed for the purposes of standardization, deduplication, the addition of metadata, and combining with events and notifications from other sources). The analytics server then combines events and notifications and displays them on a client device as described above. In some embodiments, the analytics server may use the SaaS polling flow methodology and poll data from users within an entity (e.g., employees).

Event and notification metadata may consist of an identifier for the SaaS product, originating web page, specific account information (specifically for the case of multiple accounts with a single SaaS product), and/or other information. Deduplication occurs through comparison of event contents (e.g., identical messages) and event metadata (e.g., same or different accounts on one SaaS product).

Events may be stored at various points in the process for various reasons and in various ways for such purposes of at-least-once delivery, delayed processing, load balancing, and analytics server client polling.

In general, the analytics server may retrieve various events and notifications (e.g., non-blocking duplication, by the browser extension, and of browser notifications). The analytics server may also execute a protocol to generate a unified and common format among all retrieved notifications. Because different notifications originate from different sources (e.g., Saas, client devices, and internal/extremal software tools), they might be in different formats that may or may not be compatible with the analytical protocols used by the analytics server. As a result, the analytics server may first generate a common format among all events and notifications. The analytics server may then be duplicate the events using the methods and systems described herein. The analytics server may then hydrate the data by adding metadata indicative of the context and priority data associated with each event and notification. Finally, the analytics server may display the notifications using the methods described herein.

Based on the retrieved attributes of each notification, the analytics server may generate a score for each notification. The analytics server may use various predetermined scoring rules to calculate each score accordingly. The scoring algorithm may correspond to the prioritization attribute received in step 1704. For instance, the user has indicated a desire for the analytics server to prioritize the notifications based on team hierarchy, the analytics server may generate the score based on a nodal data structure, such as team hierarchy described in FIG. 13B. In that embodiment, the analytics server may generate a higher score for users who are higher in the team hierarchy. As a result, a notification that was originated by and/or is associated with a person who is identified as having a high score within the team hierarchy will have a higher score than other notifications. That is, a notification associated with a user's manger will have a higher score than a notification associated with the user's peers.

In another example, if the user has indicated a desire for the analytics server to prioritize the notifications based on projects he/she is actively working on, the analytics server may calculate a higher score for a notification that is related to a particular project vs. other projects. For instance, if a notification includes the project name or is related to a component of work that is related to the project, the notification may score higher than other notifications that do not include the project name. In some configurations, the analytics server may identify projects related to a user (using the nodal data structure). The analytics server may then generate higher scores for notifications associated with the identified projects.

In step 1708, the analytics server may display the notification in accordance with each notification's respective score. The analytics server may prioritize displaying (or otherwise outputting, such as haptic, auditory, and otherwise). For instance, the analytics server may display notifications with a higher score before notifications with relatively lower scores. In another example, the notifications with higher scores may be outputted differently. For instance, a prioritized notification may be accompanied with a haptic or sound notification.

The analytics server may also contextualize each event and notification using the methods and systems described herein. The analytics server may then augment data associated with each event and notification, such that the analytics server adds the contextualize data to each event and notification. In a non-limiting example, the analytics server identifies other users associated with each notification. Using the methods and systems described herein, the analytics server may identify whether the associated users are relatively important to the end user receiving the notification. For example, if a notification is associated with a user who is high within an organization chart, the analytics server may generate metadata indicating that the notification is possibly important to the user receiving notification. The analytics server may use any of the methodologies described herein to add contextualization data to each notification. For example, the analytics server may identify a project related to the notification I may add project specific data as contextualize data to the notification.

When the analytics server receives a prioritization attribute from the user receiving the notification, the analytics server may first retrieve all the contextualized data and rank the notifications based on the prioritization attribute.

Figure 17C:
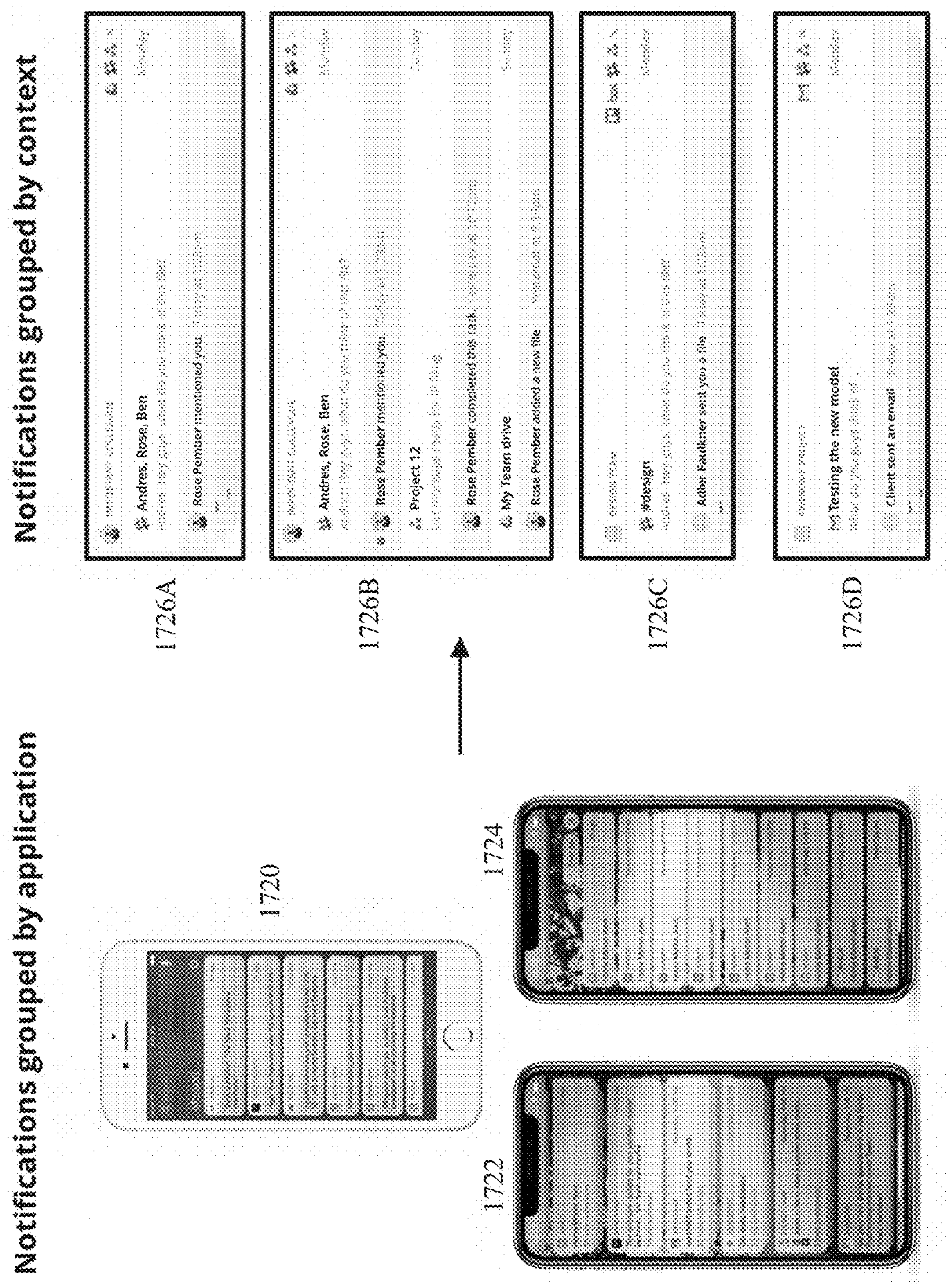
FIG. 17C illustrates graphical user interfaces displaying prioritized notification, in accordance with an embodiment.

A non-limiting example of prioritized notifications are illustrated in FIG. 17C, in accordance with an embodiment. Notification cluster 1726A-B illustrates an example where the analytics server prioritizes originator users (e.g., important colleagues). The notification cluster 1726C illustrates an example where the analytics server prioritizes notifications associated with a team over other notifications. The notification cluster 1726D illustrate an example where the analytics server prioritizes notifications associated with particular project.

Using the methods and systems described herein, the analytics server can optimize notifications. For instance, as depicted in FIG. 17C, while conventional notification systems organize notifications chronologically (e.g., GUI 1720) or based on applications (e.g., GUIS 1722 and 1724), the analytics server can organize notifications by context (e.g., notification clusters 1726A-D).

In some embodiments, the analytics server may generate and prioritize the notification. For instance, the analytics server may monitor one or more users and their corresponding devices. When the analytics server identifies an update associated with a user, the analytics server identifies that a user has accessed, revised, and/or interacted with a file or any other workflow components, the analytics server may generate a notification accordingly (e.g., user X has revised file Y of project Z). The analytics server may then prioritize the generated notifications for each user. For instance, all users associated with project Z may receive the above-described notification.

Most modern knowledge workers are involved with multiple projects, which requires them to access multiple files hosted on multiple (internal or external) applications and software tools. Currently, for simultaneous access to files (and other workflow components, such as tasks, notifications, and the like) related different projects, users must access multiple software tools, which has created negative user experiences and created inefficiencies. For instance, a typical employee may have multiple browsers, software applications, task organization applications, and other project related software applications open at the same time. Managing multiple applications decreases efficiencies.

Using the methods and systems described herein, the analytics server may provide a browser extension that provides all relevant data associated with a particular context. The context may represent any category of data selected by the user. For instance, the context may correspond to a project, a particular aspect of a project, or any other category of data described herein (e.g., all data associated with a particular employee). Using the methods and systems described herein, the analytics server may traverse the nodal data structure, identify relevant nodes, analyzed identified nodes, and provide context-specific data.

In a non-limiting example, a user may generate multiple browser tabs where each tab corresponds to a particular project or any other attribute of his/her workflow. When the user accesses a browser tab, the analytics server only displays data associated with that particular project. Therefore, the user may access all software tools, files, notifications, messages, and any other workflow component from the project's browser tab. This eliminates the need to execute and initiate multiple software applications. The browser tabs are customizable, such that users may customize notifications messages or any other workflow components according to their needs. Various applications (internal or external) and software tools can be loaded onto each browser tab to provide easy access. These applications and software tools could be desktop applications, web applications, and/or other websites. The analytics server enables users to relate different accounts to each application, such that a user can be simultaneously logged into multiple accounts for the same type of application (e.g., two social media accounts).

As will be described throughout, the methods and systems described herein can be implemented within a browser extension. However, in other embodiments, the methods and systems described herein can be implemented into any software application.

The graphical user interfaces and browser extensions/tabs described herein (e.g., FIGS. 18A-O) are also referred to herein at "smart windows." The disclosed platform that utilizes the methods and systems described herein offers software products that allow users to group data into these contexts so that they can have a holistic view (and access) without being required to execute multiple browsers and applications. The disclosed platform improves focus and productivity, while helping manage content organization across different applications. Using the methods and systems described herein, the analytics server allows users to load websites into their browser as native applications, and then group websites and resources into context.

The methods and systems described herein can be implemented as a browser extension that transforms browsers into collaborative and smart workstations where users can access information from websites at the browser level (e.g., without loading the webpages), as well as load and offload work sessions (and tabs) contextually. While some embodiments described herein are described in the context of a web-based application, such as a web browser, the method 1800 can be implemented on any application (e.g., desktop applications, databases, and/or cloud-based applications).

The analytics server may also provide a keyboard navigable version of the same concepts, where users can use keyboard shortcuts and basic commands to search through, access, and otherwise interact with information within the nodal data structure.

Because the analytics server identifies and aggregates relevant data, e.g., by generating the nodal data structure, users can organize their activities more efficiently. For instance, users can search data, generate messages and tasks, identify contacts, and receive alerts using one workflow browser application (or a single browser tab).

Figure 18A:
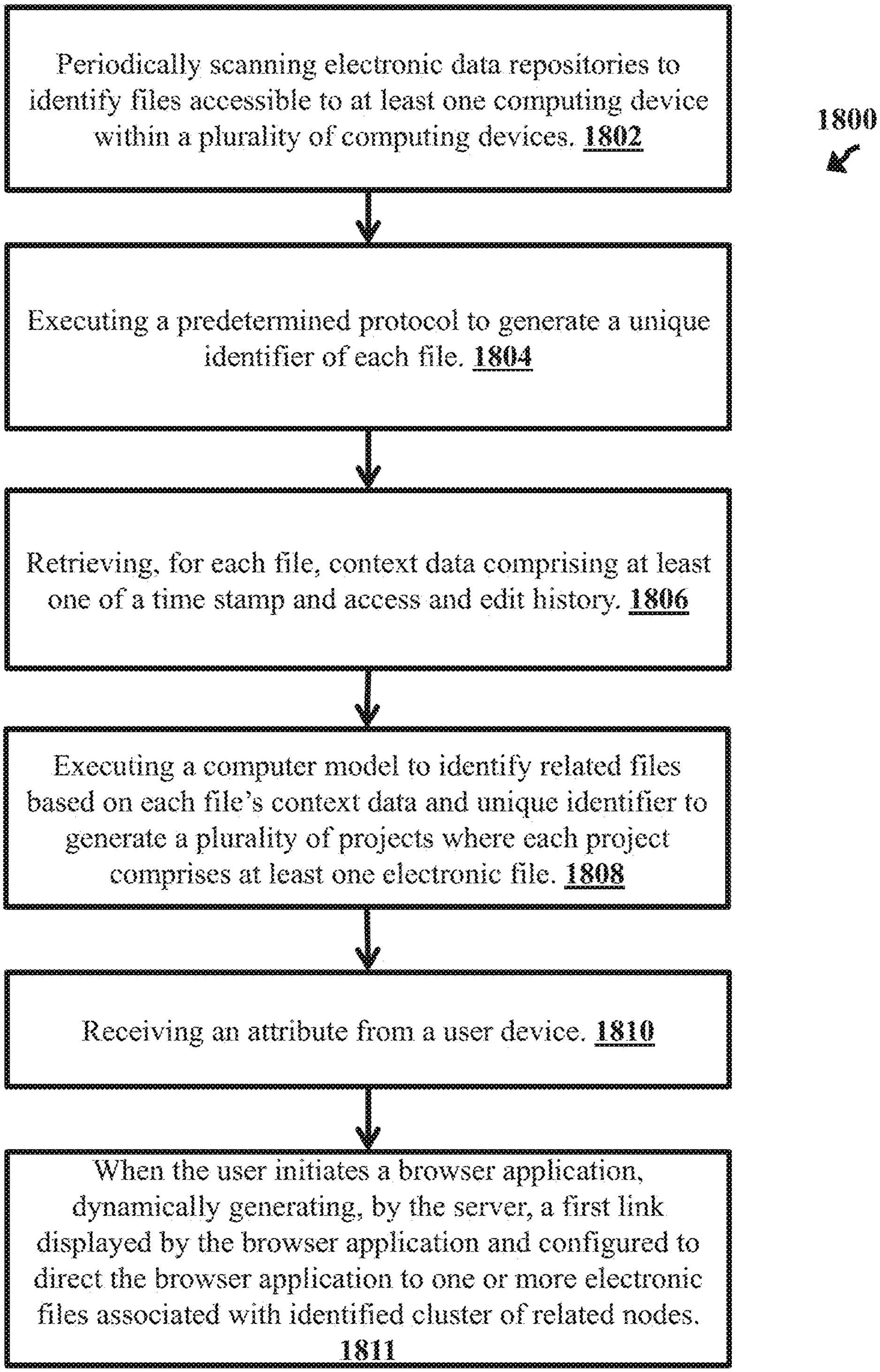
FIG. 18A illustrates a flow diagram of a process executed in an electronic workflow management system, in accordance with an embodiment.

FIG. 18A illustrates operational steps of displaying customize browser tabs based on identified projects associated with each user, in accordance with an embodiment. At step 1802, the analytics server may periodically scan a plurality of electronic data repositories accessible to a plurality of computing devices to identify a plurality of files stored onto the plurality of electronic data repositories where each file is accessible to at least one computing device within the plurality of computing devices. At step 1804, the analytics server may execute a predetermined protocol to generate at least one unique identifier of each file within the plurality of files (or any other workflow component). At step 1806, the analytics server may retrieve, for each file, context data comprising at least one of a time stamp, access, and edit history. At step 1808, the analytics server may execute a computer model to identify related files based on each file's context data and unique identifier to generate a plurality of projects where each project comprises at least one electronic file.

Using the method 1800, a user can create his/her own contexts through a GUI or API. The analytics server creates filters and/or models to map nodes to a given context. As used herein, context may refer to any attribute or classification designated by the user. For instance, the context may refer to a GUI specific to a project, team, client, portfolio, or any other classification desired by the user. For instance, the user can instruct the analytics server to generate the customize GUI that displays information relevant to one or more attributes. The analytics server may use the attributes received two identified nodes that are associated with that attribute (e.g., nodes associated with a project, client, employee subgroup, and/or a particular department).

The context (the customized GUI) can be shared with others, so that the shared content of each customized (e.g., a shared project, team, and client) does not have to be created multiple times by different people. Each user may then accordingly further customize the GUIs by adding/removing files, applications, and other content from each customized GUI (context). New users can login and already have relevant applications and context associated with their profile/workspace. As information reaches analytics server from integrated systems, data is processed and may be associated with a given context. The analytics server may then dynamically update each context according to the new data received. Therefore, each user may use his/her context as a one-stop shop to access his/her relevant data.

Additionally or alternatively, when a user opens a context via GUI or (or other user/system accesses Context via API), the analytics server can perform a search based on certain attributes and return components of work as well as recommendations. Recommendations can come from browsing history, activity, notifications, saved tabs, pinned resources, etc. The context is an "app-like" experience because it is easy to open, easy to search, provides notifications control, and screen-time/time-tracking, anther relevant features.

In steps 1802-1808, the analytics server may monitor user interactions and may generate a nodal data structure corresponding to file accessible and/or accessed by various users and user devices within the network. The generation of the nodal data structure is described in detail throughout disclosure. The nodal data structure may correspond to related files and/or workflow components within a network (e.g., organization).

At step 1810, the analytics server may receive one or more attributes from a user device. The analytics server will use this attribute to identify relevant nodes, group electronic content, and display the GUIs described herein. In some embodiments, the analytics server may display a prompt to receive the attribute from the user. The attribute may include a classification of data or context selected by the user. Non-limiting examples of the attribute may include projects, clients, portfolio, team, team hierarchy, and the like. By selecting an attribute, the user instructs the analytics server to generate a GUI (e.g., browser tab) that displays data associated with that attribute. For instance, a user may instruct analytics server to generate a browser tab that displays data (e.g., files, notification, messages, and/or tasks) associated with a particular project, objective, or other context. The grouping of nodes from the nodal structure around an attribute and the graphical user interface that represents it is also referred to herein as a context.

If no attribute is received, the analytic server may identify the user's working patterns (e.g., the user's hierarchy within the organization chart and projects associated with the user). The analytics server may use the user's working pattern as the default attribute. For instance, if a user has not identified a desire to generate a context browser, the analytic server may automatically consolidate and suggest workflow components associated with different projects in which the users is involved.

Upon receiving the attribute, the analytics server may use the methods and systems described herein to identify a cluster of nodes that correspond to the attribute. For instance, if the attribute corresponds to a project name, the analytics server may identify all nodes within the nodal data structure that are related to that particular project. That is, the analytics server identifies a cluster of nodes that are related to the attribute. The analytics server may traverse the nodal data structure and use the identified cluster of related nodes to display data as described herein.

At step 18H, the analytics server may dynamically generate a first link displayed by the browser and configured to direct the browser application to one or more electronic files associated with identified cluster of related nodes when the user initiates a browser application. For clarity and brevity, the embodiments described herein depict a browser tab that displays data grouped based on projects (sometimes referred to herein as context). However, it is expressly understood that data within the nodal data structure can be grouped based on any other attribute. For instance, the method 1800 may be used to generate a browser tab that groups data for different clients, portfolios, and the like.

Using the methods and systems described herein, the analytics server may identify files and workflow components related to different projects. The analytics server may search for and retrieve nodes that correspond to different files and workflow components that are relevant to the attribute received from the user. In other words, the analytics server may use the nodal data structure to identify nodes that are associated with and relevant to the received attribute. The analytics server may then generate various GUIs that display graphical elements that correspond to files and other workflow components corresponding to the retrieve nodes.

The analytics server may generate customized browser tabs where each tab is specific to one or more projects associated with the user. When the user interacts with a browser tab, the analytics server then displays project-specific information for the user including multiple links (e.g., graphical components) providing the user with the option to efficiently access data organized based on different projects to which they relate. In this way, users can minimize the number of browser tabs and active applications, which creates a better user experience.

Figure 18B:
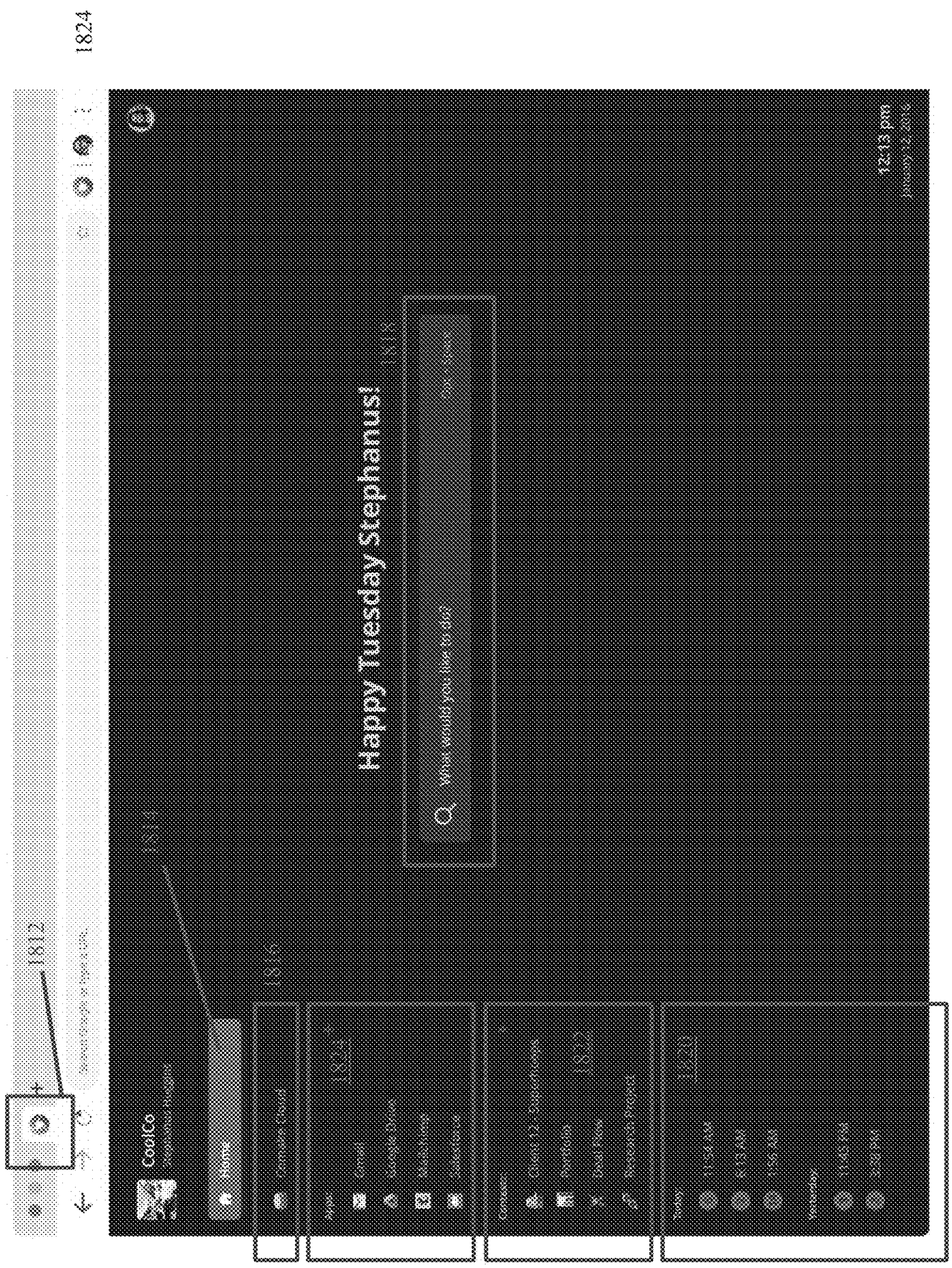
FIGS. 18B-M illustrate graphical user interfaces displayed by an electronic workflow management system, in accordance with an embodiment.

Referring now to FIGS. 18B-P a non-limiting example of a browser extension displaying a browser tab that groups/clusters data based on an attribute is depicted, in accordance with an embodiment. The browser extension can be installed and implemented on any browser, such that the information can be displayed by the analytics server. FIG. 18B illustrates a typical web browser equipped with a browser extension provided by analytics server.

To start, a user may interact with the graphical indicator 1812 and the analytics server displays the GUI 1824. In some configurations, this tab (graphical indicator 1812) will always be visible to the user. The graphical indicator 1812 is comparable to a computer's "desktop" for users' browser. The graphical indicator 1812 may represent the home space for cloud/web-based workflows, which the user can always access by interacting with the graphical indicator 1812 and/or 1814. By interacting with these graphical indicators, a user can launch any application he/she might want from "Home," pin any application to the dock (graphical elements 1816) for easy access, search for anything using the search bar 1818, and view his/her recent working history over the past several days (graphical elements 1820).

A user can also choose to keep certain contexts in their dock (graphical element 1822), such that the applications are easily accessible from the "Home" screen displayed in GUI 1824. The user can always access all pinned and unpinned applications and contexts from search bar 1818, such that she/he does not have to keep all of the contexts within his workspace always pinned to the Home screen. Also, similar to applications, notifications, recently visited pages, integrated search, and more is easily accessible without having to open others applications or other software tool itself, (e.g., FIG. 18E). The analytics server also allows users to easily search and see units of work (notifications, files, messages, notes, etc.) relevant to that context without opening/loading any of the related webpages or applications. In this way, the analytics server provides an "app-like experience" for contextual workflows (e.g., objectives, clients, classes, teams, projects, etc.) where information and accessibility is greatly improved in contrast with a traditional web site or fragmented workflows across applications.

When a user initiates a context, the user is able to continue working from where the users last terminated his/her work (e.g., left off work last time). This solution greatly improves an individual's workflow where she/he can log off or try to keep all the applications active on his/her computer. The analytics server provides a way for the user to easily maintain visibility and control into relevant activity across applications/accounts by context (e.g., project and/or objectives), while maintaining a clean and organized workstation without an overwhelming number of open windows. This improves both the user's performance as well as his computer's performance.

When a user chooses to continue working on a given context, the analytics server can retrieve the user's last known state of work for that given context, and allow the user continue working with the same window and tabs open as previously accessed. This can include logging the user into the corresponding application and accounts. For instance, if the user decided to include a third party email application, the analytics server can integrate the third party application in the GUIs described herein. The analytics server can also keep the user logged into the third party email account, such that the user is no longer required to initiate that third party application to check his/her emails. An alternate embodiment would allow multiple windows per context and could include both online and offline work.

Additionally or alternatively, the analytics server may provide users to have a context open as multiple windows in a "desktop," which comprises contextual files (files arranged based on their context data retrieved from the nodal data structure), notifications, messages, tasks, contacts, questions & answer forum, calendar, and the like.

Figure 18C:
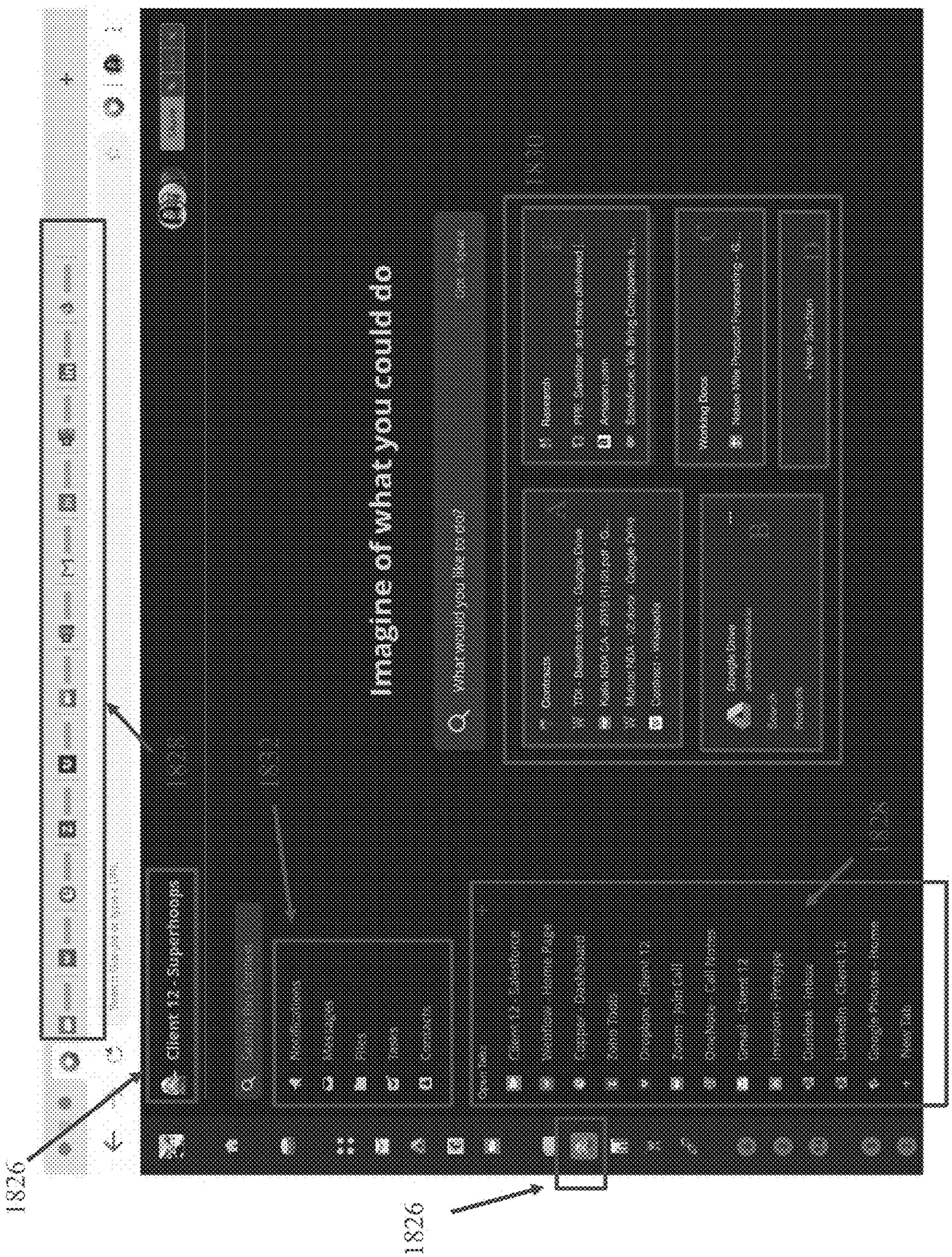

FIG. 18C illustrates an embodiment where a user opens a context by either clicking on that particular context it from the dock or searching for it. When opened, the analytics server searches for the user's or the context's previous state, retrieves all pertinent data, and loads in all the necessary websites, tabs, logins, and components to match that previous state. Graphical indicator 1826 indicates to the user what context is currently open (the project corresponding to the GUI depicted in FIG. 18C). The graphical indicator 1828 illustrates all the workflow components (e.g., applications, task, and third-party items) to which the use has access (e.g., the user has open). In some embodiments, open tabs, illustrated in the graphical component 1828, maybe stated, such that the user can always access them. For instance, the analytics server may display icons associated with the workflow components, such that the user can view/access them as a browser tab.

When the user closes a workflow component, such as an application, changes tabs, visit the website, or performs any action, the analytics server saves/stores the state/status of the user, such that the user can terminate any or all parts of the graphical user interface shown here. In that way, when the user re-initiates the workflow component, the analytics server can display a latest status of the workflow component.

The graphical components 1830B-M illustrate sections where a user can pin (e.g., permanently pin) resources to the GUIs described herein. Graphical user interfaces provided by the analytics server provide easy methods for a user to link key websites, documents, contacts, messages, applications, and other resources to a given context so that users can easily access the content. The analytics server allows the users to access the pinned content, even after the user has terminated the application itself. For instance, graphical component 1830C illustrates that a user has previously pinned a working document titled "native mile product forecasting." Even if the underlying document is no longer active (e.g., the user has terminated or closed the document or the application that hosts the document), the analytics server provides the user the opportunity to have access the document using the graphical component 1830C. For instance, the user can re-initiate and view this document by interacting with the document's icon.

The graphical component 1830B shows a given application and account that is also pinned. The user can choose to show different things for a given application. FIG. 15D (or 18D) illustrates alternate embodiments of these pinned sections where user is able to pin various workflow component (e.g., tasks, files, and messages) to a browser provided by the analytics server (e.g., a native application provided by the analytics server). Alternate embodiments of these sections include being able to pin sections showing live data embedded within components of work and widgets that show live data within applications and systems as illustrated in FIGS. 15/8D.

Referring back to FIG. 18C, the user is able to have certain shortcuts associated with that given application, or can change the view to see recently viewed, starred components of work, activity, notifications for that application, and the like. The graphical component 1832 illustrates how the analytics server may organize various categories of files and/or workflow components.

In some embodiments, the workflow components may include content that is shared with other projects or context. For instance, the graphical component 1830A/E illustrates pinned resources that may correspond to more than one contexts. In essence, the content pinned and illustrated in the graphical component 1830A/E represent links shared between two different contexts. This may be similar to the links between files or other nodes within the neural data structure. Similarly, the analytics server can recommend these associations. However, links between contexts may be different in that they can be shared metadata tags for resources or components of work relevant to both sections. Therefore when linking two contexts together, users may create a shared section both contexts, which essentially represents an intersection between the contexts. In the depicted example, the user has a context for "Contracts" (1830A) and a context for "Research" (1830E). In an embodiment, interacting with the "contracts" context would cause the analytics server to show a number of other sections for a variety of clients, one of which is "Client 12—Superhoops". Similarly when looking at each client's context, the analytics server would show a contracts section in each.

The graphical user interfaces described herein help users view pertinent data associated with each project. The users can simultaneously work across multiple applications, platforms, and the like. The graphical user interfaces described herein provide sharing features to onboard collaborators to different projects, across all different applications and accounts. The analytics server can also augment users' web browsing with useful data related to various contexts using the nodal data structure described herein.

Figure 18D:
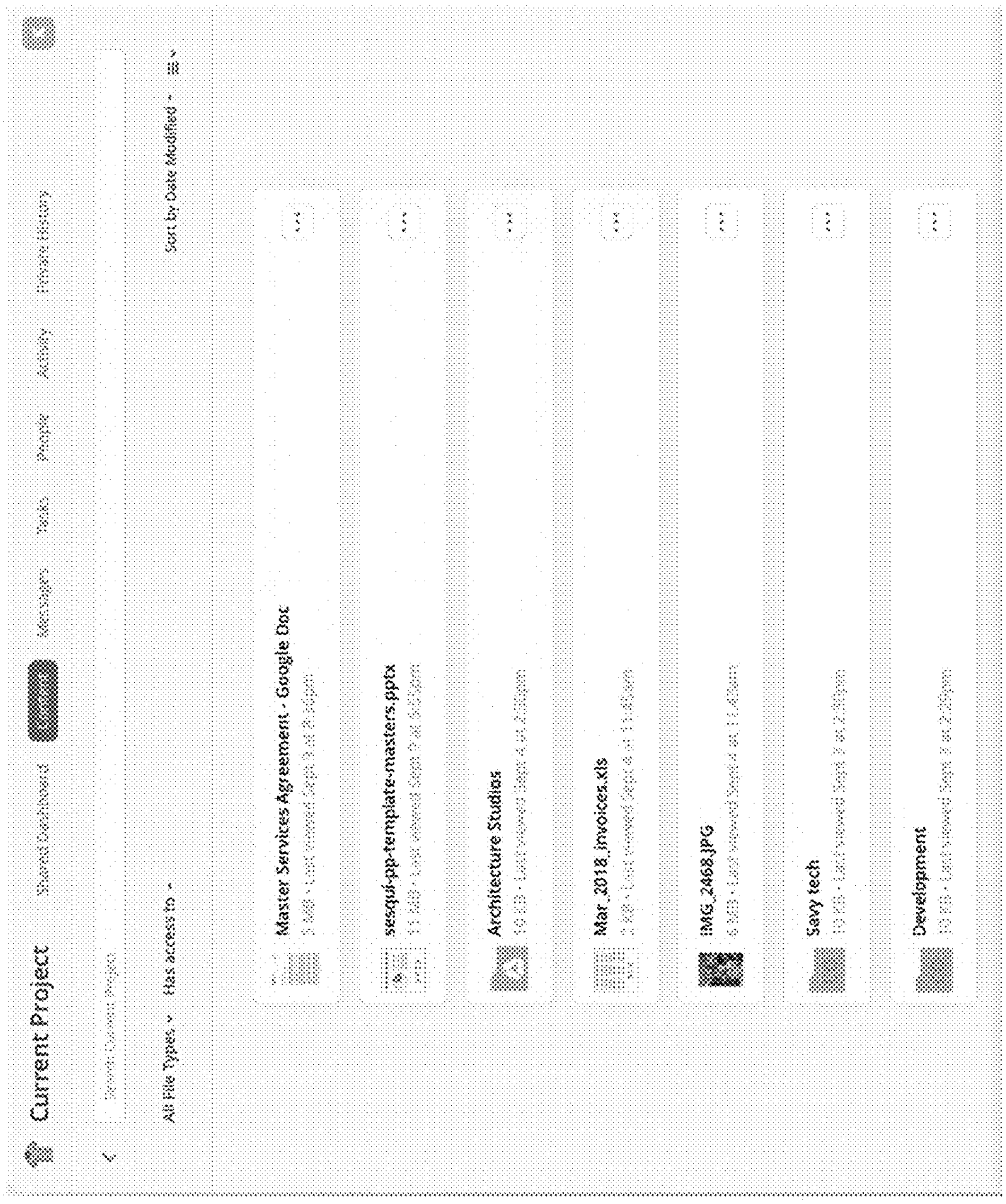
Figure 18E:
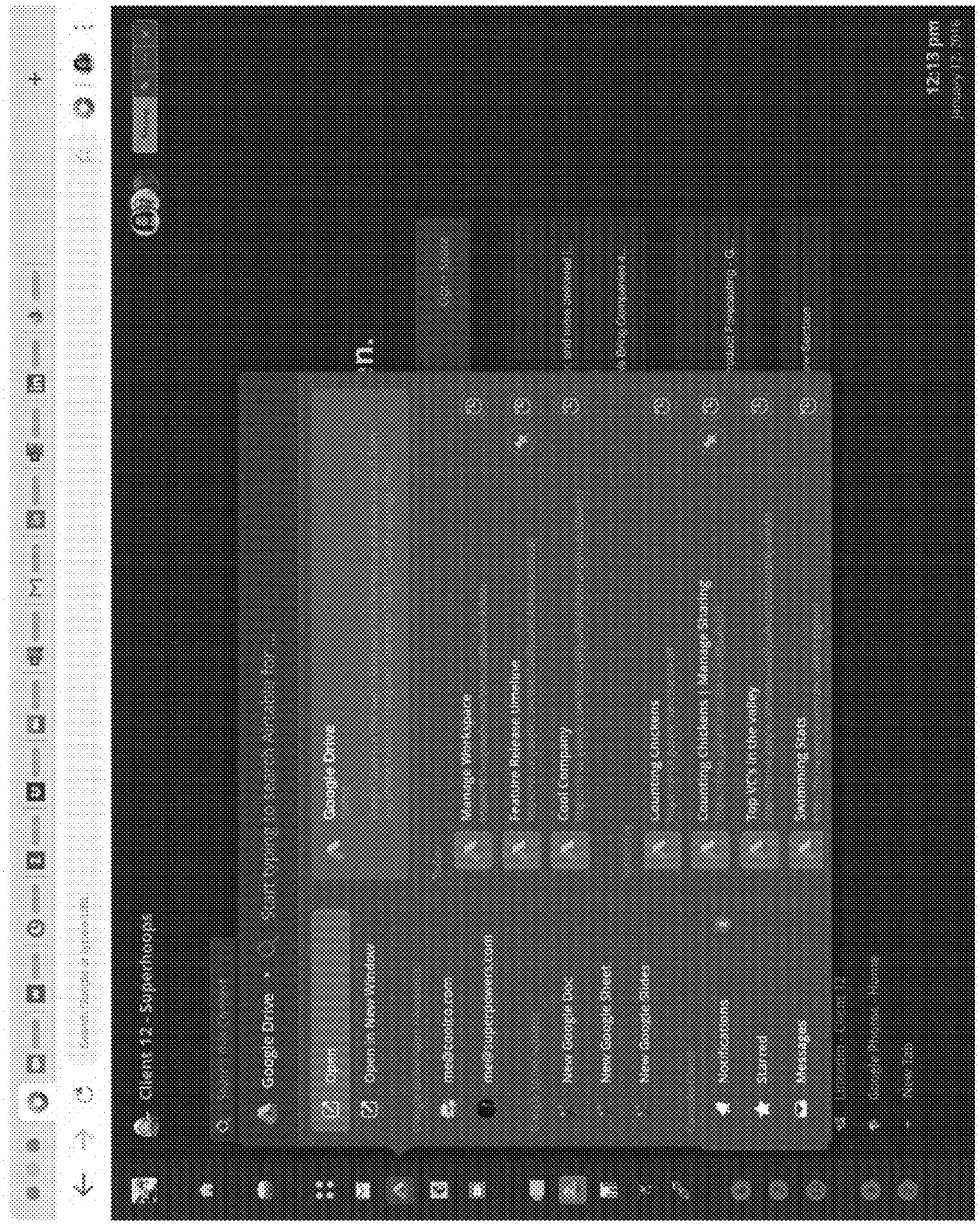

As depicted in FIG. 18E, the analytics server may display various notifications and messages specific to a project/context. For instance, the graphical component 1834 illustrates that the analytics server indexes all files, messages, tasks, notifications, starred items, and the like for every integrated application and/or context. The analytics server may index workflow components and organize all relevant workflow components as they relate to a specific application, contacts, project, or any other category selected by the user (e.g., graphical component 1836).

Figure 18F:
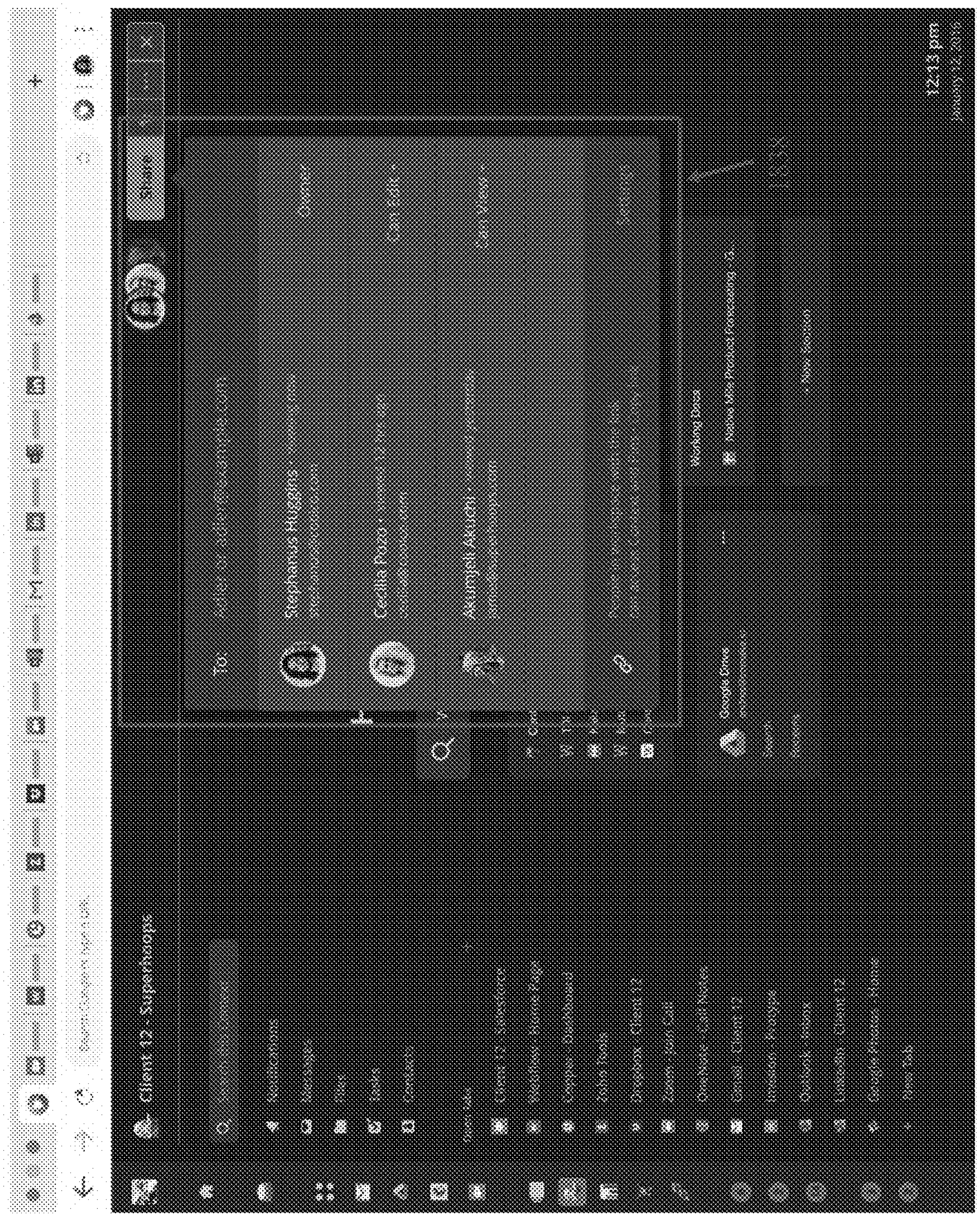

As depicted in FIG. 18F, the analytics server allows the user to transmit and share any workflow component (e.g., file, context, and the like) with other users. The analytics server provides the user an option to select a workflow component and further select a user where the analytics server shares the selected content with the recipient (e.g., graphical component 1838). The analytics server may also allow the user (sender) to select editing permissions for the recipient of the content.

Figure 18G:
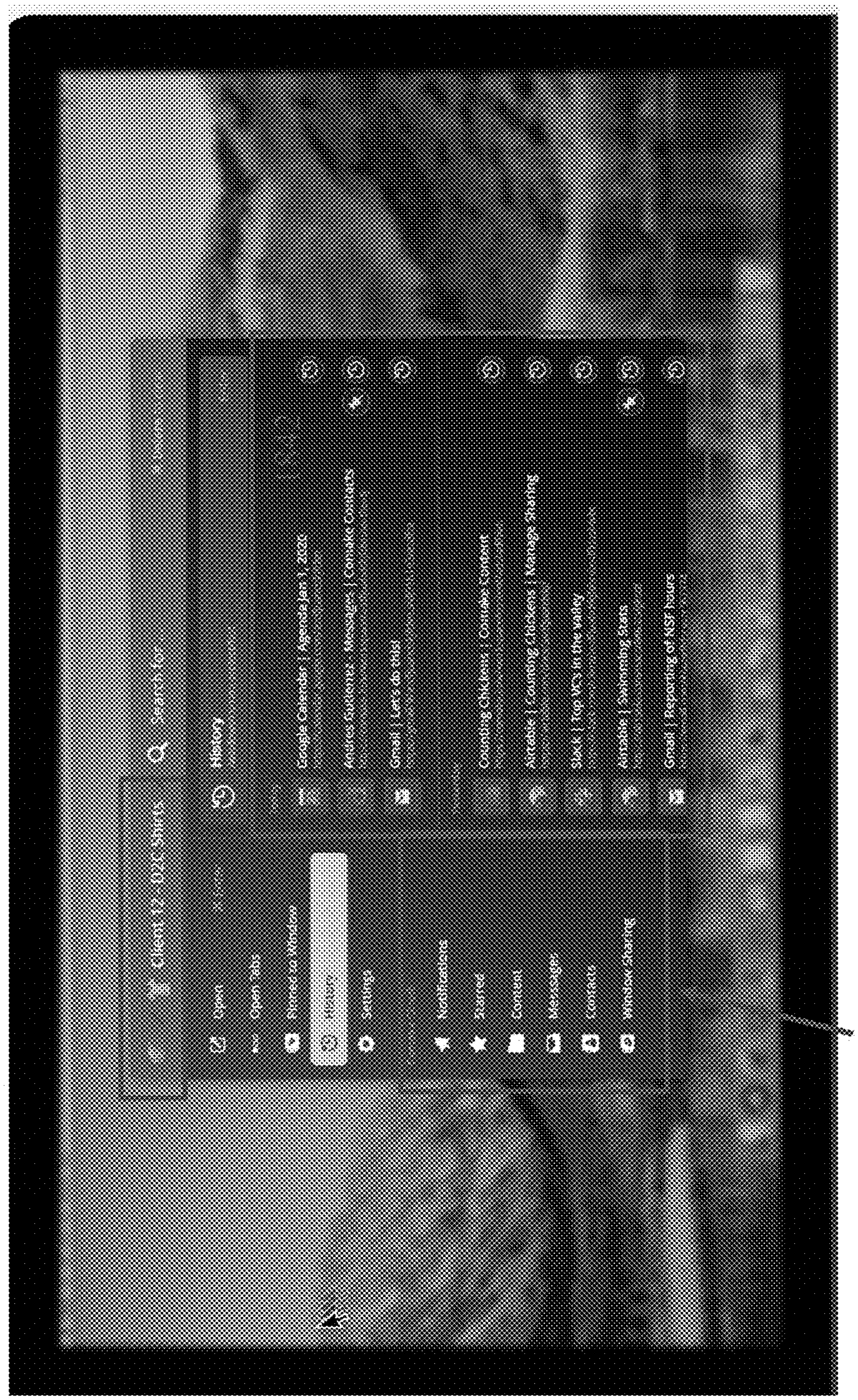

As depicted in FIG. 18G, the analytics server provides a search functionality where the searching is limited by a category, context, or any other attribute selected by the user (e.g., attribute received from the user). For instance, a user may select a project (as depicted, project "client 12—D2C shirts"). The user may then use the search bar provided by the analytics server and input a query. Upon receiving a text string entered by the user, the analytics server may identify, within the nodal structure, relevant data that correspond to the query inputted by the user and the project selected by the user. The analytics server may display the results in the graphical component 1842. As depicted, the analytics server may also populate the graphical element 1840 where notifications, starred workflow components, content, messages, contacts, and shared content associated with the inputted query and the selected project are displayed. The user may access all the information mapped and filter the information using categories described in the graphical element 1840. Using the methods and systems described herein, the analytics server may search for and display content related to local browsing history; open tabs and last used state of context; websites, applications, and resources pinned to context; sharing settings; and units of work mapped to a particular project/context.

FIGS. 18H-M illustrate how the analytics server can display components of work like notifications, messages, files, tasks, and contacts associated with a particular context. The graphical user interfaces described herein provide an app-like experience where data is arranged based on respective context (e.g., arranged based on various attributes), easy to access, and easy to search. In some embodiments, the analytics server may monitor user's interactions with various features displayed on these graphical user interfaces. For instance, the analytics server may track how long a user interacts with file accessed through a context (customized GUI). The analytics server may then use the track time to attribute the users worked hours to a particular project as described herein.

For instance, a user can search for data associated with the "Client 12—Superhoops" project. The analytics server may first identify a cluster of nodes within the nodal data structures described herein. The analytics server may then conduct a search for the inputted query within the identified cluster of nodes.

Figure 18H:
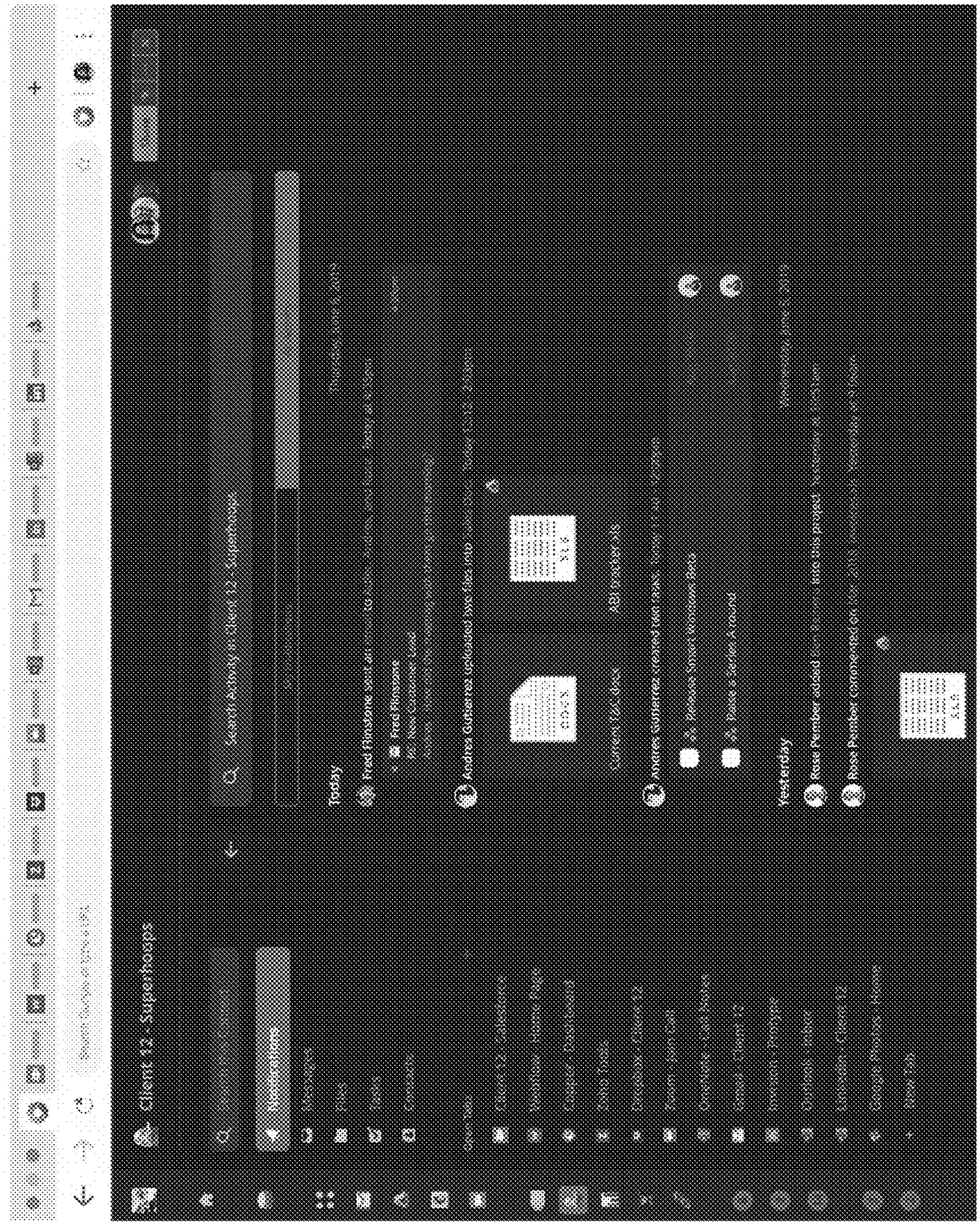
Figure 18I:
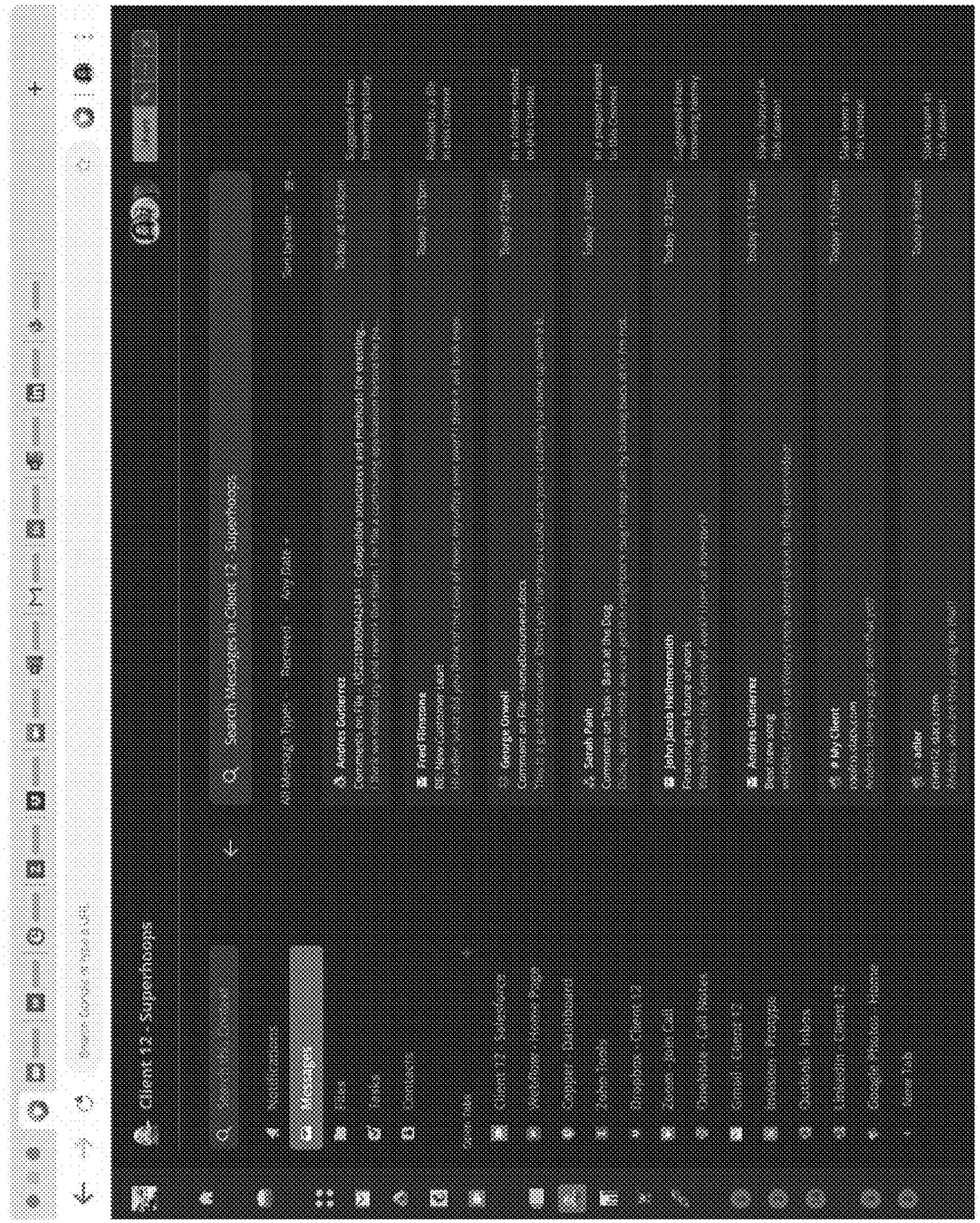
Figure 18J:
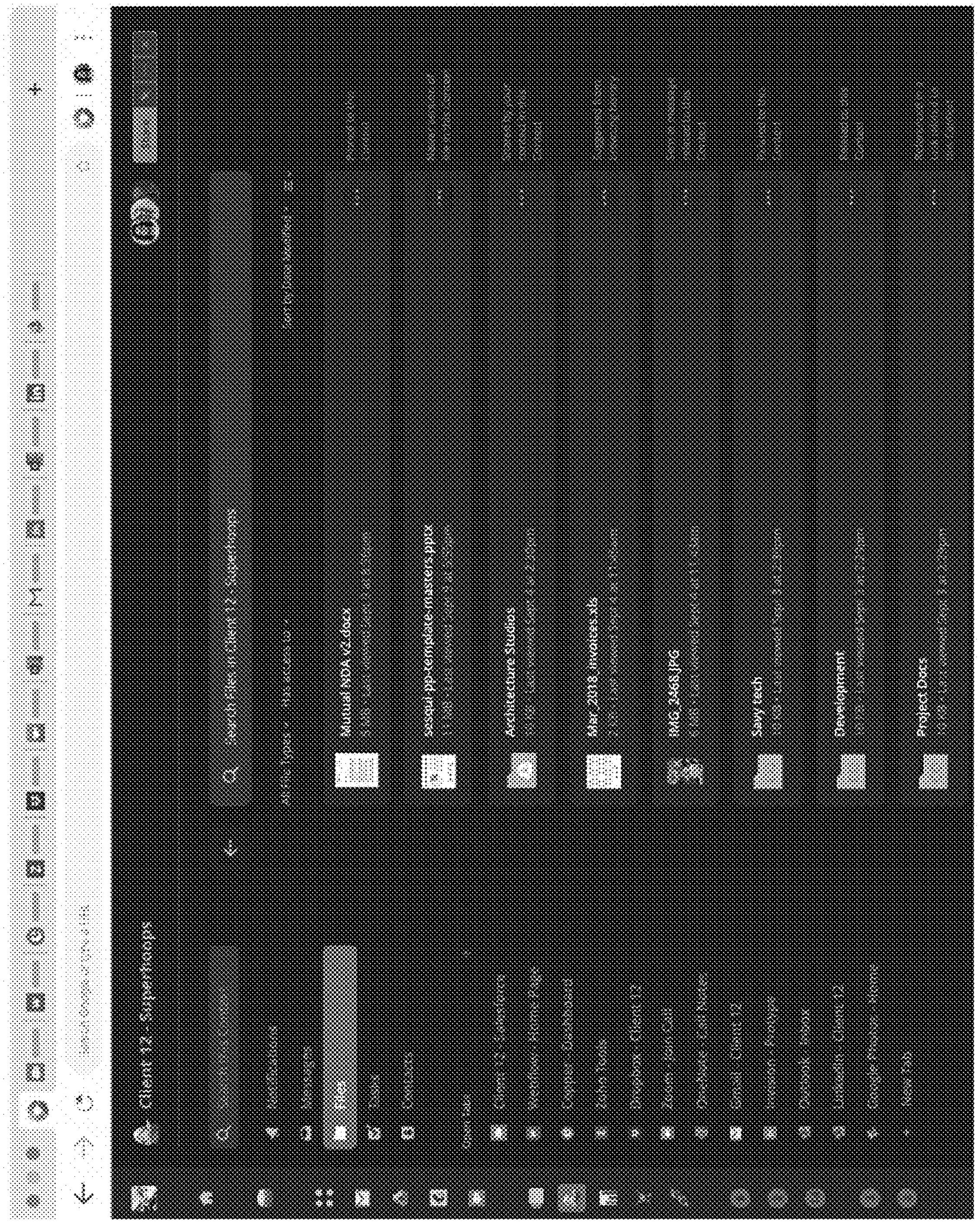
Figure 18K:
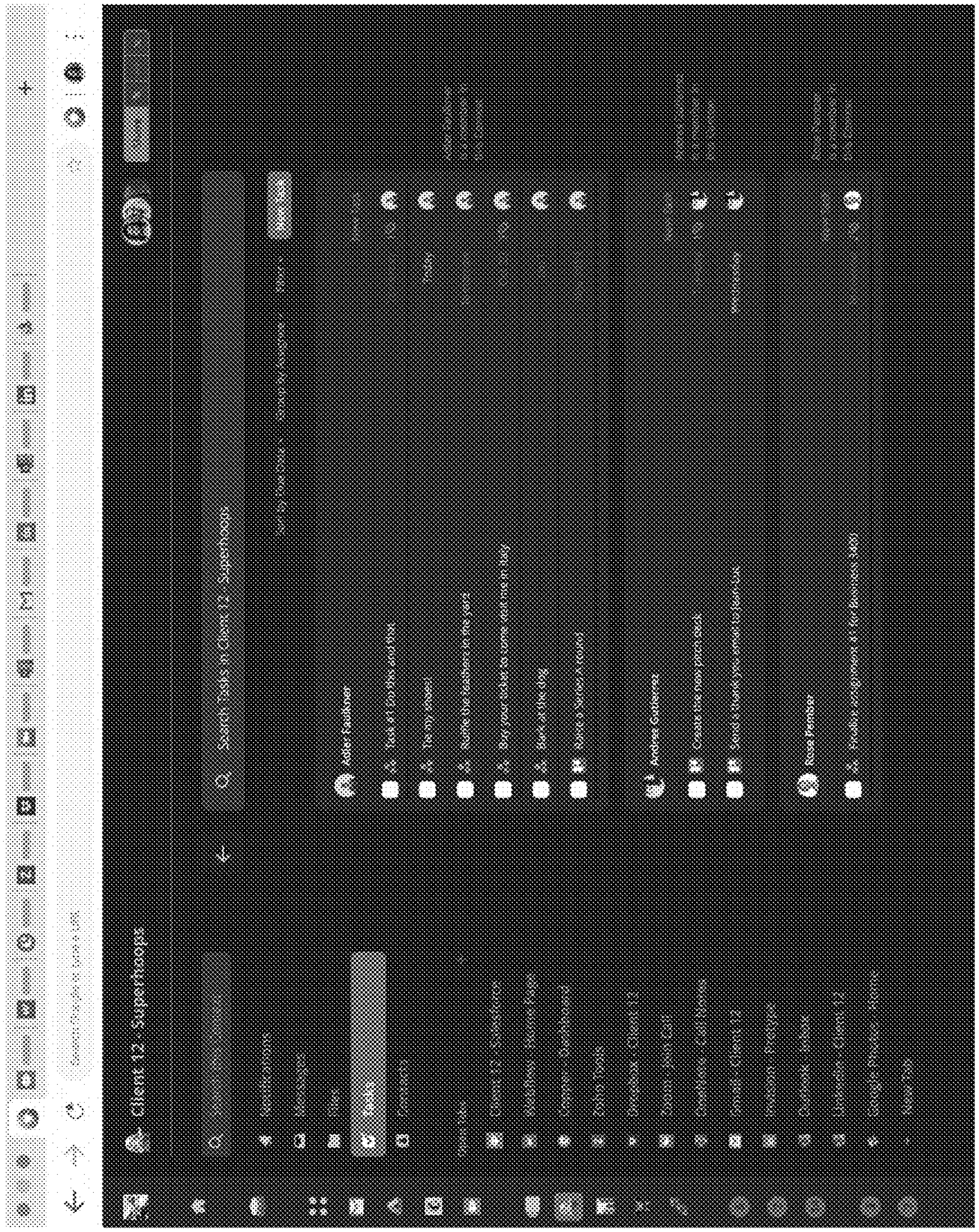

By limiting the search to the cluster of relevant nodes, the analytics server may increase efficiencies and provide better and more relevant results (FIGS. 18H-M). As depicted in FIG. 18H, the analytics server may display all relevant notifications. As depicted in FIG. 18I, the analytics server may display all relevant messages. The retrieved messages may belong to different (internal or external) applications and messaging protocols. However, all the retrieve messages are relevant messages to the selected project. As shown in the right-hand side of FIG. 18I, the reasons for why certain messages are displayed is described, including but not limited to, messages accessed in that context, comments on files related to that context, suggestions based on other user's activity, etc. As depicted in FIG. 18J, the analytics server may display all relevant files. An alternate embodiment of the relevant files is shown in FIG. 18D. Finally, as depicted in FIG. 18K, the analytics server may display all relevant tasks, which may or may not belong to the same application. The analytics server may also provide the users with the option of sorting and/or filtering the retrieve content based on various attributes selected by the user.

Figure 18L:
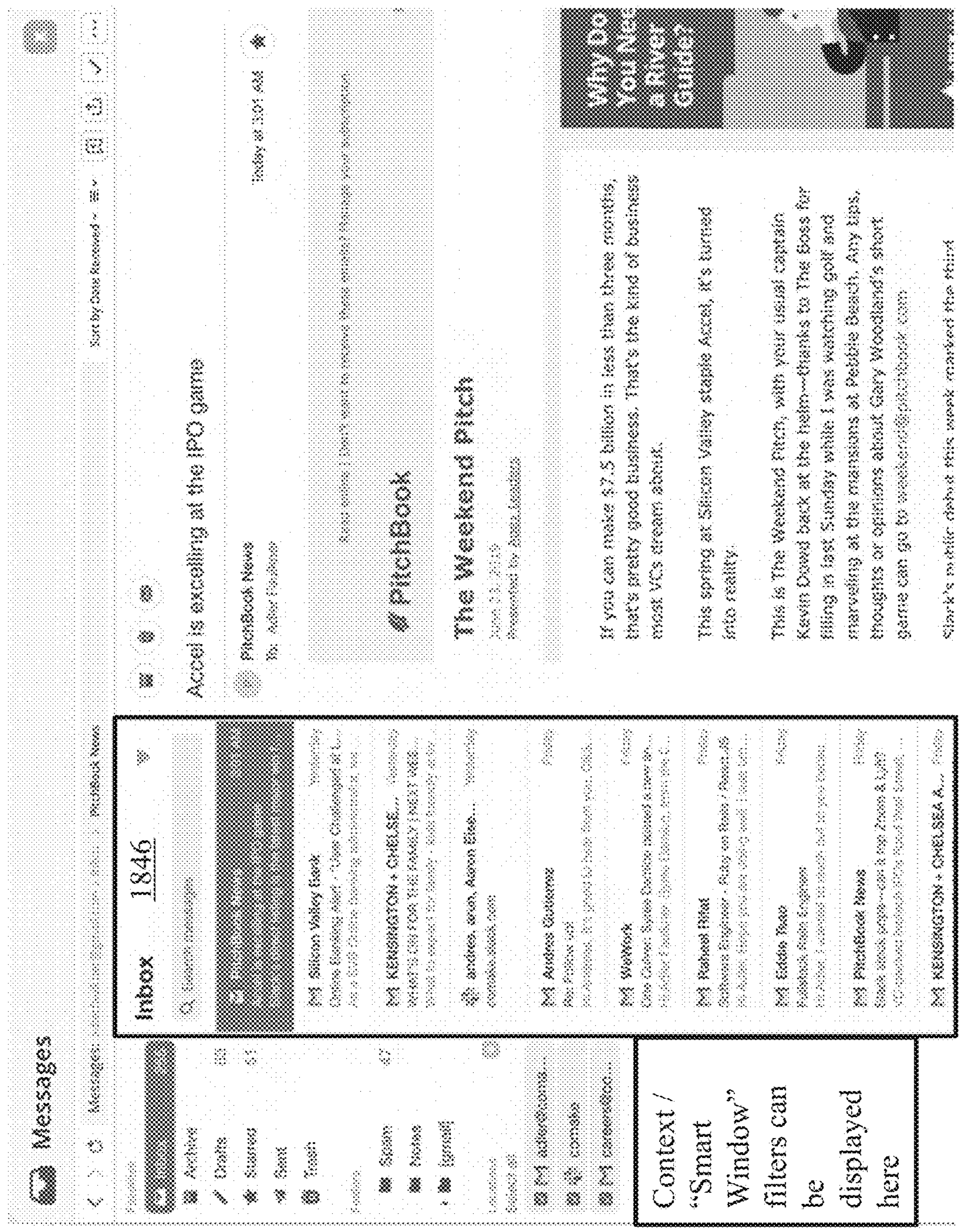
Figure 18M:
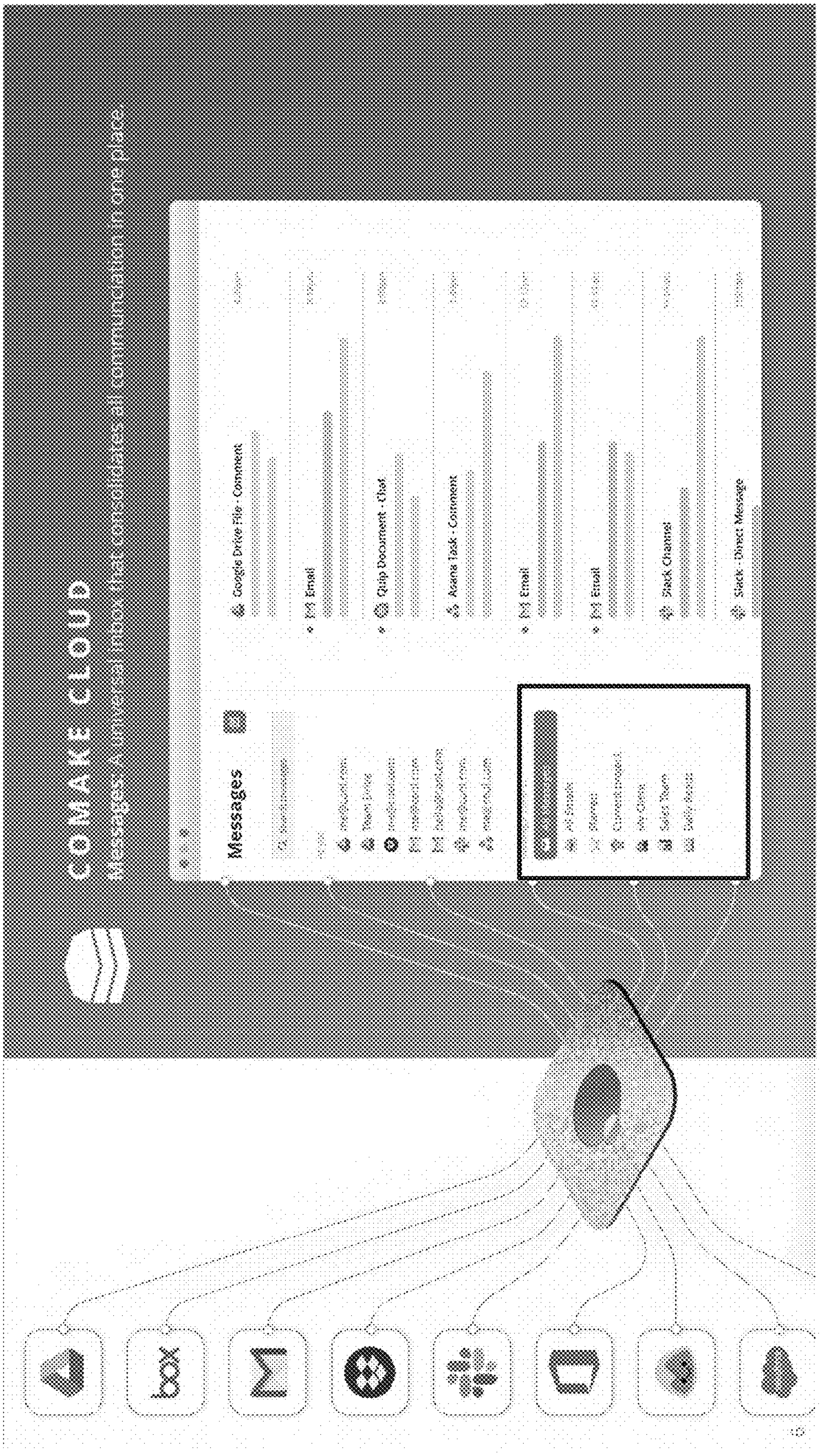

In some embodiments, graphical user interfaces or at least parts of the described GUI features may be integrated into third-party application. For instance, features described herein can be integrated into a third party (or sometimes internal) messaging application as depicted in FIGS. 18L/M. For instance, one or more features described herein can be displayed as a part of the depicted messaging application (e.g., graphical element 1844). Moreover, the analytics server may use the methods and systems described herein to sort/filter messages based on various attributes received from the user. For instance, messages displayed in the graphical element 1846 belong to different messaging applications. However, the analytics server displays the messages, such that they are sorted based on context (e.g., project) not time or the sender.

As depicted in FIG. 29, using the methods and systems described herein, a user may initiate various applications and accounts independently, or manage them in different windows (e.g., browser tabs) grouped by various attributes, such as projects, clients, portfolio, or any other context.

Figure 19:
FIGS. 19-21 illustrate graphical user interfaces displayed by an electronic workflow management software, in accordance with an embodiment.
Figure 20:
Figure 21:
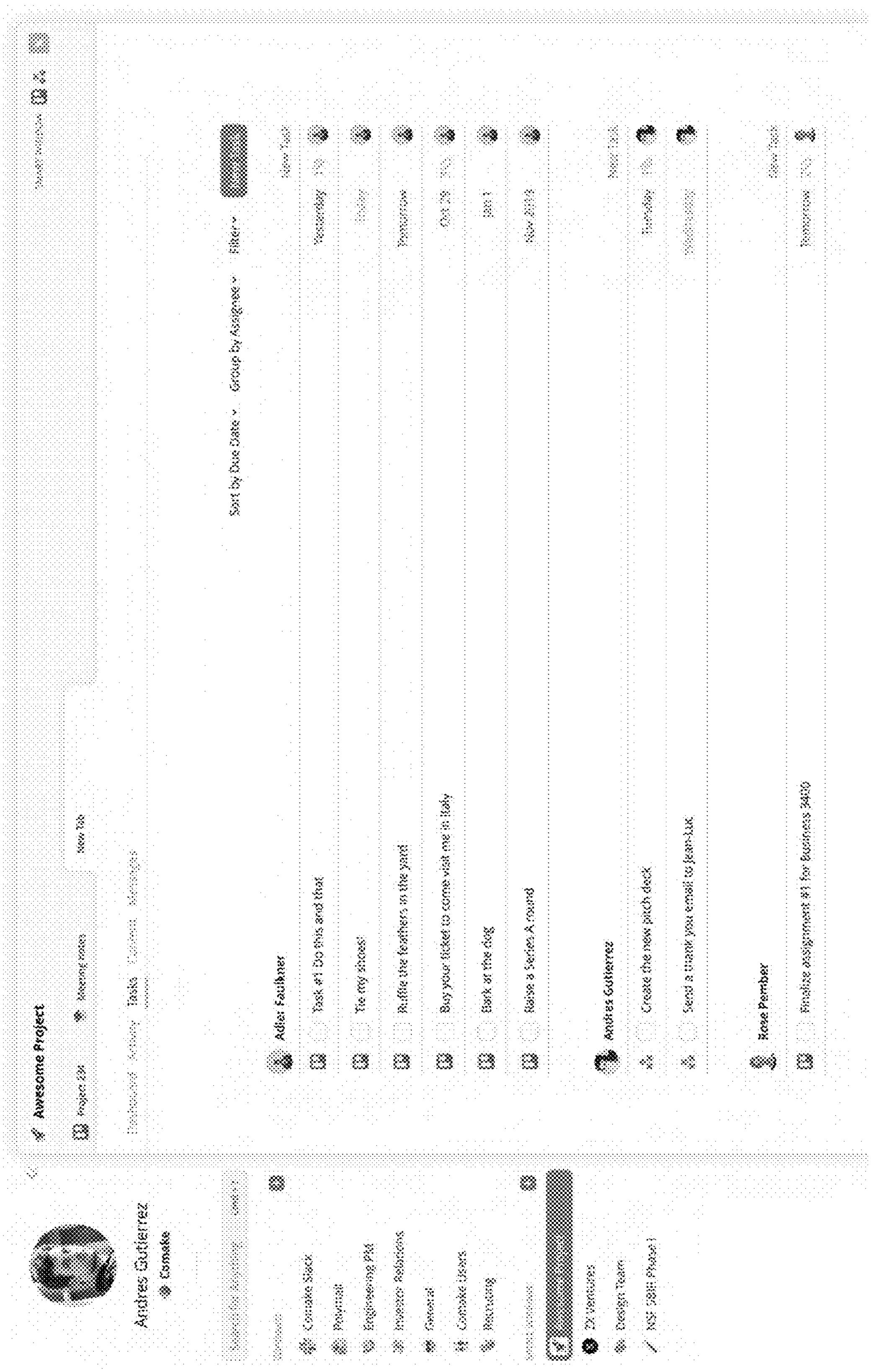

In some configurations, a user may generate multiple "smart windows" and customize graphical user interfaces where each customize graphical user interface corresponds to an attribute. Referring now to FIG. 19-21, as described in GUI 1900, a user may generate different dashboards that correspond to different contexts. For instance, browser tab 1902 and 1904 are applications opened by the user that may correspond to "Awesome Project". The user may use the graphical element 1906 to create new contexts or smart window, such that each new tab within the window shows a contextual dashboard in the new tab page. This contextual dashboard can show all relevant components of work as described above and depicted in FIGS. 18A-M and 19-21. Contexts can be embedded within one another such that one context can be experienced by the user as hierarchically nested within a different context. Similarly, users can pin and relate applications, accounts, systems, resources, and components of work with a given context. For instance, "Project 234" may be a project in Trello® that is a part of "Awesome Project." The user is easily able to open Project 234 in its native Trello® interface, as well as view the relevant tasks without opening Trello® by looking at the dashboards.

Using the methods and systems described herein, the analytics server may display various workflow components (e.g., files, messages, tasks, and other related content) within each smart window. The user may dictate how various data is displayed within each smart window. For instance, as depicted in FIG. 20, the analytics server may sort the content chronologically. In another example, as depicted in FIG. 21, the analytics server may use multiple attributes to sort the content (e.g., sort by due date, creator, and assignee).

Figure 31:
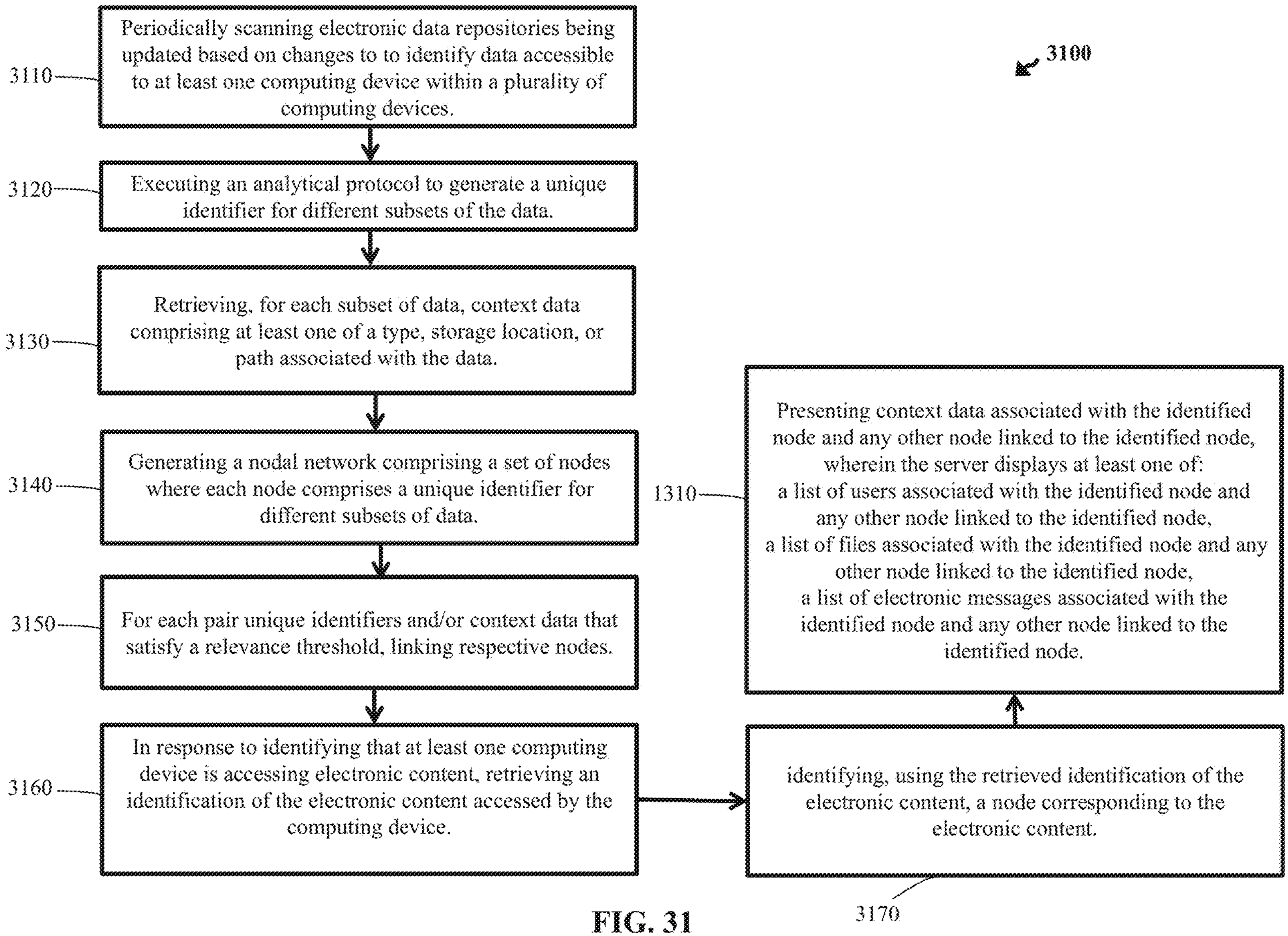
FIG. 31 is a flow diagram of a process executed in an electronic workflow management system, in accordance with an embodiment.

FIG. 31 is a flow diagram of a process executed in a work (or workflow) management system, according to an embodiment. In steps 3110-3150, the analytics server may generate a nodal data structure representing related workflow components or units of work (e.g., files, web-browser history, etc.), as described above. For instance, the analytics server may periodically monitor various files accessible to a network of computers and may generate a representative nodal data structure. The analytics server may also monitor user interactions with those files.

The analytics server may then use one or more of the analytical protocols described above to identify whether two nodes (representing two different files) are related. For example, the analytics server may use the hashing algorithms to identify whether the two nodes represent the same file (e.g., are copies of the same file). In some configurations the analytics server may generate contextually aware unique identifiers for two different units of work that might not be immediately adjacent nodes in the nodal data structure, but that are regardless related to the same topic. For example, two different text string references to the same project articulated using different vocabulary in two different mediums (e.g., a local file and an email) might be understood to be related by the analytics server through an analysis of the known data points and units of work associated with each text string. In an alternate embodiment, a user could manually link both text strings as being related to the same topic. Once the analytics server establishes, through analytical means (e.g., topic modeling) or otherwise, that both text strings are related, and referencing the same topic in this example, the analytics server might generate a unique identifier linking both units of work together.

Even though aspects of the methods and systems described herein may be described in the context of files or units of work, it is expressly understood that these methods and systems are applicable to any data, such as data that may represent components of workflow (also referred to herein as a unit of work). For example, a "file" or "unit of work" may also include any data that is generated as a result of a user interacting with his/her computer that can be contextualized (e.g., file, message, email, thread, contact, task, activity event such as a create or a read event, date and time stamp, physical location, software application, project, class, deal, product, brand, story, client, website, phone number, user-generated tag, machine-generated topic, and the like).

A unit of work for an action performed can be represented by a file, data record, and/or any instance representing the data record. For instance, a unit of work may refer to data created as a result of a user performing an action (e.g., creating a task or transmitting a message to another user). In some embodiments, the data created (and/or the unit of work) may itself be a file (e.g., document file).

Also, as described herein, "electronic content" refers to the content/data being accessed (e.g., displayed or otherwise outputted) by a user. A non-limiting example of electronic content may include a website, and email, and/or a task.

Using the methods and systems described herein, the analytics server may identify and display units of work (stored within the nodal data structure) that are relevant to the electronic content being accessed by the user. For instance, when a user is viewing a website (electronic content), the analytics server may display a chat message and a document (examples of units of work) that are relevant to the website using various GUIs described herein.

The electronic content may also include a series of layered/nested contextual information about the content being presented (e.g., viewed on the user's device). For instance, a user may be logged in as an employee of company X and is accessing a smart window (or any other browser application). The user may be viewing a web application (on website) within the smart window or the browser application. Specifically, the user has opened a word file within the web application. The word file includes an image. In this example, electronic content include all data corresponding to the web application, website, the word document, and the image itself. Specifically, the electronic content may include information about that image and all that context about how, where, and in what context the user has accessed the image.

In some configurations, the electronic content may be the same as the unit of work. In those embodiments, the electronic content being accessed by the user is a unit work that corresponds to information within the nodal data structure. For instance, the user may be viewing a document file (unit of work) and the analytics server may display relevant software applications and contextual actions associated with them, a relevant email and contextual actions associated with it, or other document files (unit of work) and contextual actions associated with them using various GUIs described herein.

Moreover, the analytics server's presentation of data is not limited to displaying the content using GUIs. In other configurations, the analytic server may present the data using CLIs (command line interface), NLUI (natural language user interface), API, Brain-computer interface (BCI/NCI), other sensory measurements that can be used as interfaces/inputs for the analytics server, etc.

The analytics server may use artificial intelligence modeling (e.g. machine learning) techniques described above to determine whether two nodes (corresponding to two units of work, such as an email and a chat session, electronic file, and/or online browsing session) are related. In some configurations, the analytics server may execute one or more AI models using context data retrieved for each file to identify whether two or more files/nodes are related. For instance, the analytics server may identify two nodes/files as being related to each other (and ultimately to a project) because they are accessed by team members working on the same project and that the two nodes/files have been attached to an email between the two team members where the email contained content related to a particular project.

The analytics server may continuously monitor the computers and revise the nodal data structure accordingly. The analytics server may continuously or periodically monitor each computing device within one or more networks of computers. For instance, the analytics server may monitor every computer operated by users (e.g., employees of a company). The analytics server may monitor a unit of work such as a web application displayed on an electronic user device via a software (e.g. a browser extension, a desktop background process) that executes on any computing device operated by a user (e.g., computer, tablet, and/or phone). The analytics server may monitor multiple electronic devices and various applications executing on the electronic devices. The analytics server may also subscribe to or otherwise be notified of relevant activity from electronic devices rather than or in addition to continuously monitoring. The analytics server may communicate with various electronic devices and monitor the communications between the electronic devices and the various servers executing applications on the electronic devices. The analytics server may also monitor one or more units of work via software that executes on a computing device (e.g., a remote server) that is providing data to a computing device operated by a user. As a result, the analytics server may periodically revise the nodal data structure when new relationships and association are identified.

At step 3160, the analytics server may, in response to identifying that at least one computing device is accessing electronic content, retrieve identification of the electronic content accessed by the computing device. Additionally or alternatively, in response to identifying that at least one computing device is accessing at least one unit of work in a "working session", retrieve identification of any unit of work accessed by the computing device.

When the analytics server identifies that a user is accessing electronic content on his/her computer, the analytics server may analyze the electronic content to identify one or more nodes that are relevant to the electronic content. For instance, the analytics server may parse the words within a web site being viewed by a user or analyze the web site using its URL. The analytics server may use this data to search within the nodal data structure and to identify relevant nodes that correspond to different units of work (e.g., files, chat messages, and emails).

Additionally or alternatively, the analytics server may augment the analysis described above by also analyzing other content accessed by the user/computer. For instance, the analytics server may also analyze data associated with different applications being used by the user (e.g., if the user is also accessing a billing software while viewing a website, the analytics server may analyze the user's interactions with the billing software). The analytics server may also analyze other units of work that are accessed by the user and their context data. For instance, if a user is viewing a website and a file at the same time, the analytics server may analyze the file (e.g., identify a node associated with the file) and its context data (e.g., what the folder file is in, a project associated with the file, data embedded in the file, timestamp indicating how the user has interacted with the file, and the like).

Using the identified data, the analytics server may identify relevant data stored onto the nodal data structure and may present the relevant data to the user or to other software applications, such that the user/software can choose to focus information around any of these nodes as they see fit. Given that the analytics server may identify many relevant nodes to the electronic content being displayed on the user's computer, the analytics server may use the above-described analysis to only show relevant data to the user.

In a non-limiting example, the user is accessing a website that is identified to be relevant to ten nodes associated with five projects. Because the user also has a file open that is identified to be associated with one of the five projects, the analytics server prioritizes the nodes relevant to the identified project.

In another non-limiting example, the user is accessing a website that is identified to be relevant to ten nodes. The analytics server also analyzes the user's "working session" and identifies that the website the user is viewing includes an email that has an attachment with an embedded image of an invoice that is associated with a particular project. As a result, the analytics server prioritizes nodes that are relevant to the website being viewed by the user that are also relevant to the identified project. For example, the analytics server may present and prioritize: relevant data and actions associated with the general navigation of web pages; relevant data and actions associated with the general navigation of email messages and webpages, as well as general context data and actions associated with the specific email app being used; contextual data and actions associated with of the identified email message and related data, including message thread, people, message content, attached files, etc.; and/or contextual data and actions associated with to the identified project and its associated nodes such as contributors, key files, dates, and more.

In some configurations the analytics server may generate contextually aware unique identifiers for two different units of work that might not be immediately adjacent nodes in the nodal data structure, but that are regardless related to the same topic. For example, two different text string references to the same project articulated using different vocabulary in two different mediums (e.g., a local file and an email) might be understood to be related by the analytics server through an analysis of the known data points and units of work associated with each text string. In an alternate embodiment, a user could manually link both text strings as being related to the same topic. Once the analytics server establishes, through analytical means (e.g., topic modeling) or otherwise, that both text strings are related, and referencing the same topic in this example, the analytics server might generate a unique identifier linking both units of work together.

The analytics server may continuously or periodically monitor and/or subscribe to or be notified of relevant activity from each computing device within one or more networks of computers. For instance, the analytics server may monitor every computer operated by each user (e.g., employees of a company). The analytics server may monitor a web application displayed on an electronic user device via a browser extension executing on any computing device operated by a user (e.g., computer, tablet, and/or phone). For example, a user may be accessing an online document that has a task embedded within it through a document editing application (e.g. Dropbox Paper) within a smart window in a web browser during a time in which said user is in a meeting registered through a calendar event. In this scenario the user's working session has several units of work that may be identified, including the application being used, the document being worked on, the task within the document, the smart window in which this is all open, and the calendar event that lines up with the current time.

The analytics server may also monitor multiple electronic devices and various applications executing on the electronic devices. The analytics server may also communicate with various electronic devices and monitor the communications between the electronic devices and the various servers executing applications on the electronic devices. For instance, the analytics server may monitor data packages received and sent by each electronic device to monitor the content of what is displayed/executed on each electronic device. The communication may take any suitable form. For example, the electronic device may execute a browser application having an application and/or an executable file that enables a user to navigate to the webpage. The analytics server may monitor all applications causing the electronic devices to perform an action, such as display a document, print a webpage, edit a spreadsheet, share or record the user's screen, render a mobile version of a website, or another form of electronic content to which a user may navigate/access online or offline.

The embodiments of the present disclosure are not limited to webpages/websites accessible via a browser application. The analytics server may monitor electronic devices operated by users to identify any electronic content accessed by the users. For instance, disclosed methods and systems are also applicable to end users accessing local files (files stored locally or on a private network, such as a company network), local tasks or reminders, local contacts, strings of text representing physical addresses or email addresses on locally stored files, etc. For clarity, certain embodiments disclosed herein use a website as a non-limiting example of electronic content accessed/viewed by a user.

When the user performs an activity on a browser application of the electronic device, the analytics server may track the user's activity and current "working session" in order to determine relevant units of work that may be present, such as the application that is open, the electronic content open within said application, any potentially embedded electronic content, and any other contextual information related to who is working on what, how, when, where, and why on the electronic device. The analytics server may use several techniques to track the user's activities on the electronic device, such as by tracking browser cookies, IP addresses, screen-scraping protocols, and information embedded in the URL address. In one example, the analytics server may track the user's activity using IP address. In another example, the analytics server may track the user activity by storing user's web browser cookies. The analytics server may store the cookies as text strings on the user's electronic device local drive, and the cookies may be sent to a system server by the analytics server for user session tracking.

In yet another example, the analytics server may track a user's activities using information embedded in a URL string on a browser application of the electronic device. The analytics server may implement the tracking process by communicating with a webserver (in communication with the electronic device) appending a tracking or query string onto the URL string at the electronic device prior to sending the URL string to a browser. When a web browser accesses the content using the URL embedded with tracking information, the web browser sends the URL string back to a webserver. By monitoring the embedded information, the analytics server may track user activities and then identify a webpage the user is accessing.

In some configurations, the analytics server may locally install a software application (e.g. a web browser extension) onto each user's electronic device. The software application may continuously/periodically track the user's activity and identify which websites have been accessed by the user. The software application (executable file) may be executing as a background process of the electronic device. For instance, the software application may be transparent to the user operating the electronic device. In this way, the analytics server is able to monitor the user's activities and "working session" without disturbing the user and/or disturbing the display screen of the electronic device. The software application may remain in the background (e.g., transparent to the user) until and unless the analytics server displays a pop-up window (or other GUIs) displaying relevant information in the foreground. This pop-up window (or other GUI or GUIs)

may be initiated automatically by the analytics server or by the user manually requesting contextual information and/or actions.

The methods and systems described herein apply to any electronic content accessed by the user, regardless of the platform on which the content is presented. For instance, the electronic content, as described herein, may apply to text viewed by the user (e.g., on a website, on an application executing on the user's computer, such as an email application) and/or images viewed by the user (e.g., an image embedded in a file, such as a PowerPoint file) or an image viewed in an email, or another file attached to an email.

The analytics server may collect the content viewed or accessed by the user's computer and execute various parsing protocols to parse the data. For instance, the analytics server may parse the words and execute natural language processing protocols to identify the words displayed within a website. In another example, the analytics server may capture a video displayed on a user's computer and may execute a facial/object recognition protocol to identify the people and objects within the video.

At step 3170, the analytics server may identify, using the retrieved identification(s) of the unit(s) of work, any node(s) corresponding to the electronic content being accessed on the user on the computer. In some configurations, the analytics server may determine an identification of the electronic content (e.g., webpage) presented or otherwise selected or accessed on or through the electronic device, as well as the identification of the software application through which the electronic content is being accessed (e.g. browser), the identification of the smart window that is open or project/context being worked on/in, the identification of the user accessing the electronic content, and so on. The analytics server may obtain the identity of the unit(s) of work and electronic content using a stored profile, cookies, IP address, request for input of an identification, domain, URL, operating system SDKs, APIs, recording the screen or user interactions and discerning identifiers through analytical protocol(s) (e.g. computer vision process to recognize a web site URL as text on screen that can be matched with a unique identifier) or any other identification method. If the electronic device has accessed a local file, the analytics server may identify an application being used to access the local file a file path associated with the local file.

The analytics server may then determine if the unit(s) of work is/are associated with at least one node within the nodal data structure, and the analytics server may present information relevant to the node. In some embodiments, the analytics server may generate a unique identifier (e.g., hash value) for the electronic content and/or unit(s) of work presented on the electronic user device. The analytics server may then query the nodal data structure to identify whether the unique identifier of the electronic content and/or unit(s) of work matches any unique identifier stored within the nodal data structure.

In some configurations, the analytics server may query a table to identify whether the identified unit(s) of work (e.g., URL of the website displayed on the electronic device, the application through which the website is being displayed, and the "smart window" currently open within the operating system and/or application) is/are associated with any context data of any nodes within the nodal data structure. For instance, when the analytics server identifies that an electronic device has accessed XYZ.com, the analytics server may query all context data to identify whether XYZ.com is relevant to any nodes, or is itself a node, within the nodal data structure. The analytics server may use hard factors and/or soft factors to identify relevant nodes to the units of work, including electronic content, presented on or through the electronic device.

In some configurations, the analytics server may capture various data fields associated with a unit work traditionally understood as "metadata" (e.g. dates, permissions, tags, and folders/folder paths). As a result, the nodal data structure can be generated and periodically revised, such that different clusters of nodes (each representing one aspect of a unit of work) can correspond to a project or any other segmentation of the data. For instance, a cluster of nodes may correspond to a file and another cluster of data may correspond to a department within an organization.

The analytics server may generate a unique identifier associated with the units of work collected and/or content parsed or otherwise understood by the analytics server (step 3160) and use various analytical protocols to generate at least one unique identifier associated with the units of work collected and/or parsed content. In a non-limiting example, the analytics server may use MD5 hashing or the AI models discussed herein. The analytics server may then use the unique ID to identify related nodes. For instance, the analytics server may compare the unique ID of the contextually-understood-content and units of work accessed by the user to information associated with people, files (and other units of work), messages, tasks, data/time, physical locations stored within the nodal data structure.

In order to identify relevant people, the analytics server may evaluate the unique ID (generated based on the content being accessed by the user) with data corresponding to the following attributes of users whose data is stored within the nodal data structure: email address, phone number, address, social profile data, website, names, birthday, ID number, social security numbers, and Other metadata/properties (e.g., associated application/service provider where data may have originated, date profile was created, people who edited profile, etc.).

In order to identify relevant files, the analytics server may evaluate the unique ID (generated based on the content being accessed by the user) with data corresponding to the following attributes of files within the nodal data structure: file contents; file ID, Web site, and/or URL; file title and other file metadata and properties (e.g., associated application/service provider, folder, size, date modified, tags, time stamps, etc.). The analytics server may also analyze the content of the data/metadata associated with the files or other filed embedded within the files (e.g., unique combinations of keywords, locations, time stamps, etc.).

In order to identify relevant messages, the analytics server may evaluate the unique ID (generated based on the content being accessed by the user) with data corresponding to the following attributes of messages within the nodal data structure: message contents; message ID, thread ID, Website/URL embedded within the message, message subject; other metadata/properties (e.g. associated channel/application, sender/receiver, time stamps, etc.); analysis of data/metadata (e.g. unique combinations of keywords, addresses, time stamps, etc.); and MD5 Hash/some other analysis or preprocessing of message (including contents and/or metadata) that result in unique ID or other metric that allows for identification of identical (or comparison of similar) messages.

Non-limiting examples of messages, as used herein, may include text messages, chat messages, email messages, comments, and threads.

In order to identify relevant tasks, the analytics server may evaluate the unique ID (generated based on the content being accessed by the user) with data corresponding to the following attributes of tasks within the nodal data structure: task contents, task ID, Website, URL; task title; other metadata/properties (e.g. assigned to, due date, date modified, project, edit history, comments, subtasks, etc.); Analysis of data/metadata (e.g. unique combinations of keywords, people, time stamps, etc.); and MD5 Hash/some other analysis or preprocessing of tasks (including contents and/or metadata) that result in unique ID or other metric that allows for identification of identical (or comparison of similar) tasks.

The analytics server may also identify related content based on timelines accessed by the user. For instance, a user may be viewing an email that includes a particular date and time. The analytics server may use the methods and systems described herein to identify whether the identified time is related to any content stored within the nodal data structure. For instance, the time being viewed may be related to an ongoing project (e.g., deadline for deliverables).

At step 3180, the analytics server may present context data associated with at least one of the identified node and any other node linked to the identified node, wherein the context data comprises at least one of a list of users (e.g., people, collaborators, and/or other employees), a list of files, or a list of electronic messages associated with the at least one of the identified node and any other node linked to the identified node. The analytics server may present searchable contextual data and contextual actions associated with the identified node(s) and any other node linked to the identified node(s), wherein the server presents at least one of a list of users associated with the identified node and any other node linked to the identified node, a list of files associated with the identified node and any other node linked to the identified node, a list of electronic messages associated with the identified node and any other node linked to the identified node.

In response to identifying one or more nodes associated with the presented electronic content, the analytics server may present an indication corresponding to the file associated with the identified node. The analytics server may also present indications associated with any other files (and nodes) related/associated with the identified node. Furthermore, the analytics server may also present all context data associated with the identified nodes.

The displayed GUI (or CLI or non-visual interface) may present related units of work and actions grouped by context or project. The GUI (or CLI or non-visual interface) presented by the analytics server may also allow users to consolidate all relevant files, such that users can easily work across accounts and navigate through various types of electronic content, units of work/context data. For instance, even if different files are stored within different platforms, a user may access them (if they are designated as related) using the same platform via the displayed GUI (or CLI or non-visual interface).

In a non-limiting example, when a computer operated by a user within a network, for instance, a team member or an employee, accesses a website, the analytics server may display a helpful pop-up window to display relevant information for the user. For instance, if a webpage associated with XYZ.com is displayed on a computer of an employee, the analytics server queries all context data of all nodes within the nodal data structure. The analytics server then identifies whether any node includes data related to XYZ.com and displays a graphical user interface with information relevant to XYZ.com.

The pop-up window (or any other visual or non-visual representation of the related context data and actions) can also be shared with other users. For instance, the user accessing the contextual data and actions (e.g., through a pop-up window) can share any or all data and actions with another user (e.g., via sending an electronic message to the user that links to or attaches the content).

In some embodiments, the analytics server may present the identified data and actions based on a type or category (or one or more attributes within the "working session" associated with the electronic content) of the electronic content accessed by the user. For instance, if the electronic content is a name (e.g., employee name or a client name), then the analytics server may analyze the nodal data structure to identify people. Furthermore, if the electronic content includes any awareness regarding when, where, how, and who (including identified and unidentified units of work) may be accessing the electronic content, it might analyze several nodes together in order to determine the identity of or probability that certain nodes are related to the electronic content. The analytics server may also use this awareness of the broader electronic content/context to prioritize the presentation of contextual data and actions.

When selecting the data to be displayed, the analytics server may weigh the data to be displayed, such that "more important" data is displayed. Therefore, the data to be displayed may be weighted. In an example, the analytics server may weigh certain the contextual data and actions corresponding one unit of work (e.g. the file being viewed may be ranked higher than the application in which the file is being viewed) within the electronic content higher than others. In another example, the analytics server may weigh the identified people based on their respective position (e.g., lead, client, patient, team, applicant (to job, program, etc.), or student) relative to the electronic content being viewed, which may potentially include data about an active user and/or an active project.

The methods and systems described herein also apply to any electronic content/units of work accessed through non-visual interfaces, such as an application programming interface or a natural language user interface. In a non-limiting example, a software application, system, or service may execute the method 3100 as the user accessing or otherwise retrieving a given unit of work and being provided with contextual data from the analytics server. In other embodiments, a software application, system, or service may take the role of a user and directly query the analytics server by providing some or all known data and/or metadata about the electronic content and/or unit(s) of work to the analytics server through an API. In yet other embodiments a user may verbally (or non-verbally) ask an intelligent personal "assistant" a natural language question about a colleague or a project, and the "assistant" could provide an electronic content and/or identify one or more unit(s) of work, and query the analytics server or otherwise be provided, by the analytics server, with contextual data relating to the electronic content and/or identified unit(s) of work. In some configurations, a simple response to a natural language question could be ascertained with some degree of certainty by reviewing the contextual data related to the electronic content and/or identified unit(s) of work. For example a user may ask the "assistant" a natural language question such as "how long have I known this colleague" and the assistant could ascertain that information by the units of work (e.g., which includes history of communication and activity across accounts) related to the identified unit of work (e.g., this colleague).

In addition to the context data discussed herein, the analytics server may present a list of including at least one contact/user associated with the identified node and any other node (and/or actions) linked to the identified node. For instance, the analytics server may identify one or more coworkers (users) who are related to the identified node.

In addition to the context data discussed herein, the analytics server may present a list of files, documents, notes, and other units of work associated with the identified node and any other node (and/or actions) linked to the identified node. Additionally or alternatively, the analytics server may present an electronic message associated with the identified node and any other node (and/or actions) linked to the identified node. Additionally or alternatively, the analytics server may display a task associated with the identified node and any other node (and/or actions) linked to the identified node.

Figure 32A:
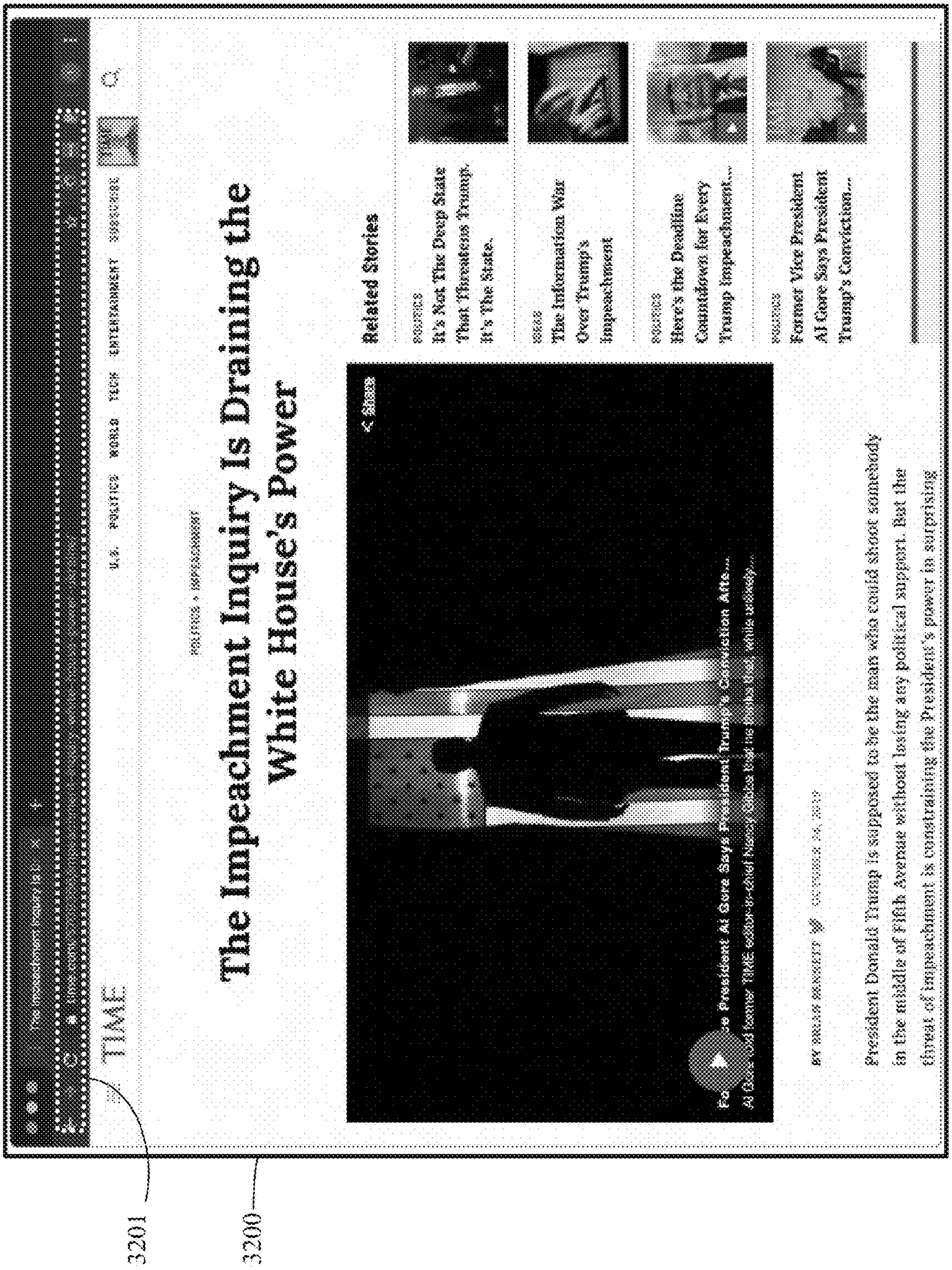
FIGS. 32A-C illustrate graphical user interfaces displayed by the electronic workflow management system, according to an embodiment.
Figure 32B:
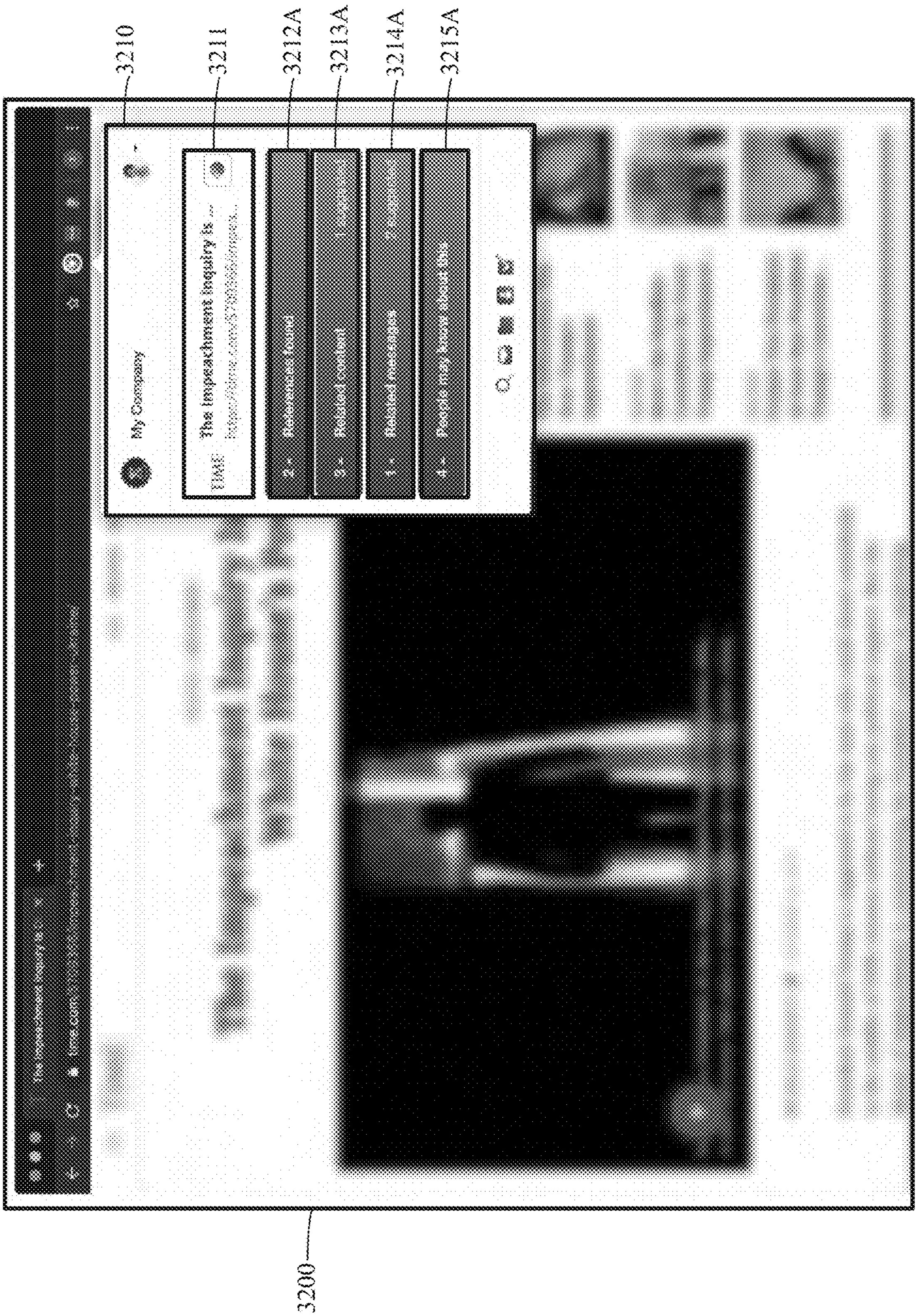
Figure 32C:
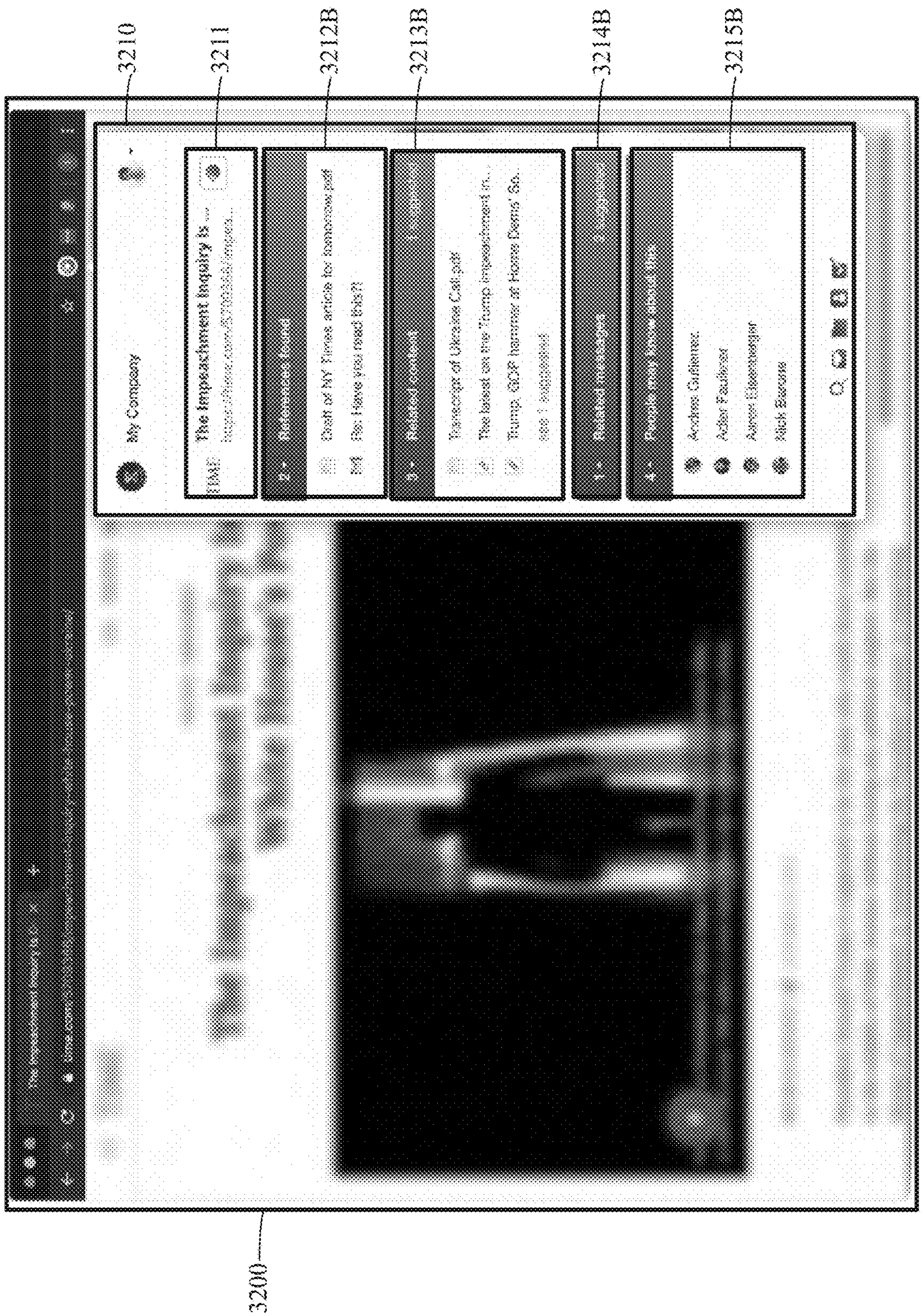

FIGS. 32A-35 illustrate non-limiting examples of how the analytics server can present relevant information and actions on a user's electronic device, according to various embodiments. FIG. 32A-C illustrate how the analytics server presents relevant context data when a user is browsing the web. In FIG. 32A, an electronic device operated by an employee uses a browser application to access GUI 3200. In the depicted embodiment, GUI 3200 represents a webpage having a URL address 3201. The analytics server may monitor the user's activity and identify the URL 3201 associated with the webpage (GUI 3200). The analytics server may accomplish this task using a browser extension and via a background process, such that the analytics server does not obfuscate any part of the GUI 3200.

The analytics server may also accomplish this task by recording the what the user is viewing on the screen or otherwise capturing the communication provided by the computing device to the user and identifying, using certain analytical processes (e.g., computer vision to process the image output by the computing device to a screen) to recognize applications, file paths, and other units of work in the current "working session". In some configurations, the process of monitoring the user's activity, through back-end (e.g., API) and/or front-end (e.g., computer vision) processes, is completely transparent to the end user.

If the URL 3201 does not match any data stored within the nodal data structure, the analytics server may not display any GUIs (or CLI or non-visual interfaces in other embodiments) and the user may not receive any context data. However, in some embodiments, when the analytics server does find a match for URL 3201 within the nodal data structure, the analytics server may create a node associated with URL 3201 in order to relate it to other identifiable units of work such as the open application, the smart window, the user, etc. When the URL 3201 does match data stored within the nodal data structure, the analytics server may display the pop-up window 3210. The pop-up window 3210 may include various graphical components 3211-3215 where each component represents context data grouped together in accordance with predetermined rules and/or the user's preferences. For instance, the graphical component 3211 may display an indication of the unit of work (e.g., webpage) displayed on the electronic device that corresponds to the URL 3201.

The graphical components 3212A may display data associated with any nodes associated with the URL 3201 and/or any nodes that otherwise reference a node for which the URL 1401 is a unique identifier. In a non-limiting example, the analytics server may display relevant electronic files (e.g., documents, notes, audio files, and video files) and messages (e.g., emails, chats, comments) that include the URL 1401 as text or a hyperlink within their contents. The users can customize these graphical components, such that they display customized categories of data and/or actions. For instance, a user may customize the graphical component 3213A to only display audio files or documents.

The graphical components 3212A may display several different types of units of work (e.g., files, messages, other websites, voice notes, video call recording, activity event, calendar invite, etc.) which include within them a "reference" to the same URL as the URL 3201, or a reference to a node for which the URL 3201 is a unique identifier. The analytics server may identify all units of work associated with the URL 3201 (e.g., embedded content, metadata, associated application, associated smart window, etc.). In some configurations, the analytics server may also display webpages from a user's browsing history that reference a given unit of work (e.g., URL 3201). In other configurations, the analytics server may also display any electronic content that has previously been presented to the user through a computing device (e.g., shown on an electronic device's display that is monitored by the analytics server, read out loud to the user by an intelligent artificial assistant, and/or presented to the user through some computing device that is not directly monitored by analytics server such that the presentation is recorded by a second computing device that is monitored by analytics server such as a camera) and that references a given unit of work (e.g., URL 3201).

The graphical components 3213A may display any units of work which may be considered content by the user and/or analytics server, such as files and/or websites, and that are related to any units of work (such as files and/or messages) which reference the URL 3201 or a node for which the URL 3201 is a unique identifier. The analytics server may present any unit of work that might be understood or classified as "content" by the user and/or analytics server (e.g., file, note, website, story, video, etc.) and that is associated with the identified node.

Files/links related to referencing files may include any files/links normally associated with each other through syncing/indexing process (e.g., MD5, files that share emails, files that share email threads, files that share slack threads, files that share tasks, and embedded files/links). Files/links related to referencing messages may include any files/links normally associated with each other through syncing/indexing process (e.g., files attached in messages, and/or links embedded in messages).

In a non-limiting example, the analytics server may present, within the related content section 3213B, suggested "content" (e.g., files, websites, notes) that is/are related to node(s)/unit(s) of work (e.g., versions, time stamps, smart window, etc.) within or otherwise associated with related content 3213A-B, and/or related messages 3214A-B. In some configurations, the analytics server may rank the suggested content using a predetermined attribute (e.g., relevance factor, closeness in nodal graph, timestamps). In some configurations, AI and machine learning methods described above can also be used to improve related and suggested content.

The graphical components 3214A may display any units of work which may be considered messages by the user and/or analytics server (e.g., emails, comments, instant messages, call transcripts, voice notes, etc. using internal or third-party messaging applications) and that are related to any units of work (such as files and/or messages) which reference the URL 3201 or a node for which the URL 3201 is a unique identifier. The graphical component 3215A may display other users who may be related to the identified nodes/unit of works (e.g., the URL 3201). For instance, the analytics server may provide a list of all the people (e.g., contacts or users) most closely associated with the nodes/units of work (e.g., the URL 3201, the news app associated with URL 3201, the context/smart window in which the news app is open, etc.) identified within the current "working session" and within the nodal data structure.

In the graphical component 3214A, the analytics server may present any unit of work that might be understood or classified as "message" by the user and/or analytics server (e.g., email, thread, chat message, comment, etc.) and that is associated with the identified node (e.g., any "message" related to any "reference"). "Messages" related to "references" may include any "messages" normally associated with each other through syncing/indexing process (e.g., MD5, messages that share attachments like files, messages that share embedded links, messages that are referenced in the same tasks, messages that are linked to the same project, etc.).

In a non-limiting example, the analytics server may present, within the related content section 3214B, suggested "messages" (e.g., emails, chats, comments) that is/are related to node(s)/unit(s) of work (e.g., files, time stamps, project, tag, smart window, etc.) within or otherwise associated with related content 3214A-B, and/or related messages 3214A-B. In some configurations, the analytics server may rank the suggested messages using a predetermined attribute (e.g., relevance factor, closeness in nodal graph, timestamps). In some configurations, AI and machine learning methods described above can also be used to improve related and suggested messages.

The analytics server may present messages related to any referencing messages. The following are non-limiting examples of a message that is related to a referencing message:

Shared file between two messages: if copies of same file exist in contents of message A and message B.

Shared web-link between two messages: if copies of the same web-link exist in contents of messages A and B.

Shared task between two messages: if the same tasks reference messages A and B.

The graphical components 3215A-B may display people associated with the units of work described above (e.g., collaborators from the "references", "related content", and "related messages"). The analytics server may rank users by number of occurrences across these units of work. In some configurations, the analytics server may only show a limited number of users related to the identified node/electronic content.

In some configurations, the analytics server may generate a score for each user associated with the identified node, electronic content, and/or the working session. The analytics server may then select a predetermined number of users (with the highest scores) and display an indicator (e.g., name or nickname) each user accordingly. The following is a non-limiting example of how the analytics server may generate a score for each user associated with electronic content and/or nodes:

The analytics server may assign 1.5 points per collaboration on copies/versions to each user. For instance, when the analytics server identifies that a user has a known activity associated with a file (e.g., edited the file), the analytics server may assign 1.5 to that particular user. The analytics server may also assign 1 point per collaboration on copies/versions that user has no activity on (e.g., only accessed the file but not edited the file or received a file in an electronic message from another user).

For related content, the analytics server may assign 0.75 points per collaboration on copies/versions of a file/node on which the user has a known activity (e.g., editing or reviewing). The analytics server may assign 0.5 points per collaboration on copies/versions of files/nodes with which the user has no known activity.

For related messages, the analytics server may assign 1.5 points per collaboration on messages that the user has generated and sent. The analytics server may assign 1 point per collaboration on messages that user was mentioned in the "To" field and/or sent slack message. The analytics server may assign 0.5 points per collaboration on messages that user was mentioned in the "CC" field and/or was recipient in a slack direct message.

Using the predetermined set of rules described above, the analytics server may identify the most relevant users to electronic content. The analytics server may then rank the users based on their respective scores. The analytics server may then only display (e.g., suggest) the top five users or any other predetermined number of users. As discussed above, the analytics server may also execute various machine learning and/or artificial intelligence modeling techniques to improve the score and identify users that are most relevant to the electronic content and/or each identified node.

When the user clicks on a name of a contact or a collaborator displayed in the graphical component 3215B, the analytics server may display context data and actions for the selected contact, including a history of communication and collaboration between the user and the selected contact. The analytics server may also identify and display all the files (or other electronic content) shared between the user and the selected contact/collaborator.

Each graphical component may include at least one interactive element that, when interacted with by the user, may display action and links allowing the end user to access relevant files or other content. For instance, when the user interacts with the graphical component 3212A, the analytics server displays the graphical component 3212B that include interactive links to related units of work (e.g., a link to an email with the subject line of "have you read this?!"). When the user interacts with the graphical component 3213A, the analytics server displays the graphical component 3213B that contains interactive links that could direct the user to the identified units of work (e.g., files associated with the identified node).

The analytics server may also display suggested content. For instance, the analytics server may display an indication within the graphical component 3213B informing the user that the analytics server may have a file that may be related to the electronic content displayed on the user's electronic device. As described above, the analytics server may use a variety of techniques (e.g., artificial intelligence, machine learning, and/or hard factors) to identify whether a unit of work (e.g., a file) is related to the electronic content. For instance, the analytics server may retrieve all context data/units of work associated with one or more "reference", "related content", and/or "related message" (e.g., timestamp of access, users who have permission to access). The analytic server may then execute predetermined protocols (e.g., AI model) to identify whether a unit of work (e.g., a file) can meet the necessary threshold to be suggested as related to the electronic content.

In a non-limiting example, the analytics server (e.g., executing as local machine or in the cloud) indexes a user's work data (e.g., messages, emails, notes, files, tasks, projects, intranet posts, ERP data, and/or CRM data). The analytics server may index the work data at a predetermined granularity level (e.g., individual level, team level, or all company level). The analytics server then finds, or generates via an analytical process, all "unique identifiers" referenced or embedded within the work data. Non-limiting example of unique identifiers may include URLs (e.g., https://nytimes-.com and/or nytimes.com), file paths (c:/my documents/file), email addresses, addresses, phone numbers, people's names, project codes, etc.

In some configurations, the analytics server may generate "unique ID's" from normal/unstructured data (e.g., text and/or images) using AI/machine learning-based clustering algorithms (e.g., topic modeling) to generate potential topics. The analytics server may also generate "unique ID's" from normal/human-readable/unstructured data (e.g., a recording of a screen, an audio or video recording of a meeting, a recording of central nervous system activity or other biological activity, etc.) using AI/machine learning-based algorithms (e.g., computer vision, natural language processing) to isolate units of work and generate unique identifiers that can be matched with or recorded in the nodal data structure.

In some embodiments, the analytics server may use more than generating relationships based on resting data and parsing the contents and metadata of electronic content (e.g., files and messages). Alternative methods of relationship-building/topic-generation could include monitoring a user's working session (including the monitoring of working sessions that are not directly or permanently connected to the analytics server, but that are monitored through sensors, recordings, systems, or other applications that are or can be connected to the analytics server) to understand what is simultaneously open, visible, and/or present in/on a user's workplace, workspace, and electronic device, including what application is in focus, what is open within said application, what are the contents of what is open within said application and if there is anything embedded within said contents, and linking nodes associated with each unit of work (e.g., files) accordingly.

In a non-limiting example, the analytics server may generate a unique ID by identifying whether the user has initiated any applications on his or her electronic device. If the applications executing on the electronic device is/are web applications (e.g., a project management application open in a tab within a web browsing application), the analytics server may retrieve a current URL being viewed on the electronic user device. If the application executing on the electronic device is a desktop application accessing a file, the analytics server may retrieve the file path (e.g., the analytics server mar retrieve a list of open files belonging to a given process executing on the user device).

The analytics server may then use various protocols to scrape content within the file being accessed (e.g., open) on the electronic device. The analytics server may then compare the contents of the file open and being accessed by the electronic user device with context data stored within the nodal data structured (e.g., previously retrieved and indexed based on the user and/or other users' activity) to identify whether the content accessed/open on the electronic user device is related to any other files.

Figure 33A:
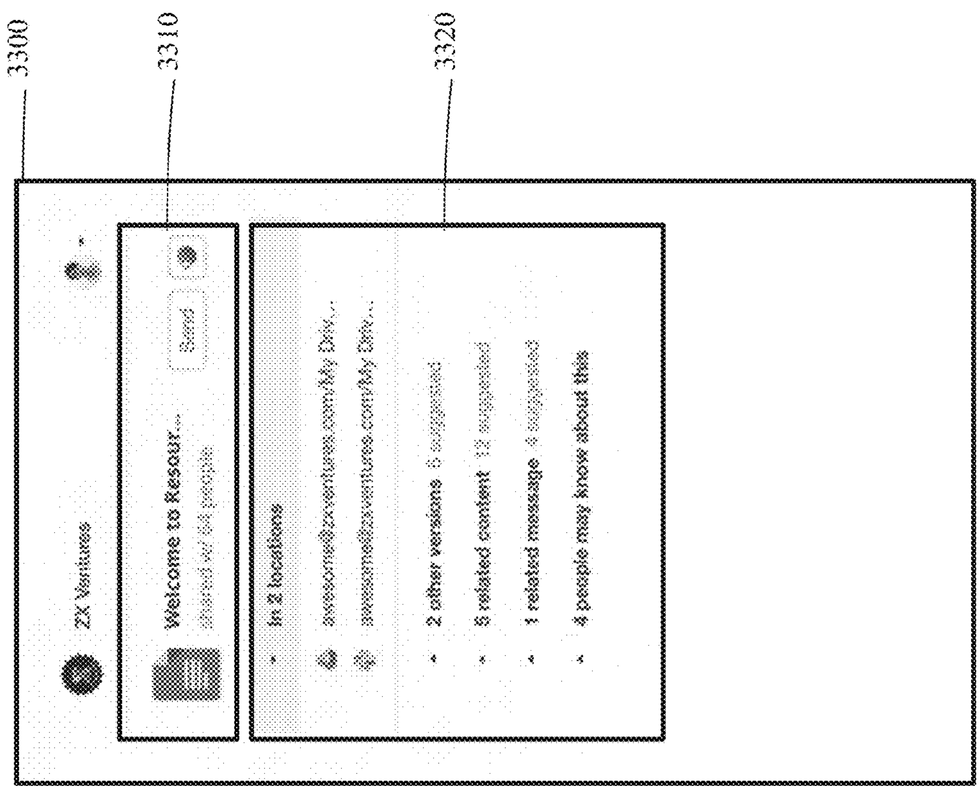
FIGS. 33A-B illustrate graphical user interfaces displayed by the electronic file management system, according to an embodiment.
Figure 33B:
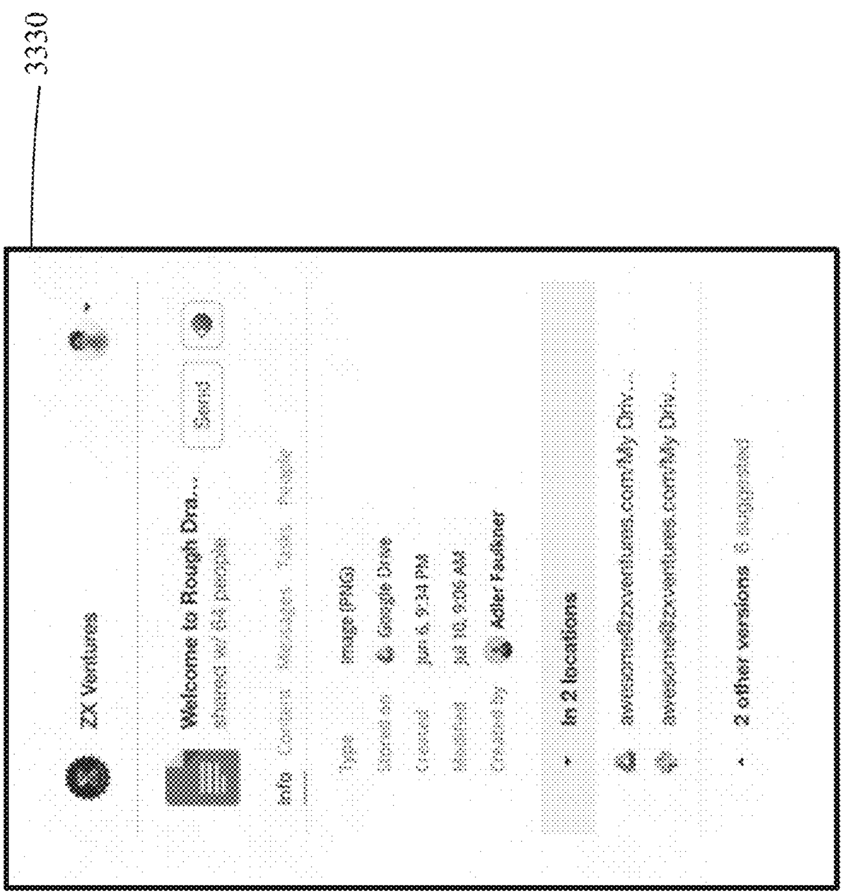

FIGS. 33A-B illustrate a GUI displayed on a user's electronic device when the user has locally accessed electronic content. As a non-limiting example, in this embodiment, the user has locally accessed an electronic file (e.g., an electronic document or a contact) on his/her computer rather than a website.

As described above, the analytics server may monitor the user's activity (e.g., electronic content accessed or viewed on the user's electronic device). The analytics server may then search for or generate unique identifier within the electronic content being accessed and/or viewed on and returns all related associations (e.g., context data associated with related nodes). Rather than utilizing a browser extension, the analytics server may utilize an executable file installed in the operating system that may reside in system tray, for example.

As depicted in FIGS. 33A-B, the analytics server may identify electronic content being viewed as an integrated file or folder (e.g., previously indexed as a "file" or "folder" rather than just a file path, or website URL). The analytics server may then consolidate and show information and metadata specific to that file or type, as well as any other units of work deemed relevant through an analysis of the electronic content (such as the combination of the workspace/company that owns the data, which in this case is "ZX Ventures", and the user/employee accessing data that together establish the domain of data that the analytics server is able to present in the GUI 3300). For instance, GUI 3300 includes graphical component 3310 that displays an indication of and contextual actions for the electronic file accessed by the user. The GUI 3300 also includes the graphical component 3320 that displays the retrieved context data. For example a Google Drive file can be connected with any references, copies, versions, etc. (as explained above) and the analytics server can recognize a given electronic content as relating to that Google Drive file (e.g., by analyzing the ID in the URL).

The GUI 3300 may display contextual associations (data). The GUI 3300 may include contextual actions (e.g., "open in Comake" button) that allow the user to access, move, copy, send, link, add task, or otherwise interact with the identified file in its native content service or other connected/integrated service (opened by the analytics server), depending on the type of action. For example, the GUI 3300 may include a "send in message button" that may initiate a messaging application and include the file as an attachment to the message. The GUI 3300 may include a "collaborators" tab/section, which may be displayed besides the title of the electronic content accessed (e.g., graphical component 3310) that initiates a collaborators overlay where users can easily access contextual information about people that they collaborate on that file with and/or on related units of work with. The GUI 3300 may include a "locations" component that only displays the copies/locations for the current version of the electronic content displayed (or relevant context data identified).

The GUI 3300 may include a "versions" tab/section, which is a graphical component that illustrates versions of different content (e.g., files) by title and the copies/locations those versions may also be displayed/accessed by the user. The GUI 3300 may include "related and suggested files" tab/section, which may show files and links related to/suggested for this file or folder accessed by the user. The GUI 3300 may include "related and suggested messages" tab/section, which may show messages related to/suggested for this file or folder accessed by the user.

The GUI 3300 may include a "people who may know about this" component or button, which is a section showing collaborators related to the units of work, electronic content identified above, and/or messages above. In some configurations, the analytics server may rank the users based on the number of occurrences across these sources. End users may customize all the above-described features. For instance, an end user may customize this feature and instruct the analytics server not to display more than five users.

Figure 48:
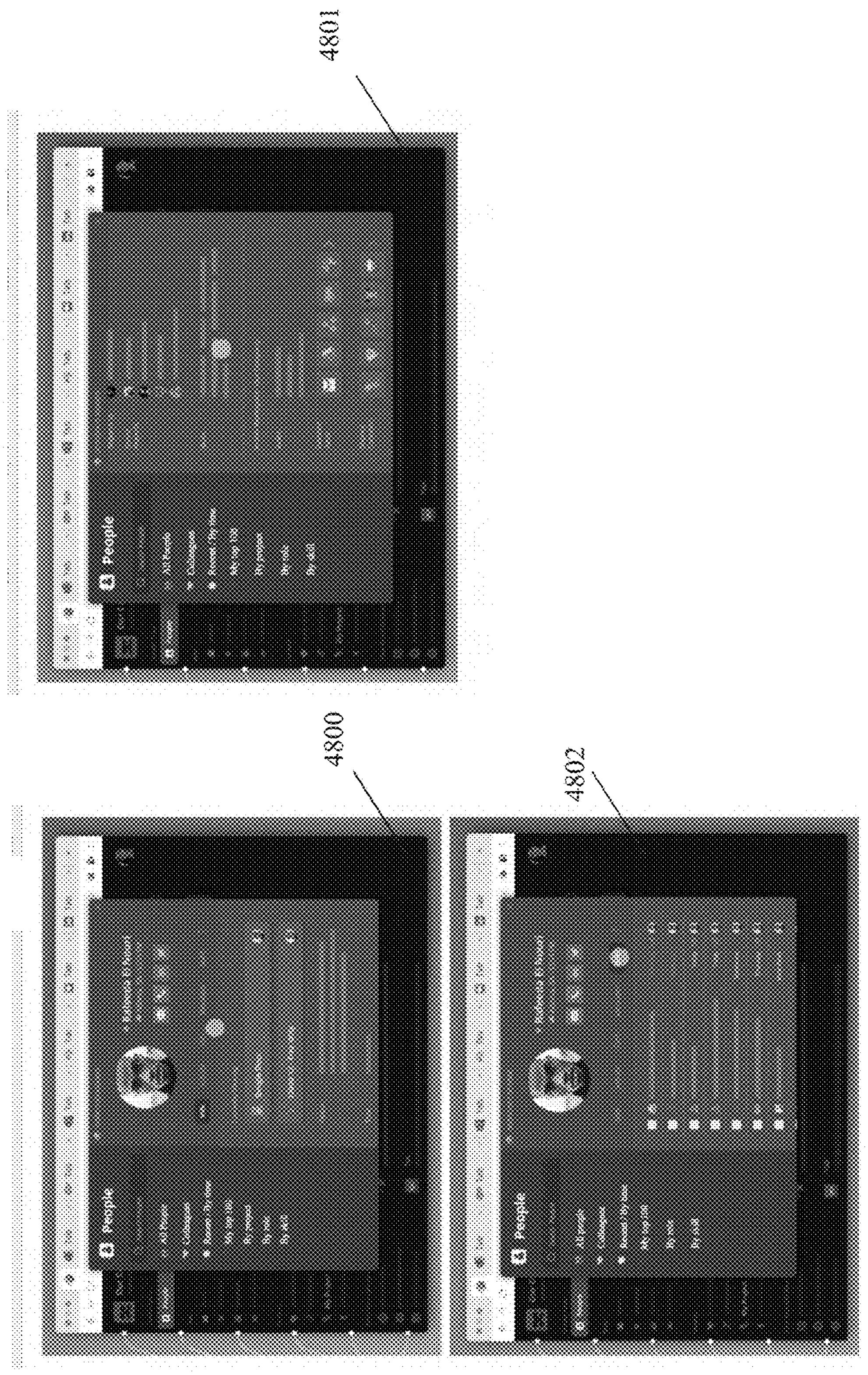

The analytics server may also display each identified person individually and may display data related to each individual, as depicted in GUIs 4800-4802 (FIG. 48). The context and contextualized data discussed herein can also be prioritized and/or filtered based on a category of data selected by the end user. For instance, the analytics server may identify data associated with nodes relevant to the electronic content being displayed on a user's computer. When presenting the data the analytics server may filter the data based on a person (e.g., user) or a category of data (e.g., project). As depicted, GUIs 4800-4802 display the context data where they data is only relevant to a particular user.

As described above, interacting with each tab/section described above, may cause the analytics server to display another graphical component that displays detailed data, as depicted in GUI 3330.

Figure 34:
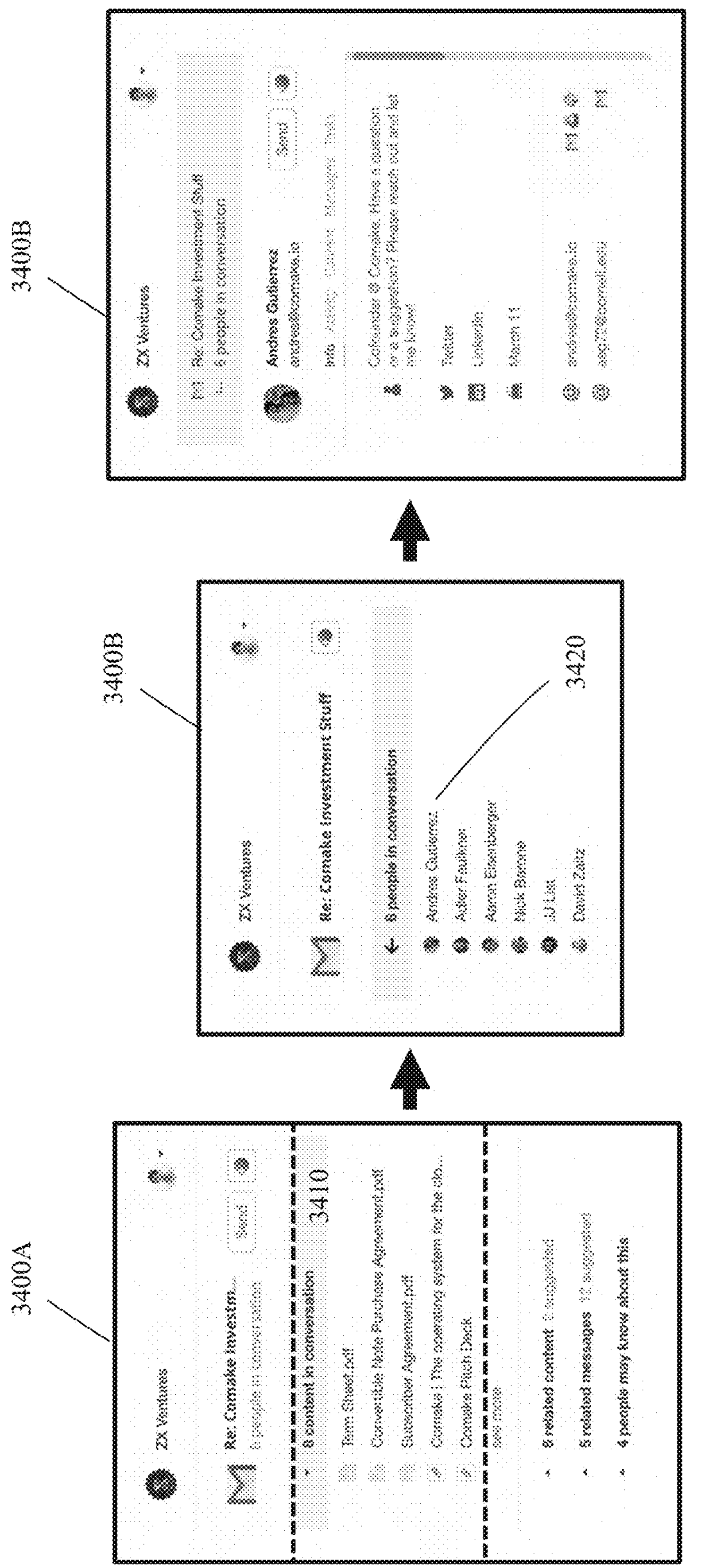
FIGS. 34-49 illustrates graphical user interfaces displayed by the electronic workflow management system, according to an embodiment.

FIG. 34 illustrates a GUI displayed on a user's electronic device when the user has locally accessed electronic content (e.g., the content accessed by the user is also a unit of work). As a non-limiting example, in this embodiment, the user accessed an electronic message that the analytics server has previously indexed as an email.

When the user accesses an email application, the analytics server may monitor the email messages. When the user visits a path (e.g., URL or file path to downloaded messages) that is recognized as an integrated email or email thread (if a path is not available the analytics server can run an analytical process to generate or find a unique identifier for the email message and/or email thread, such as creating an MD5 hash of its contents as described above), the analytics server may display the GUIs 3400A-C. Similar to other GUIs described herein, GUIS 3400A-C can be pop-up windows that display contextual information near the electronic content accessed/displayed (e.g., email displayed on the user's electronic device).

The GUIs 3400A-C may include contextual actions (e.g., an "open in Comake button") that allows the user to access, move, copy, send, link, add task, or otherwise interact with messages in a messaging application, or other connected/integrated service (opened by analytics server), depending on the type of action. GUIs 3400A-C may include "people in this conversation" tab, which displays all (or a selected portion of) senders/receivers of the email or any email in the thread accessed by the user. In some configurations, the analytics server may not display users who have been "bcc" on email threads.

The GUIs 3400A-C may include "files and links in this email thread" component that displays all files and links attached to or otherwise referenced within this email/thread. The GUIs 3400A-C may include "related & suggested content" component showing units of work determined to be content by the user and/or analytics server (e.g. files and certain websites/links) related to/suggested for this email/thread. The GUIs 3400A-C may include a "related & suggested messages" component that displays messages related to/suggested for this email/thread. The GUIs 3400A-C may also include "people who may know about this" component displaying collaborators from the files and messages above.

In the depicted embodiment, the user accesses an email message and the analytics server displays the GUI 3400A that includes the graphical component 3410 that displays the content attached to (via uploaded file or via hyperlink to cloud-based file) the email displayed (or the email thread). The analytics server may also display people involved in the email displayed on the user's electronic device. For instance, the analytics server may display the GUI 3400B that lists all users involved in the email. In some configurations, the analytics server may not display one or more users based on predetermined rules. For instance, the analytics server may not display all users who have been blind copied on the email thread.

The GUI 3400B may also include an interactive button 3420. Upon the user interacting with the button 3420 (e.g., each user displayed), the analytics server may display the GUI 3400C. The GUI 3400C displays information regarding Andres Gutierrez (interactive button 3420).

Figure 35:
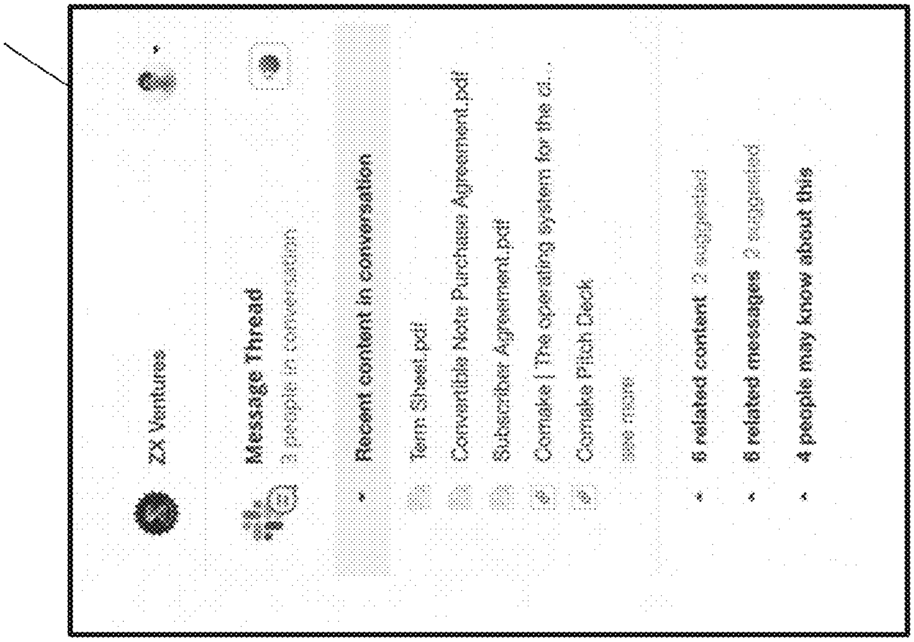
Figure 35:
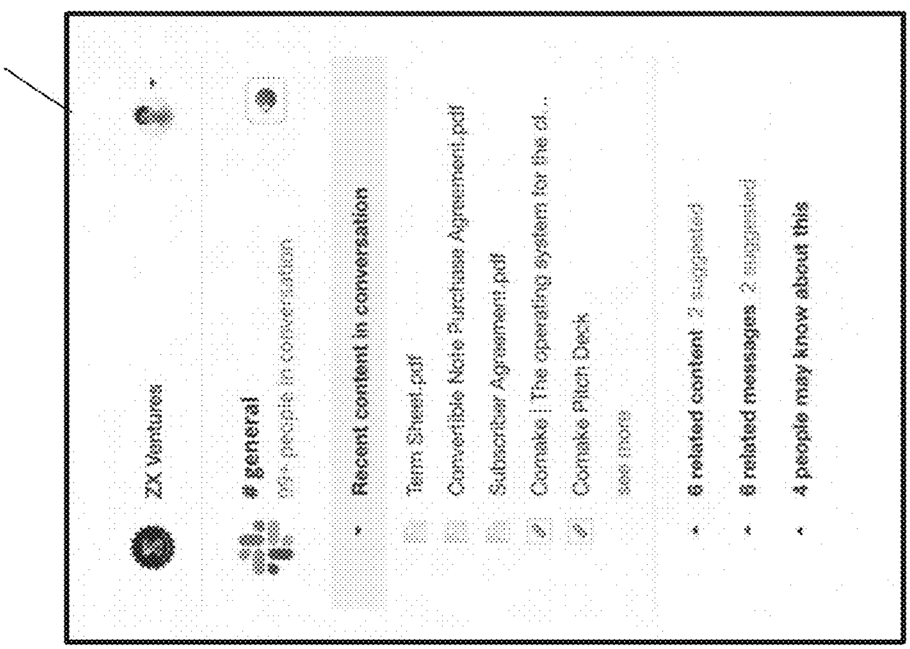

FIG. 35 illustrates GUIs displayed on a user's electronic device when the user has locally accessed electronic content. As a non-limiting example, in this embodiment, the user has accessed is recognized by the analytics server as a group messaging channel that been previously indexed as a group chat/slack channel or direct message.

The GUIs 3500A-B display additional information when a user has accessed a messaging thread. In some configurations, the GUI 3500A displays additional data displayed by the analytics server when the electronic content accessed by the user is recognized as including an integrated slack channel/direct message/thread. In some configurations, the GUI 3500B displays additional data presented by the analytics server when the electronic content accessed by the user is recognized as including an integrated slack thread. The GUIS 3500A-B may include "people in this conversation" component displaying all senders/receivers within the messages displayed in the thread/channel accessed by the user.

The GUIs 3500A-B may include a "recent files and links in this chat" component that displays a few recent files and certain web site/links attached to or otherwise referenced within this slack channel or direct message. The GUIs 3500A-B may include "related and suggested content" component that displays files and certain websites/links related to/suggested for this slack channel/chat thread. The GUIs 3500A-B may include "related and suggested messages" displaying messages related to/suggested for this slack channel/chat thread. The GUIs 3500A-B may include a "people who may know about this" component that displays collaborators from the files and messages above.

In some configurations, if the electronic content viewed by the user corresponds to content that is recognized as a message (e.g. comment, reply) that has been previously indexed (by the analytics server) as a thread/comment over a chat message. The analytics server may then display the following components in addition to the above-described components. For instance, the analytics server may display a "related files and messages" that displays related files, links, or messages related to the ones posted in this thread. The analytics server may also display a "suggested files and messages" that displays recent files and messages. The analytics server may also display a "people who may know about this" that displays people (e.g. collaborators) associated with units of work referenced above (e.g. the files and messages above).

Additionally or alternatively, the user can interact with the context data displayed herein (e.g., content displayed within the graphical elements depicted in FIGS. 32-35) to edit the information identified by the analytics server. The graphical components displaying the context data may be editable (e.g., similar to a live document). As a result, the user may add/edit and/or add other elements/metadata/relationships. The user can also edit (add or remove) any information provided and displayed by the analytics server (e.g., related users, content, and messages). As a result, the analytics server may update the nodal data structure and refine the nodes and their corresponding data using the method, systems, and GUIs described in FIGS. 31-35.

In some embodiments, the context data may be requested by the user. For instance, the user may be viewing electronic content and may select (e.g., tag) a certain unit of work associated with the electronic content and request the analytics server to display data and actions (from the nodal data structure) that are related to the specific subset of the electronic content. For instance, when a user is viewing an email, the user can highlight a portion of the text (e.g., a name that appears within the email) and instruct the analytics server to display data associated with the selected portion. As a result, the analytics server may use the methods and systems described herein to display related/context data.

The methods and systems described herein allow a user to access data associated with related nodes (e.g., contact information, related files and other workflow information, and other context data associated with the content being viewed by the user) without requiring the user to switch applications. The analytics server may utilize a software application (e.g., a browser extension) to identify and display the data described herein. For instance, the analytics server may highlight/underline/otherwise notify the user that something within the content they are viewing has been identified by the analytics server (e.g., on a browser application, such as checking emails or a native application). When the user interacts with the highlighted content, the analytics server may display searchable contextual/related data and actions as described herein. For instance, the user may hover a cursor over a word within an email displayed on the user's browser and the analytics server may display one or more of the graphical elements and components described above that provide detailed information regarding the word over which the user has hovered.

In another non-limiting example, the user may be viewing an email that contains a physical address. The analytics server may, in real time, search within the nodal data structure. If the physical address is found to be related to a node/unit of work or to be a node/unit of work itself, the analytics server may provide context data associated with the physical address that may be displayed in a pop-up window. The pop-up window/overlay may display emails and other communications that relate to the physical address, calendar events associated with the physical address, other employees associated with units of work (e.g., calendar events) that are associated with the physical address, and information retrieved from other applications, such as accounting software, invoicing software, CRM software, and the like. For instance, the analytics server may indicate that the physical address is associated with a contract and display information related to the contract (e.g., parties associated with the contract, amounts, items sold, services provided, and/or timelines).

The systems and methods described herein can be implemented through/using hardware, operating systems, native software applications, browser extensions, websites, or at the system operator level. For instance, the analytics server may analyze the content that is presented to a human user and that is meant to be easily understood by a user ("human-readable content") (e.g., image, video, natural language, etc.) in order to try to identify units of work in the working session/electronic content. For example, the analytics server may recognize within a recording or an image of the display screen, on which the "human-readable content" is presented to the user that a web browser is open, and that said web browser is open to a given file within a given web-based application (thereby identifying at least three units of work). Alternatively, the analytics server may recognize that a particular software application (native application, such as an internal CRM application) is open. When implemented at the system operator level, the analytics server may analyze all data accessed/viewed/heard by the user regardless of the application transmitting and/or displaying the data.

The methods and systems described herein can also be integrated with other searching methods, such that the user can query the data within the nodal data structure. For instance, the analytics server may be in communication with a search engine where the analytics server receives query terms, performs the methods described herein to identify appropriate nodes and their corresponding data (query results), and transmits the query results back to the search engine. Additionally or alternatively, the analytics server may display the query results as described herein.

Figure 36:
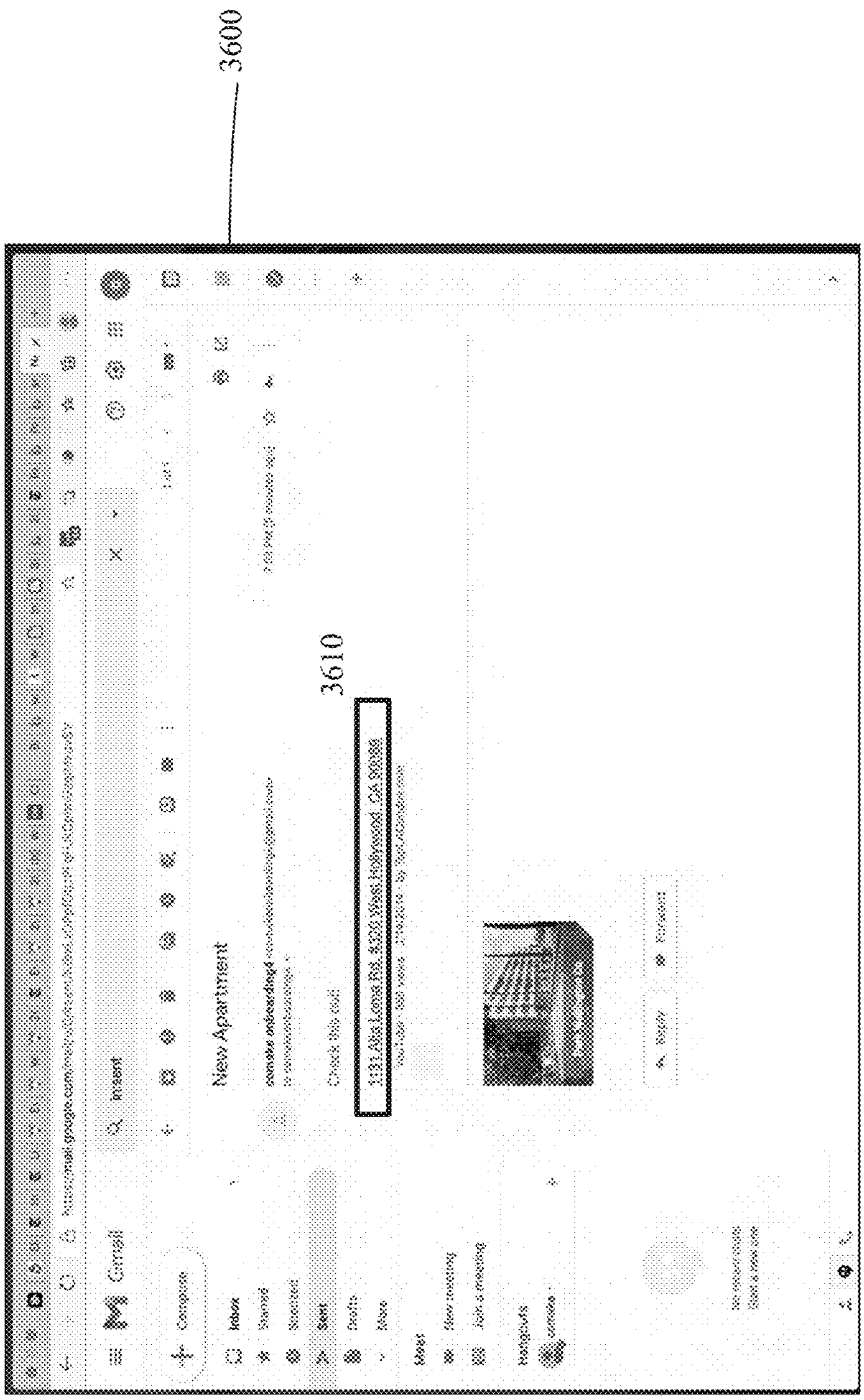
Figure 37:
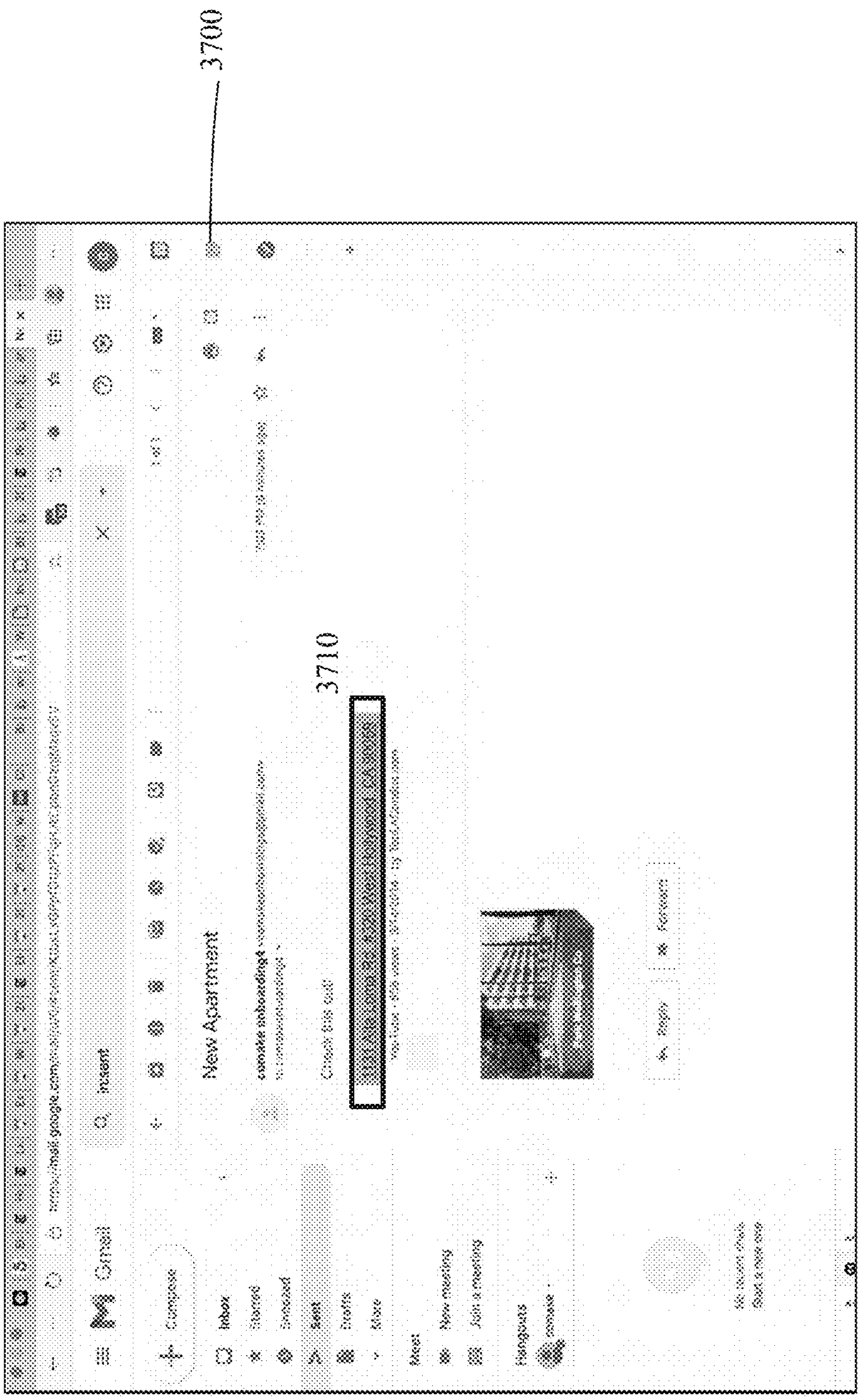
Figure 38:
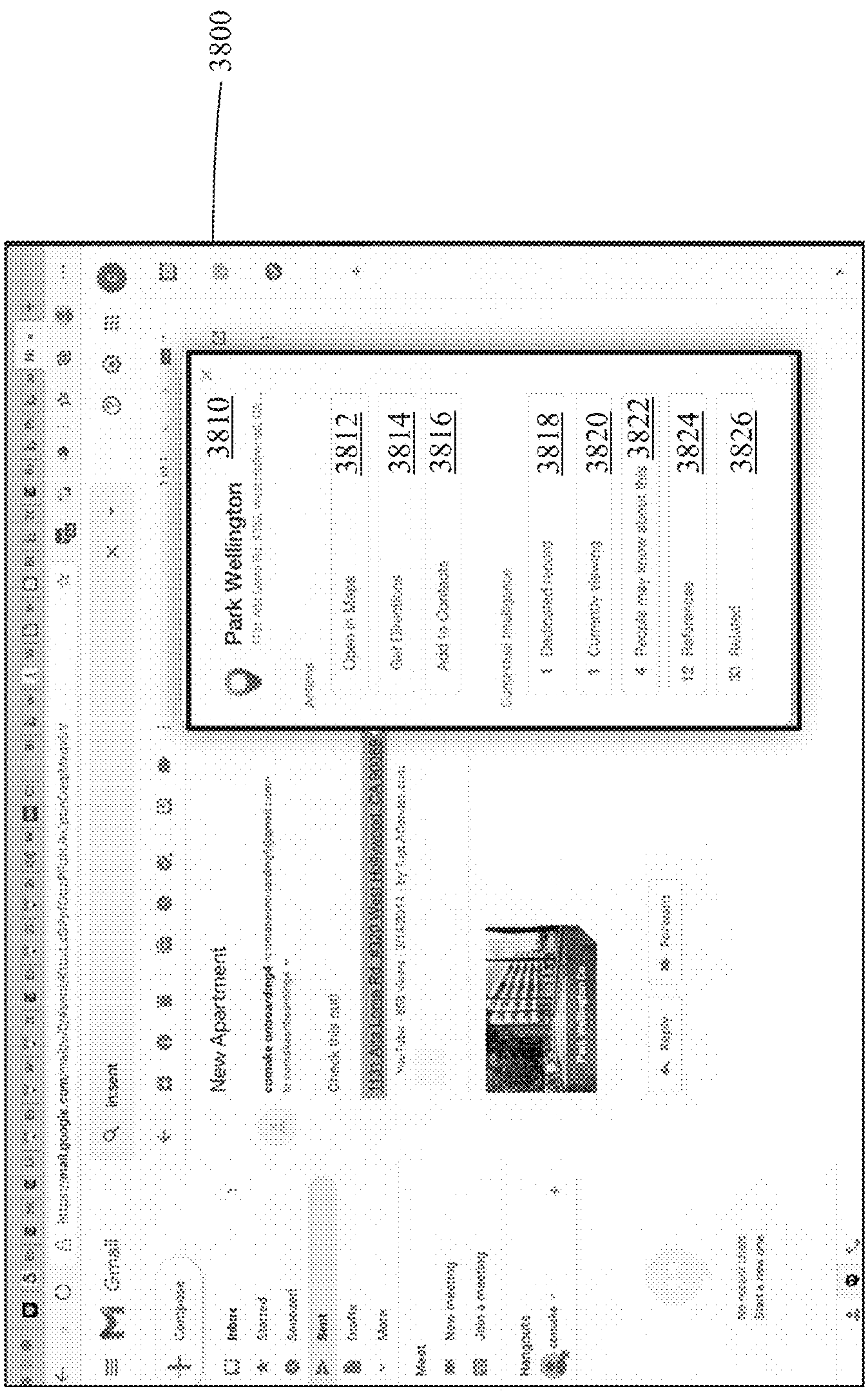

Referring now to FIGS. 36-38, a non-limiting example for displaying/presenting contextual data and actions on units of work that are embedded in the electronic content or that are otherwise identified as being accessible by the user or the screen is shown. In this non-limiting example, a user accesses an email message using a web-based application within using a browser (desktop) application, as depicted in the GUI 3600 (FIG. 36). The contents of the user's email message include a physical address 3610. The analytics server parses the words displayed within the GUI 3600. The analytics server may execute various analytical protocols (e.g., computer vision, natural language processing, regex protocols, etc.) to identify the physical address 3610 as a physical address. The analytics server may then use the physical address as, or generate a new, unique ID for the physical address 3610. The analytics server may then query the nodal data structure to identify context data related to the unique ID corresponding to the physical address 3610. If no node or reference to the physical address 3610 exists in the nodal data structure, the analytics server may create a new record within the nodal data structure.

When the user hovers over or otherwise interacts with the highlighted text 3710, the analytics server displays the GUI 3800 that includes the graphical element 3810. In the graphical element 3810, contextual data and actions associated with the highlighted text 3710 are displayed. Specifically, the analytics server may help direct/provide directions to the user to the location, such as by directing the user to an application or website that displays the map (3812) or displays directions (3814). The analytics server may provide the user with the option of saving the physical address 3710 (e.g., by linking it to a unit of work such as a contact, event, tag, project, or application) (3816). The analytics server may also indicate that it has identified dedicated records such as a record for the address 3710 within a property management system (where the unique ID within that record is also the primary identifier for the user) (3818). The analytics server may also indicate that it has identified one user currently viewing data related to the highlighted text 3710 (3820). The analytics server may also indicate that it has identified four contacts (3822), identified twelve references or documents (3824), and 33 related units of work (e.g., emails and chat messages) that are related to the highlighted text 3710.

When the user hovers over the highlighted text 3710, the analytics server displays the GUI 3800 that includes the graphical element 3810. In the graphical element 3810 displays data associated with the highlighted text 3710. Specifically, the analytics server may direct the user to a third party, such as by directing the user to an application or website that displays the map (3812) or displays directions (3814). The analytics server may provide the user with the option of saving the physical address 3710 as contact and/or linking it to an existing contact (3816). The analytics server may also indicate that it has identified one user currently viewing data related to the highlighted text 3710 (3820). The analytics server may also indicate that it has identified four contacts (3822), identified twelve references or documents (3824), and 33 related units of work (e.g., emails and chat messages) that are related to the highlighted text 3710.

In a non-limiting example, the analytics server may be in communication with a search engine that utilizes artificial intelligence assistant to communicate with the user. The search engine may receive a text string from the user. The text string may be a question presented to the search engine in natural language such that the search engine (or the "assistant" or the analytics server) may understand the intention behind the question (e.g. through an artificial intelligence model using natural language processing and/or deep learning models specialized for intelligent search), such as the type (and other properties) of data that the user is looking for as well as what it relates to (e.g., units of work, electronic content, query terms for the analytical server). The analytics server may then use any query terms provided or data provided by the processing of the natural language query to identify one or more units of work within the nodal data structure described herein. The analytics server may identify relevant nodes, retrieve corresponding data, and transmit the retrieved data to the search engine (or a server associated with the search engine, or the "assistant", or a server associated with the assistant, etc.) for display. The search engine (or the "assistant" or the analytics server) may, in certain configurations, return these answer as links to units of work/other data that contain the answers. The search engine (or the "assistant" or the analytics server) may, in other configurations return a simple answer to the natural language question in a natural language form by using certain analytical processes (e.g., through an artificial intelligence model using natural language processing) suggested answers from the nodal data structure.

Additionally or alternatively, the analytics server may also act as the search engine. Therefore, the search engine, as discussed herein, may be operated by the analytics server or a third party. For instance, the analytics server may display a search engine (e.g., on the user's browser) where the user can input a natural language query. The user can then conversationally ask the analytics server to identify context data related to a unit of work (e.g., email, client, employee, and/or chat sessions). The analytics server may then display the results using the non-limiting examples of the graphical components described herein.

Additionally or alternatively, the analytics server may perform the above-described operation to identify data related to what is being viewed by the user. For instance, when the user views an email, the analytics server may retrieve the sentences displayed within the email. The analytics server may then apply natural language processing algorithms and other analytical protocols (e.g., the artificial intelligence model discussed above that may be operated by the analytics server or a third party) to identify query terms. The analytic server may then query the nodal data structure accordingly. The analytics server may then display the query results using various graphical elements, vernal, or other and components described herein.

For instance, a user may access a search bar generated and/or hosted by the analytics server. The user may input "what were the final deliverables for project X?" While conventional search engines may display a list of deliverables, the analytics server may also display context data relate to project X including employees who worked on the project, address associated with project X, billable hours, and all other data discussed herein using one or more of the GUIs described herein.

Additionally or alternatively, the analytics server may rank the search results based on the data identified within the nodal data structure. For instance, the analytics server may rank the results of the user's search based on an attribute of the nodes identified to be relevant to the user's search. For instance, search results associated a higher number of nodes within the nodal data structure may be ranked higher than another search results. Also, as described herein, certain nodes may be weighted based on their content (e.g., a node associated with a CEO might be weighted more than a node associated with an intern). Therefore, search results may be ranked differently based on the weight of their corresponding weights. As a result, not only the analytics server identifies searchable data, it also ranks them, such that the results are prioritized and tailored based on the end user interacting with the search query.

Figure 39:
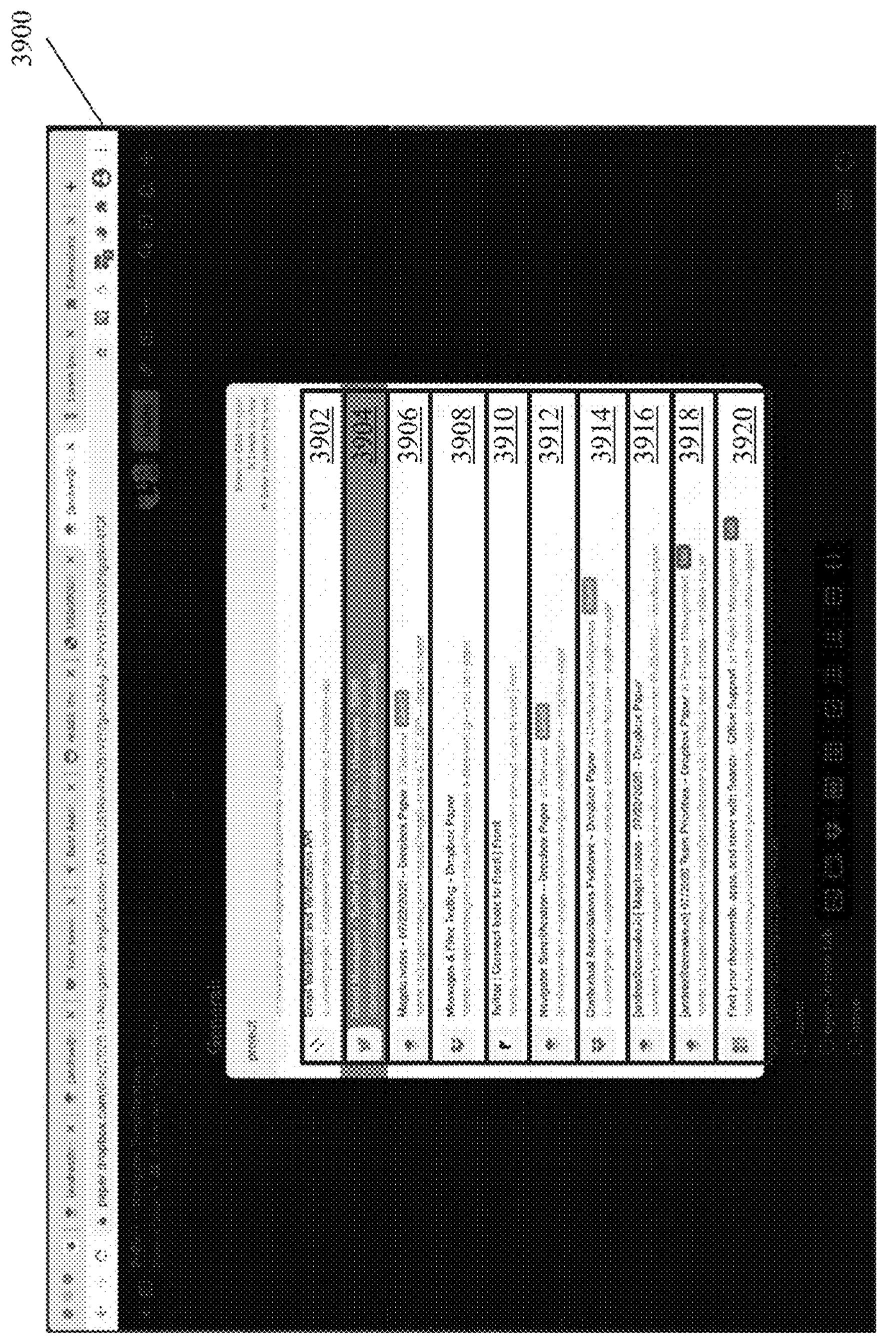
Figure 40:
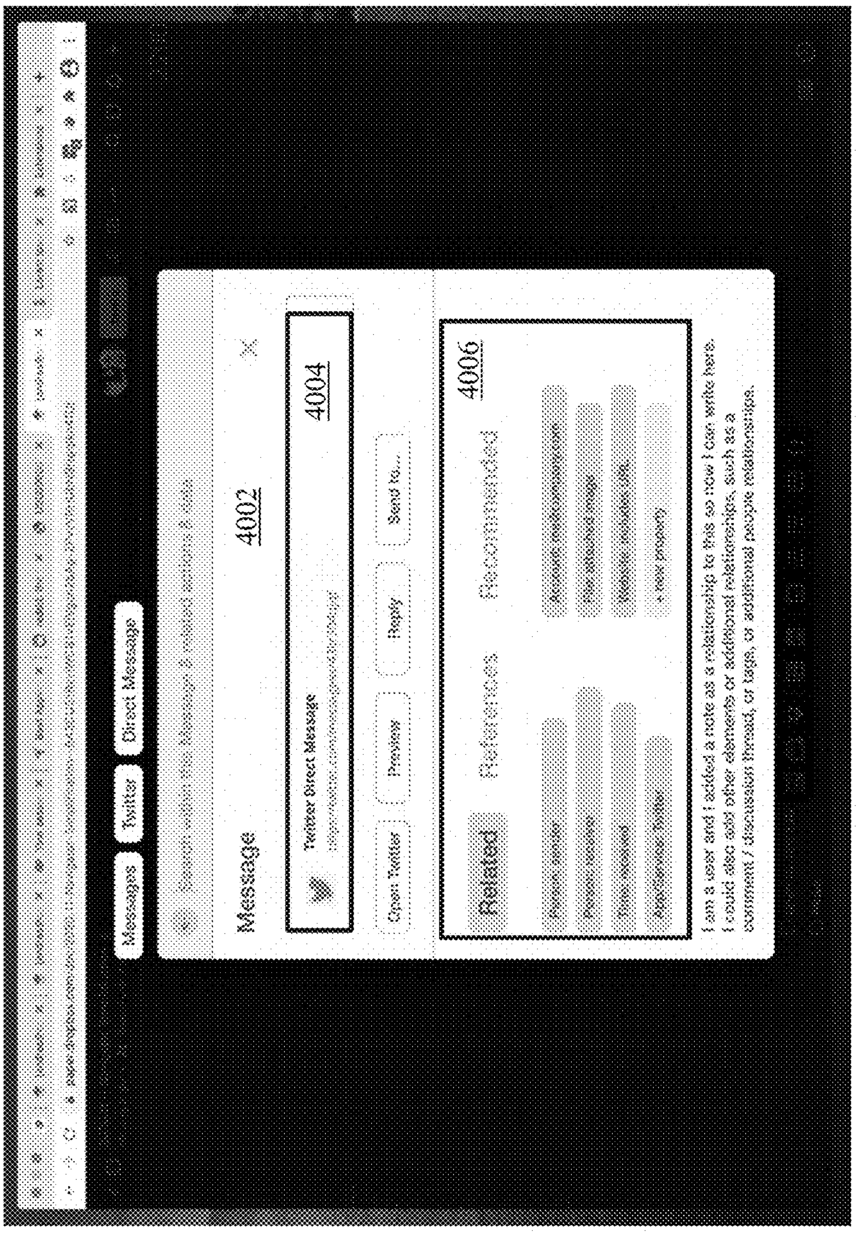

Referring now to FIGS. 39-40, a non-limiting example of displaying context data in addition to search results is presented. When a user submits a query to the analytics server, the analytics server parses the query and generates query terms. The analytics server then queries the nodal data structure and identifies nodes associated with the query terms. The analytics server then displays the GUI 3900 that displays the search results. Specifically, the GUI 3900 includes graphical components 3902-3920. Each graphical component may correspond to a unit of work (e.g., file, chat sessions, document and/or contact) that is related to the query terms. For instance, the graphical component 3902 indicates that the analytics server has identified an email that is related to the query submitted by the user. Each graphical component may provide a brief description of its corresponding unit of work. For instance, the graphical component 3902 may include the subject of the email, timestamp, recipient(s), and/or other relevant information. Right clicking on the graphical component can reveal contextual data and/or action for the associated unit of work. The user may choose to either open the result in its corresponding application or to see more information about the result in the current search interface.

For instance, when the user selects or otherwise chooses to see more information about the result with a graphical component displayed on the GUI 3900, the analytics server may display the GUI 4000 including detailed information, contextual actions, and contextual data regarding the unit of work associated with the selected graphical component. The graphical component 4002 may display context data associated with the search result displayed within the graphical component 3904. For instance, the graphical component 3904 indicates that the analytics server has identified an online chat message that is relevant to the user's query terms. When the user clicks on the graphical component 3904, the analytics server displays the graphical component 4002.

The graphical component 4002 may display an indicator of the chat message 4004. The user may interact with the buttons shown in the graphical component 4002 to perform a series of contextual actions such as open the message (in its original website/service, a message client, and or other service), preview the message without visiting the website, reply to the social medial message, or send a link of the message or the pop-up/overlay with contextual data to another user, and so on.

The graphical component 4002 may also display detailed data associated with the message. For instance, the graphical component 4006 displays data associated with the user who sent the message, time associated with the message, application/platform on which the message was sent, an email address and/or other account information associated with the account sending the message, an attachment associated with the message (e.g., image file), and/or other relevant data.

As described above, the user viewing the graphical component 4002 may interact with the displayed data by adding notes and/or revising, adding, or deleting any of the identified context data. For instance, the user may add his/her customizes notes. The analytics server may revise the nodal data structure accordingly. Therefore, the analytics server may, for example, display the user's note when the same message appears in future search results, or when the user is viewing the message elsewhere (e.g., in a message client, in the original service/website, etc.).

Figure 41:
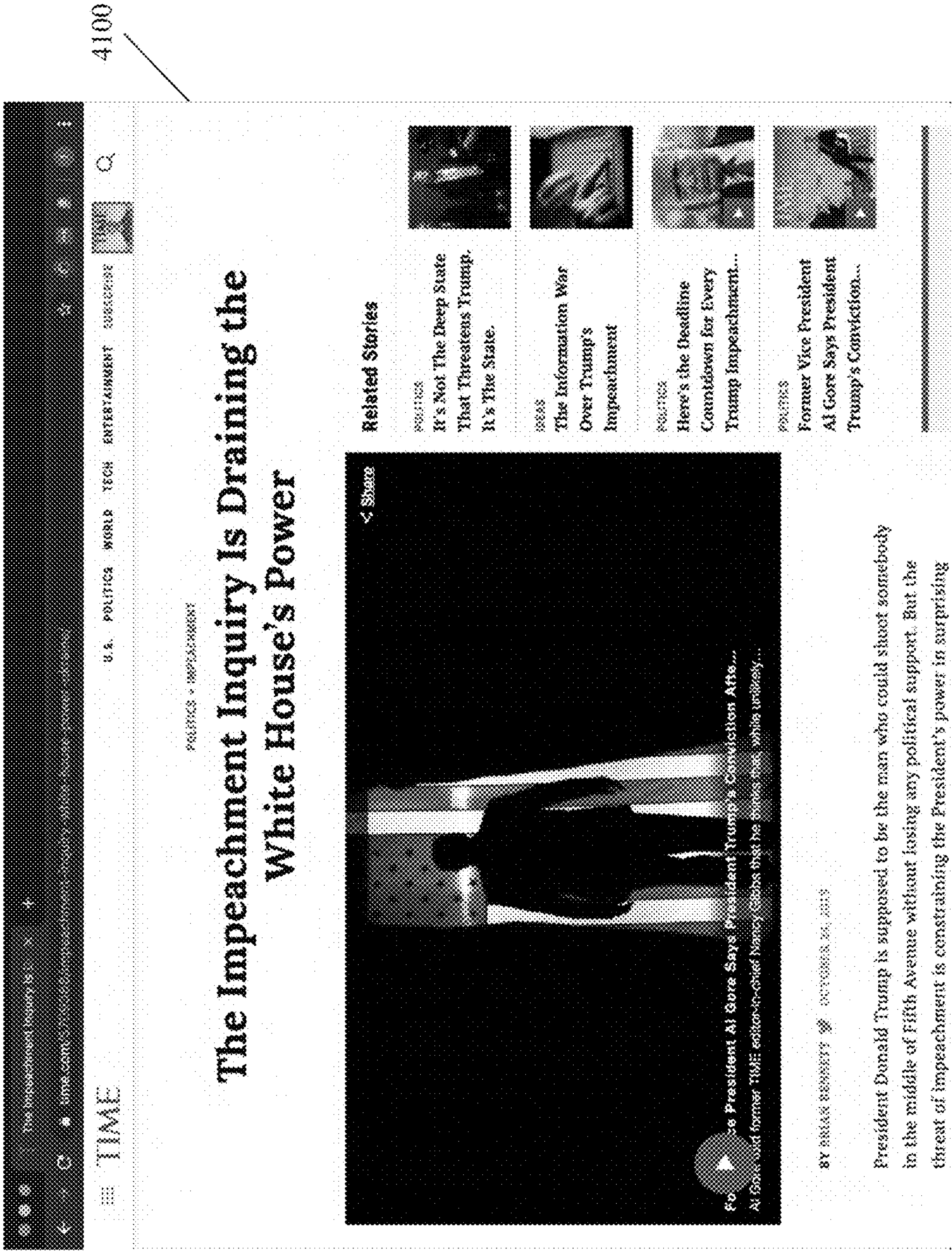
Figure 42:
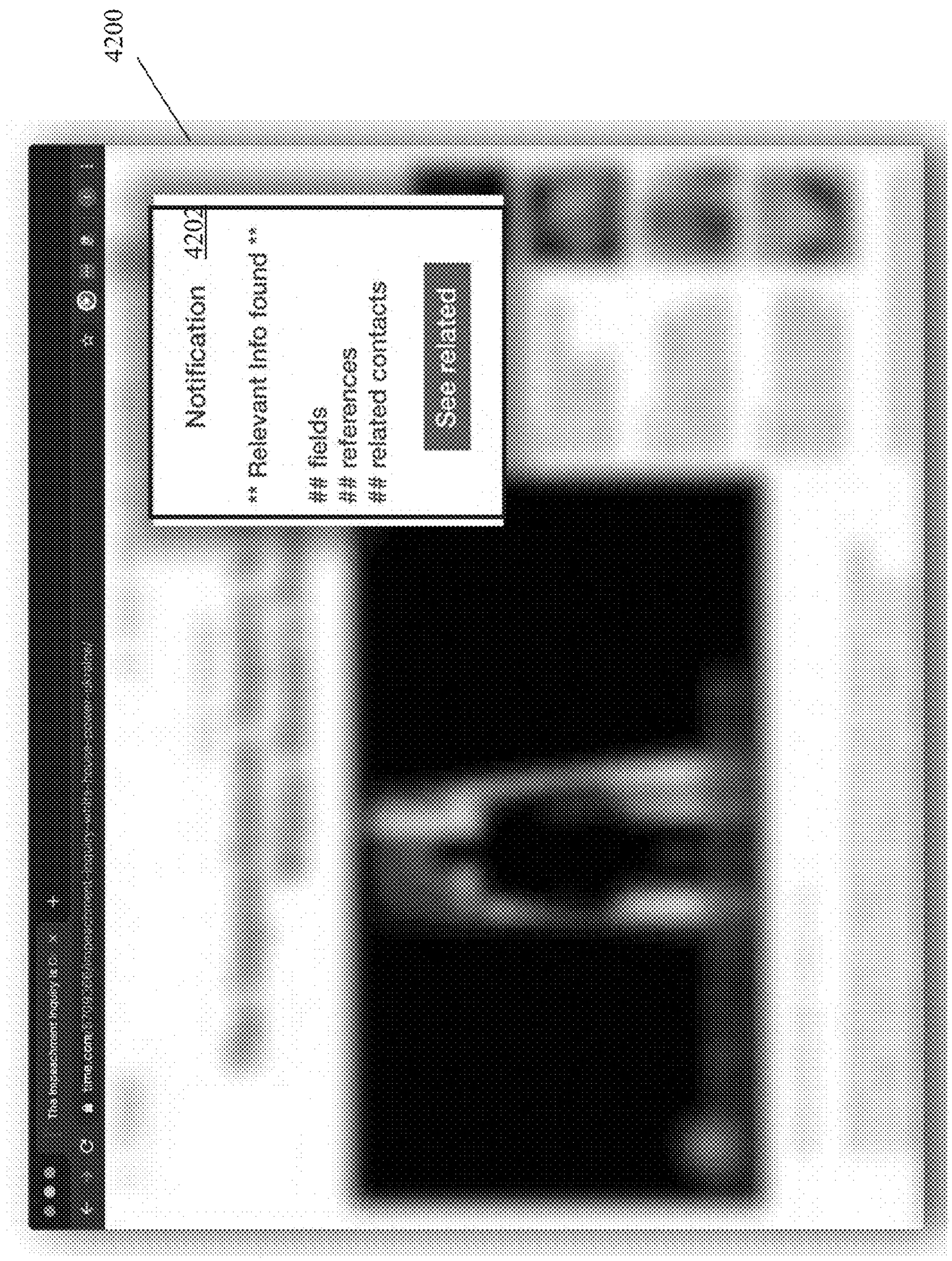

Referring now to FIGS. 41-44, another non-limiting example of displaying context data is depicted. In this non-limiting example, the user accesses a website as depicted in GUI 4100 (FIG. 41). The analytics server identifies the electronic content (website) using the URL associated with the website. The analytics server may then generate a unique identifier associated with the website and may search the nodal data structure accordingly. If the analytics server identifies one or more nodes related to the unique identifier of the website, the analytics server may display the graphical component 4202 as depicted in the GUI 4200 (FIG. 42). If the analytics server does not identify one or more nodes related to the unique identifier(s) of the electronic content, the analytics server may generate the nodes in the nodal data structure.

Figure 43:
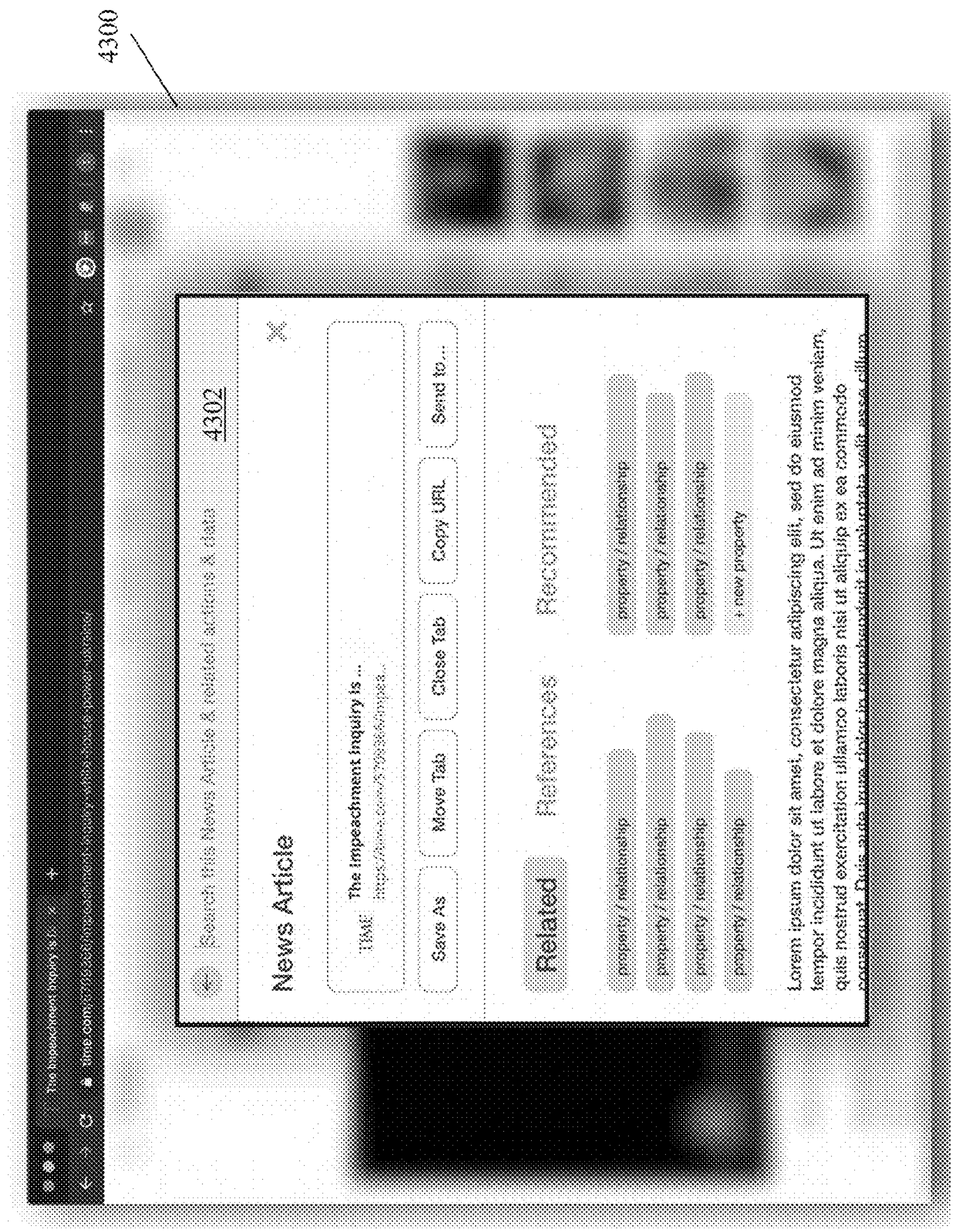

The graphical component 4202 identifies that relevant information has been found. The user can ignore the graphical component 4202 or may interact with the "see related" button to view the related information. If the user does nothing (within a predetermined time threshold) or closes the graphical component 4202, the analytics server stops displaying the graphical component 4202. If the user interacts with the "see related" button, the analytics server displays the GUI 4300 that includes the graphical component 4302 (FIG. 43).

Figure 44:
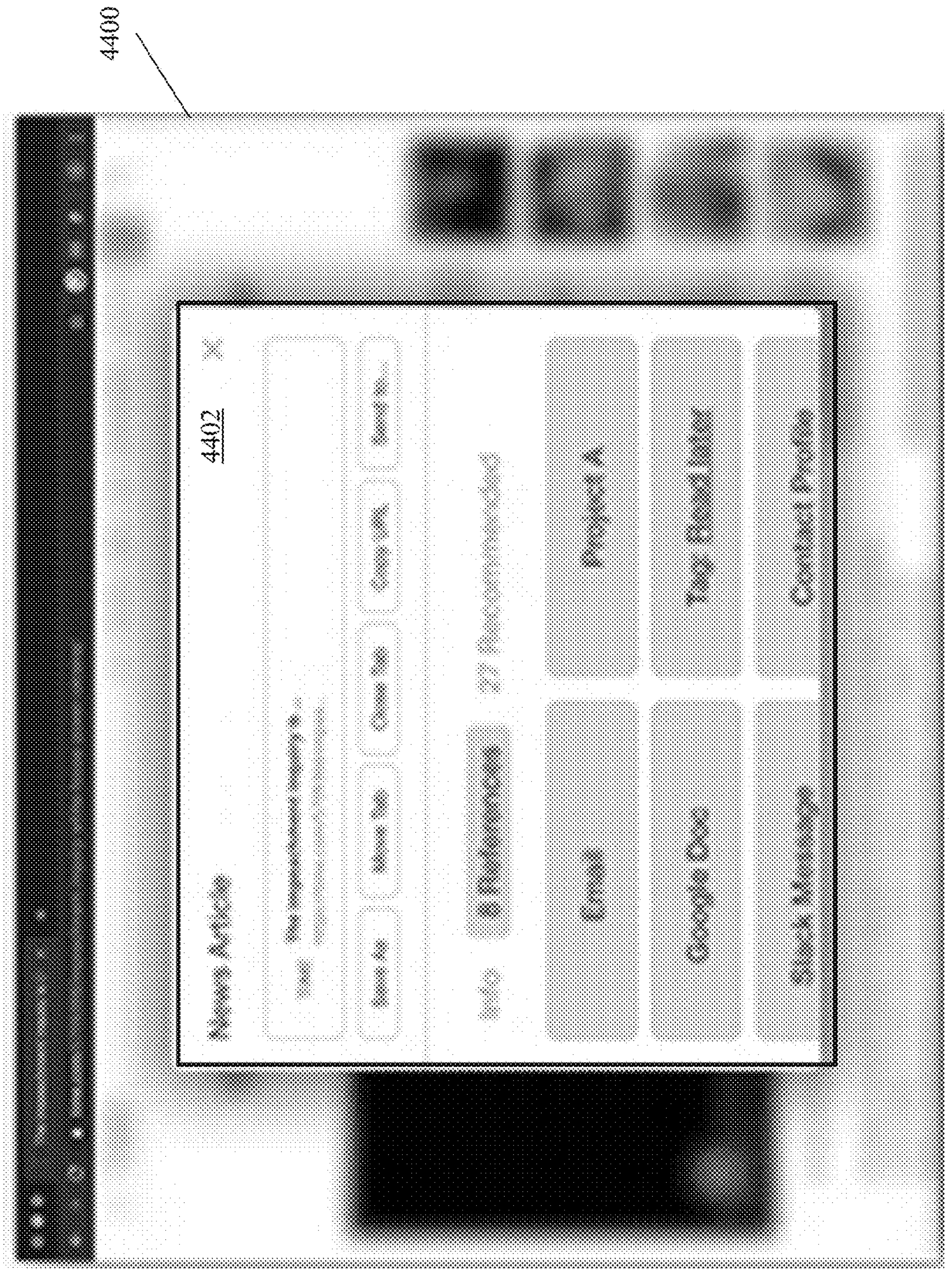

The graphical component 4302 identifies information and context data related to the electronic content displayed and viewed by the user, as described above. In some embodiments, the analytics server may display the graphical component 4402 in GUI 4400 (FIG. 44). The graphical component 4402 includes various placeholders for contextual data that reference the unique ID (e.g., web site/news article) or that reference the units of work that can be identified by the unique ID. In this non-limiting example, the user is able to visually scan and/or purposefully search through these "references" and related data. Selecting a reference may direct the user to a different page displaying the chosen/specific unit of work and all related/contextual data and actions in the nodal data structure. When the user interacts with any of the buttons, the analytics server may direct the user to a particular page (or a new GUI) that displays more detailed information regarding the unit of work corresponding with the selected button, such as any of the pages displaying context data (e.g., smart windows) described herein.

When the user interacts with the one of the references in the list (e.g., the reference found within an email shown by the "email" button/placeholder), the analytics server may direct the user to open the email in its normal webpage, in an email client, or some other service, as well as allow the user to preview all related data and actions associated with that email and the electronic content. When the user interacts with the "project A" button, the analytics server may direct the user to a new page displaying data relevant to project A. As depicted, the analytics server determines that a unique identifier of the website being viewed (GUI 4200) is related to nodes that have been identified as corresponding to a particular project (project A). Therefore, the analytics server provides the user with the option of viewing a page associated with project A.

When the user interacts with the "Google doc" button, the analytics server may direct the user to a page/GUI showing all related/contextual data and actions related to the Google doc, where all relevant units of work (e.g., notes, documents, messages, tasks, projects, clients, people, activity history, etc.) can be previewed and accessed. When the user selects the "Slack Message" button, the analytics server similarly presents a page with all contextual data and actions centered around the electronic slack message associated with the viewed website. As described above, the analytics server may identify one or more users associated with the viewed website. When the user interacts with the "contact profile" button, the analytics server may display the profile of a contact that has a reference to this particular website, URL, domain, and/or article.

The methods and systems described herein can be integrated into existing windows displayed by a computer's operating system. Moreover, the methods and systems described herein can also be implemented, such that the analytics server can display context/relevant data associated with any selected unit of work (e.g., chat message, email, or file). For instance, instead of analyzing the content displayed (or otherwise outputted) by the user's computer, the analytics server may receive a selection of a unit of work from the user (e.g., the user may right click on a file name or may otherwise select the file). In response, the analytics server may analyze the selected unit of work and display relevant data and actions as described herein. In some configurations, the user may launch a search interface with contextual data as an overlay/pop-up which will automatically use the electronic content as the selected unit(s) of work described above. In this way the user is able to easily interact (e.g., keyboard shortcut, icon click, voice command, etc.) with the electronic device to pull up searchable relevant context and data about the electronic content. When using the search feature, if no results are found to be directly associated with the electronic, the analytics engine can recommend results from elsewhere in the nodal data structure. Importantly, the analytics server may use the electronic content (and the various connections it may have to units of work in nodal structure) to influence the ranking of search results such that nodes that are related to both the search query and the electronic content are ranked higher than nodes with only an association to the search query.

In some configurations, the user may launch a search interface with contextual data as an overlay/pop-up which will automatically use the electronic content as the selected unit(s) of work described above. In this way the user is able to easily interact (e.g., keyboard shortcut, icon click, voice command, etc.) with the electronic device to pull up searchable relevant context and data about the electronic content. When using the search feature, if no results are found to be directly associated with the electronic, the analytics engine can recommend results from elsewhere in the nodal data structure. Importantly, the analytics server may use the electronic content (and the various connections it may have to units of work in nodal structure) to influence the ranking of search results such that nodes that are related to both the search query and the electronic content are ranked higher than nodes with only an association to the search query.

Additionally or alternatively, the various methods of retrieving, analyzing, and/or displaying data described herein may be combined together. For instance, the search engine described herein can be combined with other methods of data display, such that the user is provided with an intelligent search engine that may be limited to a selected category. Non-limiting examples of these embodiments are depicted in FIGS. 45-46.

Figure 45:
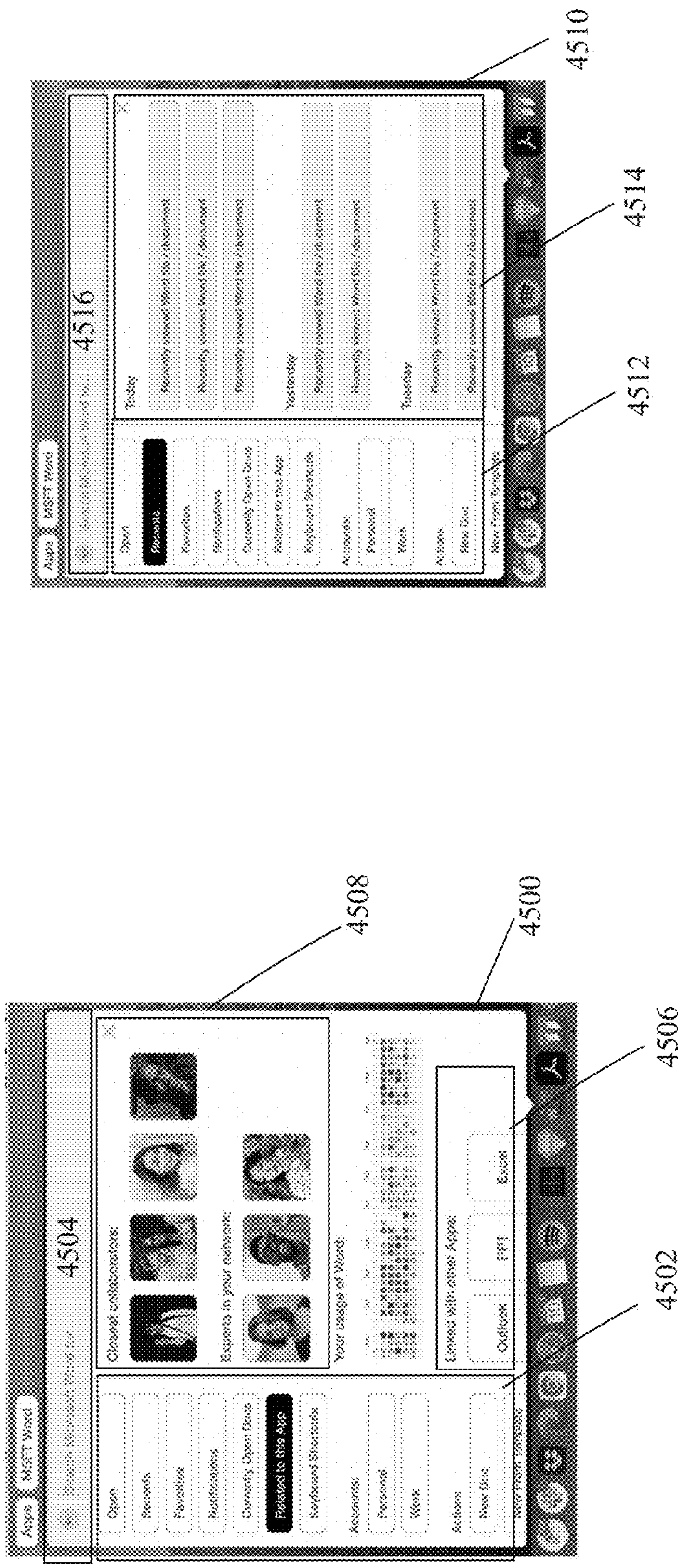
Figure 46:
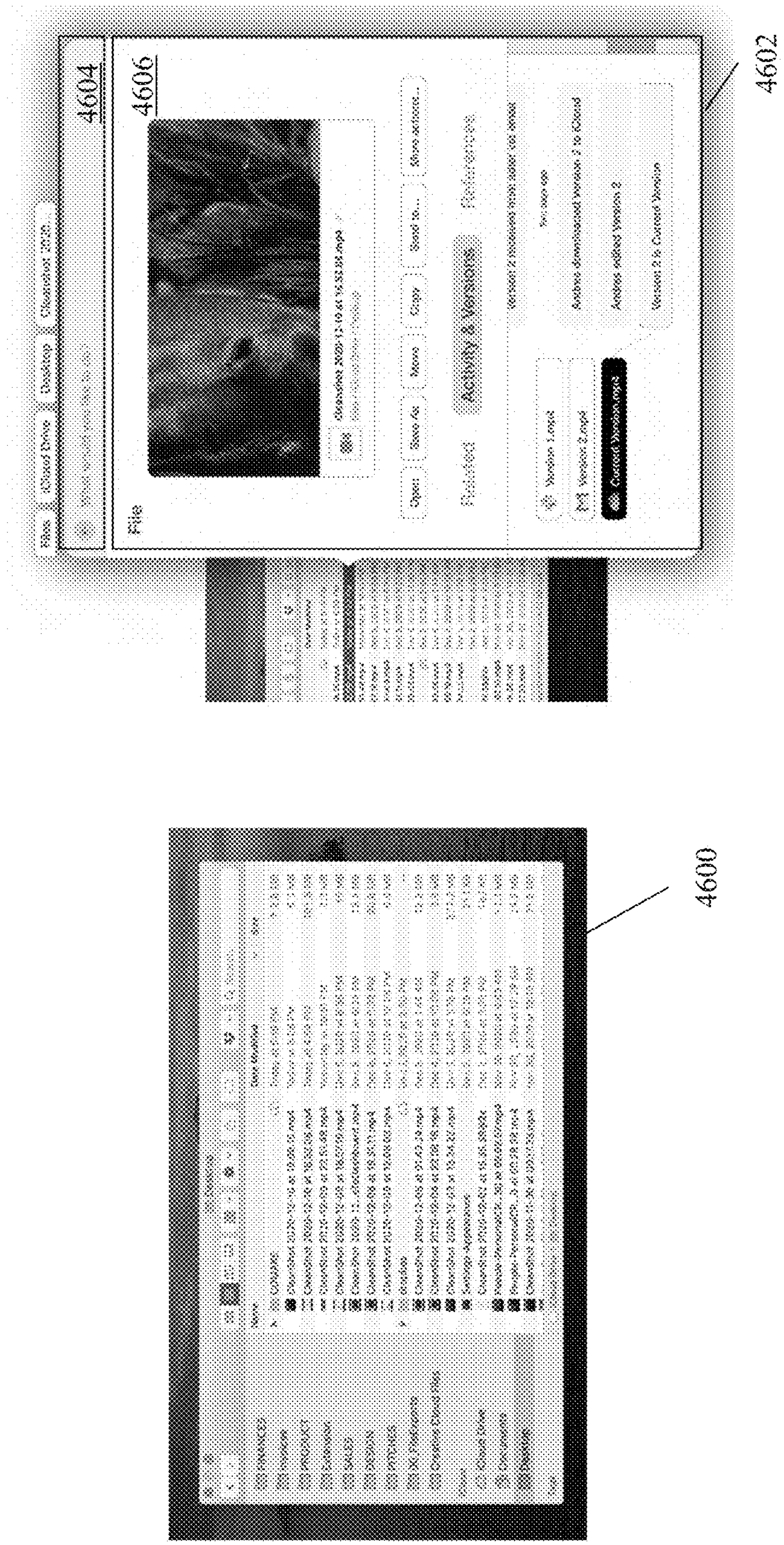

In the embodiment depicted in FIG. 45, the user accesses the GUI 4500. The GUI 4500 may be any GUI described herein that is configured to display data corresponding to one or more nodes within the nodal data structure. In an example, GUI 4500 may represent a view of all contextual data and actions related to a unit of work (e.g., a software application like Microsoft Word). In some other configurations, GUI 4500 may represent any of the pages displaying contextual data and action (e.g., smart windows) described herein.

The GUI 4500 may include a graphical component 4502 having various selectable buttons. The user may interact with a selectable button to identify the data displayed within the graphical element 4508 and/or 4506. For instance, the user may limit the data displayed within the graphical elements 4508 and/or 4506, such that the data is only relevant to a specific category (e.g., recently accessed files, favorite documents, notifications related to the selected unit of work, and/or keyboard shortcuts related to the selected unit of work). As depicted, the analytics server may integrate an intelligent search bar within the GUI 4500 (search bar 4504). Instead of browsing through the data, the user may directly enter query terms into the search bar 4504. As a result, the analytics server may use the methods and systems described herein to identify relevant data and may dynamically update the graphical elements 4508 and/or 4506. In some configurations, the results displayed may be limited by a category selected by the user (e.g., a category within the graphical component 4502).

In a non-limiting example, the user may access the GUI 4510 by right clicking on a particular file/button/link that represents/references/shortcuts to an application (e.g. Microsoft Word). The user may control the data displayed by the analytics server by dates and time. The user may do this by interacting with the selective button (e.g. "recents") displayed within the graphical component 4512. As a result, the analytics server may dynamically populate the graphical component 4514 and display recently viewed files associated with the unit of work focused in the "contextual overlay" that may show related contextual data and actions associated with that unit of work (e.g. an application like Microsoft Word). Instead of reviewing all the data displayed within the graphical component 4514, the user may use the search bar 4516 to navigate through the important dates. As described above, the user may input query terms in natural language and receive results from the analytics server.

In another non-limiting example, a variation of the GUI 4500 may represent a smart window displayed by the analytics server that is specific to a project. The user may select a category/property/action associated with that smart window using a variation of the graphical component 4502. The user may access the smart-window-variation of the GUI 4500 by interacting with a shortcut/file/reference that points to the project/smart window. The user may then see all relevant contextual data and actions presented in the "contextual overlay" for that smart window/project. The user may use the search bar 4504 and enter "who are some of the people who work on this project?" As a result, the analytics server identifies various users/employees associated with the project and dynamically displays an image and a name of each user within the graphical component 4508.

The user might also get to the "contextual overlay" for the project by first right clicking on a file on the user's computing device (or otherwise interacts with the file in a manner that instruct the analytics server to display relevant data), and from that file seeing a shortcut to the aforementioned project/window. The user may easily click the project and the analytics server may identify a corresponding project and display the smart-window-variation of the GUI 4500.

In the embodiment depicted in FIG. 46, the analytics server integrates the methods and systems described herein into an operating system of the user's computer. For instance, the user may access the GUI 4600 which is a GUI displaying different files stored on the user's computer (or otherwise accessible to the user, such as stored on the cloud). The analytics server may monitor the user's interactions with the GUI 4600. Upon the user right clicking on the file (or otherwise instructing the analytics server), the analytics server displays the pop-up window 4602 that displays data specific to the selected file.

The pop-up window 4602 may include a search bar 4604 and graphical component 2806. The graphical component 4606 displays data relevant to the selected file, such as filename, relevant files, version information, and other data stored within the nodal data structure and described herein. The user may review the data displayed within the graphical component 4606. Additionally or alternatively, the user may interact with the search bar 4604 to input direct queries where the results are specific to the selected file. For instance, the user may input "what is this file about?" As a result, the analytics server may display that the file is associated with a particular project and display project information. The analytics server may also display access history and edit history data associated with the selected file.

Figure 47:
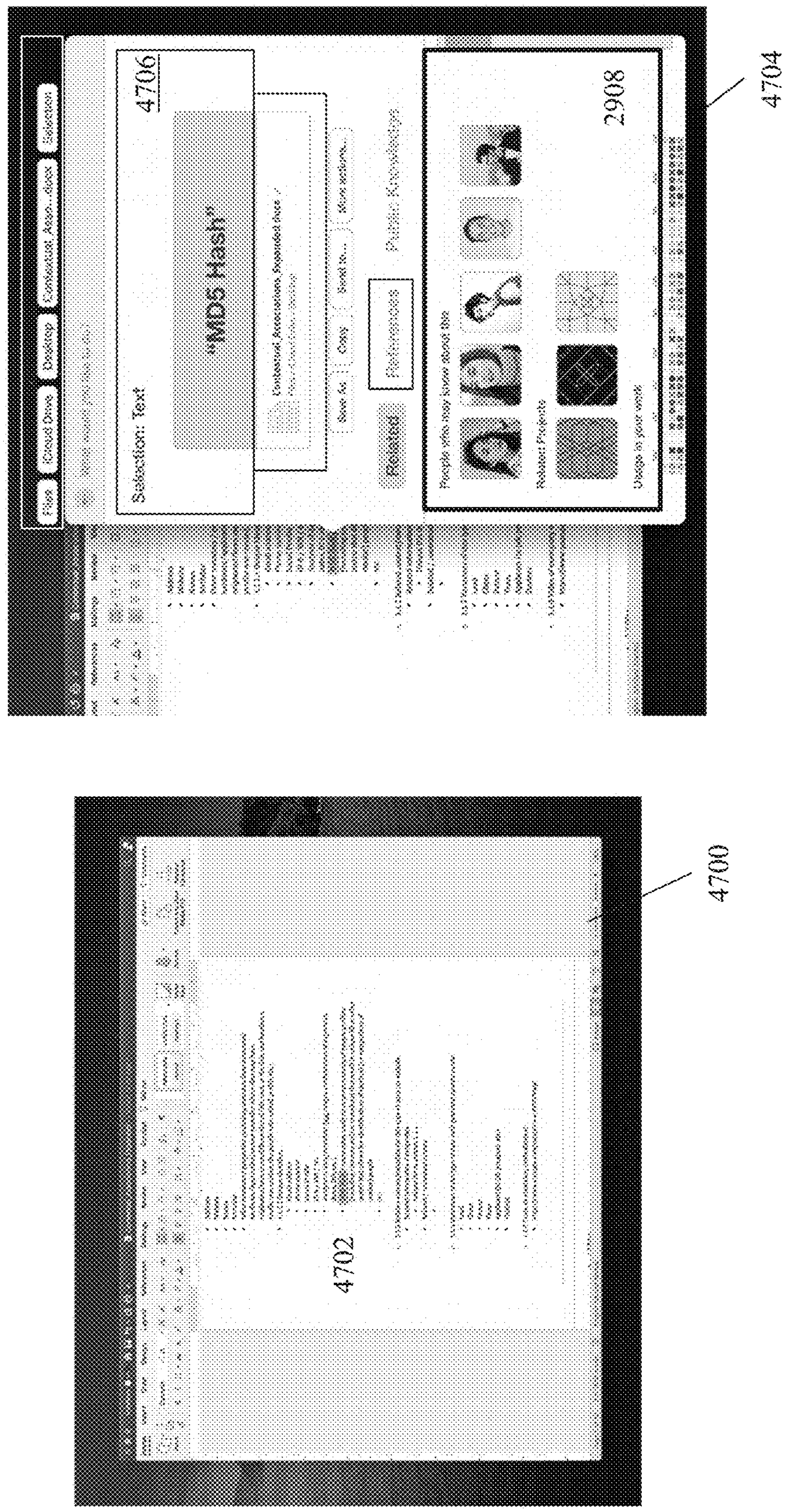

In the embodiment depicted in FIG. 47, a user is viewing an electronic document 2900. The analytics server continuously analyzes the terms within the electronic document. When the analytics server identifies a term that is related to one or more nodes within the document, the analytics server highlights the term (4702). When the user hovers over the highlighted term, the analytics server displays the GUI 4704 where the graphical element 4706 displays data associated with relevant content and the graphical component 4708 displays other users relevant to the highlighted term (e.g., other users who have worked on similar projects or projects that are related to the highlighted term).

In some configurations the analytics server does not automatically highlight the term 4702, however when the user highlights the term, the analytics server can identify present a notification that contextual data and actions exist for the highlighted or selected term/content. The analytics server may provide the user with a prompt to open the "contextual overlay" associated with that term, or otherwise automatically open it on behalf of the user.

Figure 49:
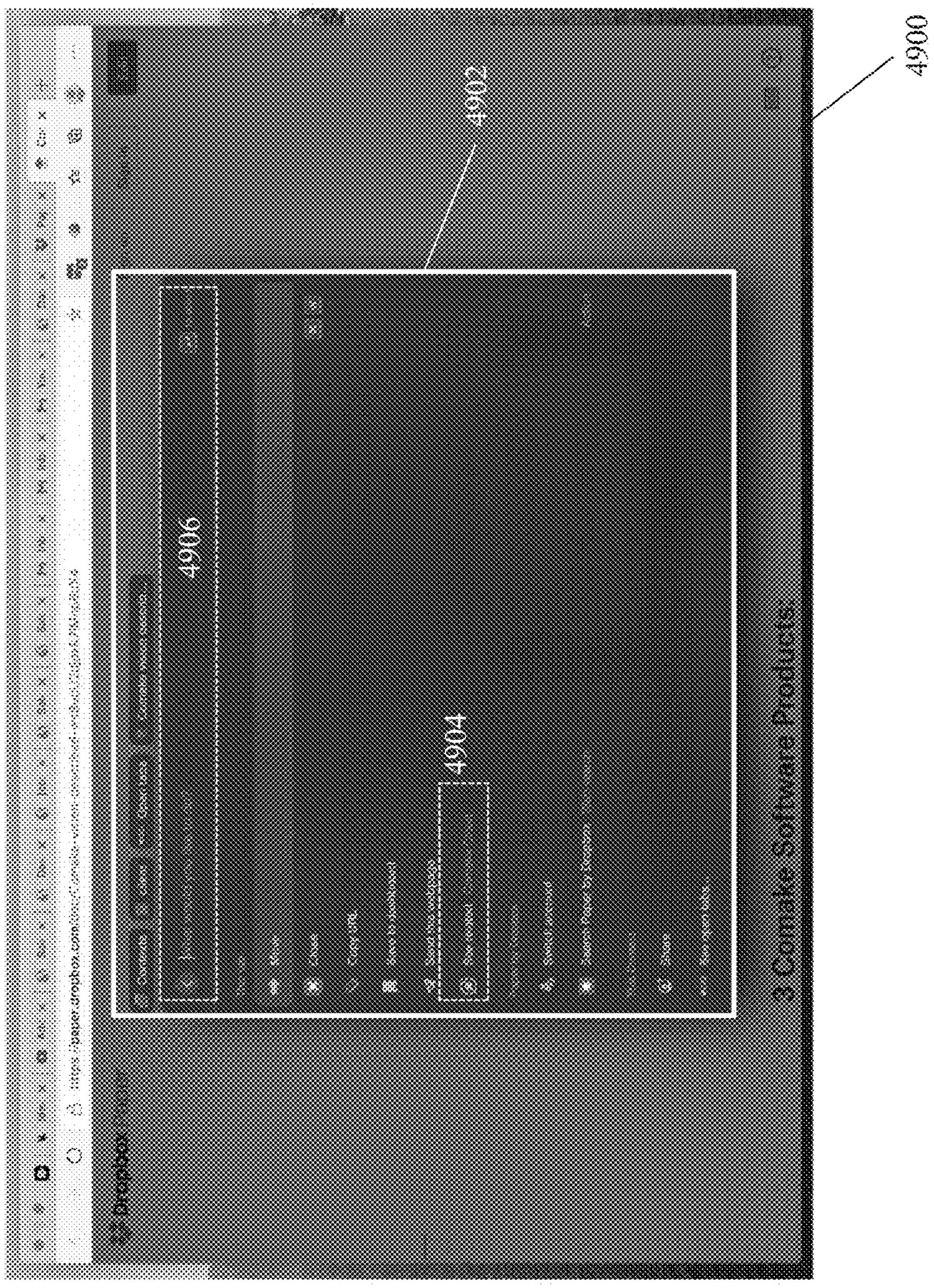

In the embodiment depicted in FIG. 49, the user is viewing electronic content on a browser. Upon the user transmitting an instruction to the analytics server (e.g., by pressing Ctrl+ Space or any other customizable combination of keys), the analytics server displays the overlay 3202 that displays contextual information and actions relevant to electronic content, which includes the webpage/tab open in the browser application being viewed by the user, the application associated with that webpage (e.g., Paper by Dropbox), the project/smart window/context associated with current browsing session (e.g. actions like share this "context"/smart window), and any relevant other units of work (e.g., some actions, some relationships, and/or options to see more information and context, as described herein).

Additionally, the analytics server may display data associated with a project and/or client associated with the content being viewed by the user. Additionally, the analytics server may display the user's saved agenda and tasks within the overlay 4902. The agenda and tasks could presented could be determined by the analytic server's understanding of the current user, the time, the location, and the date potentially present within the electronic content. The user and/or analytics server could determine to filter down the presented agenda and tasks such that is relevant to other elements of the electronic content, such as the website being viewed, the project/smart window/context/client that it is associated with, etc.

Additionally, the analytics server may display data associated with a project and/or client associated with the content being viewed by the user. Additionally, the analytics server may display the user's saved agenda and tasks within the overlay 4902 (filtered, such that is relevant to the content being displayed).

If the user desires to access a file (or any other unit of work), the user may interact with the graphical component 4904 to view related files and select the desired file. The user may also view other related content (e.g., emails). Alternatively if the user can't find the desired file, the user may message a coworker who may have relevant information about the project or the content being viewed by the user. The coworker may be identified and presented to the user as a possible person with knowledge using the methods and systems described herein.

The analytics server may then monitor the communication between the user and his/her coworker. For instance, the analytics server may generate a node within the nodal data structure that corresponds to the message. If a file is shared between the parties, the analytics server may revise the nodal data structure by linking the message and the file to the content being viewed on the user's browser. In the alternative, the user may interact with the search bar 4906 to enter queries and identify the desired file.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

receiving, by a processor, an indication that a user has interacted with a representation of a subset of a set of data output by a computing device;

executing, by the processor, a computer model using a nodal data structure by inputting the indication that the user has interacted with the representation of the subset of the set of data to identify at least one node and at least one node associated with to the at least one node, the nodal data structure comprising a set of nodes corresponding to at least a portion of the set of data, wherein each node within the set of nodes corresponds to a respective subset of the set of data, and wherein each pair of nodes that comprises two nodes relevant to each other based on a relevancy threshold are associated together within the nodal data structure; and presenting, by the processor to the computing device, data corresponding to the at least one node and at least one other node associated within the nodal data structure.

2. The method of claim 1, wherein the data associated with the at least one node and at least one other node associated within the nodal data structure corresponds to an action can be taken by the user.

3. The method of claim 2, wherein the action corresponds to at least one of sending, sharing, accessing, downloading, printing, copying, transmitting, revising, creating, opening, saving, seeing related nodes, or getting directions.

4. The method of claim 1, wherein the computing device is a brain-computer interface or a neural control interface.

5. The method of claim 1, wherein the indication that the user has interacted with the representation of the subset of the set of data output by the computing device corresponds to the user interacting with a graphical indicator of the subset of the set of data displayed on the computing device.

6. The method of claim 1, wherein the data associated with the at least one node and at least one other node associated within the nodal data structure corresponds to a file, a message, an indication of a second user, a uniform resource locator, a note, a task, an event, an email address, or a physical address.

7. The method of claim 1, further comprising:

displaying, by the processor, an input element configured to receive the query term.

8. The method of claim 7, further comprising:

searching, by the processor, the nodal data structure based on the query term.

9. A system comprising:

a computer-readable medium storing a set of instructions that when executed, cause a processor to:

receive an indication that a user has interacted with a representation of a subset of a set of data output by a computing device;

execute a computer model using a nodal data structure by inputting the indication that the user has interacted with the representation of the subset of the set of data to identify at least one node and at least one node associated with to the at least one node, the nodal data structure comprising a set of nodes corresponding to at least a portion of the set of data, wherein each node within the set of nodes corresponds to a respective subset of the set of data, and wherein each pair of nodes that comprises two nodes relevant to each other based on a relevancy threshold are associated together within the nodal data structure; and present, to the computing device, data corresponding to the at least one node and at least one other node associated within the nodal data structure.

10. The system of claim 9, wherein the data associated with the at least one node and at least one other node associated within the nodal data structure corresponds to an action can be taken by the user.

11. The system of claim 10, wherein the action corresponds to at least one of sending, sharing, accessing, downloading, printing, copying, transmitting, revising, creating, opening, saving, seeing related nodes, or getting directions.

12. The system of claim 9, wherein the computing device is a brain-computer interface or a neural control interface.

13. The system of claim 9, wherein the indication that the user has interacted with the representation of the subset of the set of data output by the computing device corresponds to the user interacting with a graphical indicator of the subset of the set of data displayed on the computing device.

14. The system of claim 9, wherein the data associated with the at least one node and at least one other node associated within the nodal data structure corresponds to a file, a message, an indication of a second user, a uniform resource locator, a note, a task, an event, an email address, or a physical address.

15. The system of claim 9, wherein the instructions further cause the processor to:

display an input element configured to receive the query term.

16. The system of claim 15, wherein the instructions further cause the processor to:

search the nodal data structure based on the query term.

17. A system comprising:

a server configured to:

receive an indication that a user has interacted with a representation of a subset of a set of data output by a computing device;

execute a computer model using a nodal data structure by inputting the indication that the user has interacted with the representation of the subset of the set of data to identify at least one node and at least one node associated with to the at least one node, the nodal data structure comprising a set of nodes corresponding to at least a portion of the set of data, wherein each node within the set of nodes corresponds to a respective subset of the set of data, and wherein each pair of nodes that comprises two nodes relevant to each other based on a relevancy threshold are associated together within the nodal data structure; and present, to the computing device, data corresponding to the at least one node and at least one other node associated within the nodal data structure.

18. The system of claim 17, wherein the data associated with the at least one node and at least one other node associated within the nodal data structure corresponds to an action can be taken by the user.

19. The system of claim 18, wherein the action corresponds to at least one of sending, sharing, accessing, downloading, printing, copying, transmitting, revising, creating, opening, saving, seeing related nodes, or getting directions.

20. The system of claim 17, wherein the computing device is a brain-computer interface or a neural control interface.

* * * * *